United States Patent
Gordon

(10) Patent No.: US 11,765,219 B2
(45) Date of Patent: *Sep. 19, 2023

(54) NETWORK MONITORING TO DETERMINE PERFORMANCE OF INFRASTRUCTURE SERVICE PROVIDERS

(71) Applicant: DLVR, Inc., Phoenix, AZ (US)

(72) Inventor: Michael Gordon, Paradise Valley, AZ (US)

(73) Assignee: DLVR, Inc., Phoenix, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/384,532

(22) Filed: Jul. 23, 2021

(65) Prior Publication Data

US 2022/0159051 A1 May 19, 2022

Related U.S. Application Data

(63) Continuation of application No. 16/173,104, filed on Oct. 29, 2018, now Pat. No. 11,075,970, which is a
(Continued)

(51) Int. Cl.
*H04N 21/24* (2011.01)
*H04N 21/2343* (2011.01)
(Continued)

(52) U.S. Cl.
CPC .............. *H04L 65/75* (2022.05); *H04L 65/80* (2013.01); *H04L 67/02* (2013.01); *H04L 67/10* (2013.01);
(Continued)

(58) Field of Classification Search
CPC ......... H04L 65/65; H04L 65/70; H04L 67/02; H04L 67/5681
See application file for complete search history.

(56) References Cited

U.S. PATENT DOCUMENTS 8,051,166 B1 11/2011 Baumback et al.
8,145,782 B2 3/2012 McGowan et al.
(Continued)

FOREIGN PATENT DOCUMENTS

CN 1713721 A 12/2005
CN 102948125 A 2/2013
(Continued)

OTHER PUBLICATIONS

AU2015339201 received a First Examination Report dated Jun. 3, 2019, 5 pages.
(Continued)

*Primary Examiner* — Dustin Nguyen
(74) *Attorney, Agent, or Firm* — Kilpatrick Townsend & Stockton LLP

(57) ABSTRACT

Techniques for serving a manifest file of an adaptive streaming video include receiving a request for the manifest file from a user device. The video is encoded at different reference bitrates and each encoded reference bitrate is divided into segments to generate video segment files. The manifest file includes an ordered list of universal resource locators (URLs) that reference a set of video segment files encoded at a particular reference bitrate. A source manifest file that indicates the set of video segment files is identified based on the request. An issued manifest file that includes a first URL and a second URL is generated based on the source manifest file. The first URL references a first domain and the second URL references a second domain that is different from the first domain. The issued manifest file is transmitted to the user device as a response to the request.

20 Claims, 25 Drawing Sheets

Related U.S. Application Data continuation of application No. 15/683,462, filed on Aug. 22, 2017, now Pat. No. 10,142,386, which is a continuation-in-part of application No. 15/362,217, filed on Nov. 28, 2016, now Pat. No. 9,800,639, which is a continuation of application No. 14/925,693, filed on Oct. 28, 2015, now Pat. No. 9,509,742, which is a continuation-in-part of application No. 14/709,171, filed on May 11, 2015, now Pat. No. 9,426,089.

(60) Provisional application No. 62/072,265, filed on Oct. 29, 2014, provisional application No. 62/072,265, filed on Oct. 29, 2014.

(51) Int. Cl.
| | |
|---|---|
| H04L 65/75 | (2022.01) |
| H04N 21/845 | (2011.01) |
| H04L 65/80 | (2022.01) |
| H04L 67/1097 | (2022.01) |
| H04L 67/02 | (2022.01) |
| H04L 67/10 | (2022.01) |
| H04L 67/146 | (2022.01) |
| H04L 69/40 | (2022.01) |
| H04L 67/563 | (2022.01) |
| H04L 67/566 | (2022.01) |

(52) U.S. Cl.
CPC ........ *H04L 67/1097* (2013.01); *H04L 67/146* (2013.01); *H04L 67/563* (2022.05); *H04L 67/566* (2022.05); *H04L 69/40* (2013.01); *H04N 21/23439* (2013.01); *H04N 21/2402* (2013.01); *H04N 21/8456* (2013.01)

(56) References Cited

U.S. PATENT DOCUMENTS

| | | | |
|---|---|---|---|
| 8,234,350 | B1 | 7/2012 | Gu et al. |
| 8,327,013 | B2 | 12/2012 | MGowan et al. |
| 8,495,675 | B1 | 7/2013 | Philpott et al. |
| 8,539,523 | B2 | 9/2013 | Philpott et al. |
| 8,561,102 | B1 | 10/2013 | Mack et al. |
| 8,645,504 | B2 | 2/2014 | MGowan |
| 8,762,564 | B1 | 6/2014 | Philpott et al. |
| 9,197,559 | B1 | 11/2015 | Cloonan et al. |
| 9,363,329 | B1 | 6/2016 | Kolam et al. |
| 9,426,089 | B2 | 8/2016 | Gordon |
| 9,509,742 | B2 | 11/2016 | Gordon |
| 9,532,092 | B1 | 12/2016 | Suryanarayanan et al. |
| 9,613,042 | B1 | 4/2017 | Joseph et al. |
| 9,800,639 | B2 | 10/2017 | Gordon |
| 10,084,838 | B2 | 9/2018 | Gordon et al. |
| 10,116,720 | B2 | 10/2018 | Gordon |
| 10,142,386 | B2 | 11/2018 | Gordon |
| 10,148,716 | B1 | 12/2018 | Joseph et al. |
| 10,182,096 | B1 | 1/2019 | Siddiqi et al. |
| 10,264,042 | B2 | 4/2019 | Gordon |
| 10,630,771 | B1 | 4/2020 | Garza et al. |
| 10,911,509 | B2 | 2/2021 | Gordon |
| 11,075,970 | B2 | 7/2021 | Gordon |
| 11,533,352 | B2 | 12/2022 | Gordon |
| 2004/0210320 | A1 | 10/2004 | Pandya |
| 2008/0086523 | A1 | 4/2008 | Afergan et al. |
| 2008/0109657 | A1 | 5/2008 | Bajaj et al. |
| 2011/0173345 | A1 | 7/2011 | Knox et al. |
| 2011/0246563 | A1 | 10/2011 | Keum et al. |
| 2012/0047542 | A1 | 2/2012 | Lewis et al. |
| 2012/0117239 | A1 | 5/2012 | Hollow ay et al. |
| 2012/0151009 | A1 | 6/2012 | Bouazizi et al. |
| 2012/0198492 | A1 | 8/2012 | Dhruv et al. |
| 2012/0254456 | A1 | 10/2012 | Visharam et al. |
| 2012/0259946 | A1 | 10/2012 | Stockhammer et al. |
| 2013/0054728 | A1 | 2/2013 | Amir et al. |
| 2013/0097309 | A1 | 4/2013 | Ma et al. |
| 2013/0103849 | A1 | 4/2013 | Mao et al. |
| 2013/0117120 | A1 | 5/2013 | Shafiee |
| 2013/0163758 | A1 | 6/2013 | Swaminathan et al. |
| 2013/0198328 | A1 | 8/2013 | Green et al. |
| 2013/0260796 | A1 | 10/2013 | Hasek |
| 2013/0290465 | A1 | 10/2013 | Harrison et al. |
| 2013/0332971 | A1 | 12/2013 | Fisher |
| 2014/0089465 | A1 | 3/2014 | Van Brandenburg et al. |
| 2014/0149210 | A1 | 5/2014 | Ma et al. |
| 2014/0149557 | A1 | 5/2014 | Lohmar et al. |
| 2014/0150019 | A1 | 5/2014 | Ma et al. |
| 2014/0230003 | A1 | 8/2014 | Ma et al. |
| 2014/0250230 | A1* | 9/2014 | Brueck ............... H04L 65/70 709/226 |
| 2014/0280480 | A1 | 9/2014 | Kazerani et al. |
| 2014/0280906 | A1 | 9/2014 | Johns et al. |
| 2014/0282765 | A1 | 9/2014 | Casey et al. |
| 2014/0337411 | A1 | 11/2014 | Panje et al. |
| 2014/0358925 | A1 | 12/2014 | Jakobowski |
| 2014/0359081 | A1 | 12/2014 | Van Deventer et al. |
| 2015/0026468 | A1 | 1/2015 | Riegel et al. |
| 2015/0120821 | A1 | 4/2015 | Bendell |
| 2015/0127844 | A1* | 5/2015 | Phillips ............... H04L 67/5681 709/231 |
| 2015/0127845 | A1 | 5/2015 | Phillips et al. |
| 2015/0172354 | A1 | 6/2015 | Coppola et al. |
| 2015/0180924 | A1 | 6/2015 | O'Callaghan et al. |
| 2015/0229471 | A1 | 8/2015 | Nair et al. |
| 2015/0256577 | A1 | 9/2015 | Gutierrez Vilaro et al. |
| 2015/0271179 | A1 | 9/2015 | Wang et al. |
| 2015/0271541 | A1 | 9/2015 | Gonder et al. |
| 2015/0296274 | A1 | 10/2015 | Good et al. |
| 2015/0304196 | A1 | 10/2015 | Sun et al. |
| 2015/0382042 | A1 | 12/2015 | Wagenaar et al. |
| 2016/0006817 | A1* | 1/2016 | Mitic ............... H04L 65/65 709/232 |
| 2016/0028647 | A1* | 1/2016 | Ramakrishnan ........ H04L 67/02 709/226 |
| 2016/0080470 | A1 | 3/2016 | Shanson |
| 2016/0127803 | A1 | 5/2016 | Shanson et al. |
| 2016/0149978 | A1 | 5/2016 | Wissingh et al. |
| 2016/0182475 | A1 | 6/2016 | Uzun |
| 2016/0191658 | A1 | 6/2016 | Kolam et al. |
| 2016/0248884 | A1 | 8/2016 | Larabi et al. |
| 2016/0337426 | A1 | 11/2016 | Shribman et al. |
| 2017/0149570 | A1 | 5/2017 | Counterman |
| 2017/0195242 | A1 | 7/2017 | Ibrahim |
| 2017/0339438 | A1 | 11/2017 | Slaughter et al. |
| 2017/0353516 | A1 | 12/2017 | Gordon |
| 2017/0353522 | A1 | 12/2017 | Van Brandenburg et al. |
| 2018/0376177 | A1 | 12/2018 | Nugent et al. |
| 2019/0297377 | A1 | 9/2019 | Tirpak |

FOREIGN PATENT DOCUMENTS

| | | |
|---|---|---|
| CN | 103210642 A | 7/2013 |
| CN | 103370709 A | 10/2013 |
| CN | 103583050 A | 2/2014 |
| CN | 107113454 A | 8/2017 |
| EP | 3213515 B1 | 6/2019 |
| TW | 201424314 A | 6/2014 |
| WO | 2013147983 A1 | 10/2013 |
| WO | 2016069896 A1 | 5/2016 |
| WO | 2016069896 A1 | 7/2016 |

OTHER PUBLICATIONS

CN201580071725.2 received an Office Action dated Jun. 27, 2019, 6 pages.
PCT/US2015/058054 Invitation to Pay Add'l Fees and Partial Search Report dated Feb. 18, 2016, 10 pages.
PCT/US2015/058054 International Search Report and Written Opinion dated Apr. 28, 2016.
U.S. Appl. No. 16/173,043 received a Non-Final Office Action dated Apr. 1, 2021, 12 pages.

(56) References Cited

OTHER PUBLICATIONS

U.S. Appl. No. 16/173,043 received a Non-Final Office Action dated Nov. 15, 2019, 11 pages.
U.S. Appl. No. 16/173,104 received a Non-Final Office Action dated Nov. 29, 2019, 13 pages.
U.S. Appl. No. 16/130,637 received a Final Office Action dated Sep. 25, 2020, 12 pages.
U.S. Appl. No. 14/709,171 , "Final Office Action", dated Feb. 25, 2016, 14 pages.
U.S. Appl. No. 14/709,171 , "Notice of Allowance", dated May 24, 2016, 8 pages.
U.S. Appl. No. 14/925,693 , "First Action Interview Office Action Summary ", dated Apr. 11, 2016, 5 pages.
U.S. Appl. No. 14/925,693 , "First Action Interview Pilot Program Pre-Interview Commu", dated Feb. 25, 2016, 4 pages.
U.S. Appl. No. 14/925,693 , "Notice of Allowance", dated Sep. 23, 2016, 5 pages.
U.S. Appl. No. 15/215,889 , "First Action Interview Pilot Program Pre-Interview Communication", dated Nov. 17, 2016, 3 pages.
U.S. Appl. No. 15/215,889 , "Notice Of Allowance", dated Feb. 15, 2017, 7 pages.
U.S. Appl. No. 15/362,217 , "First Action Interview Pilot Program Pre-Interview Communication", dated Apr. 7, 2017, 3 pages.
U.S. Appl. No. 15/362,217 , "Notice of Allowance", dated Jun. 27, 2017, 10 pages.
U.S. Appl. No. 15/615,073 , "First Action Interview Office Action Summary", dated Jan. 30, 2018, 8 pages.
U.S. Appl. No. 15/615,073 , "First Action Interview Pilot Program Pre-Interview Communication", dated Oct. 6, 2017, 4 pages.
U.S. Appl. No. 15/615,073 , "Notice of Allowance", dated Jul. 11, 2018, 6 pages.
U.S. Appl. No. 15/683,462 , "Final Office Action", dated Jul. 5, 2018, 6 pages.
U.S. Appl. No. 15/683,462 , "Non-Final Office Action", dated Nov. 30, 2017, 13 pages.
U.S. Appl. No. 15/683,462 , "Notice of Allowance", dated Sep. 5, 2018, 6 pages.
U.S. Appl. No. 15/713,179 , "Final Office Action", dated Oct. 4, 2018, 6 pages.
U.S. Appl. No. 15/713,179 , "Non-Final Office Action", dated Jan. 11, 2018, 19 pages.
U.S. Appl. No. 15/713,179 , "Notice of Allowance", dated Nov. 28, 2018, 6 pages.
U.S. Appl. No. 15/713,188 , "Final Office Action", dated Jun. 29, 2018, 6 pages.
U.S. Appl. No. 15/713,188 , "Non Final Office Action", dated Dec. 14, 2017, 19 pages.
U.S. Appl. No. 15/713,188 , "Notice of Allowance", dated Aug. 31, 2018, 6 pages.
U.S. Appl. No. 16/130,637, Notice of Allowance, dated Jan. 12, 2023, 7 pages.
U.S. Appl. No. 17/161,496, Final Office Action, dated Dec. 23, 2022, 12 pages.
U.S. Appl. No. 16/173,043, Corrected Notice of Allowability, dated Nov. 23, 2022, 3 pages.

\* cited by examiner

First Issued Variant Manifest File 500 (200 kbps)

502 — http://sfs.b.manifestserver.net/XYZ789/contentprovider/firstmanifestfile/200/segment-1.ts
504 — http://contentprovider.service-provider.net/firstmanifestfile/200/segment-2.ts
506 — http://contentprovider.service-provider.net/firstmanifestfile/200/segment-3.ts
508 — http://contentprovider.service-provider.net/firstmanifestfile/200/segment-4.ts
510 — http://sfs.b.manifestserver.net/XYZ789/contentprovider/firstmanifestfile/200/segment-5.ts
512 — http://contentprovider.service-provider.net/firstmanifestfile/200/segment-6.ts
514 — http://contentprovider.service-provider.net/firstmanifestfile/200/segment-7.ts
516 — http://contentprovider.service-provider.net/firstmanifestfile/200/segment-8.ts
518 — http://sfs.b.manifestserver.net/XYZ789/contentprovider/firstmanifestfile/200/segment-9.ts
520 — http://contentprovider.service-provider.net/firstmanifestfile/200/segment-10.ts
522 — http://contentprovider.service-provider.net/firstmanifestfile/200/segment-11.ts
524 — http://sfs.b.manifestserver.net/XYZ789/contentprovider/firstmanifestfile/200/segment-12.ts Second Issued Variant Manifest File 550 (600 kbps)

552 — http://sfs.b.manifestserver.net/XYZ789/contentprovider/firstmanifestfile/600/segment-1.ts
554 — http://contentprovider.service-provider.net/firstmanifestfile/600/segment-2.ts
556 — http://contentprovider.service-provider.net/firstmanifestfile/600/segment-3.ts
558 — http://contentprovider.service-provider.net/firstmanifestfile/600/segment-4.ts
560 — http://sfs.b.manifestserver.net/XYZ789/contentprovider/firstmanifestfile/600/segment-5.ts
562 — http://contentprovider.service-provider.net/firstmanifestfile/600/segment-6.ts
564 — http://contentprovider.service-provider.net/firstmanifestfile/600/segment-7.ts
566 — http://contentprovider.service-provider.net/firstmanifestfile/600/segment-8.ts
568 — http://sfs.b.manifestserver.net/XYZ789/contentprovider/firstmanifestfile/600/segment-9.ts
570 — http://contentprovider.service-provider.net/firstmanifestfile/600/segment-10.ts
572 — http://contentprovider.service-provider.net/firstmanifestfile/600/segment-11.ts
574 — http://sfs.b.manifestserver.net/XYZ789/contentprovider/firstmanifestfile/600/segment-12.ts

Example Manifest -- Interspersed CDNs

| |
|---|
| http://<CDN #1 SERVER HOSTNAME>/.../segment1.ts |
| http://<CDN #2 SERVER HOSTNAME>/.../segment2.ts |
| http://<CDN #2 SERVER HOSTNAME>/.../segment3.ts |
| http://<CDN #2 SERVER HOSTNAME>/.../segment4.ts |
| http://<CDN #2 SERVER HOSTNAME>/.../segment5.ts |
| http://<CDN #1 SERVER HOSTNAME>/.../segment6.ts |
| http://<CDN #2 SERVER HOSTNAME>/.../segment7.ts |
| http://<CDN #2 SERVER HOSTNAME>/.../segment8.ts |
| http://<CDN #2 SERVER HOSTNAME>/.../segment9.ts |
| http://<CDN #2 SERVER HOSTNAME>/.../segment10.ts |
| http://<CDN #1 SERVER HOSTNAME>/.../segment11.ts |
| http://<CDN #2 SERVER HOSTNAME>/.../segment12.ts |
| http://<CDN #2 SERVER HOSTNAME>/.../segment13.ts |
| http://<CDN #2 SERVER HOSTNAME>/.../segment14.ts |
| http://<CDN #2 SERVER HOSTNAME>/.../segment15.ts |
| http://<CDN #1 SERVER HOSTNAME>/.../segment16.ts |
| http://<CDN #2 SERVER HOSTNAME>/.../segment17.ts |
| ... |

Example Manifest -- Interspersed Redirects

| |
|---|
| http://<CDN #1 SERVER HOSTNAME>/.../segment1.ts |
| http://<CDN #1 URL REDIRECTS TO CDN #2 for segment2> |
| http://<CDN #1 URL REDIRECTS TO CDN #2 for segment3> |
| http://<CDN #1 URL REDIRECTS TO CDN #2 for segment4> |
| http://<CDN #1 URL REDIRECTS TO CDN #2 for segment5> |
| http://<CDN #1 SERVER HOSTNAME>/.../segment6.ts |
| http://<CDN #1 URL REDIRECTS TO CDN #2 for segment7> |
| http://<CDN #1 URL REDIRECTS TO CDN #2 for segment8> |
| http://<CDN #1 URL REDIRECTS TO CDN #2 for segment9> |
| http://<CDN #1 URL REDIRECTS TO CDN #2 for segment10> |
| http://<CDN #1 SERVER HOSTNAME>/.../segment11.ts |
| http://<CDN #1 URL REDIRECTS TO CDN #2 for segment12> |
| http://<CDN #1 URL REDIRECTS TO CDN #2 for segment13> |
| http://<CDN #1 URL REDIRECTS TO CDN #2 for segment14> |
| http://<CDN #1 URL REDIRECTS TO CDN #2 for segment15> |
| http://<CDN #1 SERVER HOSTNAME>/.../segment16.ts |
| http://<CDN #1 URL REDIRECTS TO CDN #2 for segment17> |
| ... |

Example Manifest – All Redirects

| |
|---|
| http://<CDN #1 URL REDIRECTS TO CDN #2 for segment1> |
| http://<CDN #1 URL REDIRECTS TO CDN #2 for segment2> |
| http://<CDN #1 URL REDIRECTS TO CDN #2 for segment3> |
| http://<CDN #1 URL REDIRECTS TO CDN #2 for segment4> |
| http://<CDN #1 URL REDIRECTS TO CDN #2 for segment5> |
| http://<CDN #1 URL REDIRECTS TO CDN #2 for segment6> |
| http://<CDN #1 URL REDIRECTS TO CDN #2 for segment7> |
| http://<CDN #1 URL REDIRECTS TO CDN #2 for segment8> |
| http://<CDN #1 URL REDIRECTS TO CDN #2 for segment9> |
| http://<CDN #1 URL REDIRECTS TO CDN #2 for segment10> |
| http://<CDN #1 URL REDIRECTS TO CDN #2 for segment11> |
| http://<CDN #1 URL REDIRECTS TO CDN #2 for segment12> |
| http://<CDN #1 URL REDIRECTS TO CDN #2 for segment13> |
| http://<CDN #1 URL REDIRECTS TO CDN #2 for segment14> |
| http://<CDN #1 URL REDIRECTS TO CDN #2 for segment15> |
| http://<CDN #1 URL REDIRECTS TO CDN #2 for segment16> |
| http://<CDN #1 URL REDIRECTS TO CDN #2 for segment17> |
| ... |

FIG. 13C

Example CDN Performance Table

| CDN | Region/City | Access Network | Performance Metrics |
|---|---|---|---|
| CDN #1 | Chicago | ABC Wireless | <content service statistics> |
| CDN #1 | Chicago | DEF Cable | <content service statistics> |
| CDN #1 | Seattle | ABC Wireless | <content service statistics> |
| CDN #1 | Seattle | DEF Cable | <content service statistics> |
| CDN #2 | Chicago | ABC Wireless | <content service statistics> |
| CDN #2 | Chicago | DEF Cable | <content service statistics> |
| CDN #2 | Seattle | ABC Wireless | <content service statistics> |
| CDN #2 | Seattle | DEF Cable | <content service statistics> |
| CDN #3 | Chicago | ABC Wireless | <content service statistics> |
| CDN #3 | Chicago | DEF Cable | <content service statistics> |
| CDN #3 | Seattle | ABC Wireless | <content service statistics> |
| CDN #3 | Seattle | DEF Cable | <content service statistics> |
| ... | ... | ... | ... |

NETWORK MONITORING TO DETERMINE PERFORMANCE OF INFRASTRUCTURE SERVICE PROVIDERS

CROSS-REFERENCES TO RELATED APPLICATIONS

The present application is a continuation of and claims priority to U.S. patent application Ser. No. 16/173,104, filed Oct. 29, 2018, issued as U.S. Pat. No. 11,075,970, and entitled "NETWORK MONITORING TO DETERMINE PERFORMANCE OF INFRASTRUCTURE SERVICE PROVIDERS," which is a continuation of and claims priority to U.S. patent application Ser. No. 15/683,462, filed Aug. 22, 2017, issued as U.S. Pat. No. 10,142,386, and entitled "DETERMINING MANIFEST FILE DATA USED IN ADAPTIVE STREAMING VIDEO DELIVERY," which is a continuation-in-part of and claims priority to U.S. patent application Ser. No. 15/362,217, filed Nov. 28, 2016, issued as U.S. Pat. No. 9,800,639 and entitled "CONFIGURING MANIFEST FILES REFERENCING INFRASTRUCTURE SERVICE PROVIDERS FOR ADAPTIVE STREAMING VIDEO," which is a continuation of and claims priority to U.S. patent application Ser. No. 14/925,693, filed Oct. 28, 2015, issued as U.S. Pat. No. 9,509,742, and entitled "CONFIGURING MANIFEST FILES REFERENCING INFRASTRUCTURE SERVICE PROVIDERS FOR ADAPTIVE STREAMING VIDEO," which is a continuation-in-part application of U.S. patent application Ser. No. 14/709,171, filed May 11, 2015, issued as U.S. Pat. No. 9,426,089, and entitled "SYSTEMS AND METHODS FOR SESSION-BASED RESOURCE ASSIGNMENT, DELIVERY, PERFORMANCE MANAGEMENT AND MEASUREMENT IN A NETWORKED ENVIRONMENT." Both U.S. patent application Ser. No. 14/925,693 and U.S. patent application Ser. No. 14/709,171 are non-provisional patent applications of and claim priority to U.S. Provisional Patent Application No. 62/072,265, filed Oct. 29, 2014, entitled "SYSTEMS AND METHODS FOR SESSION-BASED RESOURCE ASSIGNMENT, DELIVERY, PERFORMANCE MANAGEMENT AND MEASUREMENT IN A NETWORKED ENVIRONMENT." The entire disclosures of the above applications are hereby incorporated by reference, for all purposes, as if fully set forth herein.

BACKGROUND

1. The Field of the Invention

The present invention generally relates to adaptive streaming video. More specifically, the present invention relates to performance measurement and management for delivery of video content using adaptive streaming video protocols.

2. The Relevant Technology

There are many digital services available today, including mobile applications and services, Internet websites, social networking services, media and information distribution services, communications services, software and application services, data services, electronic commerce services, payment services, interactive services, and other digital services. Most digital services operate in a networked environment, such as a mobile network, the Internet, a local area network, a wide area network, another network, or a combination of such networks, and depend on the interaction of at least two, and often many more than two, different computing devices that communicate over the network, for example a user computer communicating with one or more servers over the Internet. Networked environments can be public, private, or a combination of public and private. Networked communications can occur directly, for example a user computer connecting to a server, or indirectly, for example a user computer connecting to a server that in turn connects to one or more other servers, or as another example, a user computer connecting to a server that in turn forwards the connection, or the information conveyed via that connection, to another server.

When a digital service operates in a networked environment, the user's experience with the digital service, and satisfaction with that experience, often depends to a substantial extent on the availability and performance of infrastructure resources, such as data and other resources available via the network, the availability and performance of network resources (such as the connections among the devices needed for that user's digital service session), or a combination of such resources. Infrastructure resources can include digital objects that are transmitted to or from the user device or among the servers or other devices supporting the digital service; compute resources, particularly compute resources that are not part of the user device, and that therefore are located remotely and accessed over the network; storage resources; data resources; network resources that connect various other resources and facilities in a networked environment, including mobile networks, the Internet, and private networks; image rendering resources; and other resources that support the digital service. Such resources may be available in multiple instances, limited instances, or single instances; may be available to all potential users, some potential users, or only a single potential user; and may be controlled and managed by the digital service (for example, servers that are operated by the digital service that host an Internet website), may be controlled and managed by a service provider with a relationship to the digital service (for example, a content delivery network service provider that provides delivery of website objects), may be controlled and managed by a service provider with a relationship to the user (for example, a user's mobile network), or may be controlled and managed by an entity with no relationship to either the digital service or the user (for example, an intermediate Internet network over which data is routed from the digital service to the user device).

Infrastructure resources are often subject to demand extremes that are unpredictable, making these resources important to manage effectively over a variety of time periods, including over long, intermediate, short, and sometimes very short periods of time; are often interconnected with limited flexibility, sophistication, and responsiveness, especially across independently managed organizations (for example, Border Gateway Protocol [BGP], the fundamental Internet routing protocol that controls the routing and flow of data between separate Internet Autonomous Systems, takes as an input the interconnection topology of networks but not the volume of traffic flows across, or the performance of, the network links that interconnect the networks); are often operated at levels approaching capacity limits, resulting in performance variability as well as significant dislocations in the event of partial or temporary failures; and are frequently dependent on the performance and/or availability of other resources operated by one or more disparate entities. Additionally, a user's actual or perceived experience with a digital service is commonly a "weakest link" circumstance, where a single unavailable or poorly performing resource may degrade the entire actual or perceived user experience; for example, an HTML, web page may not render properly in a browser window, or may not render at all, until the last page object to be delivered to the user device is received at the browser (which then finally enables the browser to render the full page) and as a result if one banner advertisement, embedded image, or other embedded page object is slow to arrive at the user device, the entire web page appears to the user to be slow to render; as another example, in many cases a video that begins playing properly will freeze and the user's device will display a buffering indicator if the data that makes up the video does not arrive at the device at the rate at which video playback renders the video data into video frames played out to the user, and as a result if one data packet is slow to arrive at the user device and arrives only after it is needed, video playback is interrupted and the video is not experienced normally and continuously by the user.

The variety of resources required, proliferation of interconnected resource infrastructure service providers, performance variability of infrastructure and other service providers, lack of control over necessary and/or unavoidable intermediate resource infrastructure and other service providers, the volatility and unpredictability of demand for (and utilization of) infrastructure resources, and the weakest link characteristics of many digital services, combined with the high performance expectations of users and low tolerance by users for error and delay, creates a demanding technical environment within which digital services operate.

A variety of commercially available services have been developed to address various aspects of this technical environment. Cloud computing services, such as EC2 from Amazon Web Services and Cloud Servers from Rackspace, provide rapidly scalable and highly available computing infrastructure services, including virtual servers addressed through IP (Internet Protocol) addresses in the same manner as physical servers, but provisioned on demand rather than physically. Cloud storage services, such as S3 from Amazon Web Services and Orchestrate™ Cloud Storage from Limelight Networks, provide rapidly scalable and highly available data storage services, where objects are typically addressed through Uniform Resource Locators (URLs) rather than through a file access method or file system associated with a physical storage device. Content delivery networks, such as Akamai Technologies and Limelight Networks, provide content (data and media object) delivery services by assigning servers to content requests through resolution of the hostname contained in a URL, leveraging the Internet's Domain Name System (DNS) infrastructure; the IP addresses returned when hostnames are resolved are intended to identify servers that are located close to the requesting point (in network terms) and are well-performing (typically, not under severe load conditions), thereby reducing network-related delays (by reducing network distance and the number of intermediate networks) and server-related delays (by avoiding overloading servers and by increasing server resources as demand for those resources increases). Network optimization services, such as Internap and Level3, reduce network-related delays by reducing network-induced latency and improving consistency by selecting better network routes, using private network segments, and/or classifying and prioritizing network traffic across networks or network segments, or network interconnections.

Each of these approaches has inherent limitations.

Using virtual server IP addresses provides an element of scalability and availability, but since virtual server IP addresses are generally each provisioned at a particular network location, the virtual server IP addresses may be far (in terms of network distance) from a given user computing device and/or subject to intermediate network performance; in addition, such virtual servers, like real physical servers, can become overloaded and therefore slower to respond.

Using cloud storage addresses provides an element of scalability and availability, but since cloud storage addresses are generally each provisioned at a particular network location or small group of network locations, they may be far (in terms of network distance) from a given user computing device and/or subject to intermediate network performance.

The DNS resolutions performed by content delivery networks allow for selection of servers that are ideally close, in network terms, to the user device, and that are not overloaded, but such DNS resolutions are not always accurately based on the location of the user's device, and further are generally not very granular. DNS resolution requests are not sent directly by the user's device to the content delivery network's DNS servers; rather, the user's device, typically along with thousands (or tens or hundreds of thousands) of other user devices, sends DNS requests to the local name server of the access network or mobile data network (generally, an Internet Service Provider, or ISP) that the user device is connected to, and the ISP local name server then sends the request to the content delivery network DNS servers for resolution. As a result, content delivery network DNS servers know only the location of the ISP local name server, and not the location of the user device itself, at the time of DNS resolution; while it is often the case that the network location of the ISP local name server is a good indicator of the network location of the user device, this is not always true—in a significant percentage of cases the network location of the ISP local name server is not an accurate indicator of the network location of the user device and in many cases is misleading. Further, DNS resolutions received by the ISP local name server from the content delivery network's DNS servers are cached (stored for a specified period of time) by the ISP local name server and reused, without re-contacting the content delivery network's DNS servers, for many other DNS resolution requests sent to the ISP local name server from other user devices; as a consequence, a single content delivery network DNS resolution may be reused thousands or tens of thousands of times before the ISP local name server re-contacts the content delivery network's DNS servers. And finally, a DNS resolution request, which is an Internet standard message, incorporates just the hostname contained in a URL, not the entire URL, and specifically does not include the path portion of the URL typically needed to identify the specific resource addressed by the URL; further, DNS resolutions are performed before the entire URL (which identifies the specific resource) is transmitted by the user device to the content delivery network (this URL transmission is the actual request from the user device to the content delivery network for the resource). Accordingly, a content delivery network's DNS hostname resolutions generally must each accommodate many (likely thousands or tens of thousands) possible content objects, many (likely thousands or tens of thousands) prospective user requests, and unknown (and possibly changing) potential server demand, all at the moment the hostname is resolved into one or more IP addresses.

While selecting a better network route or prioritizing network traffic can improve network performance over the managed portion of the end-to-end network route, it does not manage the unmanaged portion of the end-to-end network route, nor does it address server performance, server scalability, or server overloading.

Within each, and across all, of these approaches, one of a group of service providers may perform best under one set of technical conditions (comprising, for example, particular user devices, particular access networks, particular access network types [such as mobile or broadband], particular network and/or geographic locations, particular object types and sizes or resource characteristics, particular object library sizes and access patterns or resource access characteristics, and particular demand scenarios), while another service provider may perform better under a second set of technical conditions. Service provider performance under various sets of technical conditions may change over time, slowly or rapidly, may fluctuate regularly or irregularly, and may be significantly impacted by unusual occurrences, which can be long-lived or short-lived, such as sudden changes in aggregate demand or localized demand, outages, network and equipment failures, and security attacks and breaches. Service provider performance can be difficult to test fairly and objectively, especially when service providers are aware of testing and/or when performance testing itself is detectable by technical methods, especially automated technical methods. Service provider performance is also difficult to monitor in actual use (as opposed to in testing use), in detail, from a user's perspective, across multiple service providers and sets of technical conditions, within a timeframe that allows for effective action.

Further complicating the technical environment, in many cases digital services elect to allocate their use of each given infrastructure service among two or more infrastructure service providers, for example, concurrently using two (or more than two) content delivery networks to service content requests, allocating a given request to one or the other content delivery network. There are both business and technical reasons for this; a digital service may increase its negotiating leverage over service providers by utilizing more than one, and at the same time gains redundancy that allows it to continue operating if one of the service providers suffers an outage. Also in many cases, resources are supplied from multiple disparate originators, for example in the case of editorial content combined with advertising content (wherein the editorial content commonly originates from a publisher and the advertising content commonly originates from a separate advertising agency, network, server, or service provider); in such cases it is common that each originator utilizes a separate, independently managed technical infrastructure. When a digital service uses multiple infrastructure service providers, or needs to supply resources to end users from multiple originators, or both, the aggregate technical performance and actual or perceived user experience is subject to a greater and more complex range of technical factors, resulting from the performance variations among the infrastructure service providers, performance variations among the multiple originators, and performance characteristics of interactions among the multiple originators. Under these conditions, the weakest link condition may exacerbate effects on the overall user experience, or the experiences of a significant portion of users.

Some of these challenges might be partially addressed through the implementation on the user's device of software that collects data associated with technical performance and then adjusts infrastructure service provider selections and infrastructure services based on that data. This approach is limited, however, by limitations on the software environments implemented on user devices by the manufacturers of user devices, and by the increased complexity and other consequences to digital service operators of increasing the amount of programming included in the digital service's user device software or applications. For example, the browsers built into most mobile devices, including the mini Safari browser built into Apple's iOS and the mobile Chrome browser built into Android-certified devices, do not support the installation of browser extensions; as a result, browser-based applications can only interact with the browser, and the software function of the browser cannot be extended. Similarly, the software programming environments available on most mobile devices (including iOS-based devices and most Android-certified devices) do not support direct, low-level interaction with the Transmission Control Protocol (TCP) handling module on the device; this means that a software application running on an iOS device, for example, cannot directly measure connection latency, TCP packet loss, or TCP packet jitter (variations in the arrival rate of TCP packets). As a result, relying on software on the user's device would require relying on software that, in the case of many devices (including most mobile devices), is limited in terms of what it can observe, measure and implement. Even in the less restricted environment of a desktop browser, wherein using a browser extension installed into the browser can enable lower-level interaction with desktop operating system functions, the explicit user action required to install the browser extension operates as a significant impediment to practical, widespread implementation. And finally, implementing additional technical function in an end user application or via a browser extension increases the amount of programming code in the application (or in the application combined with the extension), which in turn increases programming development scope and cost, quality assurance scope, programming and operational complexity, the risk of software failure, and time to market for new software products and new releases of existing software products.

What is needed, then, is a way to assign (where appropriate) or deliver (where appropriate) resources needed by a digital service operating in a networked environment, and to assign infrastructure service providers to resource tasks required by a digital service, that operates without software extensions added to user device apps or user device browsers, that measures and manages performance of infrastructure resources, that measures and manages performance of multiple disparate infrastructure service providers, and that as a result improves the user's actual and perceived experience with the digital service.

Adaptive bitrate streaming can improve a user's experience when streaming multimedia content, such as video, over a data network or telecommunications network. To enable adaptive streaming of a video file, typically the video is encoded into multiple separate files, sometimes referred to as renditions or variants, each of which represents the same video encoded at a different reference bitrate. These files are then divided into segments in a consistent manner across the related group of files, with each segment typically (but not necessarily) a few seconds to several seconds in duration, e.g., the first segment of each variant file comprising the first ten seconds of the video, the second segment of each variant file comprising the second ten seconds, etc. Note that while this time-based segmentation is consistent across the bitrate files, it is not necessary that each sequential segment be the same duration; for example, the first segment of each bitrate can be ten seconds in duration, the second segment of each bitrate can be five seconds in duration, and the third segment of each bitrate can be six seconds in duration, and so on. Then, during playback of the video, the video player downloads the video segment file by segment file and can shift between different reference encoding bitrates as it proceeds from one segment to another, if necessary and depending on the rate at which segment files are downloaded to the device and other performance considerations, which can be affected by network conditions, server performance, device performance or characteristics, and/or other technical issues. For example, to maintain continuous playback, the player can downshift to a lower reference encoding bitrate when the network is congested and throughput is reduced; later, if network performance improves and throughput increases, the player can upshift to a higher reference encoding bitrate. Note that although playback is not interrupted, the user's experience can still be affected since a downshift in reference bitrate can cause a variation in video quality that is noticeable to the user, and since a lower bitrate video file may have reduced definition and other visual characteristics.

Generally, video file encoding can be performed in a consistent manner or in a variable manner. When a video file is encoded in a consistent manner, the encoded bit rate of the video is consistent during the video; accordingly, when a consistently encoded video is divided into segments, each segment of a given duration will be a comparable size file to other segments of the same duration. When a video file is encoded in a variable manner, the encoded bit rate of the video may vary during the video, for example when greater motion in a given sequence of video frames results in a higher bitrate in order to preserve the visual consistency of that sequence compared to other portions of the video; accordingly, when a variably encoded video is divided into segments, a segment of a given duration may be a different file size, larger or smaller, compared to one or more other segments of the same duration. Not all adaptive streaming video specifications and/or implementations support, or work properly with, variably encoded video files, but some may.

Typically, in order to obtain the video segment files for playback the video player first requests a master manifest file, sometimes also called an index file or a playlist, by issuing an HTTP GET request for the master manifest Uniform Resource Locator (URL). The master manifest is typically a text file comprising a plurality of URLs, each of which identifies a variant manifest; these URLs can be absolute or relative URLs, and are commonly relative URLs. The video player then requests some or all of the variant manifest files by issuing HTTP GET requests for the URLs of the required variant manifests. The video player may also issue HTTP header requests for the URLs of some or all of the variant manifests that are not requested in full (if any); this enables the video player to confirm that a manifest file is available for later download, and to obtain information about the file contained in the header. Each variant manifest is typically a text file comprising a plurality of URLs, each of which identifies a video segment file; these URLs can also be absolute or relative URLs, and are commonly relative URLs. Manifest files can contain other information in addition to URLs, for example metadata and other descriptive or control information. In the case of live or linear video, as the video player proceeds through playback of the segments identified in the then-current variant manifest, it will request an updated variant manifest, which should contain additional video segment URLs; in normal operation, updated variant manifest files will continue to be requested by, and available to, the video player until a manifest file is reached that contains an endlist tag or comparable indicator that the video stream has reached its end.

BRIEF SUMMARY

Various techniques (e.g., systems, methods, computer-program products tangibly embodied in a non-transitory machine-readable storage medium, etc.) are described herein for generating and providing manifest files for adaptive streaming video. In certain embodiments, a system for generating and providing manifest files may include one more segment file servers and a manifest file serving system for serving manifest files of an adaptive streaming video.

One or more embodiments may include techniques for delivery, performance measurement, and performance management of on-demand video to a user device in a networked environment, utilizing adaptive streaming video delivery protocols, and utilizing the standard video playback component that is present on the user's device without additional software or software extensions added to user device apps or user device browsers. Any of such embodiments may be referred to herein as the primary embodiment, although it should be understood that this is for reference purposes only, and that the primary embodiment is not prerequisite to or inherently more important than any of the other embodiments described herein.

One or more additional or alternative embodiments may include techniques for delivery, performance measurement, and performance management of linear video to a user device in a networked environment, utilizing adaptive streaming video delivery protocols, and utilizing the standard video playback component that is present on the user's device without additional software or software extensions added to user device apps or user device browsers. Any of such embodiments may be referred to herein as the secondary embodiment, although it should be understood that this is for reference purposes only.

The primary embodiment and secondary embodiment may comprise systems and methods according to which: the operator of a network of infrastructure components manages a set of character strings, wherein each character string designates a digital service that is authorized to use the network of infrastructure components; the network of infrastructure components resolves hostname DNS resolution requests to direct URL requests for manifest files to specific infrastructure components within the network of infrastructure components; the network of infrastructure components receives initial device requests for manifest files, wherein each manifest file is associated with the particular video that the requesting device seeks to play; the network of infrastructure components configures and returns to each requesting device one or more manifest files that enable that device to request the video segments files necessary to play the video and that enable the network of infrastructure components to assign infrastructure resources and/or infrastructure service providers to the delivery of video segment files, to measure the performance of the assigned infrastructure resources and infrastructure service providers, and to manage the performance of the assigned infrastructure resources and infrastructure service providers.

In other embodiments, the operator of a network of infrastructure components manages a set of character strings, wherein each character string designates a digital service that is authorized to use the network of infrastructure components; the network of infrastructure components resolves hostname DNS resolution requests to direct URL requests for manifest files to clusters of infrastructure components within the network of infrastructure components, by resolving the hostnames to the IP addresses of one or more switches associated with the cluster; one or more switches associated with each cluster of infrastructure components direct URL requests for manifest files to specific infrastructure components; the network of infrastructure components receives initial device requests for manifest files, wherein each manifest file is associated with the particular video that the requesting device seeks to play; the network of infrastructure components configures and returns to each requesting device one or more manifest files that enable that device to request the video segments files necessary to play the video and that enable the network of infrastructure components to assign infrastructure resources and/or infrastructure service providers to the delivery of video segment files, to measure the performance of the assigned infrastructure resources and infrastructure service providers, and to manage the performance of the assigned infrastructure resources and infrastructure service providers; and the configured manifest files returned to the requesting devices contain one or more video segment delivery URLs containing hostnames associated with the network of infrastructure components, each of which is resolved to the IP addresses of one or more segment file servers.

In other embodiments, the operator of a network of infrastructure components manages a set of character strings, wherein each character string designates a digital service that is authorized to use the network of infrastructure components; the network of infrastructure components resolves hostname DNS resolution requests to direct URL requests for manifest files to clusters of infrastructure components within the network of infrastructure components, by resolving the hostnames to the IP addresses of one or more switches associated with the cluster; one or more switches associated with each cluster of infrastructure components direct URL requests for manifest files to specific infrastructure components; the network of infrastructure components receives initial device requests for manifest files, wherein each manifest file is associated with the particular video that the requesting device seeks to play; the network of infrastructure components configures and returns to each requesting device one or more manifest files that enable that device to request the video segments files necessary to play the video and that enable the network of infrastructure components to assign infrastructure resources and/or infrastructure service providers to the delivery of video segment files, to measure the performance of the assigned infrastructure resources and infrastructure service providers, and to manage the performance of the assigned infrastructure resources and infrastructure service providers; the configured manifest files returned to the requesting devices contain one or more video segment delivery URLs containing hostnames associated with the network of infrastructure components, each of which is resolved to the IP addresses of one or more switches, in each case associated with a cluster of segment file servers; and the one or more switches associated with each cluster of segment file servers direct URL requests for video segment files to specific segment file servers.

In other embodiments, manifest files are configured by the network of infrastructure components but are not returned directly to the requesting device. Additional embodiments comprise systems and methods for the delivery of video in protocols other than adaptive streaming video protocols, for the delivery of data, image, text, audio, and other content that is not video, and for providing other infrastructure resources such as computing resources.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 5 is an illustration of exemplary issued variant manifest files that are generated for an adaptive streaming video.

configured to provide adaptive streaming video to the user device, in accordance with one or more embodiments of the disclosure.

FIG. 13A is a table representing an illustrative manifest file including interspersed URLs referencing multiple content delivery networks (CDNs), in accordance with one or more embodiments of the disclosure.

FIG. 13B is a table representing another illustrative manifest file including interspersed URLs that will cause a redirect to an additional content delivery network (CDN), in accordance with one or more embodiments of the disclosure.

FIG. 13C is a table representing another illustrative manifest file in which every URL will cause a redirect to an additional content delivery networks (CDN), in accordance with one or more embodiments of the disclosure.

FIG. 14 is a table illustrating example performance data for a number of content delivery networks (CDNs), in accordance with one or more embodiments of the disclosure.

Figure 15A:
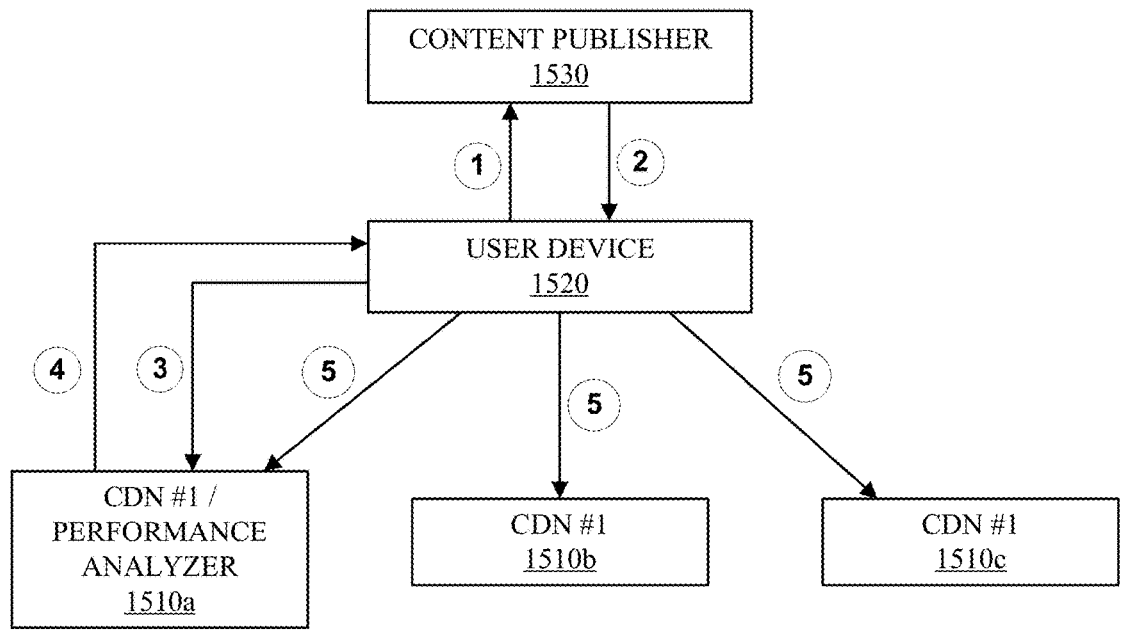
Figure 15B:
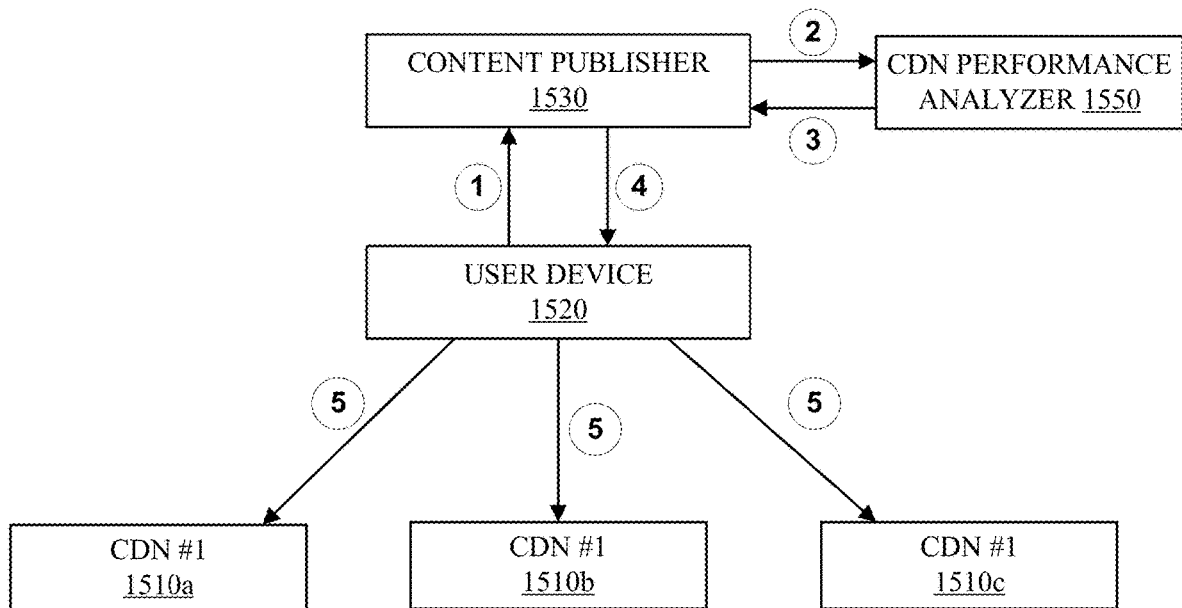

FIGS. 15A and 15B are block diagrams representing systems for delivering adaptive streaming video from one or more content delivery networks (CDNs) to user devices, in accordance with one or more embodiments of the disclosure.

Figure 16:
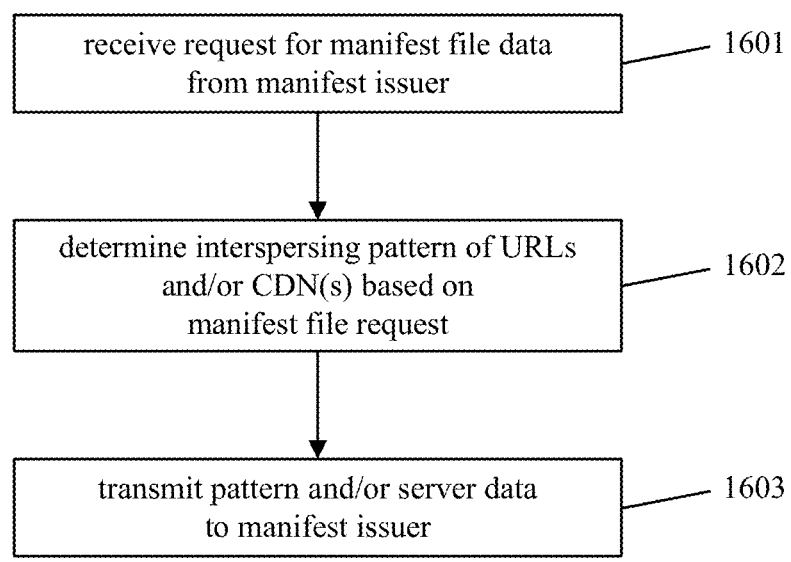

FIG. 16 is a flow diagram illustrating an example process of providing manifest-related information to a manifest issuing device, in accordance with one or more embodiments of the disclosure.

Figure 17:
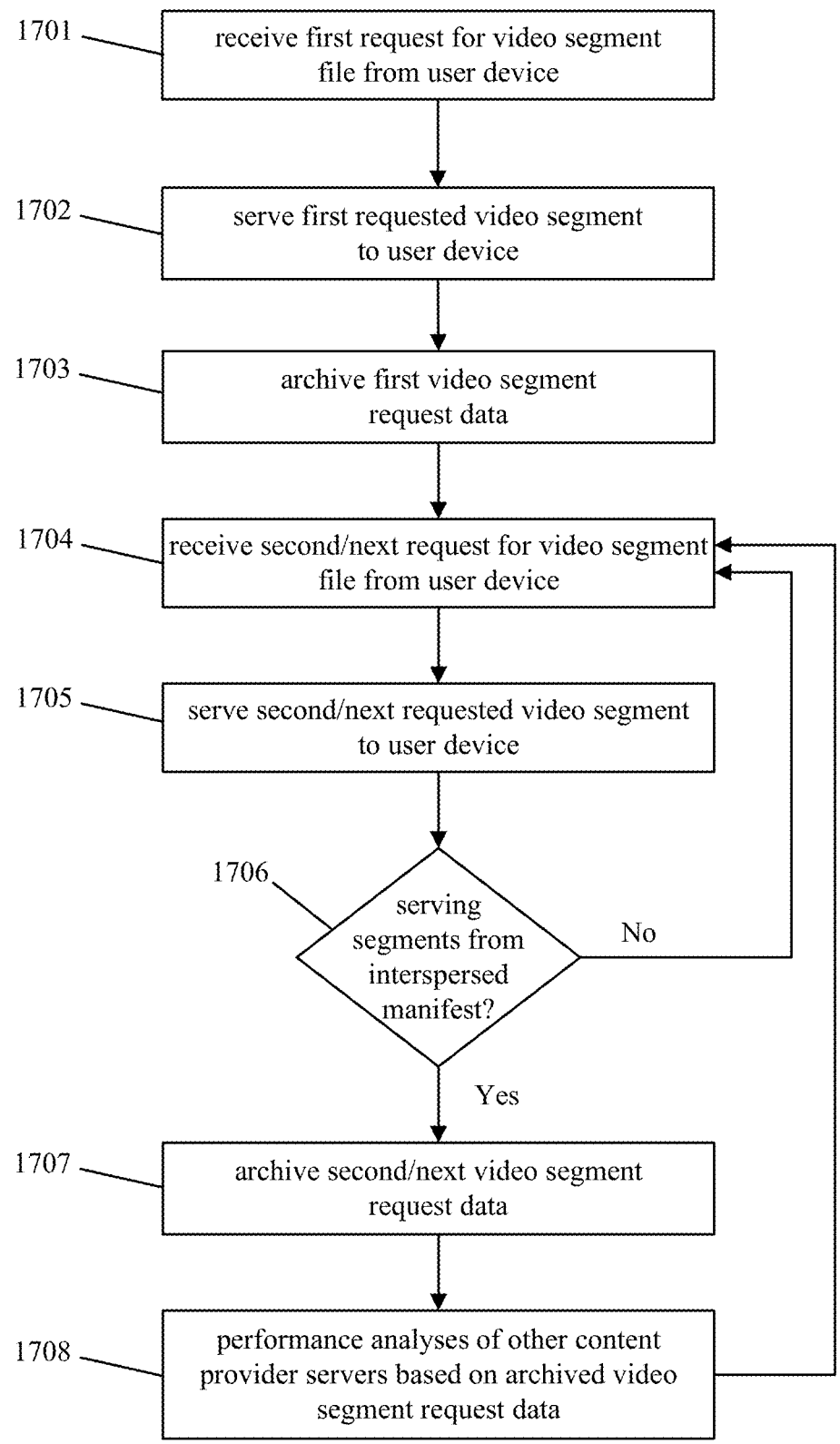

FIG. 17 is a flow diagram illustrating an example process for a content delivery network (CDN) to analyze the performance of other content delivery networks (CDNs), in accordance with one or more embodiments of the disclosure.

Figure 18:
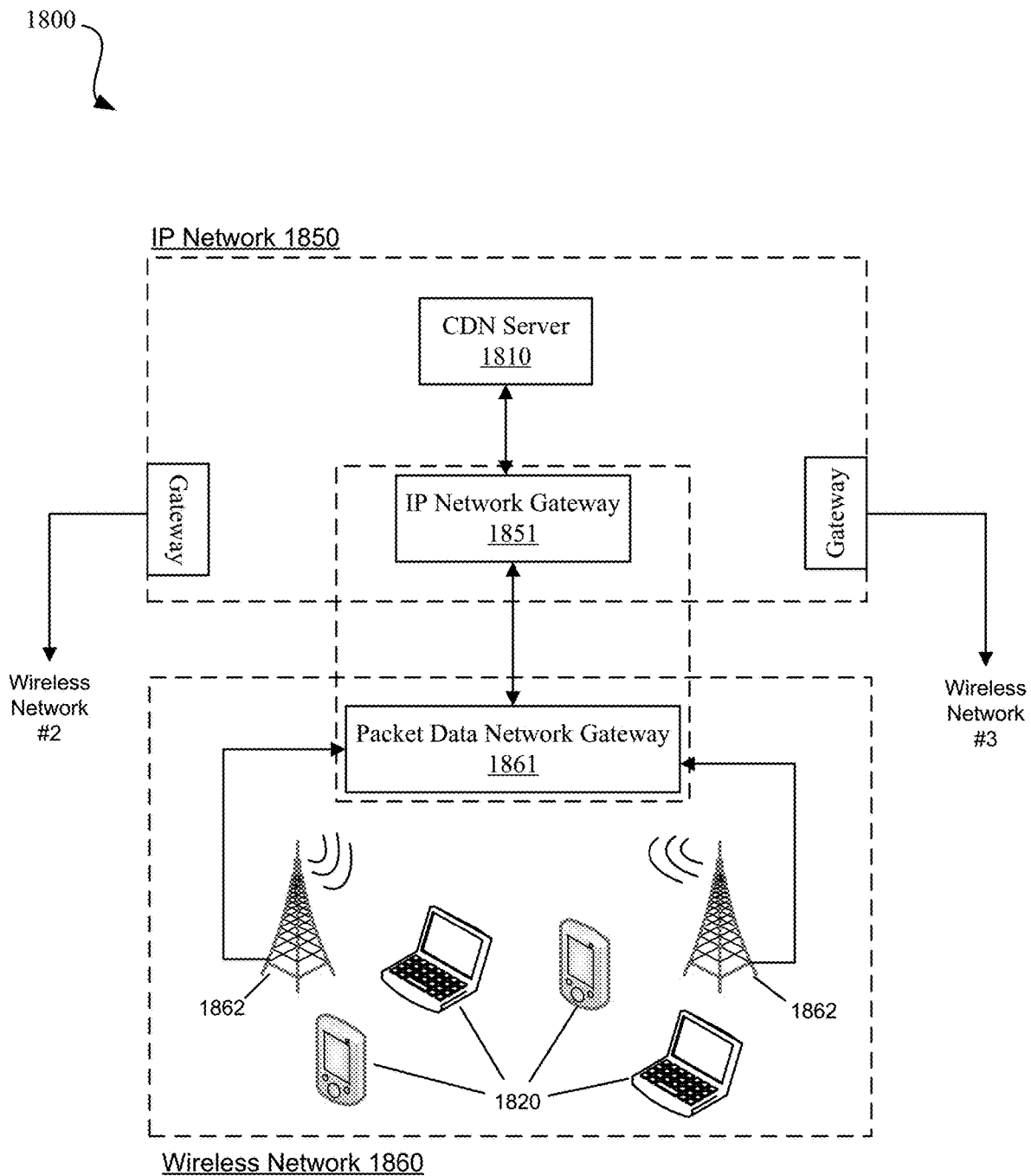

FIG. 18 is a diagram illustrating an example system including a wireless access network with user devices, and an IP network with a content delivery network (CDN) server, in accordance with one or more embodiments of the disclosure.

Figure 19A:
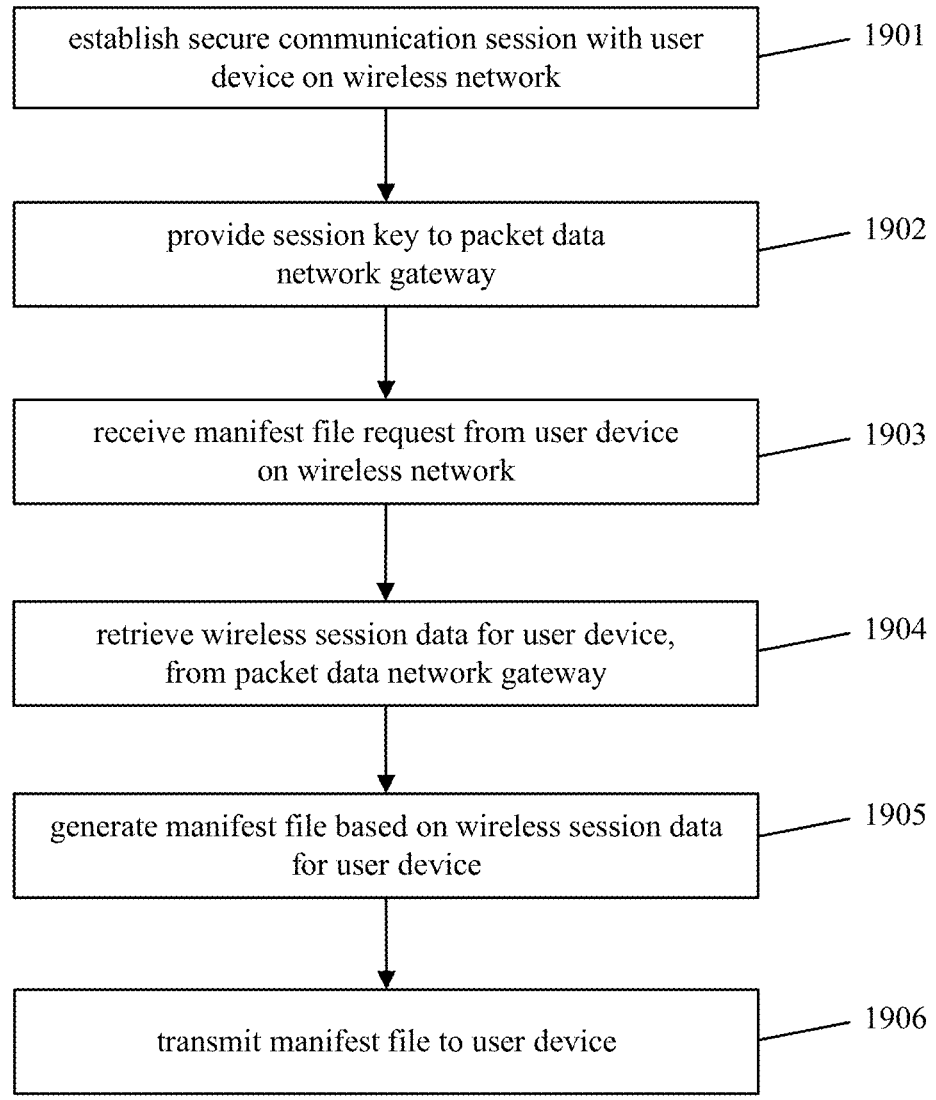
Figure 19B:
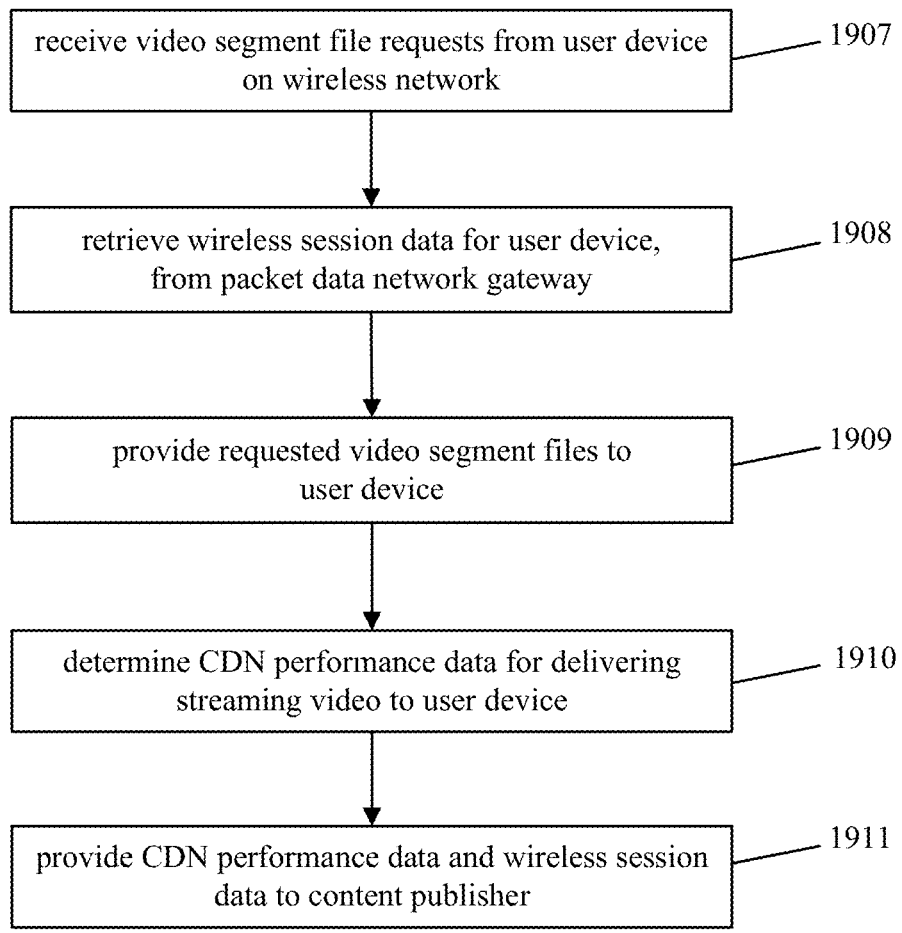

FIGS. 19A and 19B are flow diagrams illustrating example processes of providing a manifest file to a requesting user device (FIG. 19A), and serving video segment files to a requesting user device (FIG. 19B), based on wireless session data associated with the user device, in accordance with one or more embodiments of the disclosure.

Figure 20:
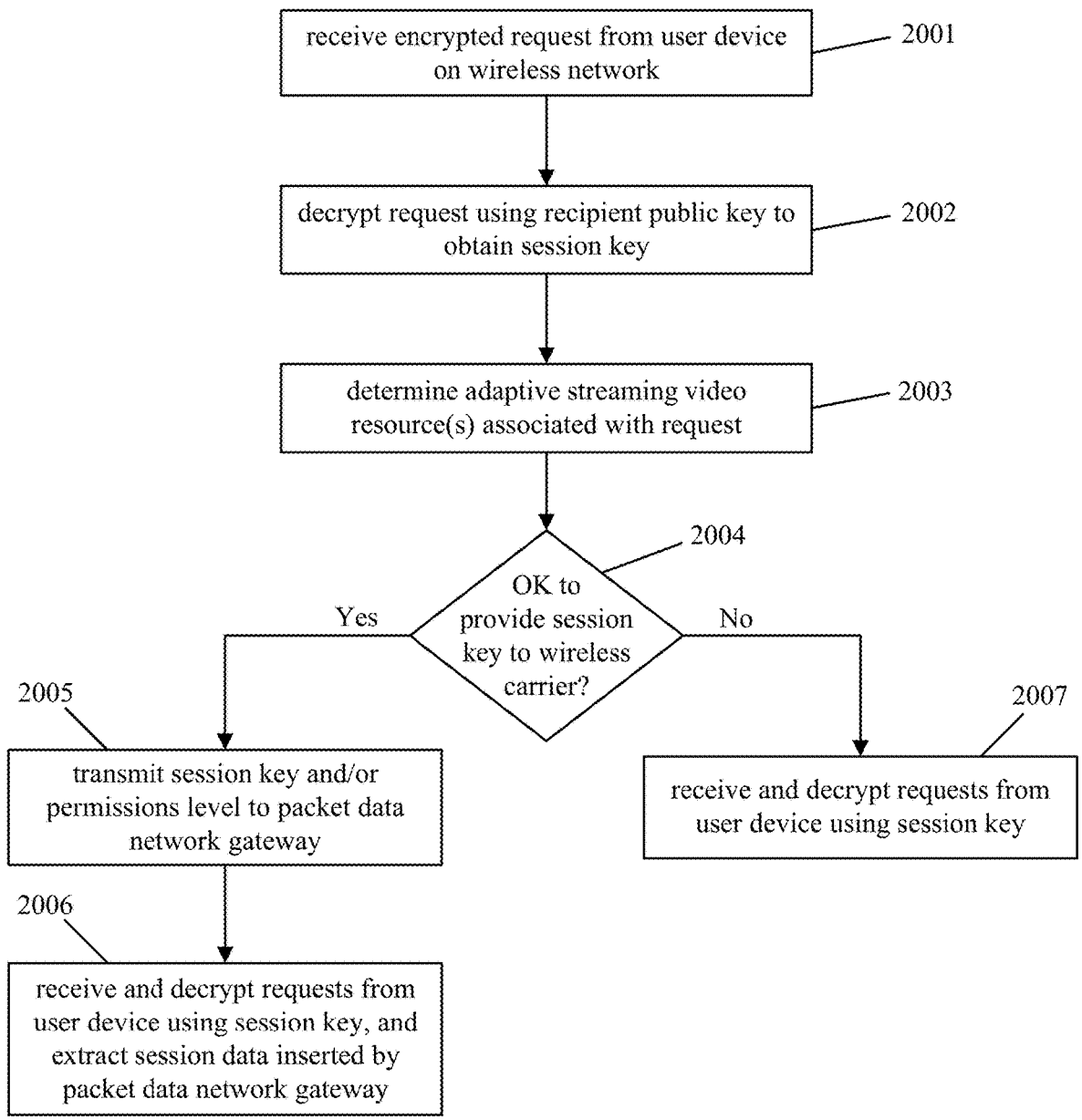

FIG. 20 is a flow diagram illustrating an example process of responding to an adaptive streaming video request from a user device, transmitted via a secure connection, in accordance with one or more embodiments of the disclosure.

Figure 21A:
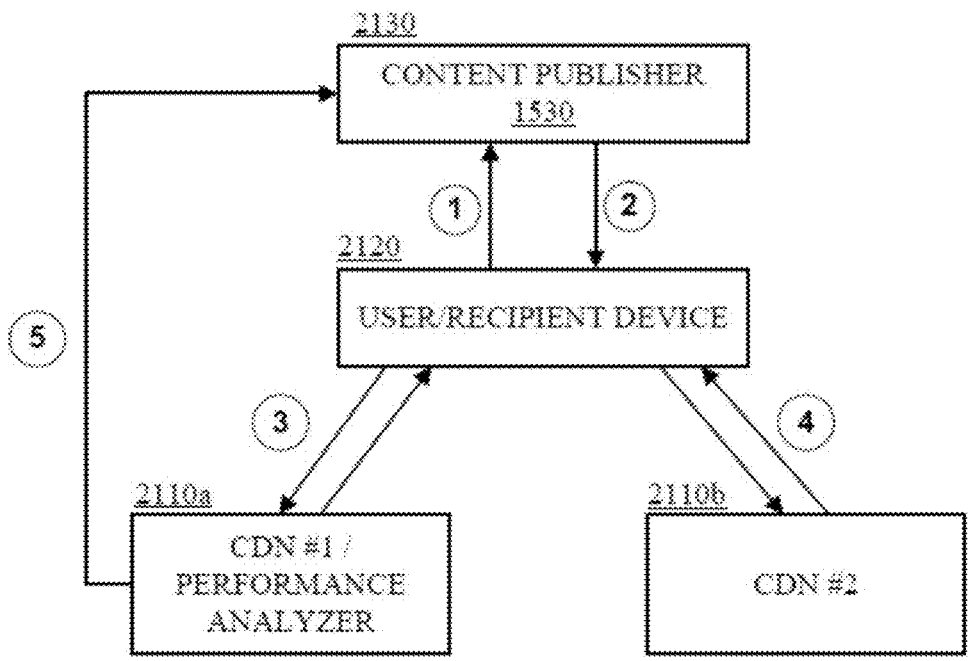
Figure 21B:
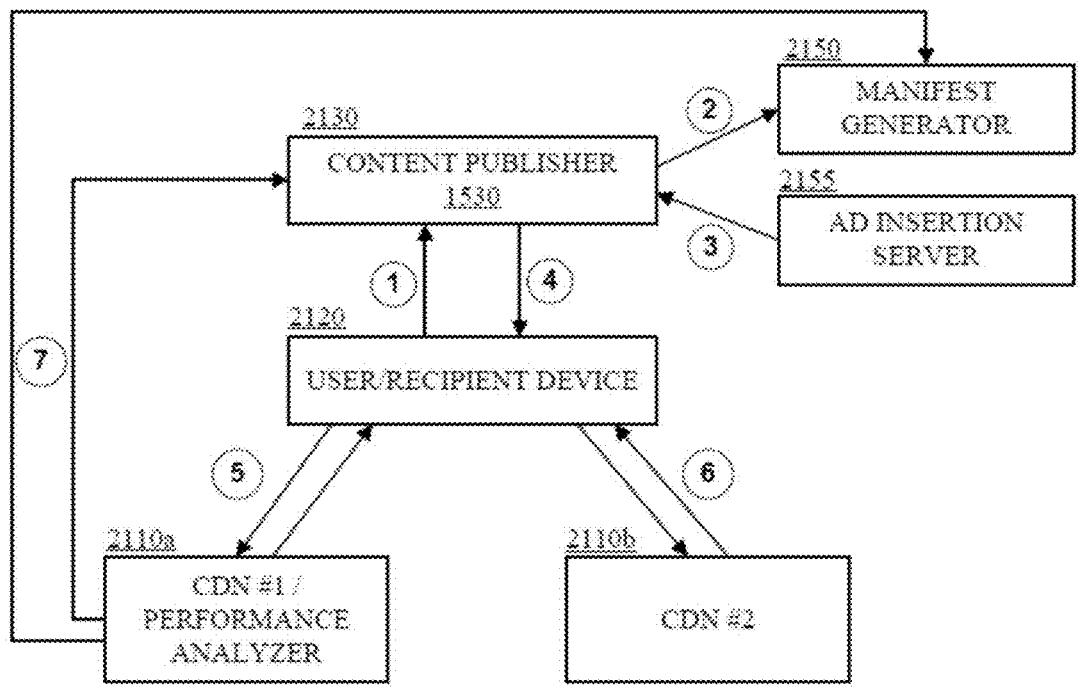

FIGS. 21A and 21B are block diagrams representing systems for delivering adaptive streaming video from one or more content delivery networks (CDNs) to recipient devices, in accordance with one or more embodiments of the disclosure.

Figure 22:
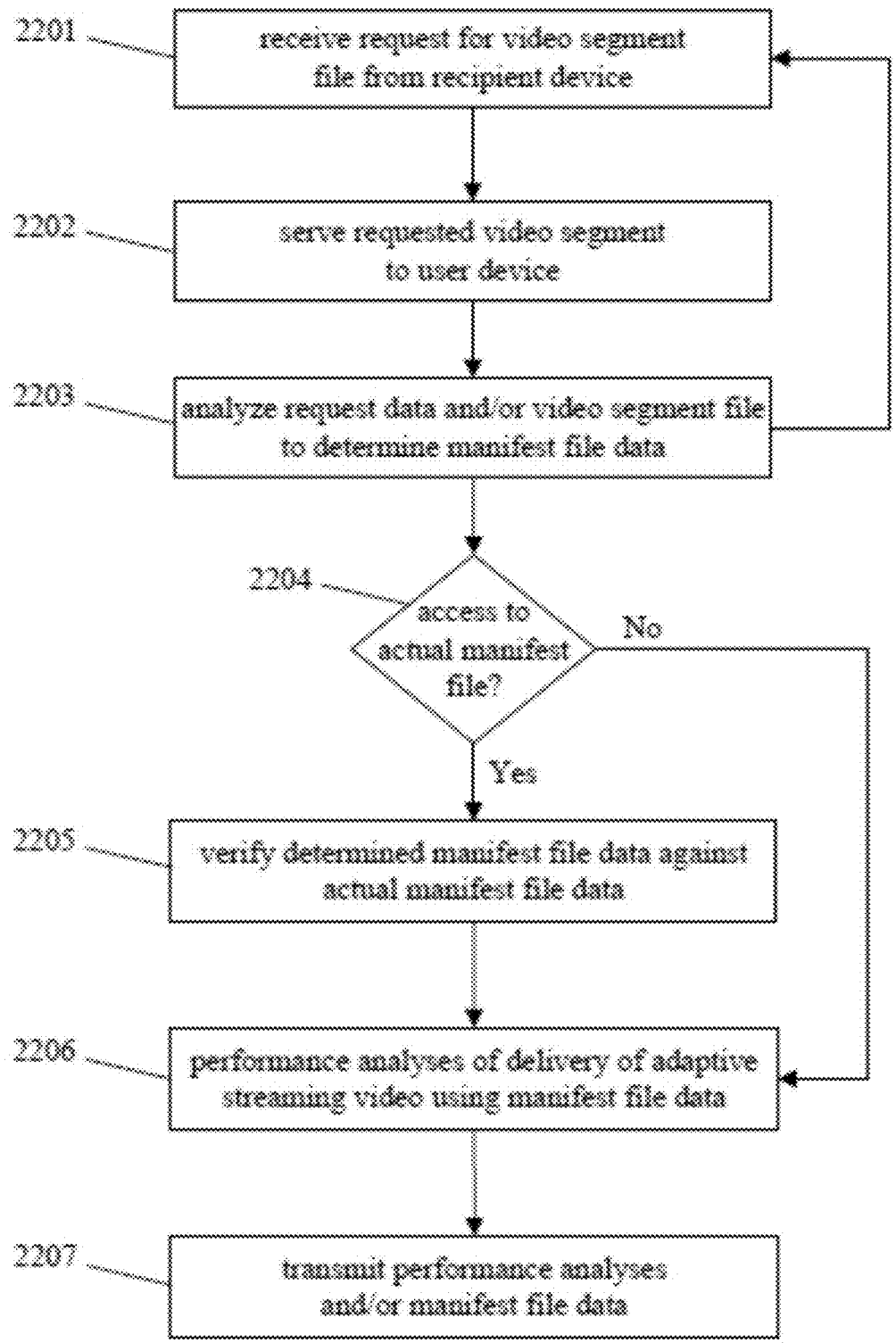

FIG. 22 is a flow diagram illustrating an example process for determining manifest file metadata and/or analyzing CDN performance, in accordance with one or more embodiments of the disclosure.

DETAILED DESCRIPTION OF THE INVENTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims. Further, when a particular feature, structure, or characteristic is described in connection with an embodiment, it is submitted that it is within the knowledge of one skilled in the art to affect such feature, structure, or characteristic in connection with other embodiments whether or not explicitly described.

Introduction

Streaming refers to a process of presenting multimedia content as the content is being delivered over a telecommunications network, rather than waiting for the entire content to be delivered before presenting the content. While video and audio are the most popular forms of streaming media, other forms of media can also be streamed, including text, image, and other data. Streaming offers several advantages over other delivery methods, such as immediate presentation of the content without having to wait for the entire content to download. However, streaming also has its limitations. One of the major drawbacks of streaming is that the quality of a user's experience is highly dependent on network performance and bandwidth. For example, in the case of video streaming, if the video data cannot be delivered to the user's device at a transmission rate that is faster than the rate at which the video data is rendered, playback of the video may freeze and the user's experience of the video may be interrupted.

To improve user experience, a content provider that is distributing multimedia content will often utilize one or more infrastructure service providers, for example, a cloud computing service provider and/or a content delivery network (CDN), to distribute the content. The infrastructure service provider may use a variety of techniques to improve delivery performance and content availability. For example, CDNs, such as Akamai Technologies and Limelight Networks, provide content delivery services by maintaining a large number of servers that are distributed across multiple locations. When a request for the content is received, the request is directed to servers that are located close to the requesting point (in network terms) and are well-performing (typically, not under severe load conditions).

Further complicating the technical environment, content providers may allocate the distribution of content among two or more infrastructure service providers for redundancy purposes, allowing distribution to continue if one service provider suffers an outage. Additionally, content data for a streaming session can be supplied from different content providers. For example, in the case of editorial content combined with advertising content, the content provider for the editorial content can be a publisher and the content provider for the advertising content can be an advertising server or service provider. Content providers and infrastructure service providers may utilize a separate, independently managed technical infrastructure and network for delivery of their respective content data.

One infrastructure service provider may perform better in one situation while another service provider may perform better in a different situation. Technical conditions that can affect content delivery performance include, for example, the user device that is requesting the content, the access network to which the user device is connected, the type of access network (such as mobile or broadband), intermediate networks, the service provider network or other infrastructure servicing the delivery of the content, the geographic location of the user device, and the type and size of the content. The performance of a particular service provider can also change over time, fluctuate regularly or irregularly, and be significantly impacted by unusual occurrences, such as sudden changes in demand, outages, equipment failures, and security breaches. When multiple service providers are involved in distributing or supplying content, variations in performance from a single service provider can have a significant impact on user experience. However, infrastructure service provider performance is difficult to determine accurately, fairly, and comprehensively. Service provider performance is also difficult to monitor in actual use (as opposed to by synthetic testing, for example using a probe or other testing point that does not measure the actual user content session), and is especially difficult to determine from a user's perspective. Without performance measurements and monitoring, it can be difficult to identify when a service provider is causing performance issues and the technical conditions under which user experience is affected, especially within a timeframe that allows for effective action.

The primary embodiment and secondary embodiment each may comprise systems and methods for delivery, performance measurement, and performance management of video to a user device in a networked environment, utilizing modern digital video protocols, and utilizing the standard video playback component that is present on the user's device without additional software or software extensions added to user device apps or user device browsers. The primary embodiment (as well as the secondary embodiment) may focus on video because video is an important part of many digital services and because video is sensitive to the sustained performance of infrastructure resources over a comparatively long period of time. Playback of a given digital video can last for a few seconds, a few minutes, a few hours, or longer; and regardless of the length of time the video playback requires, in order to deliver the best possible user experience the performance of infrastructure resources may need to be sustained for that user over at least that period of time. Other embodiments include the delivery of data, image, text, audio, and other content that is not video, which is similarly sensitive to the performance of infrastructure resources, but generally does not require the volume of data that video requires, and that normally (except in the case of audio) does not need to be sustained over as long a period of time compared to video content; thus, the primary embodiment and secondary embodiment each represents one of the most challenging content environments, and therefore associated infrastructure resource and infrastructure resource service provider environments, to be considered.

The primary embodiment may focus on the delivery of on-demand video content, which means video content that is stored such that the video can be played out to multiple users non-concurrently; in an on-demand scenario, each user can start playback when desired, without regard to any other user's playback of the video. Examples of on-demand video environments include movies on demand, television shows on demand, playback of uploaded user videos, and similar store-and-playback video use cases.

The secondary embodiment, which may be implemented as an alternative or in addition to the primary embodiment, may focus on the delivery of linear video content, which means video content that is played out linearly to multiple users concurrently; in a liner video scenario, when each new user starts watching the video program in progress, that user starts watching at the same point within the video program at which other users are concurrently watching, and all users watch concurrently. Examples of linear video environments include live events, such as sports events or music concerts, as well as linear broadcasts, such as the digital video stream of a television network broadcast; note that linear video content includes, but is not limited to, live video content.

Also note that "concurrently" in this context does not mean precisely simultaneously, e.g. to sub-second tolerance; just as when two users watch a television broadcast concurrently, one over satellite television and the other over cable television, there can be minor disparities, typically measured in seconds and less than a minute, between the arrival of the two telecasts, typically due to the processing and transport of the video signals through the two different television infrastructures. Similarly, two users watching the same linear video program via the Internet, using two different devices connected to two different Internet access networks, may experience similar minor disparities in the timing of the playback, typically measured in seconds and less than a minute, between their two devices.

The primary embodiment and the secondary embodiment may differ in some respects because of, among other reasons, differences in the underlying protocols for delivering video content in on-demand versus linear environments. Thus, both the primary embodiment and the secondary embodiment are described herein in appropriate detail.

The techniques of the primary embodiment and the secondary embodiment may be implemented on various systems and/or computing environments comprising one or more manifest file handlers, one or more segment file servers, one or more cluster performance managers, one or more service provider managers, one or more performance administrators, one or more DNS Authoritative Name Servers, and networking devices, such as switches and routers; optionally, the primary embodiment and the secondary embodiment also comprise one or more non-index-file message handlers (also referred to herein as NIF message handlers), one or more segment redirect processors, and/or one or more library storage servers. All such components included in an implementation of the primary embodiment or the secondary embodiment may be hereafter referred to, individually and/or collectively, as infrastructure components. DNS Authoritative Name Servers are DNS name servers that are authoritative for resolving hostnames identifying the network of, a group of, or an individual one of the infrastructure components into corresponding IP addresses. The infrastructure components can optionally be deployed in one or more clusters of one or more units across a geographic area or a wide network area, for example the global Internet.

Figure 1:
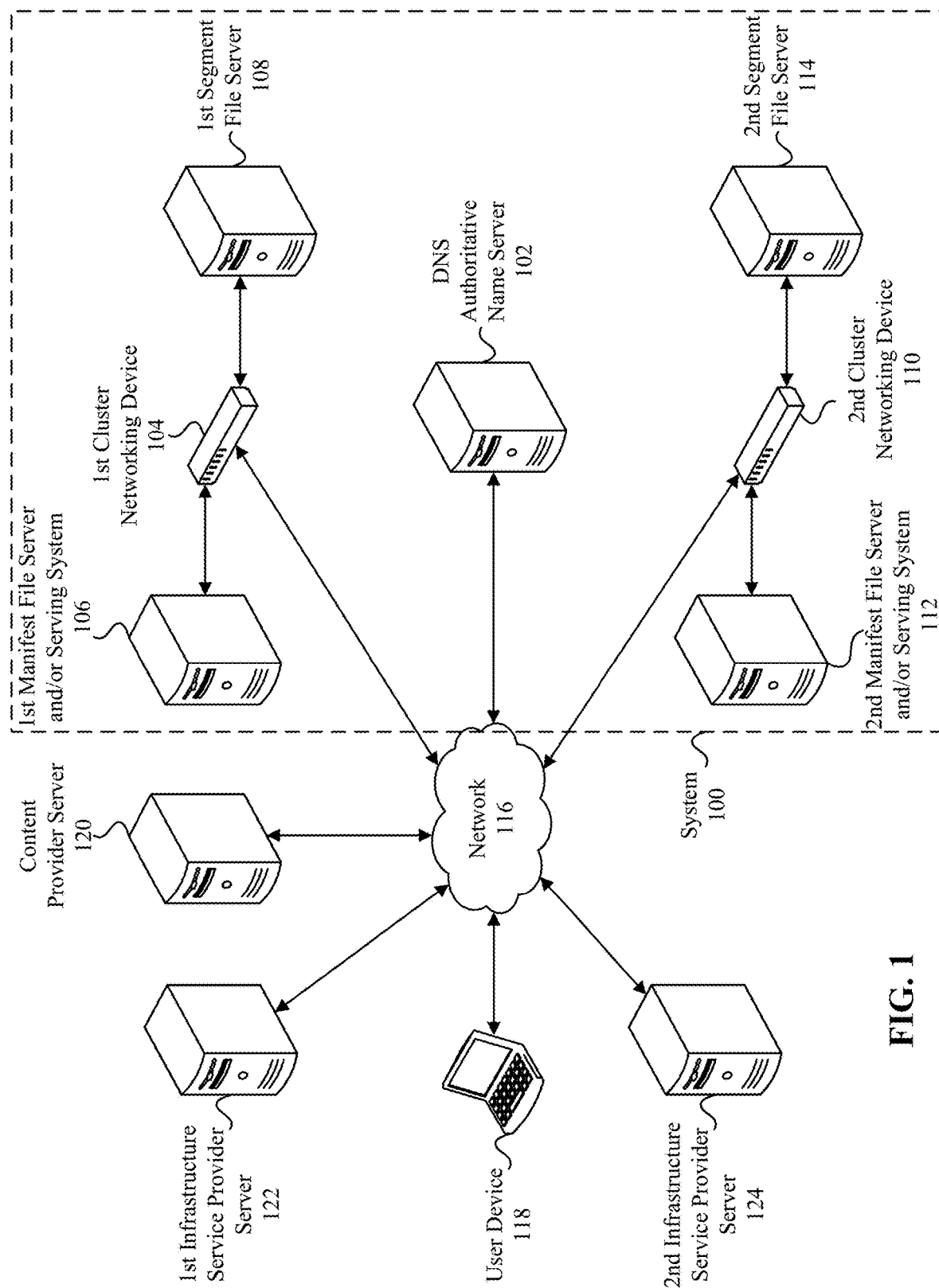
FIG. 1 is an illustration of an exemplary environment for implementing one embodiment of a system for measuring and managing the performance of adaptive streaming video deliveries.

For example, referring now to FIG. 1, a block diagram is shown illustrating an example network environment within which embodiments of a system 100 for delivery, performance measurement, and performance management of video to a user device 118 may be implemented. In this example, environment includes an embodiment of the system 100, which comprises the following infrastructure components: a Domain Name System (DNS) authoritative name server 102, first cluster networking device 104, first manifest file handler 106, first segment file server 108, second cluster networking device 110, second manifest file handler 112, and second segment file server 114.

In accordance with various embodiments discussed below, when user device 118 (or other requesting device) makes a request for manifest files or video segment files using a URL that includes the hostname of manifest file servers (and/or manifest file serving systems) 106 or 112, or segment file servers 108 or 114, DNS Authoritative Name Server 102 may resolve the hostname into one or more IP addresses according to any of the embodiments described herein. Requests for manifest files may be handled by manifest file handlers 106 or 112 (e.g., manifest file servers and/or manifest file serving systems), which may include and/or may be configured to operate in conjunction with one or more cluster performance managers, service provider managers, and performance administrators according to any of the embodiments described herein. Requests for video segment files may be handled by segment file servers 108 and 114, according to any of the embodiments described herein.

The components of system 100 may be coupled either directly or indirectly (via another component) to network 116. For example, in this embodiment, DNS authoritative name server 102 may be coupled directly to network 116 and first manifest handler 106 may be coupled indirectly to network 116 via first cluster networking device 104. Networking devices 104 and 110 can be, for example, routers, switches, or gateways. Network 116 can be a public network, a private network, or a combination of public and private. Network 116 may include a local area network (LAN), a wide area network (WAN), a wired network, a wireless network, a telephone network, such as a cellphone network, the Internet, the World Wide Web, or any other desired network. Network 116 can use any desired communication and/or network protocols.

Each component of system 100 is identified by one or more hostnames specific to that component. Optionally, a unique hostname can be assigned to each group of a given component type, with increasing levels of specificity until individual components are identified. This can be useful in implementations that include a large number of components deployed in multiple distributed clusters with multiple components at each cluster. For example, manifestserver.net can be the hostname that addresses all manifest file servers of system 100, a.manifestserver.net can be the hostname that addresses all manifest file servers at cluster A, and 1.a.manifestserver.net can be the hostname that addresses manifest file server number 1 at cluster A. In these examples, net is the top-level domain of the hostnames, manifestserver is the second-level domain of the hostnames, while a and 1.a are subdomains of the respective hostnames.

DNS authoritative name server 102 is a DNS name server that is authoritative for resolving the hostnames of system 100. DNS authoritative name server 102 may receive requests to resolve hostnames that identify a component, a group of components, or the network of components of system 100. A hostname may be resolved into one or more Internet Protocol (IP) addresses that are assigned to the component or components identified by the hostname and the IP addresses are transmitted back in response to a request.

In this example, there are also components coupled to network 116 that are not a part of system 100, including user device 118, content provider server 120, first infrastructure service provider server 122, and second infrastructure service provider server 124. Content provider server 120 may be managed and operated by a content provider that wishes to distribute an adaptive streaming video. Content provider server 120 may be, for example, a web server that hosts a website for the content provider. First infrastructure service provider server 122 may be managed and operated by a first infrastructure service provider that is distributing the video for the content provider and the second infrastructure service provider server 124 may be managed and operated by a second infrastructure service provider. To distribute the video, the content provider may publish a URL for a manifest file of the video on the website. After the URL is published, a user can utilize user device 118 to visit the website and view the video. When the user navigates to the website, the published URL is transmitted from content provider server 120 to user device 118. User device 118 may then request the manifest file of the video using the published URL. To assign a particular delivery to an infrastructure service provider, the content provider may publish a URL that contains a hostname that references, directly or indirectly (such as through the use of a CNAME), the assigned service provider, rather than its own website, and the user device 118 then requests the manifest file of the video from the infrastructure service provider.

Figure 2:
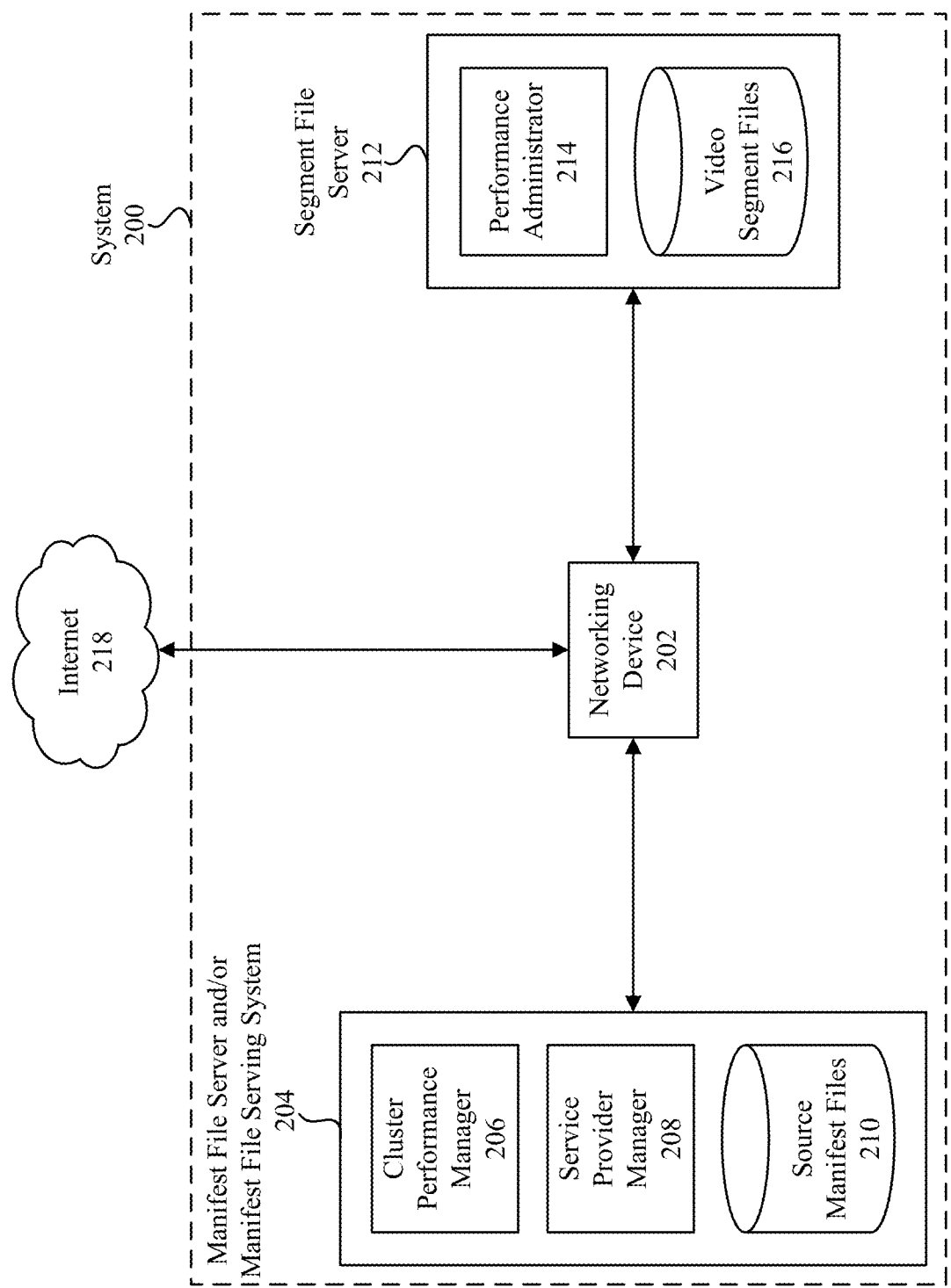
FIG. 2 is a block diagram of one embodiment of a system for measuring and managing the performance of adaptive streaming video deliveries.

Referring now to FIG. 2, a block diagram is shown of one embodiment of a system 200 for measuring and managing the performance of adaptive streaming video deliveries. System 200 includes networking device 202, manifest file handler 204, and segment file server 212. As shown in this example, in some embodiments a manifest file handler 204 may be implemented as a single manifest server 204, while in other embodiments a manifest file handler 204 may correspond to a manifest file serving system 204 including one or more separate servers designed and configured to perform separate tasks relating to configuring and providing manifest files for adaptive streaming video. The manifest file handler 204 and segment file server 212 may be connected to the Internet 218 via networking device 202. Only one server of each type is illustrated in this figure for the sake of clarity; however, it is understood that system 200 can include any number of servers arranged into any number of clusters.

In this example, manifest file handler (e.g., manifest file server/serving system 204) further includes one or more cluster performance managers 206, one or more service provider managers 208, and one or more source manifest file data stores 210. Manifest file handler 204 may handle requests for master manifest files and variant manifest files, as described below. To process a request, manifest file handler 204 may generate and/or configure an issued manifest file and transmit the issued manifest file to a requesting device.

Cluster performance manager 206 may select the hostnames of servers or clusters of system 200 for URLs included in the issued manifest file. For example, to generate an issued master manifest file, manifest file handler 204 may configure URLs that reference variant manifest files. For each URL, cluster performance manager 206 may select a manifest file server or cluster to handle the variant manifest file request. Selection may be performed according to any of the embodiments described herein for improving network performance. The hostname of the selected manifest file server or cluster is included in the host field of the URL in the issued master manifest file.

For an issued variant manifest file, the host field of each URL can contain the hostname of a segment file server or cluster of system 200 or the hostname associated with a service provider. In one embodiment, service provider manager 208 determines the URL type (i.e., whether the URL designates a segment file server/cluster or a service provider) for each URL in the issued variant manifest file based on distribution policies, distribution models, and performance and utilization information received from performance administrator 214.

For URLs that designate a segment file server/cluster of system 200 in the issued variant manifest file, cluster performance manager 206 may select the segment file server/cluster for handling the video segment file request using a process similar to the selection of a manifest file server or cluster. For URLs that reference an infrastructure service provider, service provider manager 208 may select an infrastructure service provider for handling the video segment file request. In one embodiment, the infrastructure service provider is selected based on distribution policies and performance information received from performance administrator 214, as discussed below.

Source manifest file data store 210 is a database or repository that stores source manifest files. Each issued manifest file may be generated and/or configured based on a source manifest file. When a request for a manifest file is received, the source manifest file can be identified based on the URL of the requested manifest file, which is included in the request. If an unexpired version of the source manifest file is not stored in source manifest file data store 210, manifest file handler 204 can request the source manifest file from a server of the content provider or service provider.

Segment file server 212 may further include performance administrator 214 and video segment files data store 216. In some embodiments, the performance administrator 214 and/or video segment files data store 216 might not be included within a segment file server 212, but instead may be implemented as servers and/or systems operating separately from the segment file server 212. Video segment files data store 216 may be a database or repository configured to store video segment files. Segment file server 212 may handle requests for video segment files. To process a request, the segment file server 212 identifies a video segment file stored in video segment file data store 216 based on the URL that is included in the request. If an unexpired version of the video segment file is not stored in video segment files data store 216, segment file server 212 can request the video segment file from a server of the content provider or its infrastructure service provider. In certain embodiments, cluster performance manager 206, manifest file server 204, or another infrastructure component may transmit a notification to segment file server 212 or video segment files data store 216 when the issued variant manifest file is configured for a variant manifest file request. The notification may inform segment file server 212 or video segment files data store 216 that it or another segment file server 212 or video segment files data store 216 associated with it has been selected for the delivery of a video segment file in the issued variant manifest file. In response to receiving the notification, segment file server 212 or video segment files data store 216 may request the video segment file immediately if an unexpired version of the video segment file is not already available for it to serve. Thus, the video segment file can be requested from the content provider or service provider before the user device makes a request for the video segment file, or in any event before segment file server 212 receives the request sent by the user device. This can help reduce or eliminate delays in the processing of segment file requests for video segment files that need to be retrieved from the content provider or service provider. Similarly, when segment file server 212 receives a request for the first video segment file it will serve from a given issued manifest, it can determine the next video segment file it will serve from that given issued manifest and request that next video segment file immediately if an unexpired version of that video segment file is not available.

Performance administrator 214 may record request attributes of segment file requests and transmission measurements of video segment file transmissions. Request attributes include information such as the video segment file requested, the encoding bitrate of the requested video segment file, the service provider(s) delivering the other segments of the video for the session, information (such as IP address) identifying the access network that the request was received from, the type of access network, and the device type, device model, the user agent of the user device that made the request, other message headers included in the request, and other information associated with the request. Transmission measurements include the transmission rate at which the video segment file was transmitted to the user device, packet-level statistical measurements of transmission (such as packet loss, packet retransmits, etc), the day and time of transmission, and the duration of transmission. Based on this data that is recorded for each session, performance statistics, trends and reports can be generated for a specific session, video, video category, content provider, service provider, access network, user agent, or user device type, just to list a few examples.

In other embodiments, cluster performance manager 206, service provider manager 208, and performance administrator 214 can be implemented on one or more physical servers separate from manifest file handler 204 and segment file server 212. Source manifest files 210 and video segment files 216 can also be stored on one or more storage devices separate from manifest file handler 204 and segment file server 212. For example, source manifest files 210 and video segment files 216 can be stored on a network attached storage (NAS) that is coupled to multiple manifest file handlers (e.g., manifest file servers/clusters/serving systems) and multiple segment file servers/clusters/nodes.

Optional Hostname Scheme

In the primary embodiment and secondary embodiment, the DNS Authoritative Name Servers may resolve hostnames into IP addresses based on a variety of factors as discussed throughout this disclosure. In an optional aspect of the primary embodiment and the secondary embodiment, a hostname scheme is implemented via the DNS Authoritative Name Servers, wherein each group of a given infrastructure component type can be identified by a hostname specific to that group, at increasing levels of specificity, including individual hostnames that specifically identify individual infrastructure component units; this optional aspect of the primary embodiment and secondary embodiment may be useful in an implementation that includes a large number of infrastructure component units deployed in multiple distributed clusters comprising multiple individual units each, but it is not required. Note also that while the examples presented herein will make sense to a human reader, DNS Authoritative Name Servers can resolve any hostname, which may be completely abstract and include no significant characters, into an IP address, and therefore the human-readable significance of hostname character strings, while convenient in many circumstances, is also optional, and not required.

For example, for an implementation comprising in part 32 manifest file handlers deployed in 8 clusters of 4 manifest file handler units each, wherein all units within a given cluster are located together and each such cluster is located at a different network location from the other clusters, the hostname scheme that is implemented might be:

indexhandler.net is the hostname that addresses all manifest file handlers a.indexhandler.net is a hostname that addresses all manifest file handlers at location A 1.a.indexhandler.net is the hostname that addresses manifest file handler number 1 at location A In normal operation, when multiple IP addresses are returned by the DNS Authoritative Name Servers for a hostname resolution, a requesting device may send requests for URLs containing that hostname to only a single IP address, as long as that IP address is responding, for all requests for URLs containing that hostname. Different requesting devices, however, tend to use different IP addresses, as a consequence of the behavior of ISP local name services, which rotate the order of the IP addresses they receive from an authoritative name server each time they use the cached hostname resolution. As a result of this behavior, resolving a hostname into a relatively static set of multiple IP addresses may tend to distribute requests of the URLs containing that hostname relatively evenly across all the IP addresses in the relatively static set. Thus, the manifest file handler, working in conjunction with the cluster performance manager, can use a hostname scheme based on relatively static hostname resolutions to execute segment file server assignments at any level of request volume, using flexible series of hostnames from specific to less specific to cluster to multi-cluster to network.

Utilization of HTTP-Based Adaptive Streaming Video Delivery Protocols

In some cases, the primary embodiment and/or the secondary embodiment utilize may HTTP-based adaptive streaming video delivery protocols, such as Apple's HTTP Live Streaming (HLS) protocol, Adobe's HTTP Dynamic Streaming (HDS) protocol, Dynamic Adaptive Streaming over HTTP (DASH) developed under the Moving Picture Experts Group (MPEG) working group, and/or other similar protocols, which have been designed to work efficiently over large distributed HTTP networks such as the Internet.

Using adaptive streaming protocols, the video content (file or stream) is encoded into digital files at multiple bitrates (for example, 200 Kbps, 400 Kbps, 600 Kbps, etc); each such bandwidth-specific digital file is then segmented consistently into small, sequential segments, typically multi-second segments (for example, each segment might be 10 seconds long); within a group of such bandwidth-specific files relating to the same video content item, all such bandwidth-specific files are segmented consistently, at least in terms of time, such that each nth segment of each such bandwidth-specific file represents the same time portion of the original video file or stream (e.g., the first segment of each bandwidth-specific file represents the first 10 seconds of the video file or stream). The end user device is provided one or more manifest files, sometimes referred to as manifest files or playlists, containing URLs or other address information that identify the segments, or is otherwise informed of the URLs or other address information identifying the segments. The segments are typically separate files, or separate byte ranges within a file, and can be requested and/or delivered individually; together, the segments represent a complete video file in an on-demand video use case, or a continuous video stream in a linear video use case.

The video playback component on the end user device requests segments sequentially, starting with a given bandwidth version, but then shifting from one bandwidth version to another (as segments are requested or within segments, as provided by the protocol and the video playback component), either to a higher or lower bandwidth, as permitted or required by the actual performance characteristics measured at the user device of the arriving data packets comprising the segments. Shifting from one bandwidth to another occurs at predetermined points coordinated within all bandwidths, referred to as keyframes; this ensures that when shifting occurs, it occurs at points coordinated from one bandwidth to another and therefore changes the encoded bandwidth of the video displayed but does not change the actual video content displayed.

This upshifting or downshifting of the bandwidth segments requested enables the video playback component to utilize the highest bandwidth version of the video that can effectively be delivered to the user device, as measured at the user device as the delivery proceeds. Using the highest bandwidth version provides the user with the highest video definition achievable under the conditions; using a bandwidth version that can effectively be delivered to the user device under the conditions ensures that the video playback component receives data at least at the rate at which the video is played, so that video playback does not halt (or freeze) while waiting for the next amount of data needed to continue playback. Thus, adaptive streaming protocols are designed to provide a user with the highest definition of video that can be played continuously (without freezing abnormally) under the conditions (network performance, server performance, service provider performance, other infrastructure resource performance, and/or infrastructure resource service provider performance) available at the time the video is played back. This combination of highest deliverable bandwidth and continuous playback represents the best overall quality video user experience available under the conditions present during video playback. Adaptive streaming protocols are also thus designed to adapt to any changes that occur in the conditions during the video playback period, for example downshifting the video bandwidth requested in the event that the arrival rate of video data packets slows. In summary, adaptive streaming protocols both provide the best overall quality of video user experience possible under the conditions present at the time of video playback and adapt to changes, if any, in the conditions as video playback occurs.

Once (in the on-demand video use case) or as (in the linear video use case) the video is encoded and segmented and the manifest file is created or updated, the manifest file is provided to the user device. Typically the manifest file is itself identified by a URL. The manifest file typically is a text file that contains URLs for other manifest files or URLs for video segment files, along with metadata (control and descriptive information). A manifest file can be cacheable, meaning that it is static or relatively static and that the URL that identifies it should result in the return, from the digital service or its service providers, of the same manifest file over a sustained period of time, or the manifest file may be dynamic, meaning that the URL that identifies it should result in the return, from the digital service or its service providers, of manifest files that can change from one request to the next.

Description in the Context of the Apple HLS Video Protocol

The primary embodiment and secondary embodiment will now be described in the context of the Apple HLS video protocol. Accordingly, several examples discussed below may include reference to HLS manifest files. However, it should be understood that other adaptive streaming protocols, including (but not limited to) DASH, HDS, and other adaptive streaming protocols that utilize manifest files containing segment URLs, also may be supported in the primary embodiment and secondary embodiment, although some details (for example, the file type of a manifest file or the segment files) may vary from those for HLS. Other embodiments use adaptive streaming protocols that utilize manifest files containing file byte ranges, video delivery protocols other than adaptive streaming protocols, and protocols other than video streaming protocols as described later in this disclosure.

In the primary embodiment and secondary embodiment, HLS manifest files, which are M3U8 playlist files (and end in the file extension .m3u8), and video segment files, which are MPEG transport files (and end in the file extension .ts), are initially prepared as usual, typically by the digital service or by an infrastructure service provider working for the digital service, for example a video encoding service.

HLS manifest files can comprise URLs of other HLS manifest files, or can comprise URLs of video segment files, in either case along with metadata; for example, the overall HLS manifest file for a given video may contain URLs for six other HLS manifest files for the given video, each of which then contains segment URLs for that video at a given bitrate. There can also be multiple HLS manifest files, or HLS manifest file sets, associated with the same given video; for example, an HLS manifest file for a given video that is utilized to deliver that video to devices connected via a mobile wireless network might contain a set of three HLS manifest file URLs, with the first of the three HLS manifest files containing URLs for video segment files at 200 Kbps, the second of the three HLS manifest files containing URLs for video segment files at 400 Kbps, and the third of the three HLS manifest files containing URLs for video segment files at 600 Kbps, while a second HLS manifest file for the same given video that is utilized to deliver that same given video to devices connected via a residential broadband network might contain a set of four HLS manifest file URLs, with the first of the four HLS manifest files containing URLs for video segment files at 200 Kbps, the second of the four HLS manifest files containing URLs for video segment files at 600 Kbps, the third of the four HLS manifest files containing URLs for video segment files at 1,000 Kbps, and the fourth of the four HLS manifest files containing URLs for video segment files at 1,800 Kbps.

Multiple URLs can Address the Same HLS Manifest File, Video Segment File, or Other Object In the primary embodiment and secondary embodiment, a given HLS manifest file (or other object, such as a video segment file) can be addressed by more than one URL, for example, by a first URL when the request for the HLS manifest file (or other object, such as a video segment file) is made to the network of manifest file handlers, by a second URL when the HLS manifest file (or other object) is made to a content delivery network used by the digital service, and then by a third URL when the HLS manifest file (or other object) is made directly to the digital service.

Note that when any intermediary service, for example the network of manifest file handlers or the digital service's content delivery network, is used to service requests for any object or thing (including an HLS manifest file or video segment file), the URL request to the intermediary service will generally be different from the URL request by which the intermediary service can request the object or thing directly from the digital service or from another service from which it can be received. This is because when the intermediary service does not have the object or thing, it will need to request it, and in the primary embodiment and secondary embodiment this will occur at least the first time an HLS manifest file is requested from the network of manifest file handlers and the first time a video segment file is requested from the network of segment file servers. At this point, the manifest file handler or the network of manifest file handlers will request the HLS manifest file, or (respectively) the segment file server or network of segment file servers will request the video segment file, either from the digital service or from another service (for example, as will be seen, in the primary embodiment and secondary embodiment some URL requests are made to the digital service's content delivery network, rather than to the digital service itself). If an object such as an HLS manifest file or a video segment file were to be addressed by only a single URL, the network of infrastructure components (including its components) has no way of requesting the object from another service, since all requests for the given URL come to the network of infrastructure components—the network of infrastructure components would be requesting the object from itself, circularly and infinitely without success, which is a non-functional condition.

In other embodiments, objects (including, but not limited to, HLS manifest files and video segment files) are requested by the network of infrastructure components using requests that do not require Internet-standard URLs, or are uploaded to the network of infrastructure components, in either case so that they can be addressed by a single URL. These embodiment, however, are generally (though not always) less effective in practice than embodiments where an object can be addressed by more than one URL and the network of infrastructure components can use a second URL to request an object for which it receives a request comprising a first URL, at least because (a) embodiments using non-Internet-standard addressing schemes are generally less flexible for digital service providers and their infrastructure service providers than embodiments that use Internet-standard URLs, and (b) an embodiment requiring an upload of the object to the network of infrastructure components before the object can be delivered through the network of infrastructure components either (i) requires that the digital service complete and confirm the object upload to the network of infrastructure components before publication of the URL, or (ii) sets up a "race condition" between completion of the object upload to the network of infrastructure components and end user devices receiving the published URL and issuing requests for it; for all end users where the device request for the URL happens more rapidly than the upload of the object to the network of infrastructure components, the race is "lost" with the undesirable result that the object is not found on the network of infrastructure components and the user experience as a result is less satisfactory.

Description of URLs

Returning to the primary embodiment and secondary embodiment, for a given video, the published URL for the HLS manifest file (that is, the URL for the manifest file that is provided to the end user device, e.g., provided to an app running on the device, published as a web page object on an HTML page provided to the browser on the device, published as a web page object target provided to the browser on the device, etc.) contains, in the hostname field of the published URL, a hostname associated, directly or indirectly, with the network of manifest file handlers. This will typically be a different hostname than that contained in the hostname field in other URLs that address other instances of HLS manifest files associated with the same given video, for example, the URL used to request the given video directly from the digital service (a URL used to make a request, of any kind, directly to a digital service will hereafter be referred to as a "digital service request URL"). Several examples of URL structures for an HLS manifest file are described in the following paragraphs.

For a digital service using the internet domain digserv.com, the digital service request URL used to request a given HLS manifest file (as a reminder, this is the URL used to request the given HLS manifest file directly from the digital service) might be:

http://indexfiles.digserv.com/firstindexfile.m3u8

For a network of manifest file handlers using the internet domain indexhandler.net, to request the given HLS manifest file from the network of manifest file handlers, the published URL contains a hostname associated with the network of manifest file handlers, which in this example is:

http://digserv.indexhandler.net/firstindexfile.m3u8

The hostname digserv.indexhandler.net is within the domain indexhandler.net, and (to show an optional aspect of the primary embodiment and secondary embodiment) includes a character string designating, or associated with, the digital service, in order to create, within the domain associated with the network of manifest file handlers, a subdomain that is designated for the digital service.

The character sting that designates the digital service does not, however, need to be included in the hostname; optionally, it can be included elsewhere in the URL, for example in the path. An example of such a published URL would be http://indexhandler.net/digserv/firstindexfile.m3u8

Illustrating another optional aspect of the primary embodiment and secondary embodiment, the character string in the published URL that designates the digital service can also be the hostname contained in the digital service request URL (as a reminder, the URL used to request the given HLS manifest file directly from the digital service). An example of such a published URL would be:

http://digserv.indexhandler.net/indexfiles.digserv.com/firstindexfile.m3u8

This URL might look confusing, because it appears to have two hostnames in it; however, there is only one hostname in a URL; all characters after the hostname, regardless of how they might look to the human eye, are part of the path of the URL; so in this example, digserv.indexhandler.net is the hostname in the URL, and the character string that immediately follows it, indexfiles.digserv.com, is part of the URL path, just as the characters firstindexfile are part of the URL path. Note, however, that this example published URL contains within it the character string that comprises the full URL used to request the given HLS manifest file directly from the digital service; this "second URL character string within a first URL" can in some embodiments be useful.

Another example published URL, using this structure and using the manifest file handler domain, without a subdomain, as the published hostname would be http://indexhandler.net/indexfiles.digserv.com/firstindexfile.m3u8

Optionally, published URLs can be indirectly associated with the network of manifest file handlers, e.g. through the use of CNAMEs The hostnames in published URLs can be directly associated with the network of manifest file handlers (in the examples above, digserv.indexhandler.net and indexhandler.net) or in another optional aspect of the primary embodiment and secondary embodiment, can be indirectly associated with the network of manifest file handlers, for example by using a hostname that is an alias for the internet domain associated with the network of manifest file handlers. Typically, this is implemented by using a CNAME (pronounced "see-name"), which is an Internet DNS standard method for using an alias hostname to represent a canonical hostname. An example consistent with the examples above and using a CNAME is shown below.

The published URL used to request the given HLS manifest file from the network of manifest file handlers might be:

http://alias.digserv.com/firstindexfile.m3u8

In this example, the hostname alias.digserv.com is not directly associated with the network of manifest file handlers. When a DNS resolution request for alias.digserv.com is received from a local DNS name server by the DNS name servers authoritative for that hostname (which are typically operated by the digital service or a DNS service provider), the authoritative DNS name servers return a CNAME record containing the canonical hostname in the data field; in this example, the canonical hostname would be digserv.indexhandler.net. The requesting local name server then issues a new DNS request for resolution of the canonical hostname; once the local name server receives a response containing one or more IP addresses, it will send the request for the published URL to one of those IP addresses. Thus the hostname alias.digserv.com, which is used in the published URL, while not directly associated with the network of manifest file handlers, is indirectly associated with the network of manifest file handlers.

Note that the canonical hostname is not substituted into the published URL for the alias hostname; the published URL is sent by the requesting device, in the eventual URL request for the HLS manifest file, as it was published; the canonical hostname is only used for DNS resolution (by the local name server; in typical operation, the local name server never sends the canonical hostname to the requesting device).

The CNAME process is useful at least in part because (a) when the digital service publishes URLs containing alias hostnames, if and when the published URLs are visible to a human user (for example, if and when they are visible on a web page) the published URLs appear to the human user to refer to the digital service and its servers, rather than to the network of manifest file handlers, while at the same time the requests for the published URLs will in fact be sent to the network of manifest file handlers and (b) a digital service that publishes URLs containing alias hostnames can quickly and easily change from one network of manifest file handlers to another network of manifest file handlers, without changing all of its published URLs, simply by change the canonical hostname it (or its DNS service provider) returns in response to DNS resolution requests for the alias hostname. For example, using the CNAME-related example above, the digital service could change the canonical hostname it returns in CNAME records from digserv.indexhandler.net to digserv.alternative.net; without changing any published URLs, requests for published URLs would then be directed to the network of manifest file handlers using the internet domain alternative.net.

Name Space Collisions

As shown in these examples, the published URL includes a character string that designates the digital service, located in various embodiments in the hostname in the published URL, or in the URL path, or in another part of the URL, for example in a query string in the URL. Including a character string that designates the digital service in the published URL eliminates any risk of accidentally or randomly duplicating URLs (sometimes referred to as "name space collisions") across an operating network of infrastructure components that provides services to multiple digital services; each digital service that uses the network of infrastructure components, by including a character string that designates itself in the URLs it publishes, is free to use any other character strings it chooses in the remainder of each URL it publishes.

Thus, each digital service is responsible for avoiding name space collisions within the name space delimited by the character string that designates it, while the operator of the network of infrastructure components is responsible for assuring that there are no collisions among the character strings that designate the digital services. Because the number of digital services that uses the network of infrastructure components is typically not unmanageably large, in the primary embodiment and secondary embodiment the operator of the network of infrastructure components manages the character strings that designate digital services, either assigning a character string to, or approving the character string selected by, each digital service. In other embodiments, the character strings that designate digital services are GUIDs, or other techniques are used to avoid collisions among the character strings used by separate digital services.

The Manifest File Handler

In the primary embodiment and secondary embodiment there are multiple distributed instances of the manifest file handler, optionally organized into clusters wherein each cluster comprises multiple manifest file handler instances; the hostname associated with the network of manifest file handlers is resolved by the DNS Authoritative Name Servers to IP addresses of one or more manifest file handler clusters or one or more specific manifest file handlers based on any of, or any combination of:

- manifest file handler or manifest file handler cluster network location, e.g. relatively close in network terms (meaning a manifest file handler or manifest file handler cluster that can communicate over the network quickly, e.g. with less total latency, than can at least some other manifest file handlers or manifest file handler clusters) to any of, or any combination of, the network location of the local name server making the hostname resolution request, or to the estimated network location of the requesting user device, or to the network location from which a manifest file handler or manifest file handler cluster can receive the requested HLS manifest files, HLS manifest files associated with the digital service, or HLS manifest files generally, or to the network location of the digital service, or to the network location of an advertising service or server associated with the digital service, or to another network location associated with the digital service;
- manifest file handler or manifest file handler cluster geographic location;
- association of the manifest file handler or manifest file handler cluster with, its connection (direct or indirect) to, or its location within, a specific network, e.g. the access network that the local name server making the hostname resolution request is connected to;
- network performance between the manifest file handler or manifest file handler cluster and any of, or any combination of, the local name server making the hostname resolution request, the estimated network location of the requesting user device, a network location associated with the requesting user device or the local name server making the hostname resolution request, the network location from which a manifest file handler or manifest file handler cluster can receive some or all of the requested HLS manifest files, some or all HLS manifest files associated with the digital service, or HLS manifest files generally, the network location of the digital service, the network location of an advertising service or server associated with the digital service, or another network location associated with the digital service;
- manifest file handler or manifest file handler cluster availability and utilization, both current and anticipated, including (but not limited to) the availability of sufficient capacity to process the HLS manifest file request;
- a manifest file handler or manifest file handler cluster having previously processed requests for the requested HLS manifest file, requests for HLS manifest files associated with the same video object, requests for HLS manifest files associated with the same digital service, or requests for similar HLS manifest files;
- a manifest file handler or manifest file handler cluster associated with, or optimized for, HLS manifest files associated with on-demand video, HLS manifest files associated with linear video, or HLS manifest files associated with a combination of on-demand video and linear video;
- manifest file handler or manifest file handler cluster association with a subdomain contained in the hostname, or with the digital service associated with the hostname;
- the access network used by the local name server making the hostname resolution request;
- the network location or geographic location of the local name server making the hostname resolution request.

In other embodiments, there are multiple distributed instances of the manifest file handler, optionally organized into clusters wherein each cluster comprises multiple manifest file handler instances, and the hostname associated with the network of manifest file handlers is resolved by the DNS Authoritative Name Servers to IP addresses of one or more specific manifest file handlers or manifest file handler clusters using any of, or any combination of, round-robin DNS resolution, the Internet Anycast IP address numbering scheme, round-robin DNS resolution together with the Internet Anycast IP address numbering scheme, random DNS resolution, or another technique that resolves the hostname associated with the network of manifest file handlers to IP addresses of specific manifest file handlers or manifest file handler clusters and distributes connections among a group of manifest file handlers. In other embodiments, there are multiple instances of the manifest file handler located in a single location and the hostname associated with the network of manifest file handlers is resolved by the DNS Authoritative Name Servers to IP addresses of specific manifest file handlers using any of, or any combination of, the techniques disclosed for resolving the hostname associated with the manifest file handler to IP addresses of specific manifest file handlers or manifest file handler clusters in the primary embodiment and secondary embodiment, or other embodiments with multiple distributed instances of the manifest file handler. In other embodiments, there is only a single instance of the manifest file handler and the hostname associated with the network of manifest file handlers is resolved by the DNS Authoritative Name Servers to IP address(es) associated with that instance.

In other embodiments, the manifest file handler is invoked through other methods, including alternative methods of resolving the hostname in the published URL (such as initially returning DNS name server records [where the DNS record type is set to "NS"] that identify name servers that will then resolve the hostname directly to the IP addresses of manifest file handlers or optional manifest file handler clusters), through issuance of an HTTP 302 Redirect message (a standard HTTP message that instructs a device to request a second URL in place of the first requested URL) or other HTTP message, through using another method of directly or indirectly addressing the network of manifest file handlers, a cluster or group of manifest file handlers, or a specific manifest file handler in the published URL (for example, by placing an IP address associated with a manifest file handler in the host field of the URL), by addressing the HLS manifest file using a method other than a URL, by proxying the request to the manifest file handler, by use of a network switch to switch requests for the HLS manifest file to the manifest file handler (including based on the contents of the URL requesting the HLS manifest file), by intercepting the request and diverting it to the manifest file handler, by placing the manifest file handler in-line between the requesting device and the manifest file source, or by other methods of directing the HLS manifest file request to the manifest file handler. In these other embodiments, the manifest file handler selected to receive the HLS manifest file request is based on any of, or any combination of, the bases for selecting a manifest file handler as disclosed in the primary embodiment and secondary embodiment; the user agent identified in the HLS manifest file request message; the requesting user device or device class or type; the access network used by the requesting user device; the IP address, or part of the IP address, associated with the requesting user device; or the network location, geographic location, or Global Positioning System (GPS) coordinates of the requesting user device.

In other embodiments, one of these disclosed techniques (as disclosed in the primary embodiment and secondary embodiment, other embodiments with multiple distributed instances of the manifest file handler, other embodiments with multiple instances of the manifest file handler located in a single location, other embodiments with a single instances of the manifest file handler, and other embodiments in which the manifest file handler is invoked through other methods) is combined with one or more other of these techniques to direct requests to a manifest file handler. For example, some of these other embodiments include: multiple distributed instances of the manifest file handler, with multiple instances of the manifest file handler at each location, and a switch at each location; the name servers of these exemplary other embodiments resolve the hostname associated with the network of manifest file handlers to the IP address(es) of one or more switches, selecting a switch that corresponds to the location of a cluster of manifest file handlers that is relatively close in network terms to the local name server making the hostname resolution request; and the switch, which then receives the HLS manifest file request from the requesting user device, selects a manifest file handler (and switches the request to the selected manifest file handler) based on any of, or any combination of:

- the manifest file handler's association with the same cluster of infrastructure components that the switch is associated with;
- the manifest file handler's association with a different cluster of infrastructure components than the switch is associated with, and the cluster associated with the manifest file handler is closer, in network terms, to the network location of the requesting user device;
- the manifest file handler's association with a different cluster of infrastructure components than the switch is associated with, and the cluster associated with the manifest file handler is better performing, in network terms, to the network location of the requesting user device or a network location associated with the requesting user device;
- manifest file handler availability and utilization, both current and anticipated, including (but not limited to) the availability of sufficient capacity to process the HLS manifest file request;
- a manifest file handler having previously processed requests for the requested HLS manifest file, requests for HLS manifest files associated with the same video object, requests for HLS manifest files associated with the same digital service, or requests for similar HLS manifest files;
- manifest file handler association with a subdomain contained in the hostname, or with the digital service associated with the hostname or with the requested HLS manifest file;
- manifest file handler association with a portion of the HLS manifest file request URL or contents of the HLS manifest file request message, such as the user agent identified in the HLS manifest file request message;
- manifest file handler association with, or optimization for, HLS manifest files associated with on-demand video, HLS manifest files associated with linear video, or HLS manifest files associated with a combination of on-demand video and linear video;
- the requesting user device or user agent;
- the access network used by the requesting user device;
- round-robin rotation of HLS manifest file requests among manifest file handlers;
- deterministic distribution of HLS manifest file requests among manifest file handlers, for example using a protocol such as Cache Array Routing Protocol (CARP) taking the HLS manifest file request URL, or a portion thereof, as the input; or (m) random distribution of HLS manifest file requests among manifest file handlers.

Determining a Location that is Close, in Network Terms, to Another Location or Determining Network Distance In the primary embodiment and secondary embodiment (and also in other embodiments described herein in addition to the primary embodiment and secondary embodiment), various entities are described, selected, designated, or considered as being "close, in network terms" to another entity; such entities include, but are not limited to: components of the network of infrastructure components; components of, or that are related to, infrastructure service providers, ISPs or other access networks, intermediate networks, the Internet, networks that comprise the Internet, and mobile networks; and other network-related components and locations. Entities related to the network of infrastructure components that may be described, selected, designated, or considered in this way include, but are not limited to, manifest file handlers, segment file servers, DNS Authoritative Name Servers, cluster performance managers, service provider managers, performance administrators, networking devices such as switches and routers, optional NIF Message Handlers, optional segment redirect processors, optional Library Storage Servers, other infrastructure components, groups or clusters of any of these, infrastructure components generally, routers, switches, and other infrastructure elements related to the network of infrastructure components.

Determining a location that is close, in network terms, to a second location, or that is closer than other locations, in network terms, to a second location, or determining the distance in network terms between a first network location and a second network location (e.g., a requesting device and one or more infrastructure components) can be implemented by using any of, or any combination of, all or part of: the IP addresses of one or both of the two network locations; other Internet address information related to one or both of the two network locations, such as IP address blocks, IP address ranges, or Autonomous System Numbers; Internet routing information related to one or both of the two network locations, such as inter-AS or intra-AS routing tables; connectivity or utilization information related to one or both of the two network locations (for example, the capacity of one or more router ports, or the utilization of one or more router ports, related to one or both of the two network locations); performance measurements, including speed, throughput, latency, jitter, or other network performance characteristics, between two network locations, wherein each of the two locations comprising the measured pair of locations is either one of the locations between which the distance or determination of closeness is being determined or is a location related to one of the locations between which the distance or determination of closeness is being determined; a network map; a network database, comprising network addresses, address ranges, or other network information along with location information, distance information, performance information, or other information that can be used to determine the distance between two locations or closeness of one location to another.

Network performance measurements can comprise any of, or any combination of: current, recent, or past network performance measurements; network performance measurements for comparable time periods, such as hour of day, day of week, week or month of year; or network performance measurements for periods defined by comparable network conditions, such as a measurement of the overall load on the network, or of the load on a given region of the network or point in the network; or network performance measurements for periods defined by comparable other conditions, such as "the Friday after Thanksgiving," "Super Bowl Sunday," "during the FIFA World Cup tournament," or "concurrent with a major software update release".

URL Requests Other than URLs Requesting an HLS Manifest File

Returning to the primary embodiment and secondary embodiment, an optional aspect of the primary embodiment and secondary embodiment is the ability to handle URL requests other than URLs requesting an HLS manifest file, such as URL requests that precede a URL requesting an HLS manifest file, or other URLs that do not directly request an HLS manifest file. An important example of this optional aspect of the primary embodiment and secondary embodiment is the use by digital services of device detection. Some digital services, in some settings, publish a single URL that will provide access to a given video across all device types and video protocols, supported by a device detection service that is provided either by the digital service, an infrastructure service provider, or another entity. For example, for many digital service providers it is desirable to publish a mobile website wherein a given mobile website page is accessible from multiple different mobile device types and their respective browsers (in this way, the digital service only needs to develop, maintain, and update a single mobile website, rather than multiple mobile websites, one for each distinct device type); this is technically straightforward to execute in HTML and HTML5 and is well-understood in the art. A cross-device website page, however, might contain a URL that, when requested, will result in playback of a video; however, while the website page may be readily rendered by the various browsers available across different devices, different devices often use different video protocols. The problem, then, is how to publish a webpage that can be rendered across multiple devices and that contains a URL that results in playback of a given video using the specific video protocol of each of those multiple devices.

One solution to this problem is to publish a single URL which accesses a device detection service, which then detects the device type (typically by inspecting the user agent identifier included with the HTTP request in which the URL is sent) and returns an HTTP 302 Redirect message instructing the device to request another URL (this returned URL is sometimes referred to as a "redirect URL" to distinguish it from the initially requested URL); the redirect URL is typically specific to the video protocol of the device (the redirect URL does not have to be, for example it could result in yet another HTTP 302 Redirect message, however, multiple HTTP 302 Redirects in sequence is currently not supported across all devices or by all manufacturers, and so is not commonly implemented at this time). Described in the context of the Apple HLS video protocol, then, in this scenario the initial URL would not be for an HLS manifest file and would not end in the file extension .m3u8.

HLS Manifest Files

Continuing with the primary embodiment and secondary embodiment, as a reminder (and as previously discussed), an HLS manifest file may comprise URLs of other HLS manifest files, or may comprise URLs of video segment files (in either case, along with metadata). For clarity and readability, the following designations will be used in this disclosure:

an HLS manifest file that is obtained from the digital service (or from the digital service's infrastructure service provider(s), or another manifest file provider) will be referred to as a "source" HLS manifest file;

an HLS manifest file that is configured by the manifest file handler (typically in response to a request from a user device, and which typically will be returned to the device in response to the request) will be referred to as an "issued" HLS manifest file;

an HLS manifest file that comprises URLs of other HLS manifest files (along with control, descriptive, and other information) will be referred to as a "Master" HLS manifest file;

an HLS manifest file that comprises URLs of video segment files (along with control, descriptive, and other information) will be referred to as a "Variant" HLS manifest file.

the URLs contained within a Master HLS manifest file, which are the URLs of Variant HLS manifest files, will be referred to as "Variant HLS manifest file URLs."

Continuing with the primary embodiment and secondary embodiment, to initiate playback of HLS video, the requesting device sends an initial device request for the HLS manifest file; for clarity, this is the first request for an HLS manifest file associated with the particular video that the requesting device sends. The manifest file handler begins the processing of this initial device request by (a) determining whether it has available for processing a complete current set of source HLS manifest files associated with the URL contained in the initial device request for the HLS manifest file, and (b) assigning a Session ID. Each of these is now described in more detail.

Source HLS Manifest Files

When the manifest file handler receives an initial device request for an HLS manifest file, if the manifest file handler already has available a complete current set of source HLS manifest files related to the initial HLS manifest file request, the manifest file handler will configure an HLS manifest file to be returned in response to the request. A set of source HLS manifest files related to the initial device request for an HLS manifest file comprises all of the HLS manifest files that can be obtained (from the digital service, its infrastructure service provider(s), or another manifest file provider) as a result of the initial device request for an HLS manifest file, including any and all Variant HLS manifest files referenced, directly or indirectly (e.g., through other manifest files; HLS currently supports only a single set of Variant HLS manifest files, and Variant HLS manifest files that contain URLs of other Variant HLS manifest files are not supported; however, this may change in the future and/or in the context of adaptive streaming video protocols other than HLS). For example, the set of source HLS manifest files related to the initial device request for an HLS manifest file can be determined by parsing the initially-requested HLS manifest file and requesting the Variant HLS manifest files referenced therein (if any).

In an optional aspect of the primary embodiment and secondary embodiment, the process of requesting a complete current set of HLS manifest files may be extended by the manifest file handler (or, in other embodiments, by another infrastructure component, such as the NIF Message Handler) by initiating additional requests for the initially-requested HLS manifest file and/or for non-index-file URLs that precede the initial device request for an HLS manifest file; and specifying alternative user agents and IP addresses in the HTTP X-Forwarded-For header in those additional requests, thus determining the availability of, and retrieving, other available versions (if any) of the initially-requested HLS manifest file for different device types and different access networks or access network types, or combinations of device types and access network types; then parsing the returned Master HLS manifest files and requesting any further Variant HLS manifest files contained in the first returned Master HLS manifest files, again specifying alternative user agents and IP addresses in the HTTP X-Forwarded-For header in those requests, and continuing this process until no more Variant HLS manifest files are discovered.

In an optional aspect of the primary embodiment and secondary embodiment, this process may also be extended by the manifest file handler (or, in other embodiments, by another infrastructure component, such as the NIF Message Handler) by initiating additional requests for the initially-requested HLS manifest file and specifying in these additional requests additional infrastructure service providers providing infrastructure resource services to, or otherwise associated with, the digital service.

Alternatively, or in addition, a complete set of source HLS manifest files can also be directly provided to the manifest file handler, e.g, from the digital service, its infrastructure service provider(s), or another manifest file provider, upon the completion of the encoding and segmenting process of the adaptive streaming video protocol (as previously described).

If the manifest file handler does not already have available a complete current set of source HLS manifest files related to the initial device request for the HLS manifest file, for example if this is the first request for the requested HLS manifest file and consequently the manifest file handler has never before requested or received the set of source HLS manifest files, or as another example if the manifest file handler has a set of source HLS manifest files in storage, but the stored set of source HLS manifest files contains at least one HLS manifest file that has expired, has not been updated. or is otherwise not current, then the manifest file handler (or another infrastructure component) will make requests for all of, or the needed parts of, the set of source HLS manifest files related to the initial device request for an HLS manifest file. When the manifest file handler has, and/or has received, enough of the source HLS manifest file set to continue processing, processing proceeds; thus, completing the set of requests for all of, or the needed parts of, the set of source HLS manifest files can be carried out at the same time that processing continues. Optionally, the manifest file handler can wait until it has received all of the source HLS manifest file set before processing proceeds.

To make a digital service URL request for all or the needed part of the set of source HLS manifest files, the manifest file handler will determine, for each such request, the URL to use in the digital service URL request (this URL will hereafter be referred to as the "digital service URL"). To make a URL request for all or the needed part of the set of source HLS manifest files to an infrastructure service provider associated with the digital service, the manifest file handler will determine, for each such request, the URL to use in the service provider URL request (this URL will hereafter be referred to as the "service provider URL"). In order to compose digital service URLs and service provider URLs, the manifest file handler (and other infrastructure components) use one or more hostname authority records, which are contained in a hostname authorities file.

In the case of an initial device request for the HLS manifest file, the manifest file handler uses the hostname authority record (contained in the hostname authorities file) related to the character string, contained in the requested URL, that identifies the digital service; as a reminder, this character string can be the hostname contained in the requested URL, or optionally this character string can be included in the URL path, or can be included elsewhere in the URL. The manifest file handler looks up this character string in the hostname authorities file, reads the matching hostname authority record, retrieves the hostname to be used in digital service URL requests from the hostname authority record, and then composes the URL for the digital service URL request and makes the request. If the URL contained in the initial device request for an HLS manifest file is of the type discussed earlier that contains a "second URL character string within a first URL," then the requested URL already contains all of the character strings necessary to compose the digital service request URL (which is typically the "second URL character string" within the "first URL", plus the HTTP method, "http://"); in this case, although no additional character strings are needed, the hostname authority record is still used to verify that the digital service is authorized to use the network of manifest file handlers (if there is no entry in the hostname authorities file for the character string(s) identifying the digital service, the digital service is not authorized to use the network of manifest file handlers, no further processing of the initial device request for the HLS manifest file is performed, and an HTTP 404 File Not Found error code is returned to the requesting device).

In the case of an HLS manifest file that is a Variant HLS manifest file, the digital service URL for a Variant HLS manifest file will often simply be the source Variant HLS manifest file URL (as previously described, contained in a Master HLS manifest file received directly from the digital service, its infrastructure service provider(s), or another manifest file provider); in other cases, the Master HLS manifest file will comprise service provider URLs rather than digital service URLs. If the Master HLS manifest file contains digital service URLs, but the source Variant HLS manifest files are retrieved from the digital service's infrastructure service provider (rather than directly from the digital service), the service provider URL may instead be derived in part from the digital service URL contained in the source Variant HLS manifest file, typically by changing the hostname in the source Variant HLS manifest file URL.

For example, to direct digital service URL requests to a content delivery network used by the digital service, if the source Variant HLS manifest file URL is the URL by which the Variant HLS manifest file can be requested directly from the digital service, it would be modified to replace the digital service's hostname with a hostname identifying, or associated directly or indirectly with, the content delivery network (one or more additions to, or modifications to, the URL path may also be required; generally, all such modifications necessary to derive a URL that will direct digital service requests to an infrastructure service provider such as a content delivery network are known in advance, are repeatable, and are applicable to groups of URLs, potentially including all of the service provider URLs related to a given digital service).

In the primary embodiment and secondary embodiment, the manifest file handler uses a hostname authority record related to the digital service, typically identified within the hostname authorities file by a character string that identifies the digital service, to determine the hostname to include in the service provider URL, to determine any additional information necessary to properly configure the digital service URL (including the path portion of the digital service URL), and to properly configure the digital service URL request message. In the primary embodiment and secondary embodiment, the character string that identifies the digital service is contained in the requested URL or contained in the source Variant HLS manifest file URL, while in other embodiments, the character string that identifies the digital service may be another character string.

Hostname Authority Records and Hostname Authorities File

Describing in more detail the hostname authority records and hostname authorities file as implemented in the primary embodiment and secondary embodiment, infrastructure components that make digital service URL requests, including manifest file handlers and segment file servers, may use one or more hostname authority records in conjunction with making the digital service URL request. In the primary embodiment and secondary embodiment, hostname authority records are maintained in a hostname authorities file, which is updated concurrently across infrastructure components at which hostname authority records are used. Hostname authority records can be used in at least three ways: (a) to establish the digital service URL hostnames that correspond to published URL hostnames and/or character strings inserted into the URL and that can be used to construct the appropriate URL for a digital service URL request corresponding to the received published URL request, when one is needed; (b) to establish that a given digital service is authorized to use the network of infrastructure components, and in the case of manifest file handlers, to determine that a given digital service is authorized to use the network of manifest file handlers, which is especially important in the previously-described optional aspect of the primary embodiment and secondary embodiment wherein the URL contained in the initial device request for an HLS manifest file is of the type as discussed earlier that contains a "second URL character string within a first URL," wherein the published URL received by the infrastructure component contains within it the full character string comprising the digital service URL used in the digital service URL request; and (c) as a repository for, and source of, additional hostnames and character strings for non-manifest file URL requests and other similar URL requests.

Note that the hostname authority records contained in the hostname authorities file may be used in conjunction with the published URLs that are received in URL requests, e.g. an initial device request for an HLS manifest file received from an end user device. When the digital service is using the CNAME technique in conjunction with its published URLs, as previously described, the hostname that appears in the published URLs is not the hostname resolved by the DNS Authoritative Name Servers; however, the network of manifest file handlers may know of the hostname published in the digital service's URLs, or alternatively may know of another character string identifying the digital service and present in the digital service's published URLs, as at least one of these will be used in the hostname authority records associated with that digital service.

Optionally, the hostname authorities file(s) can be encrypted, digitally signed, used in conjunction with a hash value, or similarly protected from tampering by unauthorized parties. Considering the role of the hostname authorities file in the video delivery process—at least authorizing, and in the case where identifying character strings that are not hostnames are used, functionally enabling, retrieval of source manifest files and video segment files—this added level of security further increases the difficulty of gaining unauthorized access to, and use of, the network of infrastructure components.

In other embodiments, hostname authority records are maintained in multiple hostname authorities files, each of which is update concurrently across infrastructure components at which that hostname authorities file is used, and each of which comprises hostname authority records that those infrastructure components use; for example, a separate hostname authorities file may be maintained for each separate type of infrastructure component (e.g., a hostname authorities file for the manifest file handlers and a separate hostname authorities file for the segment file servers, etc), or as another example, a separate hostname authorities file may be maintained for each separate region in which the network of infrastructure components operates (e.g., a regional hostname authorities file for North America, a separate hostname authorities file for Europe, a separate hostname authorities file for China, and a separate hostname authorities file for the rest of the world).

In other embodiments, hostname authority records are maintained in multiple hostname authorities files managed in another way; are maintained as individual records rather than aggregated into files; are accessed via one or more APIs that operate within, or are provided by the operator of, the network of infrastructure components; are accessed via one or more APIs operated by digital services that use the network of infrastructure components; and/or are accessed via one or more APIs operated by parties other than the digital services that use the network of infrastructure components.

In other embodiments, hostname authority records are not used at all. However, note that these other embodiments would be required to either (a) not restrict usage to digital services that are authorized to use the network of infrastructure components, or (b) use other authentication techniques, such as digitally signed URLs, operational restriction to a private network address space, access control lists, and other authentication techniques. An example is a network of infrastructure components that supports the type of URL discussed earlier that contains a "second URL character string within a first URL," but does not use a hostname authority record or its equivalent to confirm that the digital service is authorized to use the network of manifest file handlers; such a system would either (a) not limit usage to authorized digital services, since any digital service could simply insert the manifest file handler's hostname into its URLs, in the manner described earlier that creates a "second URL character string within a first URL," which as has been noted contains all the characters necessary to create the digital service URL with no additional input, and therefore without an authorization mechanism would result in the URL being processed, and the video request being serviced by, the network of infrastructure components; or (b) require another authentication technique.

In other embodiments, some infrastructure components use hostname authority records as described while other infrastructure components do not use hostname authority records, and accordingly the infrastructure components that do not use hostname authority records, as described, either use one or more other authentication techniques or do not restrict usage to authorized digital services.

Source HLS Manifest Files Continued

Optionally, the process of requesting all of, or the needed part of, the complete current set of source HLS manifest files related to the initial device request for an HLS manifest file may be further extended to address known, expected, or possible variations of the initial device request for an HLS manifest file. As has been previously described, in some cases there may be multiple HLS manifest file sets associated with the same given video, for example to address variations in devices and connections, such as the example provided previously wherein different HLS manifest file sets associated with the same given video are utilized to deliver the given video to, in the first case, devices connected via a mobile wireless network, and in the second case, to devices connected via a residential broadband network. In this optional aspect of the primary embodiment and secondary embodiment, the manifest file handler, NIF Message Handler, or other infrastructure component also makes one or more additional HTTP requests, including properly formatted request URLs, that incorporate one or both of: (a) specifying one or more user agents other than the user agent specified in the initial device request for the HLS manifest file; and/or (b) specifying one or more other networks than the network associated with the requesting user device, including by utilizing one or more other HTTP headers (such as the HTTP X-Forwarded-For header) and including an IP address associated with such other network or other network-identifying information.

Optionally, the complete current set of source HLS manifest files, related to an initial device request for an HLS manifest file or related to all possible meaningful variations of an initial device request for an HLS manifest file, can be regularly, periodically, or on demand requested apart from, such as in advance of, any device request for the HLS manifest file, including an initial device request for the HLS manifest file or a device request for an updated HLS manifest file. For example, in the secondary embodiment (which, as a reminder, focuses on the delivery of linear video content), it may be advantageous to request updates to HLS manifest files in advance of any device request for the updated HLS manifest file.

Alternatively, or in addition, a complete current set of source HLS manifest files can also be directly provided to the manifest file handler, e.g., from the digital service, its infrastructure service provider(s), or another manifest file provider, upon the completion of the encoding and segmenting process (as previously described for adaptive bitrate streaming).

In other embodiments, the manifest file handler begins the processing of the initial device request for the HLS manifest file by determining whether it has available for processing the needed portion of the complete current set of source HLS manifest files (associated with the URL contained in the initial device request for the HLS manifest file), and if it does, continues to the next step without requesting any other portion of the complete current set of source HLS manifest files; in these embodiments, portions of the complete current set of source HLS manifest files are requested only as needed.

Assigning a Session ID

Returning to the primary embodiment and secondary embodiment, as previously described the manifest file handler may begin the processing of the initial device request for the HLS manifest file by (a) determining whether it has available for processing a complete current set of source HLS manifest files associated with the URL contained in the initial device request for the HLS manifest file, and (b) assigning a Session ID. Turning now to assigning a Session ID, the manifest file handler receives the initial device request for an HLS manifest file and assigns a Global Unique Identifier (GUID) to the session; once assigned to a session, this will be referred to as the Session ID.

In the first embodiment and second embodiment, the manifest file handler may obtain the GUID by generating it. In other cases, when the manifest file handler receives an initial request for an HLS manifest file, the manifest file handler may obtain a GUID to be assigned to the session by any of, or any combination of, or any concatenation of: recording a GUID provided in the URL request or message; performing a lookup in a table or file; interacting with an API, including (but not limited to) an API of the digital service, an infrastructure service provider, a GUID-generation service, or another entity; or otherwise obtaining a GUID. In other embodiments, when the manifest file handler receives an initial request for an HLS manifest file, the manifest file handler will assign a session identifier other than a GUID to the session (thereby creating an optional alternative form of Session ID), obtaining the session identifier by any of, or any combination of, or any concatenation of: generating, performing a lookup of, or obtaining a session identifier other than a GUID; recording a GUID or other session identifier provided in the URL request or message; deriving a session identifier from the date, time, location, or other current or prior information related to the URL request or message; deriving a session identifier from one or more items related to, or contained in, the URL request or message, such as the IP address or access network from which the request was sent, the requested video content or information associated with the requested video content, or the TCP sequence number, TCP acknowledgement number, TCP checksum, other TCP or other protocol information from the underlying TCP connection or other protocol related to the transport of the URL request or message; or interacting with an API of the digital service, an infrastructure service provider, an access network, or another entity to generate, derive, or obtain a session identifier.

In an optional aspect of other embodiments, the Session ID may optionally additionally include a sub-session identifier. In another optional aspect of other embodiments, the Session ID may be additionally associated with other parameters or information, which may or may not be unique to the session, that is contained in, derived from, or related to the URL request or message, or that is obtained through interacting with an API of the digital service, an infrastructure service provider, an access network, or another entity, or that is obtained from a database lookup; for example, the Session ID may be associated with a user identifier included in the query string as a parameter. Including a sub-session identifier in the Session ID and/or associating the Session ID with other information in this way enables subsequent resource allocation and prioritization, infrastructure service provider assignment, and other video delivery resource decisions, as well as aggregation and other statistical manipulation of session information, across multiple videos (for example, multiple discrete on-demand short videos that are selected by a user and played back on the user's device) and across all sessions or any group comprising more than one session according to the one or more associated information values or parameters.

Processing the Initial Device Request for an HLS Manifest File

Continuing with the manifest file handler's processing of the initial device request for an HLS manifest file, the manifest file handler may configure an HLS manifest file to be returned to the requesting device (hereafter referred to as an issued HLS manifest file). Generally, the issued HLS manifest file may be configured based on the source HLS manifest file corresponding to the URL contained in the HLS manifest file request; each URL in the issued HLS manifest file is configured based on the corresponding URL in the source HLS manifest file. The details of the issued HLS manifest file configuration depend in part on whether the requested HLS manifest file is a Master HLS manifest file (as a reminder, comprises Variant HLS manifest file URLs) or a Variant HLS manifest file (as a reminder, comprises video segment file URLs).

Master HLS Manifest files: HLS Manifest Files that Comprise Variant HLS Manifest File URLs If the requested HLS manifest file is a Master HLS manifest file, the manifest file handler will configure an issued HLS manifest file that is also a Master HLS manifest file, and that comprises Variant HLS manifest file URLs wherein (a) the hostname configured in each Variant HLS manifest file URL is associated with the manifest file handler, another manifest file handler, a manifest file handler cluster, or the network of manifest file handlers; (b) the URL path configured in each Variant HLS manifest file URL includes the assigned Session ID; (c) the URL path configured in each Variant HLS manifest file URL also includes the hostname of the digital service (contained in the initial request for an HLS manifest file) or a character string that designates the digital service associated with the initial request for an HLS manifest file, wherein in either case the digital service is authorized to use the network of infrastructure components; and (d) the URL path configured in each Variant HLS manifest file URL includes the path of the corresponding URL in the source Master HLS manifest file.

In the primary embodiment and secondary embodiment, these aspects of the issued Variant HLS manifest file URLs are implemented by configuring each issued Variant HLS manifest file URL based on the corresponding source Variant HLS manifest file URL (contained in the source Master HLS manifest file), incorporating these four elements, and using the hostname authorities file to confirm authorization of the digital service to use the network of infrastructure components and/or to look up the character string that designates the digital service associated with the request for an HLS manifest file. Optionally, when applicable, authorization of the digital service to use the network of infrastructure components can be confirmed subsequently, for example at the time an issued Variant HLS manifest file is requested from the network of manifest file handlers, or at the time video segment file URLs are requested from the network of segment file servers.

For example, the published URL http://digserv.indexhandler.net/firstindexfile.m3u8 invokes the network of manifest file handlers to receive and handle deliveries of the Master HLS manifest file identified by the URL http://indexfiles.digserv.com/firstindexfile.m3u8 at its source digital service "digserv.com," (this example is consistent with the previous example in this respect).

A manifest file handler receives a request for the published URL and requests the source HLS manifest file using the source HLS manifest file URL; the Master HLS manifest file returned by the digital service comprises three source Variant HLS manifest file URLs as follows:

http://indexfiles.digserv.com/firstindexfile/variant-HLS-index-file-200.m3u8
http://indexfiles.digserv.com/firstindexfile/variant-HLS-index-file-400.m3u8
http://indexfiles.digserv.com/firstindexfile/variant-HLS-index-file-600.m3u8

In this example, the receiving manifest file handler is one of multiple manifest file handlers, its serial number is 1, but for this request it is assigning a different manifest file handler to receive the requests for issued Variant HLS manifest files and accordingly it inserts a hostname associated with the manifest file handler cluster designated as cluster "B"; in addition, the receiving manifest file handler assigns the Session ID "XYZ789" (shortened in the examples contained herein from actual GUID length to streamline the example URLs and make them more readily readable) to this request. Accordingly, the receiving manifest file handler configures an issued Master HLS manifest file (and returns it to the requesting device) comprising three issued Variant HLS manifest file URLs as follows:

http://b.indexhandler.net/XYZ789/indexfiles.digserv.com/firstindexfile/variant-HLS-index-file-200.m3u8
http://b.indexhandler.net/XYZ789/indexfiles.digserv.com/firstindexfile/variant-HLS-index-file-400.m3u8
http://b.indexhandler.net/XYZ789/indexfiles.digserv.com/firstindexfile/variant-HLS-index-file-600.m3u8

As a reminder, HLS manifest files, including Master HLS manifest files, may also contain control, descriptive, and other information, in addition to URLs. For readability and clarity, metadata is not shown in any of the example HLS manifest files contained herein.

As can be seen, the issued Master HLS manifest file is configured with Variant HLS manifest file URLs that are each configured with: the hostname b.indexhandler.net associated with one or more manifest file handlers in cluster "B" (or, with cluster "B" generally); the assigned Session ID XYZ789; and a character string (in this case, the full source Variant HLS manifest file URL, minus the method "http://", e.g., indexfiles.digserv.com/firstindexfile/variant-HLS-index-file-400.m3u8) that enables any manifest file handler in cluster "B" (or any other infrastructure component, including any manifest file handler), when it receives a request for this issued Variant HLS manifest file URL, to use the received URL in conjunction with the hostname authorities file to confirm authorization to use the network of infrastructure components and to determine and configure the source Variant HLS manifest file URL associated with received URL.

The following example illustrates the use of the character string designating an authorized digital service, rather than using the full digital service hostname.

As in the previous example, the published URL http://digserv.indexhandler.net/firstindexfile.m3u8 invokes the network of manifest file handlers to receive and handle deliveries of the Master HLS manifest file identified by the digital service URL http://indexfiles.digserv.com/firstindexfile.m3u8 (this example is consistent with previous examples in this respect).

As in the previous example, the manifest file handler receives a request for the published URL and requests the source HLS manifest file using the source HLS manifest file URL; the Master HLS manifest file returned by the digital service comprises three source Variant HLS manifest file URLs as follows:

http://indexfiles.digserv.com/firstindexfile/variant-HLS-index-file-200.m3u8
   http://indexfiles.digserv.com/firstindexfile/variant-HLS-index-file-400.m3u8
   http://indexfiles.digserv.com/firstindexfile/variant-HLS-index-file-600.m3u8

As in the previous example, the receiving manifest file handler is one of multiple manifest file handlers, its serial number is 1, but for this request it is assigning a different manifest file handler to receive the requests for issued Variant HLS manifest files and accordingly it inserts a hostname associated with the manifest file handler cluster designated as cluster "B"; in addition, the receiving manifest file handler assigns the Session ID "XYZ789" to this request; however, in this example, the character string "digserv," rather than the digital service hostname contained in the original request, is included in the issued URLs.

Accordingly, in this example the manifest file handler configures an HLS manifest file (and returns it to the requesting device) comprising three issued Variant HLS manifest file URLs as follows:

http://b.indexhandler.net/XYZ789/digserv/firstindexfile/variant-HLS-index-file-200.m3u8
   http://b.indexhandler.net/XYZ789/digserv/firstindexfile/variant-HLS-index-file-400.m3u8
   http://b.indexhandler.net/XYZ789/digserv/firstindexfile/variant-HLS-index-file-600.m3u8

As can be seen, the issued Master HLS manifest file is configured with Variant HLS manifest file URLs that are each configured with: the hostname b.indexhandler.net associated with one or more manifest file handlers in cluster "B" (or, with cluster "B" generally); the assigned Session ID XYZ789; and a character string (in this case, the character string digserv) that enables any manifest file handler in cluster "B" (or any other infrastructure component, including any manifest file handler), when it receives a request for this issued Variant HLS manifest file URL, to use the received URL in conjunction with the hostname authorities file to confirm authorization to use the network of infrastructure components and to determine and configure the source Variant HLS manifest file URL associated with received URL.

This URL configuration structure, which is followed throughout the primary embodiment and secondary embodiment as HLS manifest files are created and the URLs that comprise them are configured, allows a network of manifest file handlers, and as will be seen, also segment file servers, performance administrators, optional redirect message processors, optional library storage servers, and other infrastructure components, to work together using URLs and the hostname authorities file.

This configuration structure provides for both flexibility where needed and specificity where required, as well as synchronized operation and measurement, high performance, and efficient resource utilization across infrastructure components in handling the multiple URL requests and file deliveries that comprise a single HLS video delivery (or similarly comprise a single video delivery in other HTTP-based adaptive streaming video delivery protocols), including, but not limited to the following:

configuring a Variant HLS manifest file URL that contains a hostname associated with the manifest file handler assures, in that case, that the Variant HLS manifest file URLs will then be requested (by the requesting device) from the manifest file handler;

in another case, configuring a Variant HLS manifest file URL that contains a hostname for another manifest file handler enables the manifest file handler that receives the first request for the HLS manifest file to identify, when and if applicable, another manifest file handler that is better suited to handle requests for all of, or any of, the Variant HLS manifest files;

in another case, configuring a Variant HLS manifest file URL that contains a hostname for a cluster of manifest file handlers enables the manifest file handler that receives the first request for the HLS manifest file to identify, when and if applicable, a cluster of manifest file handlers that is well suited to handle requests for all of, or any of, the Variant HLS manifest files, but without yet selecting the individual manifest file handler within the cluster, leaving that selection instead for a later point, for example, at resolution of the manifest file handler cluster hostname into one or more IP addresses, or as another example, when (following DNS resolution of the manifest file handler cluster hostname into one or more switch IP addresses associated with the manifest file handler cluster) the connection request for the Variant HLS manifest file URL is received by a switch at the manifest file handler cluster and is then directed by the switch to a specific manifest file handler;

in another case, configuring a Variant HLS manifest file URL that contains a hostname for the network of manifest file handlers enables the manifest file handler that receives the first request for the HLS manifest file to issue a Variant HLS manifest file URL and defer selection of the specific manifest file handler or manifest file handler cluster to a later point in the process, at which point another infrastructure component can make the selection of a manifest file handler or manifest file handler cluster that is well suited to handle requests for all of, or any of, the Variant HLS manifest files;

including the assigned Session ID in the URL path of the issued URLs assures that a Session ID that is common across all URLs associated with the session, but unique (or approximately unique, see related descriptions in this disclosure and additional notes for more information on GUIDs) to the delivery of that video to that requesting device (and distinct from the Session IDs in URLs associated with the delivery of other videos to that requesting device or associated with the delivery of that same video to other requesting devices) is communicated to any manifest file handler in any request for any of the Variant HLS manifest files. This in turn enables that manifest file handler to include that same Session ID in the URLs it configures and includes in the HLS manifest files that it returns (regardless of whether the URLs are Variant HLS manifest file URLs, video segment URLs, or other URLs). Including the assigned Session ID in all Variant HLS manifest file URLs and video segment URLs, as well as optionally in other URLs, issued as a result of the initial device request for the HLS manifest file enables synchronized operation, performance management, and performance measurement across all related infrastructure components, as well as across infrastructure service providers, with precision and with session-level granularity and specificity;

including the digital service hostname contained in the initial request for an HLS manifest file, or a character string that designates the digital service associated with the initial request for an HLS manifest file, in the path portion of the issued URLs enables any infrastructure component that ever needs, for a URL it receives, to derive the corresponding URL with which it can request that object directly from the digital service, to do so with no input other than the URL it received and the hostname authority table.

including the path of each corresponding source URL in the path portion of each issued URL eliminates any risk of accidentally or randomly duplicating URLs (referred to as "name space collisions") across an operating network of infrastructure components servicing multiple digital services, and in addition enables any infrastructure component that ever needs, for a URL it receives, to derive the corresponding URL with which it can request that object directly from the digital service, to do so with no input other than the URL it received and the hostname authority table.

The Cluster Performance Manager

Continuing with the primary embodiment and secondary embodiment, the manifest file handler may operate in conjunction with the cluster performance manager to configure Variant HLS manifest file URLs that identify itself to handle requests for all of, or any of, the Variant HLS manifest files, or, if and when applicable, that identify another manifest file handler or cluster of manifest file handlers that is better suited to handle requests for all of, or any of, the Variant HLS manifest files, or, if and when applicable, to defer selection of the specific manifest file handler or manifest file handler cluster to a later point in the process, at which point another infrastructure component can make the selection of a manifest file handler or manifest file handler cluster that is well suited to handle requests for all of, or any of, the Variant HLS manifest files.

Note that when a device receives an Internet URL request from a requesting device, including a manifest file handler that receives the initial request for an HLS manifest file from a requesting device, in general (e.g., under common Internet operating conditions) that device knows the network address from which the request was sent to it, and this network address can be used to determine the network location of the requesting device and/or to determine the distance, in network terms, of various other network locations from the network location of the requesting device. An example of an exception to this general proposition is a request sent by the requesting device first to an anonymizing proxy, which then forwards the request without attaching any information about the original requesting device, e.g. does not include an HTTP X-Forward-For message header in the forwarded request; through this and related techniques, an anonymizing proxy thereby obscures the network address of the original requesting device. Such exceptions, however, are a very small portion of Internet URL requests overall.

This means that when the manifest file handler receives an initial device request for an HLS manifest file (which, as a reminder, in an adaptive streaming video delivery precedes the delivery of any video segment files to the requesting device), it has precise and accurate information about the delivery that is being requested, which it can use itself or can communicate to another infrastructure component. The manifest file handler in most cases knows the actual network address of the requesting device, which can be used to determine the distance, in network terms, of any infrastructure component to the requesting device, or can be used to select an infrastructure service provider that performs well in delivering video segment files to that network location. The manifest file handler may know in all cases the exact HLS video that is being requested, which can be used in a number of ways, for example to select a server that has, or is likely to have, the video segment file in storage, to preload all or part of the video segment file into storage on one or more specific servers, to select an infrastructure service provider that performs well in delivering video segment files related to that specific HLS video, or in delivering video segment files that have one or more properties in common with, or similar to, those of that specific HLS video.

Individually or together, these factors can be used in determining which infrastructure component(s), generally or of a given type, or cluster(s) of infrastructure component(s), should be assigned to the various aspects of delivering the requested HLS video to the requesting device. For example, as will be seen, segment file servers (or, optionally, a cluster of segment file servers) can be assigned when Variant HLS manifest files are issued to requesting devices, which occurs following the initial device request for an HLS manifest file, and therefore occurs at a point in the video delivery process when the requested video is in all cases known and the network location of the requesting device is in most cases known; this can make such selections more accurate or effective, and management of a group of infrastructure components or one or more infrastructure service providers more effective and efficient, than existing infrastructure service provider processes that operate without certainty as to the specific content requested and/or that rely on an estimate or approximation of the network location of the requesting device or that rely on the network location of a device other than the requesting device. In addition, this approach allows each video segment file delivery to be individually assigned to one or more segment file servers or one or more clusters of segment file servers, and further allows the aggregate number of video segment file deliveries assigned to a segment file server or cluster of segment file servers to be accurately counted, rather than estimated or predicted, which is more precise and accurate than existing infrastructure service provider processes that assign groups (that are unknown and variable in size and composition) of video segment file deliveries, rather than individual video segment file deliveries, as each delivery assignment is made. And optionally, this approach allows selection of an infrastructure service provider for each individual video, even for each individual video segment file, based at least in part on how the available infrastructure service providers perform in delivering HLS video segment files with comparable properties to the same or comparable network locations or network subsections.

Figure 3:
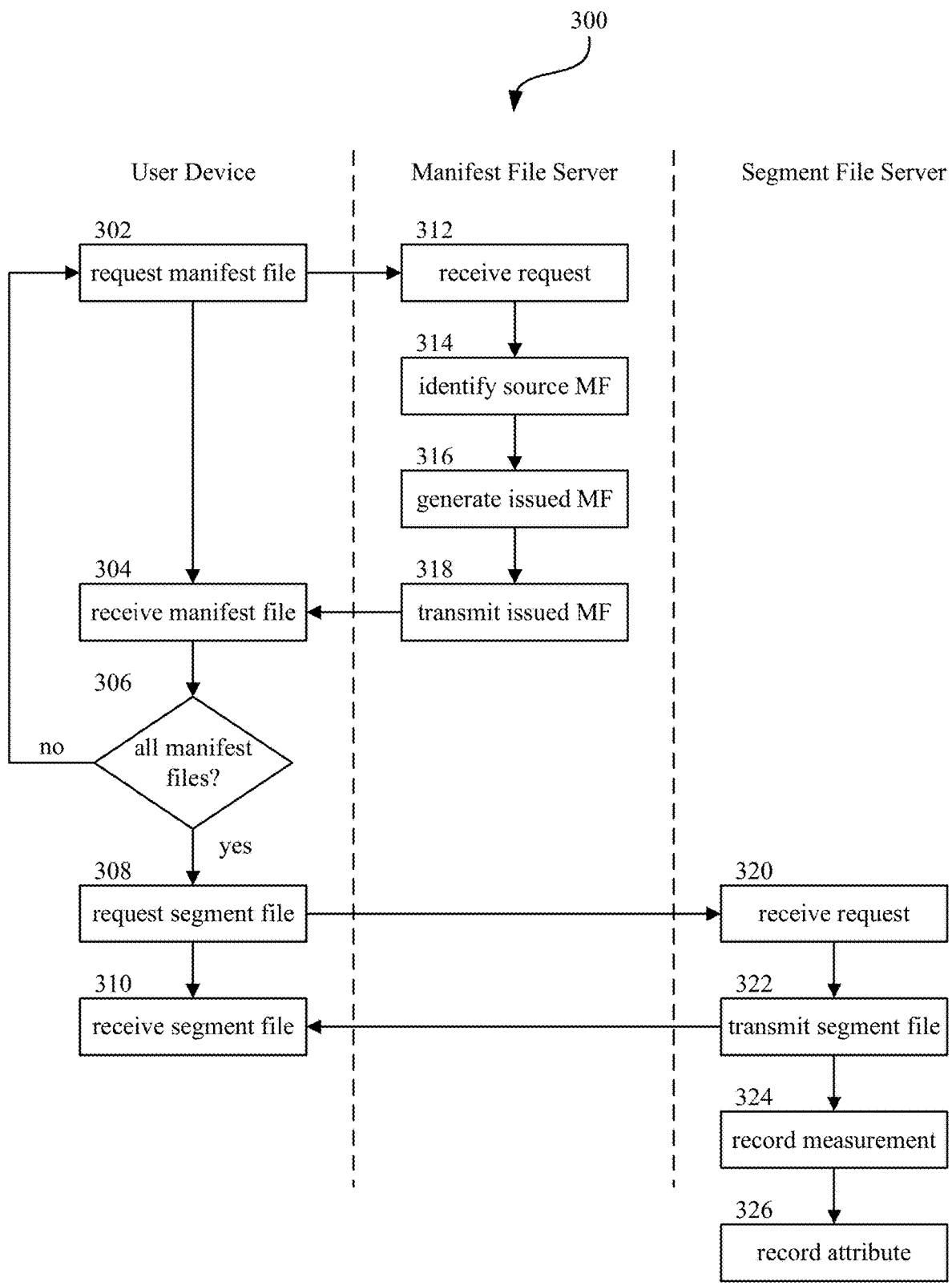
FIG. 3 is an interaction flowchart of one embodiment of a process for measuring and managing the performance of adaptive streaming video deliveries.

For example, referring now to FIG. 3, a flowchart is shown illustrating a process 300 for measuring and managing the performance of adaptive streaming video deliveries in accordance with certain embodiments. This flowchart illustrates the interactions between a user device (or other requesting device), a manifest file server (e.g., 106 or 112), and a segment file server (e.g., 108 or 114). The user device 118 communicates with the manifest file server 106 or 112 and segment file server 108 or 114 via a network, such as the Internet.

At block 302, the user device makes a request for a manifest file, for example, using a URL that is published on a content provider webpage. At block 304, an issued manifest file is received by the user device from the manifest file server as a response to the request. At block 306, a branching decision is made based on whether all manifest files for the video have been received. If all necessary manifest files have not been received, process 300 returns to block 302 and blocks 302, 304, and 306 are repeated until all necessary manifest files have been received. Note that many user devices are functionally capable of making more than one concurrent data request; for these user devices, the number of repetitions through blocks 302, 304, and 306 will be reduced, including to a single sequence through blocks 302, 304, and 306 if the device is capable of making all necessary manifest file requests concurrently. Then, process 300 continues to block 308 wherein the user device makes a request for a video segment file using one of the URLs from one of the received variant manifest files. At block 310, the requested video segment file is received from the segment file server. Blocks 308 and 310 are repeated for each segment of the video that is served by a segment file server of system 100.

Turning now to the manifest file server, at block 312, the manifest file server receives the request for the manifest file. The request includes the URL that references the manifest file. For example, the URL can include a character string that identifies the content provider and the path of the URL can include an identifier of the manifest file. At block 314, a source manifest file is identified based on the URL included in the request. At block 316, an issued manifest file is generated based on the source manifest file. More details for generating an issued manifest file are provided herein below with reference to FIG. 4. At block 318, the issued manifest file is transmitted to the user device.

Turning now to the segment file server, at block 320, the segment file server receives the request for the video segment file. Based on the URL included in the request, a video segment file is identified and at block 322, the video segment file is transmitted to the user device. At block 324, a measurement of the transmission of the video segment file is recorded and at block 326, an attribute of the request for the video segment file is recorded.

Figure 4:
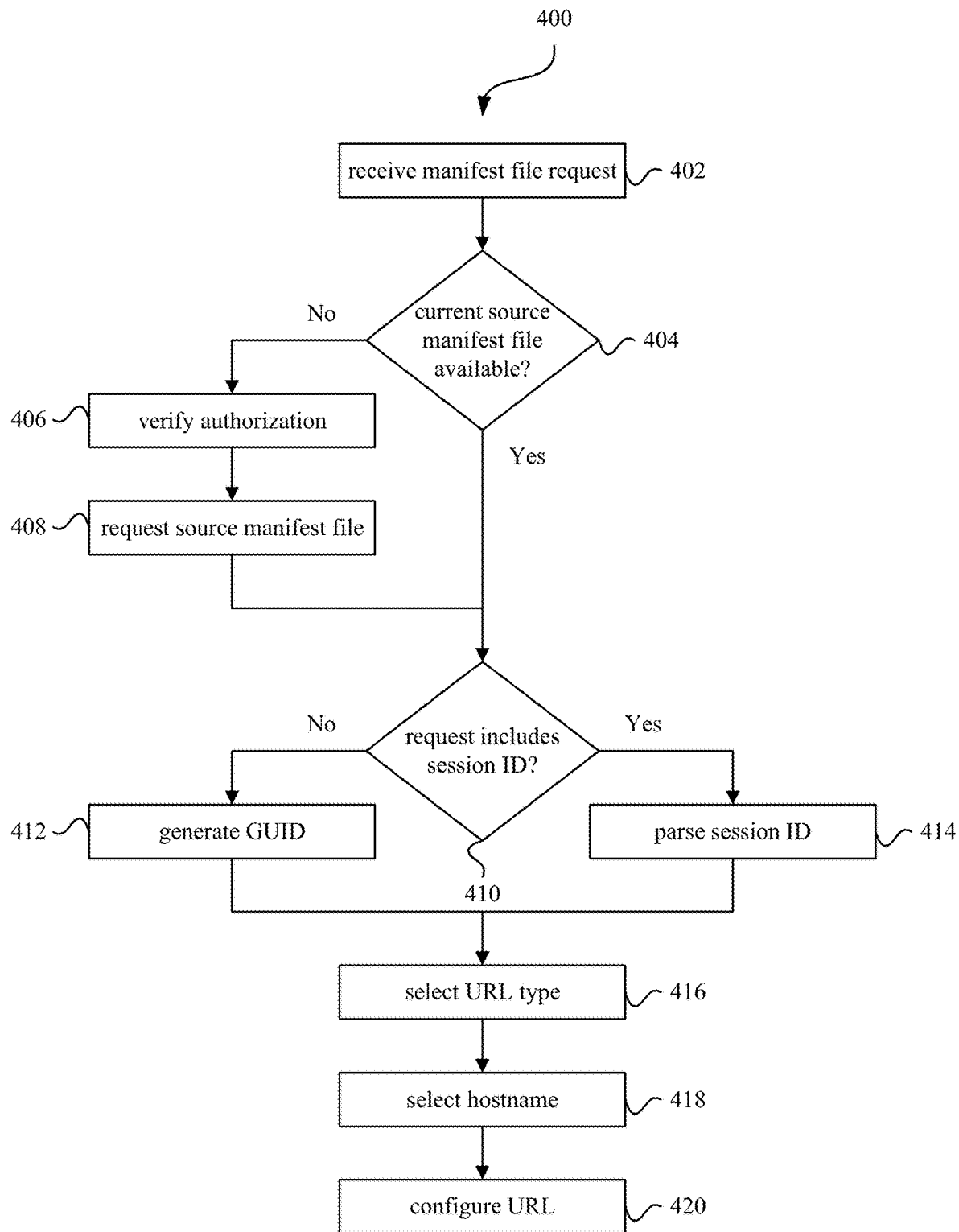
FIG. 4 is a flowchart of one embodiment of a process for generating an issued manifest file.

Referring now to FIG. 4, a flowchart is shown illustrating a process 400 for generating an issued manifest file. Process 400 can be performed, for example, by a manifest file handler 204 (e.g., manifest file server/serving system) in conjunction with a cluster performance manager and a service provider manager. At block 402, a manifest file request is received and a source manifest file is identified based on the request. For example, the source manifest file can be identified based on the string of characters that designate the content provider and the manifest file name, which are both included in the URL that is received with the request. In one embodiment, the character string that designates the content provider and the manifest file name are parsed from the URL. The character string and the file name are then concatenated together and the source manifest file is identified using the concatenated string. At block 404, a decision is made based on whether a current version of the source manifest file is available. For example, a query can be made on the source manifest files repository using the concatenated string. If the current version of the source manifest file is available, the source manifest file can be retrieved from the repository and process 400 continues to block 410.

If the current version of the source manifest file is not available, process 400 continues to block 406 wherein the content provider is verified to be authorized to use the service. In one embodiment, a hostname authorities file is used to verify authorization. The hostname authorities file includes a hostname authority record for each authorized content provider. The hostname authorities file can be encrypted or similarly protected from tampering by unauthorized parties. Verification can be performed by searching for a hostname authority record in the hostname authorities file using the character string that designates the content provider. If a record is found, then authorization is verified.

At block 408, the source manifest file is requested from the content provider or a service provider. In one embodiment, a URL for the source manifest file is constructed using information included in the URL received with the request at block 402. For example, the character string designating the content provider can be used as the hostname in the URL for the source manifest file, or the character string can be used to look up the hostname of a service provider server in a hostname authority record. The path of the URL received with the request can be used as the path of the URL for the source manifest file. The constructed URL for the source manifest file is used to request the source manifest file. After the source manifest file is received, the source manifest file can be cached in the database for future requests. In one embodiment, when an initial request for a manifest file of a video is received, the entire set of source manifest files for the video is retrieved. The entire set of source manifest files includes all of the source manifest files that are available for the video.

At block 410, a decision is made based on whether the URL received with the request includes a session identifier (ID). If this is an initial request for the master manifest file of the video content that is made using a URL published on a content provider website, then the URL does not include a session ID. In this case, process 400 continues to block 412 wherein a globally unique identifier (GUID) is generated and assigned as the session ID for the current video streaming session. If it is not an initial request for the video content (i.e., if the request is for a variant manifest file), the URL includes a session ID because, in this embodiment, the session ID is inserted into variant manifest URLs contained within issued master manifest files. For example, the session ID can be included in the host field of the URL, in the path portion of the URL, or appended at the end of the URL as a query string. If the URL includes the session ID, the session ID is parsed from the URL at block 414.

At block 416, a URL type is selected for a URL that is included in the issued manifest file generated for this request. Block 416 is typically performed for variant manifest file requests because all of the URLs in an issued master manifest file will reference manifest file servers implemented according to embodiments described herein, not one or more service providers. At block 418, a hostname is selected for the host field of the URL based on the URL type. For example, if the URL type is a service provider URL, a hostname associated with a service provider, typically also associated with the digital service but within the service provider's domain, is selected. At block 420, the URL is configured based on the selected URL type and the selected hostname. The URL is also conditionally configured to include the session ID, depending on the URL type and potentially depending on other conditions. For example, for URLs that contain a hostname associated with segment file servers of the system 100, the session ID is included in the URL; for URLs that contain a hostname associated with a service provider whose segment file servers can perform block 324 and/or block 326 (recording measurements and/or attributes), a session ID may be included in the URL; and for URLs that contain a hostname associated with a service provider that is not capable of handling the session ID, or for other reasons, e.g., a policy, or a configuration attribute associated with the digital service, the session ID is not included in the URL. Blocks 416-420 are repeated for each URL included in the issued manifest file. For example, if the request is for a variant manifest file of a video that has ten segments, then block 416-420 are repeated ten times to configure ten URLs, one for each segment. After all of the URLs have been configured, the issued manifest file is transmitted to the user device to complete the request.

To implement this capability, in optional aspects of the primary embodiment and secondary embodiment, the manifest file handler provides any of, or any combination of, the network address of the requesting device, the requested URL in the initial device request for the HLS manifest file, and the assigned Session ID to its cluster performance manager (or, optionally, another cluster performance manager), which determines (and returns to the manifest file handler) the manifest file handler(s), or cluster(s) or group(s) of manifest file handlers, or the network of manifest file handlers, to be designated, by use of hostnames, in Variant HLS manifest file URLs included in an issued Master HLS manifest file. The cluster performance manager similarly determines, and returns to the manifest file handler, the segment file server(s), or cluster(s) or group(s) of segment file servers, or the network of segment file servers, to be designated, by use of hostnames, in video segment delivery URLs included in an issued Variant HLS manifest file. Finally, as will be described in more detail later, the manifest file handler provides any of, or any combination of, the network address of the requesting device, the requested URL in the initial device request for the HLS manifest file, and the assigned Session ID to its service provider manager, (or, optionally, another service provider manager), which determines (and returns to the manifest file handler) the service provider, and optionally the hostname(s) associated with the service provider and/or the digital service, to be designated, by use of hostnames, in service provider segment delivery URLs included in an issued HLS manifest file, and in particular in an issued Variant HLS manifest file.

In other embodiments, the cluster performance manager may provide assignment information to the manifest file handler and the manifest file handler may use the assignment information, optionally in conjunction with the information it has about the HLS manifest file request, to designate, by use of hostnames in Variant HLS manifest file URLs included in an issued Master HLS manifest file, the manifest file handler(s), or cluster(s) or group(s) of manifest file handlers, or the network of manifest file handlers, and/or to designate, by use of hostnames in video segment URLs included in an issued Variant HLS manifest file, the segment file server(s), or cluster(s) or group(s) of segment file servers, or the network of segment file servers. Such assignment information might, for example, be in the form of an assignment table indexed by IP address ranges or other network identifiers and sub-indexed by digital services and their respective content identifiers or categories; using this assignment table, the manifest file handler can then look up the assignment to be used in the designation. In such other embodiments, the cluster performance manager updates the assignment information as the operating conditions (such as availability, performance, load or utilization, network performance, and other operating characteristics) of infrastructure components changes, or changes materially; in addition, manifest file handlers optionally inform the cluster performance manager as they configure and return HLS manifest files, thereby providing the cluster performance manager with at least some information with respect to upcoming subsequent requests to manifest file handlers and/or segment file servers. Other embodiments utilize relatively less dynamic assignment information, wherein the cluster performance manager updates the assignment information less frequently than the operating conditions of infrastructure components changes, or only as the infrastructure components themselves change (e.g., as new infrastructure components are added to the pool of available infrastructure components).

In other embodiments, the manifest file handler does not use assignment information to make some or all of the indicated designations, but instead makes some or all of the indicated designations using round-robin rotation among infrastructure components, deterministic distribution among infrastructure components, for example using a protocol such as CARP, or random distribution among infrastructure components.

Note that when one or more cluster(s) or group(s) of manifest file handlers or segment file servers is designated by a hostname, the eventual selection of a specific manifest file handler or segment file server may have been narrowed to the designated group or cluster, but will then be finally determined within that group or cluster at a subsequent point; similarly, when the network of manifest file handlers or the network of segment file servers is designated by a hostname, the eventual selection of a specific manifest file handler or segment file server has not been narrowed, and will be finally determined at a subsequent point. This characteristic provides flexibility both in this optional aspect of the primary embodiment and secondary embodiment and in other embodiments.

In other embodiments, comprising multiple distributed instances of the manifest file handler, with multiple instances of the manifest file handler at each location, and a switch at each location, the cluster performance manager identifies to the manifest file handler a cluster of manifest file handlers, or the hostname associated with a cluster of manifest file handlers, to be designated in the Variant HLS manifest file URLs. In one such embodiment, the manifest file handler provides information, as described in the primary embodiment and secondary embodiment, to a cluster performance manager which determines, and returns to the manifest file handler, the manifest file handler(s), or cluster (s) or group(s) of manifest file handlers, or the network of manifest file handlers, to be designated, by use of hostnames, in Variant HLS manifest file URLs; in another such embodiment, the cluster performance manager provides assignment information to the manifest file handler and the manifest file handler uses that assignment information, optionally in conjunction with the information it has about the HLS manifest file request, to make the manifest file handler designations, for example as previously described. The hostname associated with a cluster and designated in a Variant HLS manifest file URL is then resolved by the DNS Authoritative Name Servers to the IP address(es) of one or more switches associated with the cluster; the switch then receives the resulting connection request from the requesting user device and selects a manifest file handler to handle the Variant HLS manifest file request.

Continuing with these other embodiments, the cluster performance manager identifies the manifest file handler cluster or hostname associated with a cluster of manifest file handlers to be designated in the Variant HLS manifest file URLs or to be included in assignment information it provides to the manifest file handler based on any of, or any combination of:

the network location of the cluster of manifest file handlers;

the relative distance, in network terms, of the cluster of manifest file handlers to the network location of the requesting device or to other network locations associated with the network location of the requesting device, as compared to the distance, in network terms, of one or more other clusters of manifest file handlers to the network location of the requesting user device;

the relative performance, in network terms, of the cluster of manifest file handlers when communicating to the network location of the requesting device or to other network locations associated with the network location of the requesting device, as compared to the performance, in network terms, of one or more other clusters of manifest file handlers when communicating to the network location of the requesting device or to other network locations associated with the network location of the requesting device;

manifest file handler availability and utilization, both current and anticipated, including (but not limited to) the availability of sufficient capacity to process the HLS manifest file request;

a manifest file handler having previously processed requests for the requested HLS manifest file, requests for HLS manifest files associated with the same video object, requests for HLS manifest files associated with the same digital service, or requests for similar HLS manifest files;

manifest file handler association with a subdomain contained in the hostname, or with the digital service associated with the hostname or with the requested HLS manifest file;

manifest file handler association with a portion of the HLS manifest file request URL or contents of the HLS manifest file request message, such as the user agent identified in the HLS manifest file request message;

manifest file handler association with, or optimization for, HLS manifest files associated with on-demand video, HLS manifest files associated with linear video, or HLS manifest files associated with a combination of on-demand video and linear video;

the requesting user device or user agent;

the request rate of the Variant HLS manifest file or the related Master HLS manifest file;

duration of the video associated with the Variant HLS manifest file, or number of video segment file deliveries comprising the Variant HLS manifest file;

release date, publication date, availability date of video the access network used by the requesting user device;

round-robin rotation of Variant HLS manifest file requests among manifest file handlers;

deterministic distribution of Variant HLS manifest file requests among manifest file handlers, for example using a protocol such as Cache Array Routing Protocol (CARP) taking the HLS manifest file request URL, or a portion thereof, as the input; or random distribution of HLS manifest file requests among manifest file handlers.

In an optional aspect of these other embodiments, the cluster performance manager may identify the manifest file handler cluster or hostname associated with a cluster of manifest file handlers to be designated in the Variant HLS manifest file URLs or to be included in assignment information it provides to the manifest file handler additionally based on any of, or any combination of:

the network location of a cluster of segment file servers;

the relative distance, in network terms, of a cluster of segment file servers to the network location of the requesting device or to other network locations associated with the network location of the requesting device, as compared to the distance, in network terms, of one or more other clusters of segment file servers to the network location of the requesting user device;

the relative performance, in network terms, of a cluster of segment file servers when communicating to the network location of the requesting device or to other network locations associated with the network location of the requesting device, as compared to the performance, in network terms, of one or more other clusters of segment file servers when communicating to the network location of the requesting device or to other network locations associated with the network location of the requesting device;

segment file server availability and utilization, both current and anticipated, including (but not limited to) the availability of sufficient capacity to process and respond to requests for the video segment files associated with the HLS manifest file request;

a segment file server or cluster of segment file servers having previously processed requests for the video segment files associated with the requested HLS manifest file, video segment files associated with requests for HLS manifest files associated with the same video object, video segment files associated with requests for HLS manifest files associated with the same digital service, or the video segment files associated with requests for similar HLS manifest files;

the request rate of the related Master HLS manifest file or Variant HLS manifest files association of a segment file server or cluster of segment file servers with a subdomain contained in the hostname, or with the digital service associated with the hostname or with the requested HLS manifest file;

association of a segment file server or cluster of segment file servers with a portion of the HLS manifest file request URL or contents of the HLS manifest file request message, such as the user agent identified in the HLS manifest file request message;

the association of, or optimization for, a segment file server or cluster of segment file servers with Variant HLS manifest files associated with on-demand video, Variant HLS manifest files associated with linear video, or Variant HLS manifest files associated with a combination of on-demand video and linear video;

round-robin rotation of video segment file requests, directly or by consideration of Variant HLS manifest file requests, among segment file servers;

deterministic distribution of video segment file requests, directly or by consideration of Variant HLS manifest file requests, among segment file servers, for example using a protocol such as Cache Array Routing Protocol (CARP) taking the HLS manifest file request URL, or a portion thereof, the video segment file request URL, or a portion thereof, or a combination thereof, as the input; or random distribution of video segment file requests, directly or by consideration of HLS manifest file requests, among segment file servers.

In the primary embodiment and secondary embodiment, the manifest file handler returns the issued Master HLS manifest file to the requesting device and creates a manifest file serving record; see the "Returning the Issued Variant HLS Manifest File to the Requesting Device" section herein for a description of manifest file records and related aspects of the primary embodiment and secondary embodiment.

Variant HLS Manifest Files: HLS Manifest Files that Comprise Video Segment File URLs Continuing with the primary embodiment and secondary embodiment, when the manifest file handler receives an initial device request for an HLS manifest file that is a Variant HLS manifest file, or when the manifest file handler receives a subsequent request for any Variant HLS manifest file (e.g., when a Variant HLS manifest file URL is subsequently requested by a requesting device after it receives an issued Master HLS manifest file), the manifest file handler may determine the source Variant HLS manifest file corresponding to the requested URL and, based on the source Variant HLS manifest file, may configure an issued Variant HLS manifest file to be returned in response to the request. As a reminder, the corresponding source Variant HLS manifest file URL can be determined from the requested URL in conjunction with the hostname authorities file, using the hostname of the digital service or character string that designates the digital service along with the corresponding URL path portion, both of which are contained in the path of portion of each Variant HLS manifest file URL, or are contained in the requested URL in the case of an initial device request for an HLS manifest file that is a Variant HLS manifest file.

If the Variant HLS manifest file request is an initial device request for an HLS manifest file, is the first HLS manifest file received for this request, or if for any other reason the requested HLS manifest file URL does not include a Session ID, the manifest file handler assigns a Session ID as previously described (see the section "Assigning a Session ID" and related descriptions in this disclosure). If the Variant HLS manifest file request is made using a Variant HLS manifest file URL that was contained in an issued Master HLS manifest file, then the Variant HLS manifest file URL will contain a Session ID, and the manifest file handler continues using this previously assigned Session ID for the issued Variant HLS manifest file.

This issued Variant HLS manifest file is configured by the manifest file handler and comprises (but is not limited to) any of, or any combination of:

video segment delivery URLs, which identify video segment files for delivery by the network of segment file servers, in each case wherein (a) the hostname contained in the video segment delivery URL identifies a segment file server, a cluster of segment file servers, or the network of segment file servers, (b) the video segment delivery URL includes the assigned Session ID included in the URL path, (c) the digital service hostname contained in the initial device request for the HLS manifest file, or alternatively a character string associated with the digital service associated with initial device request for the HLS manifest file, is included in the URL path; and (d) the remainder of the URL path is the path portion of the digital service URL, or optionally the infrastructure provider URL, as contained in the corresponding source Variant HLS manifest file;

service provider segment delivery URLs identifying the video segment file for delivery by an infrastructure service provider, in each case wherein (a) the hostname contained in the service provider segment delivery URL is associated with the infrastructure service provider, and optionally by the service provider with the digital service, (b) optionally, if, and as, supported by the service provider, the assigned Session ID is included in the URL path and (c) the remainder of the URL path is the path portion of the digital service URL, or optionally is the path portion of the infrastructure service provider URL, as contained in the corresponding source Variant HLS manifest file; or optionally service provider segment delivery URLs identifying the video segment file for delivery by an infrastructure service provider, in each case wherein the service provider segment delivery URL is the infrastructure service provider URL as contained in the corresponding source Variant HLS manifest file;

segment redirect URLs, which will be requested from a segment redirect processor, which will result in the issuance to the requesting device by the segment redirect processor of an HTTP 302 Redirect message containing a redirect URL (in the primary embodiment and secondary embodiment a service provider segment delivery URL or video segment delivery URL, and in other embodiments another valid URL identifying a network location from which the video segment file can be requested), wherein in each case (a) the hostname contained in the segment redirect URL identifies a segment redirect processor, a cluster of segment redirect processors, or the network of segment redirect processors, (b) the segment redirect URL includes the assigned Session ID inserted into the URL path, (c) the URL path includes the path portion of the digital service URL, or optionally the infrastructure service provider URL, as contained in the corresponding source Variant HLS manifest file, and (d) optionally, the URL path includes one or more of the following: the hostname assigned by the infrastructure service provider to the digital service; a character string associated with the service provider; a character string associated with the digital service and the service provider; or, a character string associated with the digital service associated with the initial device request for the HLS manifest file.

These URL types can flexibly be combined as applied to any set of video segment files configured in an issued Variant HLS manifest file. Unless otherwise explicitly specified, the metadata associated with each video segment file configured in the issued Variant HLS manifest file is the same as the metadata associated with that video segment file in the source Variant HLS manifest file, for example specifying the same codec, bandwidth, and/or resolution; but the URL type that each video segment file is configured as—video segment delivery URL, service provider segment delivery URL, or segment redirect URL—can be determined independently for each URL. This is a useful property of the manifest file handler.

In the primary embodiment and secondary embodiment, these aspects of issued video segment delivery URLs, issued service provider segment delivery URLs, and issued segment redirect URLs are implemented by configuring each issued URL based on the corresponding video segment file URL contained in the source Variant HLS manifest file, incorporating the respective aspects of the issued URL, and using the hostname authorities file to confirm authorization of the digital service to use the network of infrastructure components and/or to look up the character string that designates the digital service associated with the request for an HLS manifest file. Optionally, when applicable, confirmation of authorization of the digital service to use the network of infrastructure components can be based on the presence of a valid, current Session ID in the case of a subsequent request for a Variant HLS manifest file that was previously issued by the network of manifest file handlers, rather than use of the hostname authorities file.

Another example may be provided, continuing with the previous examples provided for Master HLS manifest files. As a reminder, the published URL http://digserv.indexhandler.net/firstindexfile.m3u8 invokes the network of manifest file handlers to receive and handle deliveries of the Master HLS manifest file identified by its source HLS manifest file URL http://indexfiles.digserv.com/firstindexfile.m3u8 at its source digital service "digserv.com." As a further reminder, the issued Master HLS manifest file configured and returned to the requesting device by the manifest file handler comprises three issued Variant HLS manifest file URLs as follows:

http://b.indexhandler.net/XYZ789/digserv/firstindexfile/variant-HLS-index-file-200.m3u8
    http://b.indexhandler.net/XYZ789/digserv/firstindexfile/variant-HLS-index-file-400.m3u8
    http://b.indexhandler.net/XYZ789/digserv/firstindexfile/variant-HLS-index-file-600.m3u8

In this example, the requesting device selects the following Variant HLS manifest file URL and requests it:

http://b.indexhandler.net/XYZ789/digserv/firstindexfile/variant-HLS-index-file-400.m3u8

As described in the previous example, when the requesting device sends a request for one of these URLs, the URL request process will begin with the resolution of the hostname contained in the requested URL. In this example, the hostname b.indexhandler.net identifies cluster "B" of manifest file handlers, and in the primary embodiment and secondary embodiment is resolved by the DNS Authoritative Name Servers to the IP address(es) of one or more manifest file handlers in cluster "B." Note that, as previously described, in other embodiments the hostname b.indexhandler.net, which identifies cluster "B" of manifest file handlers, is resolved by the DNS Authoritative Name Servers to the IP address(es) of one or more switches associated with cluster "B," and the switch then selects a manifest file handler to handle the request.

The manifest file handler then receives the request for the Variant HLS manifest file URL. If the manifest file handler that receives this Variant HLS manifest file request does not have the current source Variant HLS manifest file on hand, it configures the digital service URL for the source Variant HLS manifest file, issues an HTTP request for it, receives it, and configures an issued Variant HLS manifest file based on the source Variant HLS manifest file; if the manifest file handler already has the current source Variant HLS manifest file on hand, it configures an issued Variant HLS manifest file based on the current source Variant HLS manifest file.

To issue an HTTP request for the source Variant HLS manifest file, the manifest file handler may:

parse the received URL, read the URL path, and identify the configuration elements of the URL path, including: the Session ID, in this example XYZ789; the hostname of the digital service (contained in the initial request for an HLS manifest file) or a character string that designates the digital service associated with the requested HLS manifest file, in this example digserv; and the path portion of the corresponding Variant HLS manifest file URL as configured in the received URL, in this example firstindexfile/variant-HLS-index-file-400.m3u8;

look up the hostname authority record for the character string digserv (in the hostname authorities file) and retrieve the digital service URL hostname indexfiles.digserv.com from the hostname authority record;

configure the digital service URL for the source Variant HLS manifest file, using the hostname indexfiles.digserv.com retrieved from the hostname authority record and the URL path firstindexfile/variant-HLS-index-file-400.m3u8 parsed from the requested URL, resulting in the digital service URL http://indexfiles.digserv.com/firstindexfile/variant-HLS-index-file-400.m3u8.

Referring to the beginning of the example which appears shortly after the heading "Master HLS manifest files: HLS manifest files that comprise Variant HLS manifest file URLs," note that this is the same URL that was contained in the source Master HLS manifest file—as previously described, the manifest file handler has configured it using just the requested URL and the hostname authorities file.

the manifest file handler then issues the HTTP request for the source Variant HLS manifest file Once the source Variant HLS manifest file is on hand, the manifest file handler configures an issued Variant HLS manifest file based on it. In this example, the source Variant HLS manifest file comprises 12 video segment file URLs (in this example, each video segment file represents 10 seconds of video, for a total of 120 seconds, or a video two minutes in duration). In this example, the 12 video segment file URLs contained in the source Variant HLS manifest file are:

http://indexfiles.digserv.com/firstindexfile/200/segment-1.ts
    http://indexfiles.digserv.com/firstindexfile/200/segment-2.ts
    http://indexfiles.digserv.com/firstindexfile/200/segment-3.ts
    http://indexfiles.digserv.com/firstindexfile/200/segment-4.ts
    http://indexfiles.digserv.com/firstindexfile/200/segment-5.ts
    http://indexfiles.digserv.com/firstindexfile/200/segment-6.ts
    http://indexfiles.digserv.com/firstindexfile/200/segment-7.ts
    http://indexfiles.digserv.com/firstindexfile/200/segment-8.ts
    http://indexfiles.digserv.com/firstindexfile/200/segment-9.ts
    http://indexfiles.digserv.com/firstindexfile/200/segment-10.ts
    http://indexfiles.digserv.com/firstindexfile/200/segment-11.ts
    http://indexfiles.digserv.com/firstindexfile/200/segment-12.ts Note that in this example, the digital service "digserv.com" uses the same hostname for its source URLs for manifest files and its source URLs for video segment files; this is permitted, but is not required (it is structured this way in this example in part to help keep this example straightforward to read and understand). As a reminder, and as previously described, the only requirements are that "digserv.com" avoid duplicate URLs (i.e., name space collisions, as previously described) and that the network of infrastructure components be informed of the hostnames used in each case, so that the hostname authority records contained in the hostname authorities file are properly configured and complete, and so that infrastructure components are able to properly configure digital service URLs.

As previously described, the manifest file handler has a number of options in configuring the URLs in the issued Variant HLS manifest file. Each URL can be configured as a URL identifying a video segment file for delivery by the network of segment file servers, as a service provider segment delivery URL identifying a video segment file for delivery by an infrastructure service provider, or as a segment redirect URL, and these URL types can flexibly be combined in any combination or sequence in an issued Variant HLS manifest file.

A first example of the URLs configured in the issued Variant HLS manifest file illustrates the manifest file handler configuring video segment delivery URLs identifying video segment files for delivery by the network of segment file servers, as follows:

http://sfs.b.indexhandler.net/XYZ789/digserv/firstindexfile/200/segment-1.ts
    http://sfs.b.indexhandler.net/XYZ789/digserv/firstindexfile/200/segment-2.ts
    http://sfs.b.indexhandler.net/XYZ789/digserv/firstindexfile/200/segment-3.ts
    http://sfs.b.indexhandler.net/XYZ789/digserv/firstindexfile/200/segment-4.ts
    http://sfs.b.indexhandler.net/XYZ789/digserv/firstindexfile/200/segment-5.ts
    http://sfs.b.indexhandler.net/XYZ789/digserv/firstindexfile/200/segment-6.ts
    http://sfs.b.indexhandler.net/XYZ789/digserv/firstindexfile/200/segment-7.ts
    http://sfs.b.indexhandler.net/XYZ789/digserv/firstindexfile/200/segment-8.ts
    http://sfs.b.indexhandler.net/XYZ789/digserv/firstindexfile/200/segment-9.ts
    http://sfs.b.indexhandler.net/XYZ789/digserv/firstindexfile/200/segment-10.ts
    http://sfs.b.indexhandler.net/XYZ789/digserv/firstindexfile/200/segment-11.ts
    http://sfs.b.indexhandler.net/XYZ789/digserv/firstindexfile/200/segment-12.ts As a reminder, the issued Variant HLS manifest file also contains control, descriptive, and other information, and the metadata associated with each video segment file configured in the issued Variant HLS manifest file is the same as the metadata associated with that video segment file in the source Variant HLS manifest file, for example specifying the same codec, bandwidth, and/or resolution. For readability and clarity, the metadata is not shown in any of the example HLS manifest files contained herein.

These video segment delivery URLs include a hostname associated with the network of segment file servers, sfs.b.indexhandler.net, which designates cluster "B" of segment file servers (which may, or may not, be co-located with cluster "B" of manifest file handlers); include the Session ID XYZ789; include the character string digserv designating the digital service associated with the requested video; and include the path portion of the URL by which the given video segment file can be requested from the digital service.

As a reminder, the Session ID was first assigned by the manifest file handler that received the initial device request for the HLS manifest file; was included by the manifest file handler in the Variant HLS manifest file URLs configured in the issued Master HLS manifest file that the manifest file handler returned to the requesting device; was therefore included in the Variant HLS manifest file URL requested by the requesting device, and received at a second manifest file handler that received the Variant HLS manifest file request (and which can be, as is the case in this example, a different manifest file handler than the manifest file handler that issued the Master HLS manifest file); was then included by the second manifest file handler in the video segment delivery URLs configured in the issued Variant HLS manifest file returned to the requesting device; and as shall shortly be seen, are therefore conveyed to the segment file server via the video segment delivery URL requests, thereby making the Session ID available to the segment file server that will serve the requested video segment files associated with the initial device request for the HLS manifest file.

As described in the previous example, when the requesting device sends a request for one of these URLs, the URL request process will begin with the resolution of the hostname contained in the requested URL. In this example, the hostname sfs.b.indexhandler.net contained in the video segment delivery URLs identifies cluster "B" of segment file servers, and in the primary embodiment and secondary embodiment is resolved by the DNS Authoritative Name Servers to the IP address(es) of one or more segment file servers in cluster "B." Note that, as previously described, in other embodiments the hostname sfs.b.indexhandler.net, which identifies cluster "B" of segment file servers, is resolved by the DNS Authoritative Name Servers to the IP address(es) of one or more switches associated with segment file server cluster "B," and the switch then selects a segment file server to handle the request.

The segment file server then receives the request for the video segment delivery URL. As will be seen, the video segment delivery URL, together with the hostname authorities file, provides the segment file server with all the information it needs to request the source video segment file from the digital service or its infrastructure service provider, if necessary, to serve the video segment file, and to record measurement and performance information specific to the delivery of this specific video segment file in this specific session.

A second example of the URLs configured in the issued Variant HLS manifest file illustrates the manifest file handler configuring video segment delivery URLs identifying video segment files for delivery by the network of segment file servers, wherein a specific segment file server is designated in each URL, and further illustrates that different segment file servers can be designated in different URLs, as follows:

http://sfs90055.indexhandler.net/XYZ789/digserv/firstindexfile/200/segment-1.ts
    http://sfs90055.indexhandler.net/XYZ789/digserv/firstindexfile/200/segment-2.ts
    http://sfs90055.indexhandler.net/XYZ789/digserv/firstindexfile/200/segment-3.ts
    http://sfs91060.indexhandler.net/XYZ789/digserv/firstindexfile/200/segment-4.ts
    http://sfs91060.indexhandler.net/XYZ789/digserv/firstindexfile/200/segment-5.ts
    http://sfs91060.indexhandler.net/XYZ789/digserv/firstindexfile/200/segment-6.ts
    http://sfs91060.indexhandler.net/XYZ789/digserv/firstindexfile/200/segment-7.ts
    http://sfs91060.indexhandler.net/XYZ789/digserv/firstindexfile/200/segment-8.ts
    http://sfs91060.indexhandler.net/XYZ789/digserv/firstindexfile/200/segment-9.ts
    http://sfs91060.indexhandler.net/XYZ789/digserv/firstindexfile/200/segment-10.ts
    http://sfs91060.indexhandler.net/XYZ789/digserv/firstindexfile/200/segment-11.ts
    http://sfs91060.indexhandler.net/XYZ789/digserv/firstindexfile/200/segment-12.ts The first three of these video segment delivery URLs include a hostname associated with the network of segment file servers, sfs90055.indexhandler.net, designating a specific segment file server; the subsequent nine of these video segment delivery URLs include a different hostname associated with the network of segment file servers, sfs91060.indexhandler.net, designating a different specific segment file server; and all twelve of these video segment delivery URLs include the Session ID XYZ789, the character string digserv designating the digital service associated with the requested video, and the path portion of the URL by which the given video segment file can be requested from the digital service. Note that the hostname included in each video segment delivery URL can be different and can designate a different segment file server or group of segment file servers.

A third example of the URLs configured in the issued Variant HLS manifest file illustrates the manifest file handler configuring service provider segment delivery URLs identifying video segment files for delivery by an infrastructure service provider, as follows:

http://digserv.service-provider.net/firstindexfile/200/segment-1.ts
    http://digserv.service-provider.net/firstindexfile/200/segment-2.ts
    http://digserv.service-provider.net/firstindexfile/200/segment-3.ts
    http://digserv.service-provider.net/firstindexfile/200/segment-4.ts
    http://digserv.service-provider.net/firstindexfile/200/segment-5.ts
    http://digserv.service-provider.net/firstindexfile/200/segment-6.ts
    http://digserv.service-provider.net/firstindexfile/200/segment-7.ts
    http://digserv.service-provider.net/firstindexfile/200/segment-8.ts
    http://digserv.service-provider.net/firstindexfile/200/segment-9.ts
    http://digserv.service-provider.net/firstindexfile/200/segment-10.ts
    http://digserv.service-provider.net/firstindexfile/200/segment-11.ts
    http://digserv.service-provider.net/firstindexfile/200/segment-12.ts These service provider segment delivery URLs include the hostname digserv.service-provider.net, which is associated with the infrastructure service provider service-provider.net and in this example further use a hostname that designates the digital service together with the service provider (e.g., the digital service's account with, or infrastructure subset within, the infrastructure service provider); these service provider segment delivery URLs also include the path portion of the URL by which the given video segment file can be requested from the digital service, e.g., firstindexfile/200/segment-1.ts.

If supported by the infrastructure service provider, these service provider segment delivery URLs could also contain the Session ID; in this example, two possible such service provider segment delivery URLs containing the Session ID might be:

http://digserv.service-provider.net/XYZ789/firstindexfile/200/segment-1.ts
    and
    http://digserv.service-provider.net/firstindexfile/200/segment-1.ts?s=XYZ789

In the first case, the Session ID is placed in the path portion of the URL; in the second case, the Session ID is appended to the URL as a query string. Actual placement of the Session ID within the URL, if supported by the infrastructure service provider, would be determined by the URL parsing capabilities and/or information logging and reporting capabilities of the infrastructure service provider, or as otherwise supported by the infrastructure service provider.

A fourth example of the URLs configured in the issued Variant HLS manifest file illustrates the manifest file handler configuring segment redirect URLs, as follows:

http://redirect21.indexhandler.net/XYZ789/digserv/servpro/firstindexfile/200/segment-1.ts
    http://redirect21.indexhandler.net/XYZ789/digserv/servpro/firstindexfile/200/segment-2.ts
    http://redirect21.indexhandler.net/XYZ789/digserv/servpro/firstindexfile/200/segment-3.ts
    http://redirect21.indexhandler.net/XYZ789/digserv/servpro/firstindexfile/200/segment-4.ts
    http://redirect21.indexhandler.net/XYZ789/digserv/servpro/firstindexfile/200/segment-5.ts
    http://redirect21.indexhandler.net/XYZ789/digserv/servpro/firstindexfile/200/segment-6.ts
    http://redirect21.indexhandler.net/XYZ789/digserv/servpro/firstindexfile/200/segment-7.ts
    http://redirect21.indexhandler.net/XYZ789/digserv/servpro/firstindexfile/200/segment-8.ts
    http://redirect21.indexhandler.net/XYZ789/digserv/servpro/firstindexfile/200/segment-9.ts
    http://redirect21.indexhandler.net/XYZ789/digserv/servpro/firstindexfile/200/segment-10.ts
    http://redirect21.indexhandler.net/XYZ789/digserv/servpro/firstindexfile/200/segment-11.ts
    http://redirect21.indexhandler.net/XYZ789/digserv/servpro/firstindexfile/200/segment-12.ts These segment redirect URLs include the hostname redirect21.indexhandler.net, which identifies a segment redirect processor; include the Session ID XYZ789; include the path portion of the URL by which the given video segment file can be requested from the digital service; include the optional character string digserv designating the digital service associated with the requested video; and include the optional character string servpro designating the infrastructure service provider, service-provider.net, associated with this video segment file delivery.

A fifth example of the URLs configured in the issued Variant HLS manifest file illustrates the manifest file handler configuring a combination of URL types, in this example video segment delivery URLs identifying video segment files for delivery by the network of segment file servers and service provider delivery URLs identifying video segment files for delivery by an infrastructure service provider, as follows:

http://sfs.b.indexhandler.net/XYZ789/digserv/firstindexfile/200/segment-1.ts
    http://digserv.service-provider.net/firstindexfile/200/segment-2.ts
    http://digserv.service-provider.net/firstindexfile/200/segment-3.ts
    http://digserv.service-provider.net/firstindexfile/200/segment-4.ts
    http://sfs.b.indexhandler.net/XYZ789/digserv/firstindexfile/200/segment-5.ts
    http://digserv.service-provider.net/firstindexfile/200/segment-6.ts
    http://digserv.service-provider.net/firstindexfile/200/segment-7.ts
    http://digserv.service-provider.net/firstindexfile/200/segment-8.ts
    http://sfs.b.indexhandler.net/XYZ789/digserv/firstindexfile/200/segment-9.ts http://digserv.service-provider.net/firstindexfile/200/segment-10.ts http://digserv.service-provider.net/firstindexfile/200/segment-11.ts http://sfs.b.indexhandler.net/XYZ789/digserv/firstindexfile/200/segment-12.ts In this example, the first, fifth, ninth, and twelfth URLs are video segment delivery URLs identifying video segment files for delivery by cluster "B" of the network of segment file servers, while the remaining URLs are service provider segment delivery URLs identifying the video segment file for delivery by an infrastructure service provider.

A sixth example of the URLs configured in the issued Variant HLS manifest file illustrates the manifest file handler configuring a combination of URL types, again in this example video segment delivery URLs identifying video segment files for delivery by the network of segment file servers and service provider segment delivery URLs identifying video segment files for delivery by an infrastructure service provider, but in this example designating a first infrastructure service provider in certain service provider segment delivery URLs and a second infrastructure service provider in other service provider segment delivery URLs, as follows:

http://sfs.b.indexhandler.net/XYZ789/digserv/firstindexfile/200/segment-1.ts http://digserv.service-provider.net/firstindexfile/200/segment-2.ts http://digserv.service-provider.net/firstindexfile/200/segment-3.ts http://digserv.service-provider.net/firstindexfile/200/segment-4.ts http://sfs.b.indexhandler.net/XYZ789/digserv/firstindexfile/200/segment-5.ts http://digserv.service-provider.net/firstindexfile/200/segment-6.ts http://digserv.other-service-provider.net/firstindexfile/200/segment-7.ts http://digserv.other-service-provider.net/firstindexfile/200/segment-8.ts http://sfs.b.indexhandler.net/XYZ789/digserv/firstindexfile/200/segment-9.ts http://digserv.other-service-provider.net/firstindexfile/200/segment-10.ts http://digserv.other-service-provider.net/firstindexfile/200/segment-11.ts http://sfs.b.indexhandler.net/XYZ789/digserv/firstindexfile/200/segment-12.ts In this example, the first, fifth, ninth, and twelfth URLs are video segment delivery URLs identifying video segment files for delivery by cluster "B" of the network of segment file servers, while the second, third, fourth, and sixth URLs are service provider segment delivery URLs identifying the video segment file for delivery by the first infrastructure service provider, which operates the hostname digserv.service-provider.net, and the seventh, eight, tenth, and eleventh URLs are service provider segment delivery URLs identifying the video segment file for delivery by the second infrastructure service provider, which operates the hostname digserv.other-service-provider.net.

A seventh example of the URLs configured in the issued Variant HLS manifest file is another illustration of the manifest file handler configuring a combination of URL types, in this example: URLs identifying video segment files for delivery by the network of segment file servers, wherein a specific segment file server is designated in each such URL; URLs identifying video segment files for delivery by an infrastructure service provider; and segment redirect URLs, as follows:

http://sfs.b.indexhandler.net/XYZ789/digserv/firstindexfile/200/segment-1.ts http://sfs.b.indexhandler.net/XYZ789/digserv/firstindexfile/200/segment-2.ts http://digserv.service-provider.net/firstindexfile/200/segment-3.ts http://digserv.service-provider.net/firstindexfile/200/segment-4.ts http://digserv.service-provider.net/firstindexfile/200/segment-5.ts http://sfs.b.indexhandler.net/XYZ789/digserv/firstindexfile/200/segment-6.ts http://digserv.service-provider.net/firstindexfile/200/segment-7.ts http://digserv.service-provider.net/firstindexfile/200/segment-8.ts http://digserv.service-provider.net/firstindexfile/200/segment-9.ts http://sfs.b.indexhandler.net/XYZ789/digserv/firstindexfile/200/segment-10.ts http://digserv.service-provider.net/firstindexfile/200/segment-11.ts http://redirect21.indexhandler.net/XYZ789/digserv/servpro/firstindexfile/200/segment-12.ts In this example, the first two URLs are video segment delivery URLs identifying video segment files for delivery by cluster "B" of the network of segment file servers; the next three URLs are service provider segment delivery URLs identifying the video segment file for delivery by an infrastructure service provider; the sixth URL is another video segment delivery URL identifying video segment files for delivery by cluster "B" of the network of segment file servers; the next three URLs (the seventh, eighth, and ninth) are again service provider segment delivery URLs identifying the video segment file for delivery by the infrastructure service provider; the tenth URL is another video segment delivery URL identifying video segment files for delivery by cluster "B" of the network of segment file servers; the eleventh URL is another service provider segment delivery URL identifying the video segment file for delivery by the infrastructure service provider; and the twelfth URL is a segment redirect URL, which will be requested from a segment redirect processor identified by the hostname redirect21.indexhandler.net.

In the primary embodiment and secondary embodiment, the URL configuration structure and the configurability of video segment URL types in issued Variant HLS manifest files provides for both flexibility where needed and specificity where required, as well as synchronized operation and measurement, high performance, and efficient resource utilization across infrastructure components and, where applicable, infrastructure service providers, in handling the multiple URL requests and file deliveries that comprise a single HLS video delivery (or similarly comprise a single video delivery in other HTTP-based adaptive streaming video delivery protocols). Including the assigned Session ID in the URL path of (or elsewhere within, as applicable) issued video segment delivery URLs, redirect segment URLs, and (where supported by an infrastructure service provider) service provider segment delivery URLs assures that a Session ID that is common across all issued URLs associated with the delivery of the video to that specific requesting device, but unique (or approximately unique, see related descriptions in this disclosure and Additional Notes for more information on GUIDs) to the delivery of that video to that requesting device (and distinct from the Session IDs in URLs associated with the delivery of other videos to that requesting device or associated with the delivery of that same video to other requesting devices) is configured in all supporting URLs and enables each discrete video delivery to a device to be individually managed, measured, and reported. As a reminder, note that from the time an initial request for an HLS manifest file is received by the manifest file handler, all subsequent requests derived from that initial request, including requests for HLS manifest files, for video segment delivery URLs, and (for infrastructure service providers that support the Session ID) for service provider segment delivery URLs, are configured with the same Session ID. This enables:

- highly granular assignment of individual deliveries to, and allocation of aggregate deliveries among, resources comprising the network of infrastructure components, as well as one or more infrastructure service providers;
- precise and effective management of individual infrastructure resources and/or clusters or groups of individual infrastructure resources within the network of infrastructure components; and/or that connect the network of Infrastructure Resources to requesting devices, other devices, and other networks; and/or (if and as supported) within infrastructure service providers;
- precise measurement and reporting of infrastructure resource and infrastructure service provider performance, variation in performance, and utilization;
- detailed correlation, with and among specific video, video delivery, and exogenous characteristics, conditions, and circumstances, of the performance, variation in performance, and utilization of infrastructure resources and infrastructure service providers; and
- precise measurement and reporting of the behavior of requesting devices, variation in behavior of and among requesting devices, and utilization.

Flexibly configuring the different types of video segment file URLs within a single issued Variant HLS manifest file, and then measuring, collecting, and reporting the timing and performance of the video segment delivery URLs as they are received by segment file servers, enables an operating network of infrastructure components to allocate video deliveries among its own resources, infrastructure service providers, or the combination of its own resources and infrastructure service providers, and further to measure in detail its own actual performance and the actual performance of infrastructure service providers. In particular, because the video segment files contained in a Variant HLS manifest file are requested by the requesting devices in a particular order (the order in which the segments properly comprise the video content), interspersing video segment delivery URLs periodically (whether regularly, irregularly, intermittently, or otherwise) throughout the order in which video segment files will be requested within a Variant HLS manifest file that is otherwise comprised of infrastructure service provider segment delivery URLs (for example, see the sixth example above) enables an operating network of infrastructure components to measure the detailed performance, performance variation, and aggregate delivery volume of the infrastructure service provider, based on the timing and the particular makeup of the interspersed video segment URLs as they are requested.

Referring now to FIG. 5, two examples are shown of issued variant manifest files that have been generated and/or configured for an adaptive streaming video, and that use certain techniques discussed above for interspersing video segment delivery URLs (e.g., periodically positioned, regularly interleaved, irregularly interleaved, intermittently or randomly positioned, or otherwise) that reference segment file servers of system 100, within other video segment delivery URLs that reference one or more infrastructure service providers 122 and 124.

Specifically, FIG. 5 illustrates a first issued variant manifest file 500 and a second issued variant manifest file 550. First issued variant manifest file 500 includes URLs that reference video segment files encoded at 200 kbps for the adaptive streaming video and second issued variant manifest file 550 includes URLs that reference video segment files encoded at 600 kbps. There are twelve segments for this video, thus there are twelve URLs in each issued variant manifest file. The URLs are ordered according to the video segment number of the video segment file that is referenced by each URL. Thus, the URL that references the video segment file corresponding to the first segment of the video is the first URL in each issued variant manifest file, and the URL that references the video segment file corresponding to the last segment of the video is the last URL in each issued variant manifest file.

First issued variant manifest file 500 includes URLs 502-524. In this embodiment, the first URL 502, the fifth URL 510, the ninth URL 518, and the last URL 524 designate a segment file server or cluster implemented according to the embodiments described herein for the delivery of the respective video segment files. The hostname that is contained in the host field of these URLs 502, 510, 518, and 524 is sfs.b.manifestserver.net, which, for example, designates cluster B of segment file servers (sfs.b) within the second-level domain manifestserver.net. In other embodiments, different segment file servers or clusters can be used for the URLs within a single issued variant manifest file. For example, the first URL 502 can designate cluster B of segment file servers while the fifth URL 510 can designate cluster A or a specific segment file server. The path portion of the URLs 502, 510, 518, and 524 includes the session ID XYZ789, the character string contentprovider, which designates the content provider for the request video, and the path of the respective video segment file.

The other URLs 504-508, 512-516, and 520-522 in first issued variant manifest file 500 designate infrastructure service provider servers for the delivery of the respective video segment files. The host field contains the hostname contentprovider.service-provider.net, which designates the subdomain contentprovider within the second level domain service-provider.net. In this embodiment, all of the URLs 504-508, 512-516, and 520-522 designate the same second level domain, which is a hostname that is associated with an infrastructure service provider server; in another issued manifest that references another playback of the same video (for example, to a second user viewing the video), the URLs 504-508, 512-516, and 520-522 can designate a different second level domain, which is a hostname that is associated with a second infrastructure service provider, in order to allocate the distribution of the video among a number of service providers, for example, according to a distribution policy. In other embodiments, some of URLs 504-508, 512-516, and 520-522 can designate one infrastructure service provider while other URLs of URLs 504-508, 512-516, and 520-522 can designate a second infrastructure service provider to allocate the distribution of the video among a number of infrastructure service providers, for example, according to a distribution policy or model. The number of service provider URLs between each pair of segment file server URLs, which in this case is three, can also be determined according to the distribution policy or model to implement a percentage of distribution, and frequency of segment files served, that will be handled by the segment file servers. The path portion of the URLs 504-508, 512-516, and 520-522 includes the path of the respective video segment file. In this embodiment, the session ID is not included in the service provider URLs 504-508, 512-516, and 520-522. In other embodiments where the service provider supports session IDs and logging/reporting measurements, the service provider URLs 504-508, 512-516, and 520-522 can also include the session ID, for example, in the host field, in the path portion, or appended as a query string.

Second issued manifest file 550 includes URLs 552-574. In this embodiment, the positioning of URLs that designate a segment file server and URLs that designate a service provider server is consistent between first issued variant manifest file 500 and second issued manifest file 550. Thus, URLs 552, 560, 568, and 574 designate a segment file server and URLs 554-558, 562-566, and 570-572 designate an infrastructure service provider. In addition to using consistent positioning of URL types across issued variant manifest files for different encoding bitrates, consistent positioning can also be used across issued variant manifest files for different sessions and different videos. The advantages of having consistent positioning of URL types include less storage capacity requirements on segment file servers since the segment file servers need not store the segments that are not delivered by segment file servers. In other embodiments, random positioning of URL types can be used across some or all of the video segments, which may enable the segment file servers to record delivery measurements with finer granularity across video segments.

There are also advantages to having the first URL and/or the last URL designate segment file servers. By designating a segment file server in the first URL, it can be ensured that the first segment of the video is delivered to the user at the fastest transmission rate possible through the user's access network. Thus, any subsequent downshift in encoding bitrate can be correlated with the network performance of the infrastructure service provider that is delivering the other segments of the video. By designating a segment file server in the last URL, the segment file server can record measurements regarding the number and percentage of users that request and complete downloading the last segment of the video, and therefore watched the entire video.

In some embodiments, dynamic adjustments can be made to the number of segment file server URLs in an issued variant manifest file based on the network performance of the segment file servers. For example, if the network traffic becomes congested or network performance degrades on the segment file server network, fewer segment file server URLs can be included in the issued variant manifest files to ensure user experience is not impacted due to delivery of the video segment files by the segment file servers. In this situation, all manifest files may be configured with fewer segment file URLs; alternatively, some manifest files may be configured with the standard number of segment file server URLs and some manifest files configured with a reduced number of segment file URLs and a higher number of infrastructure service provider server URLs, thus reducing overall demand on segment file servers while still preserving the standard frequency of measurements in some of the video playback sessions. In extreme conditions, issued manifest files can be dynamically adjusted such that all URLs in some or all issued manifest files designate infrastructure service providers, to ensure availability of the video content to users.

Configuring segment redirect URLs within an issued Variant HLS manifest file enables the manifest file handler to:
  defer the choice between, as a first alternative one or more segment file servers and, as a second alternative, one or more infrastructure service providers, until the point in time when the segment redirect URL is requested
  defer selection of an infrastructure service provider until the point in time when the segment redirect URL is requested
  measure the timing of video segment file requests at a point within a series of video segment file requests that are all assigned to an infrastructure service provider Configuring a video segment delivery URL that contains a hostname associated with one or more specific segment file servers enables the manifest file handler to identify, in that case, one or more segment file servers well suited to handle requests for that video segment delivery URL and to manage the volume of video segment delivery URL requests assigned to the one or more segment file servers. In the primary embodiment and secondary embodiment, DNS Authoritative Name Servers employ relatively static hostname resolutions, meaning that a particular hostname will be resolved to the IP addresses of the same one or more servers consistently through a series of hostname resolution requests, enabling the manifest file handler to predictably assign deliveries to specific segment file servers. Optionally, as an alternative or as a supplemental technique, DNS Authoritative Name Servers can employ relatively dynamic hostname resolutions, meaning that a particular hostname will be resolved to potentially changing IP addresses through a series of hostname resolution requests, enabling the DNS Authoritative Name Servers to assign deliveries to segment file servers at hostname resolution time (as a reminder, however, and as discussed in the Background section of this disclosure regarding content delivery network DNS hostname resolutions, there are some inherent limitations when assigning servers using DNS hostname resolutions; however, see also the description of the Additional Embodiment that utilizes a Session ID included in a hostname resolved by DNS Authoritative Name Servers).

Configuring a video segment delivery URL that contains a hostname associated with a specific cluster of segment file servers enables the manifest file handler, in that case, to identify, when and if applicable, a cluster of segment file servers that is well suited to handle requests for all of, or any of, the Variant HLS manifest files, but without yet selecting the individual segment file server within the cluster, leaving that selection instead for a later point, for example, at resolution of the segment file server cluster hostname into one or more IP addresses, or as another example, when (following DNS resolution of the segment file server cluster hostname into one or more switch IP addresses associated with the segment file server cluster) the connection request for the video segment delivery URL is received by a switch at the segment file server cluster and is then directed by the switch to a specific segment file server;

Configuring a video segment delivery URL that contains a hostname for the network of segment file servers enables the manifest file handler, in that case, to defer selection of the specific segment file server or segment file server cluster to a later point in the process, at which point another infrastructure component can make the selection of a segment file server or segment file server cluster that is well suited to handle requests for all of, or any of, the video segment delivery URLs.

Including the digital service hostname contained in the initial request for an HLS manifest file, or a character string that designates the digital service associated with the initial request for an HLS manifest file, in the path portion of issued video segment delivery URLs and segment redirect URLs enables any infrastructure component that ever needs to, for such a URL that it receives, derive the corresponding URL with which it can request that object directly from the digital service, or for any other reason associate that URL with the digital service associated with the initial request for the HLS manifest file, to do so with no input other than the URL it received and the hostname authorities file.

Similarly, configuring issued service provider segment delivery URLs with the hostname associated with the infrastructure service provider (and optionally, associated by the service provider with the digital service) and with the path portion of the digital service URL, or optionally the infrastructure service provider URL, as contained in the corresponding source Variant HLS manifest file in the path portion of issued service provider segment delivery URLs, or optionally configuring issued service provider segment delivery URLs with the infrastructure service provider URL as contained in the corresponding source Variant HLS manifest file, enables the infrastructure service provider to receive and process the URL request for, and deliver, the video segment file.

The Service Provider Manager and Cluster Performance Manager

Continuing with the primary embodiment and secondary embodiment, the manifest file handler operates in conjunction with the service provider manager and cluster performance manager to configure the video segment file URLs configured in the issued Variant HLS manifest file. In other embodiments, the manifest file handler works indirectly in conjunction with the cluster performance manager, working directly in conjunction with the service provider manager (which in turn works with the cluster performance manager and provides the cluster performance manager's results to the manifest file handler); or works indirectly in conjunction with the service provider manager, working directly in conjunction with the cluster performance manager (which in turn works with the service provider manager and provides the service provider manager's results to the manifest file handler).

Note that when a manifest file handler receives a request for an Variant HLS manifest file from a requesting device, as previously described it in most cases knows the actual network address of the requesting device, which can be used to determine the distance, in network terms, of any infrastructure component to the requesting device, or can be used to select an infrastructure service provider that performs well in delivering video segment files to that network location. The manifest file handler has correct and precise information about the exact HLS video manifest file requested (and therefore the HLS video with which the requested HLS manifest file is associated) and the video segment files that comprise it, and can make an individual delivery assignment for each such video segment file. This correct and precise information can be used in a number of ways, for example to select a server that has, or is likely to have, the video segment file in storage, to preload all or part of the video segment file into the storage of one or more specific servers, to select an infrastructure service provider that performs well in delivering video segment files related to that specific HLS video, or in delivering video segment files that have one or more properties in common with, or similar to, those of that specific HLS video.

Individually or together, these factors are used in determining which segment file servers (or, optionally, which cluster(s) of segment file servers) and which infrastructure service providers are assigned to each video segment file that will be, or may be, requested by (and delivered to) the requesting device. The aggregate number of video segment file deliveries assigned to a segment file server or cluster of segment file servers is accurately counted, rather than estimated or predicted, which is more precise and accurate than existing infrastructure service provider processes that assign video segment file deliveries in groups (that typically are unknown, and variable, in size and composition). And optionally, this approach allows selection of an infrastructure service provider for each individual video, and further for each individual video segment file, based at least in part on how the available infrastructure service providers perform in delivering HLS video segment files with comparable properties to the same or comparable network locations or network subsections.

In an optional aspect of the primary embodiment and secondary embodiment, the manifest file handler can also configure failover URLs in an issued Variant HLS manifest file. A failover URL is a second URL, that corresponds to a first URL, and will automatically be requested by the video playback component of the requesting device under certain conditions, generally, the failure of the server from which the first URL is requested to respond properly, or in a timely fashion, to the URL request. Typically, a failover URL is used by the video playback component of the requesting device in conjunction with the metadata provided for the URL for which it is a failover option, i.e., a failover URL typically does not have separate metadata that is different than, or apart from, the metadata of the URL for which it is a failover option. In this optional aspect of the primary embodiment and secondary embodiment, the manifest file handler typically configures a failover URL as an alternate method of ultimately requesting the same video segment file, and to enable a greater degree of control over the video playback component of the requesting device, as describer further herein. In other embodiments, the service provider manager and cluster performance manager are combined into a single service execution manager.

The Service Provider Manager

In the primary embodiment and secondary embodiment, the manifest file handler provides the assigned Session ID, the video segment file URLs in the source Variant HLS manifest file, the metadata associated with the video segment file URLs in the source Variant HLS manifest file, optionally the URL of the source Variant HLS manifest file, and optionally the requested URL in the initial device request for the HLS manifest file, to its service provider manager (or, optionally, another service provider manager). Optionally, some or all of this information may be stored centrally for multiple manifest file handlers, such as centrally within a cluster, within a group of clusters, within a region, or within the network of manifest file handlers, and a pointer to, or one or more parameters or index values associated with, the centrally stored information is provided by the manifest file handler to the service provider manager. In another embodiment, this information is provided to the service provider manager via a session association repository or session association service.

The service provider manager determines, and returns (directly or indirectly) to the manifest file handler, the video segment file URL type to be used for each video segment file; and for any video segment file URL where the URL type to be used is a service provider segment delivery URL, the infrastructure service provider to be configured, and optionally any additional information needed to properly configure the service provider segment delivery URL.

In addition, for any video segment file URL where the URL type to be used is a segment redirect URL, the service provider manager determines, and provides (directly or indirectly) to the segment redirect processor, the URL redirect arguments to be used in specifying the redirect URL to be returned in an HTTP 302 Redirect message upon receipt from the requesting device of the segment redirect URL. As used herein in this context, the URL redirect arguments refers to: in the case of an unconditional redirect argument, the redirect URL, or the type of URL and associated parameters to be used in configuring the redirect URL, to be returned in the HTTP 302 Redirect message; and in the case of conditional redirect arguments, condition indicators and for each indicated condition, the redirect URL, or the type of URL and associated parameters to be used under that condition in configuring the redirect URL, to be returned in the HTTP 302 Redirect message (see The segment redirect processor section of this disclosure for additional information).

In an optional aspect of the primary embodiment and secondary embodiment, the service provider manager determines, and returns (directly or indirectly) to the manifest file handler, a type of segment redirect URL referred to herein as a benchmark segment redirect URL. The manifest file handler treats a benchmark segment redirect URL like other segment redirect URLs. The service provider manager, in the case of a benchmark redirect URL, determines, and provides (directly or indirectly) to the segment redirect processor, a video segment delivery URL as the URL redirect argument, generally as an unconditional redirect argument (meaning that the video segment delivery URL will always be returned as the redirect URL in the HTTP 302 Redirect message), but optionally as a conditional redirect argument (meaning that under specified conditions the video segment delivery URL will be returned as the redirect URL in the HTTP 302 Redirect message, and under other conditions it will not).

In this optional aspect of the primary embodiment and secondary embodiment, the service provider manager configures reserved hostnames in video segment delivery URLs provided to segment redirect processors as redirect arguments for segment redirect URLs; reserved hostnames in this instance may identify one or more segment file servers, or one or more segment file server clusters, designated to be used in conjunction with benchmark segment redirect URLs, or as an alternative may be designated for DNS resolution by the DNS Authoritative Name Servers in conventional infrastructure service provider fashion. Alternatively, the service provider manager operates in conjunction with the cluster performance manager to configure hostnames in video segment delivery URLs, provided to segment redirect processors as redirect arguments for segment redirect URLs, that identify one or more segment file servers, or one or more clusters of segment file servers, that is/are well suited to handle requests for the video segment files identified by such video segment delivery URLs, or (if and when applicable) to configure video segment delivery URLs that in operation defer selection of the specific one or more segment file servers or one or more clusters of segment file server to a later time, at which point another infrastructure component makes the selection of one or more segment file servers or one or more clusters of segment file servers that is/are well suited to handle requests for the video segment files identified by such video segment delivery URLs.

Benchmark redirect URLs are useful for, among other things, measuring the time between when the issuance of an HTTP 302 Redirect message to a requesting device is complete and when the receipt of the corresponding video segment delivery URL request is received by a segment file server. This interval is a reasonable measurement of the round-trip time between that specific requesting device and the network of infrastructure components.

To determine the video segment file URL type to be used for each video segment file URL in the Variant HLS manifest file to be issued, the service provider manager uses performance and utilization information it receives from a performance administrator in conjunction with one or more distribution policies and a distribution model, both from its distribution policy repository.

Distribution policies determine, for a given Variant HLS manifest file, the allocation of video segment file URLs among the possible URL types. As a simple example, a distribution policy might specify 50% video segment delivery URLs and 50% infrastructure service provider segment delivery URLs; whereas a distribution model might specify that the allocated video segment file URLs will be ordered (within playback sequence) beginning with a video segment delivery URL and then interleaving the remaining video segment delivery URLs with other URLs in intervals that are as evenly structured as possible; this would result in an order (within playback sequence) beginning with a video segment delivery URL, followed by a infrastructure service provider segment delivery URL, followed by another video segment delivery URL, and continuing to alternate until the end of the playback sequence. As another example, a distribution policy can specify that 20% of the URLs designate a segment file server/cluster and 80% of the URLs designate an infrastructure service provider, and that 60% of the URLs designating an infrastructure service provider designate a first infrastructure service provider and 40% designate a second infrastructure service provider.

Distribution models determine the pattern of distribution or ordering of URL types in a given variant manifest file. For example, a distribution model can specify that the first URL in the playback sequence designates a segment file server/cluster of system 200, followed by a specific number of URLs (such as 4) that designate service provider servers, followed by a URL that designates a segment file server/cluster of system 200, followed again by a specific number of URLs that designate service provider servers, and continuing in this fashion to alternate between URL types until the end of the playback sequence.

In the primary embodiment and secondary embodiment, distribution policies and distribution models are maintained in a distribution policy repository, which is updated concurrently across service provider managers as distribution policies and/or distribution models are added, deleted, or changed.

In an optional aspect of the primary embodiment and secondary embodiment, a distribution policy can also specify enhanced information to be included in the hostnames configured in service provider segment delivery URLs. As has been previously described, at the time that video segment file URLs, including service provider segment delivery URLs, are configured, the manifest file handler (and therefore the service provider manager as well), has more information about the video segment file than will be available to the infrastructure service provider at the time it resolves the hostname included in the service provider segment delivery URL; accordingly, it may be advantageous for the manifest file handler to include some or all of that information, or parameters associated with, or derived from, that information, in the service provider hostname configured in the service provider segment delivery URL. For example, the IP address of the requesting device, the user agent associated with the requesting device, and/or the video content or category of video content could be configured or encoded into the service provider hostname so that the service provider has that information available when it resolves the hostname. Such enhanced information distribution policies optionally include the enhanced information to be included in the enhanced service provider hostname, the format and structure of the enhanced service provider hostname, and the eligibility of, and conditions governing, a given digital service's use of an enhanced service provider hostname.

Distribution policies can be specific to any of, or any combination of:
- the digital service associated with the video, or a category, parameter, library, or other video classification information provided by the digital service;
- duration of the video;
- release date, publication date, or availability date of video
- number and size of video segment files comprising the source Variant HLS manifest file;
- the video mode (e.g., on-demand video or linear video);
- the requesting device or user agent, or category or type of user agent, or an attribute or characteristic associated with the user agent, identified in the initial device request for the HLS manifest file or in a preceding request for a non-manifest file URL;
- the network location of, or a network location associated with the network location of, the requesting device;
- the network to which the requesting device is connected, the category or type of network to which the requesting device is connected, or an attribute or characteristic associated with the network to which the requesting device is connected;
- another network associated with the request for, or with the manifest file handler's response to, the initial device request for the HLS manifest file;
- the geographic location of, or a geographic location or area associated with the geographic location of, the requesting device;
- one or more infrastructure service providers;
- a category of infrastructure service providers;
- one or more thresholds, ceilings, priorities, allocations, minimums, maximums, averages, or other constraints, boundaries, goals, objectives, or characterizations associated with the volume of video segment file deliveries assigned to, or associated with, one or more infrastructure service providers or categories of infrastructure service providers;
- the measured performance of one or more infrastructure service providers, or types or categories of infrastructure service providers;
- measured performance exceptions associated with one or more infrastructure service providers, or types or categories of infrastructure service providers;
- the measured performance of one or more infrastructure components, or types, categories, groups, or clusters of infrastructure components;
- measured performance exceptions associated with one or more infrastructure components, or types, categories, groups, or clusters of infrastructure components;
- the manifest file handler, the network location or geographic location of the manifest file handler, or an attribute or characteristic associated with the manifest file handler;
- the source Variant HLS manifest file, or information contained in the source Variant HLS manifest file, including metadata, tags, or other information that is otherwise functional or non-functional;
- the URL of the source Variant HLS manifest file, or any part thereof (including the hostname, the path, or the query string, or any part thereof);
- the source Master HLS manifest file associated with the source Master HLS manifest file, including metadata, tags, or other information that is otherwise functional or non-functional;
- the URL of the source Master HLS manifest file, or any part thereof (including the hostname, the path, or the query string, or any part thereof);
- the URL contained in the initial device request for the HLS manifest file, or any part thereof (including the hostname, the path, or the query string, or any part thereof);
- a non-index-file URL that preceded the request the URL contained in the initial device request for the HLS manifest file, or any part thereof (including the hostname, the path, or the query string, or any part thereof);
- the request rate of a Master HLS manifest file or of a Variant HLS manifest file
- the time, date, part of day, day of week, day or week of month, month or season of year, or other temporal factor;
- distribution policies based on business rules;
- or one or more arbitrary distribution policies defined in the distribution policy repository A distribution policy or a distribution model can optionally be assigned, or associated with, a scope, priority, one or more situational priorities, a weight or value, and/or other indicators of the relative importance of the distribution policy under some, varying, or all conditions. The distribution policy repository can also optionally contain rules and priorities for resolving conflicts between and among distribution policies and distribution models, under some, varying, or all conditions.

In an optional aspect of the primary embodiment and secondary embodiment, the manifest file handler also optionally informs the service provider manager as it configures and returns Variant HLS manifest files, thereby providing confirmation to the service provider manager of the HLS Variant manifest files configured and returned to requesting devices.

In other embodiments, the service provider manager provides assignment information to the manifest file handler and the manifest file handler uses the assignment information in conjunction with the information contained in the Variant HLS manifest file, and optionally in conjunction with other information it has about the Variant HLS manifest file request, to determine the video segment file URL type to be used for each video segment file and, for each video segment file URL where the URL type to be used is a service provider segment delivery URL, to configure the service provider segment delivery URL. Such assignment information might, for example, be in the form of an assignment table indexed by IP address ranges or other network identifiers associated with requesting devices and sub-indexed by digital services and their respective content identifiers or categories; using this assignment table, the manifest file handler can then look up the assignment to be used in the designation. In such other embodiments, the service provider manager updates the assignment information as the operating characteristics or measured performance of infrastructure service providers changes, or changes materially.

Other embodiments utilize relatively less dynamic assignment information, wherein the service provider manager updates the assignment information less frequently than the operating characteristics or measured performance of infrastructure service providers changes, or only as the infrastructure service providers associated with a digital service change (e.g., when a digital service changes from one infrastructure service provider to another, or changes the desired allocation of video segment file deliveries among its infrastructure service providers).

In other embodiments, distribution policies and distribution models are maintained in multiple distribution policy repositories, each of which is updated concurrently across service provider managers at which that distribution policy repository is used; for example, a separate distribution policy repository may be maintained for each separate region in which the network of infrastructure components operates (e.g., a regional distribution policy repository for North America, a separate distribution policy repository for Europe, a separate distribution policy repository for China, and a separate distribution policy repository for the rest of the world).

In other embodiments, distribution policies and distribution models are maintained in multiple distribution policy repositories managed in another way; are maintained as individual records rather than aggregated into a repository; are accessed via one or more APIs that operate within, or are provided by the operator of, the network of infrastructure components; are accessed via one or more APIs operated by digital services that use the network of infrastructure components; and/or are accessed via one or more APIs operated by parties other than the digital services that use the network of infrastructure components.

The Cluster Performance Manager

Continuing with the primary embodiment and secondary embodiment, the manifest file handler may operate in conjunction with the cluster performance manager to configure video segment delivery URLs (configured in Variant HLS manifest files) that identify one or more segment file servers, or one or more clusters of segment file servers, that is/are well suited to handle requests for the video segment files identified by such video segment delivery URLs, or (if and when applicable) to configure video segment delivery URLs that in operation defer selection of the specific one or more segment file servers or one or more clusters of segment file server to a later time, at which point another infrastructure component makes the selection of one or more segment file servers or one or more clusters of segment file servers that is/are well suited to handle requests for the video segment files identified by such video segment delivery URLs.

To implement this capability, in the primary embodiment and secondary embodiment, the manifest file handler may provide to its cluster performance manager (or, optionally, another cluster performance manager) the network address of the requesting device, the assigned Session ID associated with the request, the URL or other identifying information for the video segment file(s) to be assigned, metadata associated with the video segment file(s) (such as length in time, encoded bitrate/bandwidth, position in the order of video segment files that comprise the HLS video), and optionally any of, or any combination of: calculated or predictive information associated with the video segment file(s) (such as the point in time when it is expected to be requested by the device, e.g. 30 seconds or 30 minutes from now), the video mode associated with the video segment file (e.g., on-demand video or linear video), and/or the requested URL associated with the initial device request for the HLS manifest file. Optionally, some or all of this information may be stored centrally for multiple manifest file handlers, such as centrally within a cluster, within a group of clusters, within a region, or within the network of manifest file handlers, and a pointer to, or one or more parameters or index values associated with, the centrally stored information is provided by the manifest file handler to the cluster performance manager.

The cluster performance manager also monitors the operating characteristics of the segment file servers in its cluster, and optionally in other clusters (or optionally exchanges such information with cluster performance managers associated with other clusters). The operating characteristics of segment file servers that the cluster performance manager monitors optionally include, but are not limited to, any of, or any combination of: availability and normal operating condition, or alternatively the failure of, or impaired operating condition of, a segment file server and/or its components, whether persistent or intermittent; utilization of, or load on, a segment file server and/or its components (such as its memory, storage, processor, and network connection or network interface); video segment files currently in memory or storage on a segment file server; operating characteristics or conditions of a system or facility that the segment file server uses or on which it depends, such as a network connection, a layer-2, or a power system; and/or environmental conditions, such as temperature or humidity, associated with a segment file server.

In addition, the cluster performance manager also monitors the operating characteristics of the segment file server cluster, and optionally other clusters (or optionally exchanges such information with cluster performance managers associated with other clusters), including, but not limited to, any of, or any combination of: availability and normal operating condition, or alternatively the failure of, or impaired operating condition of, the segment file server cluster and/or infrastructure components associated with it (e.g., DNS Authoritative Name Servers associated with a cluster, or switches associated with a cluster), whether persistent or intermittent; utilization of, or load on, a segment file server cluster and/or infrastructure components associated with it (e.g., the aggregate load on, and utilization of, the cluster of segment file servers, or the load on, and utilization of, one or more switches associated with a cluster); video segment files currently in storage in the segment file server cluster and/or infrastructure components associated with it (e.g., optional Library Storage Servers associated with a cluster); performance, utilization, operating characteristics, or conditions of a system or facility that the segment file server cluster uses or on which it depends, such as a connection to another network, a device in another network to which the cluster is connected, or a power system.

In the primary embodiment and secondary embodiment the cluster performance manager determines (and returns to the manifest file handler) the one or more segment file servers, or one or more clusters of segment file servers, or the network of segment file servers, to be designated, by use of hostnames, in video segment delivery URLs configured in an issued Variant HLS manifest file.

In an optional aspect of the primary embodiment and secondary embodiment, the manifest file handler optionally informs the cluster performance manager as it configures and return Variant HLS manifest files, thereby providing confirmation to the cluster performance manager of the HLS Variant manifest files configured and returned to requesting devices.

In other embodiments, the cluster performance manager provides assignment information to the manifest file handler and the manifest file handler uses the assignment information in conjunction with the information contained in the Variant HLS manifest file, and optionally in conjunction with other information it has about the Variant HLS manifest file request, to determine and designate, by use of hostnames, one or more segment file servers, or one or more clusters of segment file servers, or the network of segment file servers in video segment delivery URLs configured in an issued Variant HLS manifest file. Such assignment information might, for example, be in the form of an assignment table indexed by IP address ranges or other network identifiers and sub-indexed by digital services and their respective content identifiers or categories; using this assignment table, the manifest file handler can then look up the assignment to be used in the designation. In such other embodiments, the cluster performance manager updates the assignment information as the operating conditions of segment file servers, other infrastructure components, and/or the cluster of segment file servers changes, or changes materially, and/or as the information the cluster performance manager receives from other cluster performance managers changes, or changes materially. Other embodiments utilize relatively less dynamic assignment information, wherein the cluster performance manager updates the assignment information less frequently than the operating conditions of infrastructure components changes, or only as the infrastructure components themselves change (e.g., as new infrastructure components are added to the pool of available infrastructure components).

In other embodiments, the manifest file handler does not use assignment information to make some or all of the indicated designations, but instead makes some or all of the indicated designations using round-robin rotation among segment file servers or other infrastructure components, deterministic distribution among segment file servers or other infrastructure components, for example using a protocol such as CARP, or random distribution among segment file servers or other infrastructure components.

Note that when one or more cluster(s) or group(s) of segment file servers is designated by a hostname, the eventual selection of a specific segment file server has been narrowed to the designated group or cluster, but will then be finally determined within that group or cluster at a subsequent point; similarly, when the network of segment file servers is designated by a hostname, the eventual selection of a specific segment file server has not been narrowed, and will be finally determined at a subsequent point. This characteristic provides flexibility both in this aspect of the primary embodiment and secondary embodiment and in other embodiments.

In other embodiments, comprising multiple distributed instances of segment file servers, with multiple instances of segment file servers and optionally one or more manifest file handlers, and one or more switches at each cluster/location, the cluster performance manager identifies to the manifest file handler a cluster of segment file servers, or the hostname associated with a cluster of segment file servers, to be designated in the video segment delivery URLs configured in an issued Variant HLS manifest file. In one such embodiment, the manifest file handler provides information, as described in the primary embodiment and secondary embodiment, to a cluster performance manager which determines, and returns to the manifest file handler, the cluster(s) or group(s) of segment file servers to be designated, by use of hostnames, in video segment delivery URLs; in another such embodiment, the cluster performance manager provides assignment information to the manifest file handler and the manifest file handler uses that assignment information, optionally in conjunction with the information it has about the HLS manifest file request, to make the segment file server cluster designations, for example as previously described. In yet another embodiment, the manifest file handler defaults to designating a hostname associated with its cluster of segment file servers in the video segment delivery URLs configured in an issued Variant HLS manifest file. In these embodiments, the hostname associated with a cluster and designated in a video segment delivery URL is then resolved by the DNS Authoritative Name Servers to the IP address(es) of one or more switches associated with the cluster; the switch then receives the resulting connection request from the requesting user device and selects a manifest file handler to handle the video segment delivery URL request.

In the primary embodiment and secondary embodiment the cluster performance manager identifies the hostname associated with one or more segment file servers that it returns to the manifest file handler to be designated in the video segment delivery URLs (or optionally to be included in assignment information it provides to the manifest file handler), and in other embodiments the hostname associated with one or more clusters of segment file servers that it returns to the manifest file handler to be designated in the video segment delivery URLs (or optionally to be included in assignment information it provides to the manifest file handler), using any of, or any combination of:

- the network location of, or a network location associated with the network location of, the requesting device;
- the relative distance, in network terms, of the cluster of segment file servers to the network location of the requesting device or to other network locations associated with the network location of the requesting device, as compared to the distance, in network terms, of one or more other clusters of segment file servers to the network location of the requesting user device;
- the relative performance, in network terms, of the cluster of segment file servers when communicating to the network location of the requesting device or to other network locations associated with the network location of the requesting device, as compared to the performance, in network terms, of one or more other clusters of segment file servers when communicating to the network location of the requesting device or to other network locations associated with the network location of the requesting device;
- segment file server availability and utilization, both current and anticipated, including (but not limited to) the availability of sufficient capacity to process the video segment delivery URL request;
- a segment file server having previously processed requests for the requested video segment delivery URL, requests for video segment delivery URLs associated with the same video object, requests for video segment delivery URLs associated with the same digital service, or requests for similar video segment delivery URLs;
- segment file server association with the requested HLS manifest file;
- segment file servers association with a portion of the HLS manifest file request URL or contents of the HLS manifest file request message, such as the user agent identified in the HLS manifest file request message;

segment file server association with, or optimization for, video segment delivery URLs associated with on-demand video, video segment delivery URLs associated with linear video, or video segment delivery URLs associated with a combination of on-demand video and linear video;

the request rate of a Master HLS manifest file or of a Variant HLS manifest file;

duration of the video;

release date, publication date, or availability date of video;

number and size of video segment files comprising the source Variant HLS manifest file;

the requesting device or user agent, or category or type of user agent, or an attribute or characteristic associated with the user agent;

the access network used by the requesting user device;

round-robin rotation of video segment delivery URL requests among segment file servers;

deterministic distribution of video segment delivery URL requests among segment file servers, for example using a protocol such as Cache Array Routing Protocol (CARP);

random distribution of video segment delivery URLs requests among segment file servers;

the network location of the manifest file handler

In an optional aspect of the primary embodiment and secondary embodiment, the cluster performance manager also may operate in conjunction with other infrastructure components, sending notifications when operating characteristics of segment file servers, manifest file handlers, other infrastructure components, or clusters of infrastructure components, become unacceptable, out of balance with the operating characteristics of other infrastructure components of the same type or of infrastructure components generally, exceed (or fall beneath) specified thresholds, or otherwise vary beyond an acceptable range or tolerance.

For example, in the event that a segment file server or manifest file handler begins experiencing performance or load conditions that are unacceptable or that are out of balance with the other segment file servers or manifest file handlers, respectively, in its cluster, the cluster performance manager can notify the infrastructure components that make selections after the manifest file handler configures HLS manifest files and the URLs therein, such as DNS Authoritative Name Servers and/or cluster switches. These notifications can indicate to the DNS Authoritative Name Servers and/or cluster switches that the indicated infrastructure component(s) should no longer be selected to receive requests, e.g., that the DNS Authoritative Name Servers should no longer include the IP address of a poorly performing segment file server in DNS hostname resolutions, or in the case of a switch, that the switch should not select that poorly performing segment file server to receive a connection request for a video segment delivery URL (at least until further notice).

These optional notifications can enable an operating network of infrastructure components to experience fewer consequences as a result of, and to recover more quickly from, performance and availability problems, particularly associated with manifest file handlers and/or segment file servers.

In another example, the cluster performance manager can operate in conjunction with the service provider manager to adjust the rate at which, or relative percentages of, video segment file URLs that are configured as video segment delivery URLs and service provider delivery URLs; for example, if an infrastructure service provider is performing poorly, the service provider manager and cluster performance manager can operate in conjunction to determine that the network of segment file servers has available capacity to take over video segment file deliveries from the service provider, or that the network of segment file servers does not; and if the network of segment file servers does, notify one or more manifest file handlers to override the instructions for one or more digital services contained in the manifest file handlers' digital services policy file.

In an optional aspect of the primary embodiment and secondary embodiment, the manifest file handler 204 may specify one or more segment file servers 212 for a higher percentage of, or all of, the video segment files 216 comprising a given requested video (or identified within a given requested manifest) when the request rate for the given video meets specified criteria, such as when the request rate for the given video is below a specified threshold locally, regionally, or globally. The manifest file handler 204 may operate in conjunction with the cluster performance manager 206 to determine the selected segment file server(s) 212, and/or to override the threshold-based determination and specify an infrastructure service provider.

In an optional aspect of the primary embodiment and secondary embodiment, the manifest file handler 204, the segment file servers(s) 212, or the manifest file handler 204 and manifest file server(s) 212 operating together, may pre-request from the source or origin (e.g., pre-cache) some or all of the video segment files 216 in advance of receiving a request from the requesting user device, thereby enabling the segment file server(s) 212 to respond to the requesting user device more quickly than if it had to first retrieve the requested video segment file(s) 216. All such pre-requested video segment files 216 may be requested at once; or, pre-requested video segment files 216 may be requested in blocks or groups, for example as preceding blocks of, groups of, or individual video segment files 216 are requested by, or delivered to, the requesting user device; or, pre-requested video segment files may be requested serially, for example as preceding video segment files 216 are requested by, or delivered to, the requesting user device; or a combination of these techniques may be employed, for example, requesting pre-requested video segment files 216 in blocks for the first part of a video, then pre-requesting pre-requested video segment files 216 individually and serially for the subsequent part of the video. Pre-requesting video segment files 216 in blocks or groups, or individually, may make more efficient use of storage than pre-requesting video segment files 216 all at once.

Combining these two optional aspects of the primary embodiment and secondary embodiment can both enable the use of the network of infrastructure components for delivery of a higher percentage of, or all of, the video segment files 216 comprising a given requested video (or identified within a given requested manifest) and at the same time enable the segment file server(s) 212 to respond to the requesting user device more quickly than if they had to first retrieve the requested video segment file(s) 216, and do so when the specified request rate criteria are met; while at the same time enabling the use of one or more infrastructure service providers when the specified request rate criteria are not met. For example, if the specified request rate criterion is that the rate is below a certain threshold in a given region, then infrastructure service providers could be used to respond to requests for most of the video segment files 216 for videos that are frequently requested in a given region (request rate criteria not met), while the network of infrastructure components could be used to respond to requests for all video segment files for videos that are infrequently requested in that region (request rate criteria is met), and by pre-requesting the video segment files in small blocks as the preceding blocks of video segment files are requested by, or delivered to, the requesting user device, the network of infrastructure components could respond rapidly to requests for video segment files 216 while also using storage efficiently.

Returning the Issued Variant HLS Manifest File to the Requesting Device

In the primary embodiment and secondary embodiments, the manifest file handler returns issued Variant HLS manifest files to the requesting device and creates a manifest file serving record comprising the Session ID and any of, or any combination of: one or more HLS manifest file identifiers (which may be all or part of the requested HLS manifest file URL, all or part of the source HLS manifest file URL, or another identifier); the video segment file URLs configured in an issued Variant HLS manifest file (or, in the case of a Master HLS manifest file, the Variant HLS manifest file URLs configured in the issued Master HLS manifest file); the IP address of the requesting device; timestamp that the HLS manifest file request was received; timestamp that the HLS manifest file return was completed; and some or all of the TCP packet-level metrics, or summaries of TCP packet-level metrics, related to the request and delivery of the HLS manifest file, including, but not limited to, identifiers and timestamps for some or all of the individual packets comprising the TCP connection, packet retries, re-requests, and re-sends, packet sizes and composition, and other connection-level information associated with the TCP connection.

The manifest file handler sends the manifest file serving record, or otherwise makes it available, directly or indirectly (by sending it to, or otherwise making it available to, another infrastructure component), to one or more performance administrators, either immediately after it is created or subsequently, optionally in groups of manifest file serving records; optionally, the manifest file handler sends, or otherwise makes available, directly or indirectly, a summary of, or extract from, the manifest file serving record or a group of manifest file serving records, directly or indirectly, to one or more performance administrators.

Optionally, a performance administrator may send to, or make available for retrieval by, one or more other performance administrators any of, or any combination of, the manifest file serving record; a group of manifest file serving records; one or more summaries of, or one or more extracts from, the manifest file serving record; or one or more summaries of, or one or more extracts from, a group of manifest file serving records.

Continuing with the primary embodiment and secondary embodiment, the manifest file handler returns the issued Variant HLS manifest file to the requesting device. The requesting device issues URL requests for the video segments, in each case using the video segment file URL configured in the issued Variant HLS manifest file. As previously described, using an adaptive streaming video delivery protocol, the requesting client typically will request the video segment file URLs in playback sequence, beginning playback of the video once it has received a sufficient amount of data to do so, and continuing to request segment files as needed as playback proceeds.

Thus, the playback process results in the requesting device sending URL requests for the video segment file URLs configured in the issued Variant HLS manifest file as the segments are needed for playback. Requests for service provider segment delivery URLs are sent to the infrastructure service provider configured in the URL; in the primary embodiment and secondary embodiment, the network of infrastructure components does not receive, or directly observe, these requests. Requests for video segment delivery URLs and segment redirect URLs, however, are sent to the network of infrastructure components, more specifically, to a segment file server as configured in the video segment delivery URL or to a Redirect Processor as configured in the segment redirect URL, respectively.

The Segment Redirect Processor

In an optional aspect of the primary embodiment and secondary embodiment, the network of infrastructure components includes one or more segment redirect processors. Segment redirect processors may provide subsequent support in the network of infrastructure components for processing segment redirect URLs configured in Variant HLS manifest files; accordingly, in an embodiment that does not implement one or more segment redirect processors (or equivalent function) or that does not otherwise support the processing of segment redirect URLs configured in Variant HLS manifest files, the service provider manager will not direct the configuration of, nor will the manifest file handler perform the configuration of, any URLs of the segment redirect URL type.

As previously described, in the primary embodiment and secondary embodiment, for any video segment file URL where the URL type to be used is a segment redirect URL, the service provider manager determines, and provides to the segment redirect processor, one or more URL redirect arguments to be used in specifying the redirect URL configured in an HTTP 302 Redirect message, or other HTTP message, returned upon receipt from the requesting device of the segment redirect URL request. As used herein in this context, URL redirect arguments refers to: in the case of an unconditional redirect argument, the redirect URL, or the type of URL and associated parameters to be used in configuring the redirect URL, to be returned in the HTTP 302 Redirect message, or the other HTTP message and any associated parameters to be used in configuring the other HTTP message, to be returned; and in the case of conditional redirect arguments, condition indicators or statements and, for each condition indicator or statement, under that condition, the redirect URL, or the type of URL and associated parameters to be used in configuring the redirect URL, to be returned in the HTTP 302 Redirect message, or other HTTP message and any associated parameters to be used in configuring the other HTTP message, to be returned.

Although not mandatory, unconditional redirect arguments will normally be service provider segment delivery URLs (or parameters that result in the configuration of a service provider segment delivery URL), and will result in a redirect URL returned to the requesting device (which will then request it) that is the same as the service provider segment delivery URL that would otherwise have been specified by the service provider manager to be configured by the manifest file handler in the Variant HLS manifest file where the segment redirect URL was configured. Although configuring a segment redirect URL with an unconditional redirect argument adds an extra step (the request, by the requesting device, of the segment redirect URL, which then leads to the request, by the requesting device, of the service provider segment delivery URL), it provides the network of infrastructure components with visibility of the request from the requesting device for the service provider segment delivery URL.

As an example, in a series of eight consecutive (in video playback sequence) video segment file URLs in a Variant HLS manifest file, where the first and eighth video segment URLs are configured as video segment delivery URLs:

configuring the remaining six consecutive (second though seventh) video segment URLs as service provider segment delivery URLs provides the network of infrastructure components with no additional visibility into the delivery of those six video segments; receiving a request for the first video segment delivery URL identifying the high bandwidth video segment file for that video segment and a request for the eighth video segment delivery URL identifying a lower bandwidth video segment file for that video segment, confirms to the network of infrastructure components that the video playback component reduced the bandwidth of requested video segment files during the playback of the six service provider segment delivery URLs, but does not identify to the network of infrastructure components where within those six segments the video playback component began making the reduced bandwidth requests;

whereas, continuing this example, configuring some of the remaining six consecutive video segment file URLs (which are the second though seventh overall), for example the first, third, and fifth of the remaining six consecutive video segment file URLs (which are the second, fourth, and sixth overall) as redirect segment URLs (and the others of the remaining six consecutive video segment file URLs as service provider segment delivery URLs), enables the network of infrastructure components to narrow (but not specifically determine) where within those six segments the video playback component began making the reduced bandwidth requests; for example, if the video playback component's reduced bandwidth requests begin following its request for the second overall video segment, then the request for the second overall segment (which is the first of the remaining six consecutive video segment files) will be made with the redirect segment URL associated with the service provider segment delivery URL for the high bandwidth video segment file, and then the request for the fourth overall segment (which is the third of the remaining six consecutive video segment files) will be made with the redirect segment URL associated with the service provider segment delivery URL for the low bandwidth video segment file; thus, enabling the network of infrastructure components to determine that the video playback component's requests for reduced bandwidth video segment files began after the second overall segment and by the fourth overall segment, meaning with either the third or the fourth overall segment;

whereas, continuing this example, configuring all of the remaining six consecutive video segment file URLs as redirect segment URLs enables the network of infrastructure components to determine specifically where within those six segments the video playback component began making the reduced bandwidth requests.

Configuring a segment redirect URL with conditional redirect arguments provides the same request visibility that configuring a segment redirect URL with unconditional arguments provides, and in addition enables the segment redirect processor to select among alternative possible redirect URLs to be returned in the HTTP 302 Redirect message. With this capability, the segment redirect processor can select among multiple infrastructure service providers to be used for delivery of the video segment file, or between one or more infrastructure service providers and the network of segment file servers, or among segment file servers. For example, if the conditions are based on a measure of delivery performance, and the infrastructure service provider is performing at a level below the threshold indicated, then the segment redirect processor can configure a video segment delivery URL as the redirect URL in the HTTP 302 Redirect message, thereby shifting the video segment file delivery to the network of infrastructure components instead.

Configuring a segment redirect URL with conditional redirect arguments also enables the segment redirect processor to conditionally return an HTTP message that is not an HTTP 302 Redirect message, which enables additional control over video playback process on the requesting device. For example, in many cases the response of the video playback component of the requesting device when it receives an HTTP 404 File Not Found message is predictable, and therefore the segment redirect processor can use this predictable behavior in conjunction with its ability to conditionally issue an HTTP message to control the behavior of the video playback component; by comparison, this ability can provide a level of precision and control that an application running on the device, or code on an HTML page executing in a browser, cannot.

For example, in many device implementations of adaptive streaming video protocols, including device-specific implementations of HLS, when the device playback component receives an HTTP 404 File Not Found message it requests a failover URL specified in the Variant HLS manifest file and from that point continues to request failover URLs for additional segments. As described earlier, the manifest file handler can configure one or more failover URLs in an issued Variant HLS manifest file; using this capability of the manifest file handler, coupled with the ability of the segment redirect processor to issue an HTTP 404 File Not Found message, the segment redirect processor can direct the requesting device to change to the failover URLs.

Consider, as an example, a situation where the performance of an infrastructure service provider degrades, either globally or in a specific region or in conjunction with specific end user access networks or user device types; as soon as the performance degradation is detected, manifest file handlers can issue (to all or just to some requesting devices, e.g. just to requesting devices potentially affected by the performance degradation) Variant HLS manifest files with video segment URLs that do not include the degraded infrastructure service provider; at the same time, the segment redirect processor can return an HTTP 404 File Not Found message to some or all of the requesting devices with previously-issued Variant HLS manifest files, predictably causing these devices to change to the failover URLs previously configured in their issued Variant HLS manifest files, thereby moving those requesting devices from the degraded infrastructure service provider to another infrastructure service provider.

Thus, working in combination, manifest file handlers and segment redirect processors can rapidly shift video segment demand from one infrastructure service provider to another, across both newly commencing video playback requests and video playback requests that are already underway. Using the same techniques, but in conjunction with video segment delivery URLs, manifest file handlers and segment redirect processors can rapidly shift video segment demand from one group of segment file servers to another within the network of segment file servers, or from the network of segment file servers to an infrastructure service provider, or from an infrastructure service provider to the network of segment file servers, in each case across both newly commencing video playback requests and video playback requests that are already underway.

As another example, in many device implementations of adaptive streaming video protocols, including device-specific implementations of HLS, when the device playback component receives an HTTP 404 File Not Found message and there are no failover URLs specified in the Variant HLS manifest file, the device playback component changes playback to the next available video profile (resolution, bandwidth, etc) and discontinues using the video profile that resulted in the HTTP 404 File Not Found message. In these circumstance, by issuing an HTTP 404 File Not Found message, the segment redirect processor can direct the requesting device to change to the next available video profile.

Consider, as an example, a situation where the overall user demand for a given digital service is within the technical ability of the digital service's infrastructure provider(s) and/or the network of infrastructure components to effectively deliver, but exceeds an overall threshold set by the digital service (for example, in order to control aggregate bandwidth in use, and therefore control cost). As the threshold is approached, or when it is reached, manifest file handlers can begin to issue Variant HLS manifest files containing only lower bitrate profiles, and at the same time, the segment redirect processor can direct some or all of the requesting devices with previously-issued Variant HLS manifest files to shift down to a lower bitrate profile (for example, initially targeting only the requesting devices using the highest bitrates for a downward shift, leaving requesting devices using lower bitrate profiles at those lower bitrates). If user demand for the digital service's video continues to increase, manifest file handlers can further reduce the maximum bitrate available in the profiles configured in issued Variant HLS manifest files, and at the same time, the segment redirect processor can again direct some or all of the requesting devices with previously-issued Variant HLS manifest files to again shift down to a lower bitrate.

Thus, working in combination, manifest file handlers and segment redirect processors can smoothly shift the bandwidth usage of individual video sessions down, managing the aggregate bandwidth used by the digital service, even when the technical conditions are such that the video playback components on most or all user devices would individually request a higher bitrate profile, and in doing so would in aggregate cause the digital service to exceed its bandwidth threshold. In addition, as described in this example, this approach provides each requesting device with the maximum individual video bitrate that is consistent with the digital service's aggregate threshold, and therefore comparable experiences to all users of comparable requesting devices, rather than the uneven distribution of video bitrates, and therefore of user experience, that would result from applying all of the downshifting burden to newly requesting devices.

The segment redirect processor works in conjunction with a performance administrator, which compiles and analyzes performance of, and aggregate utilization of, infrastructure service providers and components of, and clusters or groups of components of, the network of infrastructure components, to determine which conditions of a conditional redirect argument have been satisfied, or what other message to send in the circumstances, when the segment redirect URL request is received (see related description in the section of this disclosure regarding the performance administrator).

Continuing with this optional aspect of the primary embodiment and secondary embodiment, when the segment redirect processor receives the segment redirect URL request, it serves the HTTP 302 Redirect message or other HTTP message and creates a redirect serving record comprising: the Session ID; one or more redirect identifiers (which may be all or part of the requested segment redirect URL, all or part of the redirect URL included in the returned HTTP 302 Redirect message, or another identifier); the IP address of the requesting device; timestamp that the segment redirect delivery URL request was received; optionally the timestamp that the HTTP 302 Redirect message delivery was completed; and optionally some or all of the TCP packet-level metrics, or summaries of TCP packet-level metrics, related to the request and delivery of the HTTP 302 Redirect message, including, but not limited to, identifiers and timestamps for some or all of the individual packets comprising the TCP connection, packet retries, re-requests, and re-sends, packet sizes and composition, and other connection-level information associated with the TCP connection.

In this optional aspect of the primary embodiment and secondary embodiment, the segment redirect processor sends the redirect serving record to a performance administrator immediately after it is created. In other embodiments, the segment redirect processor: sends the redirect serving record to more than one performance administrator immediately after it is created; sends the redirect serving record to another infrastructure component, which directly or indirectly sends, or otherwise makes available, the redirect serving record to one or more performance administrators; compiles, groups, or summarizes more than one redirect serving record and then sends the compilation, group, or summary to one or more performance administrators or another infrastructure component (which directly or indirectly sends, or otherwise makes available, the compilation, group, or summary of redirect serving records to one or more performance administrators); queues redirect serving records for retrieval by one or more performance administrators or another infrastructure component (which directly or indirectly sends, or otherwise makes available, redirect serving records to one or more performance administrators); or otherwise conveys information contained in one or more redirect serving records, directly or indirectly, to one or more performance administrators.

In this optional aspect of the primary embodiment and secondary embodiment, and in other embodiments, a performance administrator may send to, or make available for retrieval by, one or more other performance administrators any of, or any combination of, the redirect serving record; a group of redirect serving records; one or more summaries of, or one or more extracts from, the redirect serving record; or one or more summaries of, or one or more extracts from, a group of redirect serving records.

Note that the IP address of the requesting device can change from one video segment to the next, because each video segment is a separate URL request; the IP address used by the requesting device can change during the duration of a video playback, and in fact would be expected to change under certain circumstances, for example when the requesting device changes the network it is connected to, such as when a user carries her mobile smartphone into her office and the smartphone transitions from her wireless carrier to her office wifi network. Once the smartphone makes the transition to another network, from that point forward the network of infrastructure components will receive requests from a different IP address, which is associated with a different network than the previous IP address; at the same time, however, the requested URLs will, under normal conditions, continue to include the same Session ID.

In an optional aspect of the primary embodiment and secondary embodiment, the segment redirect processor may also send the redirect serving record, or a subset of the redirect serving record, to one or more other infrastructure components, such as the Non-Index-File Message Handler (see the NIF Message Handler section included in the parent disclosure).

The Segment File Server

Continuing with the primary embodiment and secondary embodiment, as previously described, requests for video segment delivery URLs may be sent by the requesting device to the network of infrastructure components, more specifically to a segment file server as configured in the video segment delivery URL (or to another infrastructure component, such as a switch, that connects the request to a segment file server). The segment file server may then responds to the video segment delivery URL request by serving the video segment file identified in the video segment delivery URL. Generally, a video segment delivery URL identifies one specific video segment file. In an optional aspect of the primary embodiment and secondary embodiment, a video segment delivery URL may identify more than one specific video segment file, and the segment file server responds to the video segment delivery URL request by serving one of the more than one alternative video segment files.

Continuing with the primary embodiment and secondary embodiment, the video segment file served in response to the video segment delivery URL request is the segment file server's copy of the source video segment file. Note that in normal operation, many segment file servers will request, store, and serve copies of a single source video segment file; note also that in normal operation many video segment delivery URLs will correspond to a single source video segment file (by way of explanation, considering that, as previously described, each video segment delivery URL is configured to include a Session ID that is unique to each video delivery, such as each initial device request for an HLS manifest file, then each requesting device that initiates playback of the same video will, when it reaches a given segment during the playback of the video, request a video segment delivery URL that is different, due at least to the Session ID, from all other video segment delivery URLs requested by all other devices when they reach that given segment; thus, all such video segment delivery URLs correspond to the same source video segment file, even though the video segment delivery URLs requested by different requesting devices are all different).

When the segment file server responds to the video segment file URL request by serving the video segment file, it determines whether it has in storage an unexpired copy of the source video segment file corresponding to the video segment delivery URL. If it has an unexpired copy of the source video segment file in storage, it serves it to the requesting device.

If the segment file server does not already have in storage an unexpired copy of the source video segment file, for example if this is the first request received by this segment file server for a video segment delivery URL corresponding to the video segment file, or as another example if the source video segment file is in storage but has an associated time-to-live ("TTL") that has expired, then the segment file server (or another infrastructure component) will make a request for the source video segment file, and once it receives it, will in turn serve it to the requesting device.

Optionally, if an unexpired copy of the source video segment file is already stored in another infrastructure component, such as another segment file server or a Library Storage Server, the serving segment file server may request the unexpired source video segment file from such other infrastructure component.

To make a request for a source video segment file, the segment file server determines the source video segment file URL to use in the request. The source video segment file may be a digital service URL, which can be used to request the source video segment file directly from the digital service, or may be a service provider URL, which can be used to request the source video segment file from an infrastructure service provider associated with the digital service; or, in the case of a request to another infrastructure component, may be another URL or other identifying information. In the primary embodiment and secondary embodiment, a service provider URL is preferred over a digital service URL; multiple segment file servers requesting source video segment files concurrently is a possible, and possibly frequent, characteristic of an network of infrastructure components in normal operation, especially in the context of video that is new, or popular, or both new and popular (e.g., a viral hit); many infrastructure service providers can readily support this demand for source video segment files, in terms of fast, successful fulfillment of such requests, whereas a digital service's own infrastructure is more at risk of being slow to respond to such requests, or even becoming overwhelmed by such requests (note that, as described in the Background section, scale and performance considerations are among the reasons digital services use infrastructure service providers in place of, or in addition to, their own infrastructures). In an optional aspect of the primary embodiment and secondary embodiment, when a digital service uses more than one infrastructure service provider, one of the infrastructure service providers is preferred. In other embodiments, digital service URLs are preferred over service provider URLs, or neither digital service URLs or service provider URLs is preferred over the other.

To make a request for a source video segment file, the segment file server uses the hostname authority record (contained in the hostname authorities file) related to the character string contained in the requested URL that identifies the digital service; as a reminder, this character string can be the hostname contained in the requested URL, or optionally this character string can be included in the URL path, or can be included elsewhere in the URL. The segment file server looks up this character string in the hostname authorities file, reads the matching hostname authority record, retrieves the hostname and other configuration information to be used in service provider URLs (or, if a digital service URL is used, in digital service URLs), composes the URL for the service provider URL request (or, if a digital service URL is used, the URL for the digital service URL request), and makes the request. The segment file server then receives the source video segment file from the infrastructure service provider, optionally stores it and records its TTL (if any), and serves it to the requesting device.

When the segment file server makes a service provider URL request for a source video segment file, it creates a service provider request record corresponding to the request, comprising: the Session ID; the requested service provider URL; and optionally any of, or any combination of, one or more other source video segment file identifiers, the IP address of the responding service provider server, timestamp that the video segment delivery URL was requested, timestamp that the receipt of the video segment delivery file was completed, and optionally some or all of the TCP packet-level metrics, or summaries of TCP packet-level metrics, related to the request and delivery of the service provider URL, including, but not limited to, identifiers and timestamps for some or all of the individual packets comprising the TCP connection, packet retries, re-requests, and re-sends, packet sizes and composition, and other connection-level information associated with the TCP connection with the infrastructure service provider's server or service. The segment file server sends this service provider request record to, or otherwise makes this service provider request record available for retrieval by, one or more performance administrators, directly or indirectly.

In an optional aspect of the primary embodiment and secondary embodiment, the network of infrastructure components may include library storage servers. Library storage servers may be located in conjunction with some or all individual segment file servers, some or all clusters of segment file servers, or in one or more independent clusters, and some or all of the requests made by segment file servers for source video segment files are routed to library storage servers, rather than directly to the digital service or an infrastructure service provider.

Library storage servers may be arranged in a single-level hierarchy, for example, one or more library storage servers in a single level supporting the segment file servers comprising a given cluster; in a single level hierarchy, a library storage server that does not have an unexpired copy of a requested source video segment file requests the source video segment file from the digital service or an infrastructure service provider associated with the digital service. Library storage servers may also be arranged in a multi-level hierarchy comprising more than one level of library storage servers; in a multi-level hierarchy, some library storage servers that do not have an unexpired copy of a requested source video segment file request the source video segment file from another library storage server; and when a library storage server in the final level of a multi-level hierarchy does not have an unexpired copy of a requested source video segment file, it requests the source video segment file from the digital service or an infrastructure service provider associated with the digital service.

Optionally, a multi-level hierarchy of library storage servers may be implemented with flexibly-defined hierarchies, for example where a hierarchy is specific to any of, or any combination of, one or more digital services, one or more infrastructure service providers, one or more content types, one or more networks (such as the network associated with the requesting device), or video mode (e.g., on-demand video or linear video). Also note that a library storage server may concurrently take the role of more than one hierarchy level, for example, a given library storage server may concurrently be the single level library storage server for some segment file servers or request for source video segment files, while at the same time being the initial level in multiple levels of library storage servers for other segment file servers or requests for source video segment files, and at the same time being the final level in multiple levels of library storage servers for other segment file servers, library storage servers, or requests for source video segment files.

Continuing with this optional aspect of the primary embodiment and secondary embodiment, to make a request for a source video segment file to a digital service or its infrastructure service provider, the library storage server looks up the hostname authority record (contained in the hostname authorities file), using the character string related to the digital service, reads the matching hostname authority record, retrieves the hostname to be used in service provider URLs (or, if a digital service URL is used, in digital service URLs), composes the URL for the service provider URL request (or, if a digital service URL is used, the URL for the digital service URL request), and makes the request. The library storage server may then receive the source video segment file from the infrastructure service provider, store it, and serve it to the infrastructure component that requested it.

When a library storage server receives a request for a source video segment file from an infrastructure component and it has an unexpired copy of the source video segment file in storage, the library storage server serves the source video segment file to the device that requested it and optionally creates a library segment serving record comprising: the Session ID; one or more video segment file identifiers (which may be all or part of the requested video segment delivery URL, all or part of the source video segment file URL, or another identifier); the IP address of the requesting device; timestamp that the video segment file request was received; timestamp that the video segment file was completed; and optionally some or all of the TCP packet-level metrics, or summaries of TCP packet-level metrics, related to the request and delivery of the video segment file, including, but not limited to, identifiers and timestamps for some or all of the individual packets comprising the TCP connection, packet retries, re-requests, and re-sends, packet sizes and composition, and other connection-level information associated with the TCP connection. The library storage server may send the library segment serving record, or otherwise makes it available, directly or indirectly (by sending it to, or otherwise making it available to, another infrastructure component), to one or more performance administrators, either immediately after it is created or subsequently, optionally in groups, optionally by queuing library segment serving records for sending or retrieval; and/or sends, or otherwise makes available, directly or indirectly, a summary of, or extract from, the library segment serving record or a group of library segment serving records, directly or indirectly, to one or more performance administrators.

Optionally, a performance administrator may send to, or make available for retrieval by, one or more other performance administrators any of, or any combination of, the library segment serving record; a group of library segment serving records; one or more summaries of, or one or more extracts from, the library segment serving record; or one or more summaries of, or one or more extracts from, a group of library segment serving records.

When a library storage server makes a service provider URL request for a source video segment file, it creates a service provider request record corresponding to the request, comprising the Session ID, the requested service provider URL, and optionally any of, or any combination of, one or more other source video segment file identifiers, the IP address of the responding service provider server, timestamp that the video segment delivery URL was requested, timestamp that the receipt of the video segment delivery file was completed, and optionally some or all of the TCP packet-level metrics, or summaries of TCP packet-level metrics, related to the request and delivery of the service provider URL, including, but not limited to, identifiers and timestamps for some or all of the individual packets comprising the TCP connection, packet retries, re-requests, and re-sends, packet sizes and composition, and other connection-level information associated with the TCP connection with the infrastructure service provider's server or service. The library storage server may send this service provider request record to, or otherwise make this service provider request record available for retrieval by, one or more performance administrators, directly or indirectly.

In other embodiments, source video segment files are uploaded to library storage servers, where they may be stored permanently. In other embodiments, source video segment files are requested from a digital service or an infrastructure service provider using a request other than an HTTP request containing a URL, for example using another message type or protocol.

Continuing with when the segment file server responds to the video segment file URL request by serving the video segment file, the segment file server serves the requested video segment file to the requesting device and creates a video segment serving record comprising: the Session ID; one or more video segment file identifiers (which may be all or part of the requested video segment delivery URL, all or part of the source video segment file URL, or another identifier); the IP address of the requesting device; timestamp that the video segment delivery URL request was received; timestamp that the video segment delivery file was completed; and optionally some or all of the TCP packet-level metrics, or summaries of TCP packet-level metrics, related to the request and delivery of the video segment file, including, but not limited to, identifiers and timestamps for some or all of the individual packets comprising the TCP connection, packet retries, re-requests, and re-sends, packet sizes and composition, and other connection-level information associated with the TCP connection.

In the primary embodiment and secondary embodiment, the segment file server may send the video segment serving record, or otherwise makes it available, to the performance administrator immediately after it is created. In other embodiments, the segment file server: sends the video segment serving record, or otherwise makes it available, to more than one performance administrator immediately after it is created; sends the video segment serving record, or otherwise makes it available, to another infrastructure component, which directly or indirectly sends the video segment serving record, or otherwise makes it available, to one or more performance administrators; compiles or groups more than one video segment serving record and then sends the group, or otherwise makes the group available, to one or more performance administrators or another infrastructure component (which directly or indirectly sends the group of video segment serving records, or otherwise makes the group available, to one or more performance administrators); queues video segment serving records for retrieval by one or more performance administrators or another infrastructure component (which directly or indirectly sends the video segment serving records, or otherwise makes them available, to one or more performance administrators); sends a summary of, or extract from, the video segment serving record, or summaries of, or extracts from, one or more groups of video segment serving records, to one or more performance administrators or another infrastructure component (which directly or indirectly sends summary of, or extract from, the video segment serving record, or the summary of, extracts from, the group of video segment serving records, or otherwise makes these available, to one or more performance administrators); or otherwise conveys video segment serving records or summaries of, or extracts from, video segment serving records, directly or indirectly, to one or more performance administrators.

In an optional aspect of the primary embodiment and secondary embodiment, a performance administrator may send to, or make available for retrieval by, one or more other performance administrators any of, or any combination of, the video segment serving record; a group of video segment serving records; one or more summaries of, or one or more extracts from, the video segment serving record; or one or more summaries of, or one or more extracts from, a group of video segment serving records.

In an optional aspect of the primary embodiment and secondary embodiment, the segment file server may also send the video segment serving record, or a subset of the video segment serving record, to one or more other infrastructure components, such as the Non-Index-File Message Handler (see the NIF Message Handler section included in the parent disclosure).

In another optional aspect of the primary embodiment and secondary embodiment, a video segment delivery URL may identify more than one specific video segment file; the segment file server responds to the video segment delivery URL request by serving one of the more than one alternative video segment files. In this optional aspect of the primary embodiment and secondary embodiment, when the segment file server receives a request for a video segment delivery URL it accesses an alternative video segment file repository or alternative video segment file service and identifies which of the alternative video segment files is to be served in response to this video segment delivery URL, based on the Session ID configured in the video segment delivery URL. The selected alternative video segment file may be identified by the alternative video segment file repository or alternative video segment file service to the segment file server by: all or part of its full source video segment file URL; a code or parameter that identifies it, or its category or class (which can then optionally be used in combination with all or part of its video segment delivery URL, for example by cross-indexing, to identify it); or another identifier, alone or in combination with other information, including the video segment delivery URL, the network associated with the requesting device, or the user agent contained in the video segment delivery URL request.

In order to serve the selected alternative video segment file, the segment file server may determine whether it has in storage an unexpired copy of the source selected alternative video segment file. If it has an unexpired copy of the source selected alternative video segment file in storage, it serves it to the requesting device. If the segment file server does not already have in storage an unexpired copy of the source selected alternative video segment file, for example if this is the first request for which the selected alternative video segment file has been identified for the video segment delivery URL, or as another example if the source selected alternative video segment file is in storage but has an associated TTL that has expired, then the segment file server (or another infrastructure component) will make a request for the source selected alternative video segment file, and once it receives it, will in turn serve it to the requesting device. A request for a source selected alternative video segment file is made in the same manner as the previously described request for a source video segment file.

As a reminder, Variant HLS manifest files may include metadata in addition to, and that is associated with, the video segment files comprising the video. When a video segment is followed (in playback sequence) by a next video segment with different metadata (e.g., duration, codec, bandwidth, and/or resolution), a discontinuity tag is required in the Variant HLS manifest file to alert the video playback component that the metadata will change. Similar discontinuity flags are implemented in other adaptive video streaming protocols.

Accordingly, in this optional aspect of the primary embodiment and secondary embodiment, when the manifest file handler issues an issued Variant HLS manifest file wherein a video segment delivery URL may identify more than one specific video segment file, for each such video segment delivery URL:

all of the more than one alternative video segment files corresponding to that video segment delivery URL may conform to the same metadata, which may be the same as the metadata of the preceding video segment file; in this case, the selection of the alternative video segment file may be made at any time prior to the serving of the selected alternative video segment file, for example, at the time the video delivery URL request is received by the segment file server; or when all of the more than one alternative video segment files corresponding to that video segment delivery URL conform to the same metadata, but that metadata is different from the metadata of the preceding video segment file, the manifest file handler inserts a discontinuity tag and appropriate metadata for the more than one alternative video segment files; in this case, the selection of the alternative video segment file may be made at any time prior to the serving of the selected alternative video segment file, for example, at the time the video delivery URL request is received by the segment file server; or when one or more of the more than one alternative video segment files corresponding to that video segment delivery URL conform to different metadata, when the manifest file handler issues an issued HLS manifest file wherein that video segment delivery URL will result in the selection at the segment file server of an alternative video segment file with different metadata than the preceding video segment, the manifest file handler inserts a discontinuity tag and appropriate metadata for the alternative video segment file(s) that will be selected; in this case, the selection of the alternative video segment file is made, or at least narrowed to a subset of alternative video segment files that each have the same metadata, at least by the time that the manifest file handler issues the issued Variant HLS manifest file.

The segment file server responds to the video segment delivery URL request by serving the selected alternative video segment file to the requesting device and creates a video segment serving record comprising: the Session ID; one or more video segment file identifiers (which may be all or part of the requested video segment delivery URL, all or part of the source selected alternative video segment file URL, or another identifier); the IP address of the requesting device; timestamp that the video segment delivery URL request was received; timestamp that the selected alternative video segment delivery file was completed; and optionally some or all of the TCP packet-level metrics, or summaries of TCP packet-level metrics, related to the request and delivery of the video segment file, including, but not limited to, identifiers and timestamps for some or all of the individual packets comprising the TCP connection, packet retries, re-requests, and re-sends, packet sizes and composition, and other connection-level information associated with the TCP connection.

In an additional optional aspect of this optional aspect of the primary embodiment and secondary embodiment, the segment file server may also send the video segment serving record, or a subset of the video segment serving record, to one or more other infrastructure components, such as the Non-Index-File Message Handler (see the NIF Message Handler section included in the parent disclosure).

In another optional aspect of the primary embodiment and secondary embodiment, the segment file server may incorporate some or all of the functions of the segment redirect processor, so that the segment file server can also receive both video segment delivery URLs and redirect segment URLs, and in response: serve a video segment file; serve an alternative video segment file, as identified by the Session ID configured in the video segment delivery URL in conjunction with the alternative video segment file repository or alternative video segment file service; or return an HTTP 302 Redirect message or other HTTP message, corresponding to one or more URL redirect arguments received, directly or indirectly, from the service provider manager.

The Performance Administrator

In the primary embodiment and secondary embodiment, as previously described, the performance administrator may receive manifest file serving records from manifest file handlers, video segment serving records from segment file servers, and redirect serving records from segment redirect processors; these may be referred to collectively herein as service measurement records.

Figure 6:
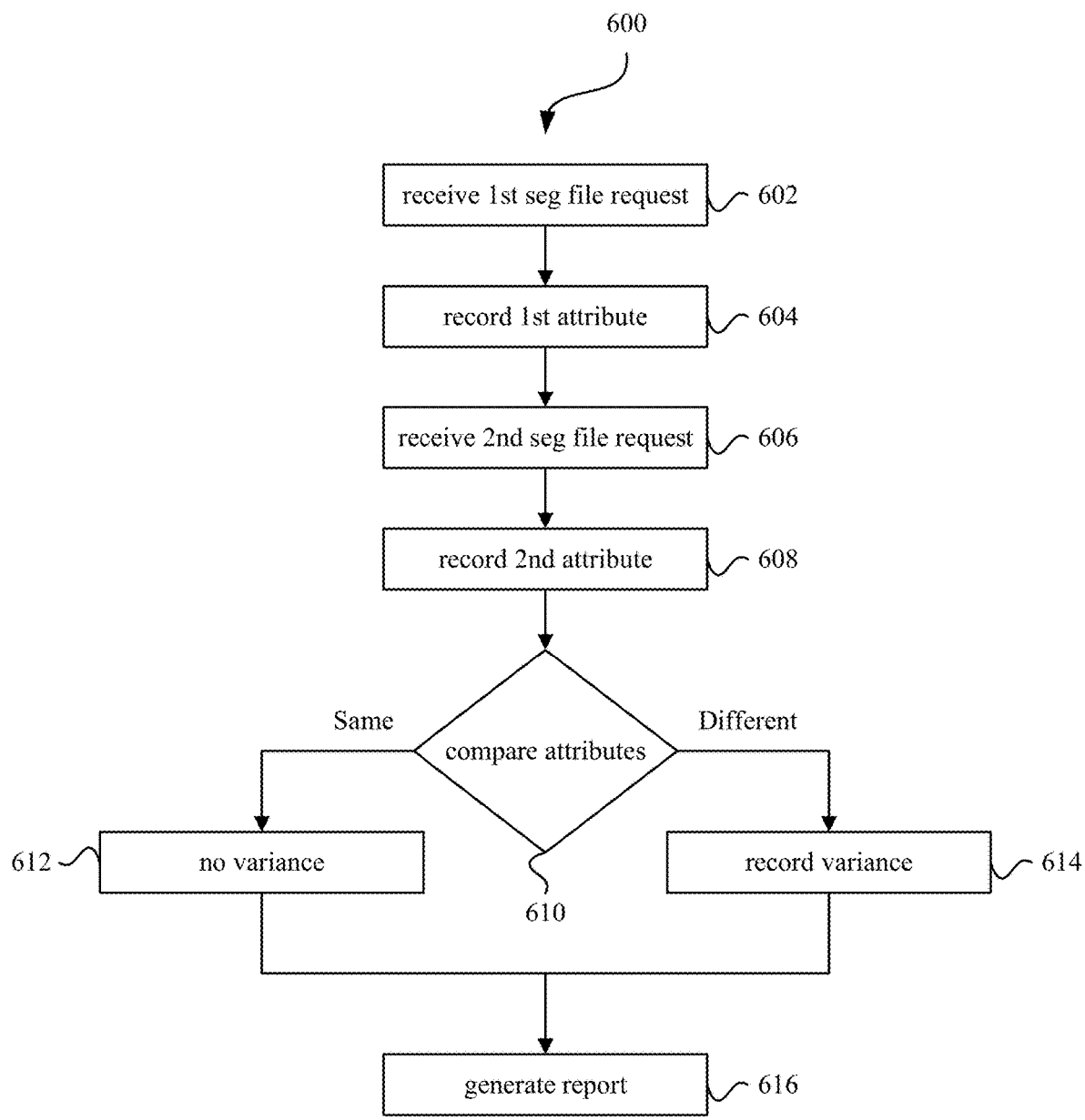
FIG. 6 is a flowchart of one embodiment of a process for measuring the performance of adaptive streaming video deliveries.

Referring now to FIG. 6, a flowchart is shown illustrating an example process 600 for measuring the performance of adaptive streaming video deliveries based on such service measurement records. Process 600 can be performed, for example, by a performance administrator in conjunction with one or more segment file servers.

At block 602, a first segment file request for a video segment file is received. A URL that references the video segment file is received with the request. The URL includes a character string designating the content provider, a session ID, and a path that identifies the requested video segment file, which can also include, or be associated with, the encoding bitrate of the video segment file. The request can also include additional information, such as data identifying the access network of the user device that transmitted the request (e.g., an IP address of the access network), the access network type, the user agent that transmitted the request, and any other information that is transmitted with URL requests. The segment file server, or another network component such as a switch, router, or data collection component, can determine additional information associated with the request, such as the time that the first data packet of the request is received, the time that any other data packet of the request is received, the time that delivery of the requested segment file is completed, packet loss and variations in packet transmissions associated with the request for, and delivery of, the requested segment file. At block 604, an attribute of the first segment file request is recorded. The recorded attribute can include any of the information that is received with the request, including information in the URL or the request message, or can include additional information, determined by the segment file server or another network component, associated with the request for, or delivery of, the requested segment file delivery. The session ID is recorded with the attributes. In one embodiment, the attributes are recorded in a database that is indexed by the session ID.

At block 606, a second segment file request is received for the same video viewing session. Thus, the second segment file request includes the same session ID as the first segment file request. At block 608, an attribute of the second segment file request is recorded with the session ID. At block 610, the recorded attribute of the first segment file request is compared to the recorded attribute of the second segment file request. If the attribute of the first request is the same as the attribute of the second request, process 600 continues to block 612 and variance is not recorded for this session. If the attribute of the first request is different than the attribute of the second request, a variance is recorded for the session at block 614. At block 616, a report is generated for the number or percentage of sessions that a variance is recorded for. The report can be generated periodically, for example hourly, daily, weekly, monthly or quarterly, or by the second, minute, part of an hour, day part, or other time interval, for viewing sessions during the period. The report can also be generated with specified parameters, such as for a specific service provider.

In this embodiment, the recorded attribute is the encoding bitrate of the request video segment file. Thus, by comparing the encoding bitrate of the first requested video segment file with the encoding bitrate of the second requested video segment file, it can be determined if there is a variance in the video quality during the viewing session, for example, due to network congestion, which could be noticed by the user. The report indicates the number or percentage of times a variance occurred during playback of the video for a certain period of time. This type of data can be desirable to content providers, for example, for quality control purposes.

The performance administrator may derive additional service measurement records, referred to herein as derived service measurement records, in particular using video segment serving records and redirect serving records to determine derived infrastructure service provider measurements (as described elsewhere in this disclosure; see e.g. "Variant HLS Manifest Files: HLS Manifest Files that Comprise Video Segment File URLs" and "The Segment Redirect Processor").

If an infrastructure service provider supports configuration of Session IDs in service provider segment delivery URLs and provides video segment file delivery records containing Session IDs, the performance administrator also may receive these video segment file delivery records from the infrastructure service provider, referred to herein as supplemental service measurement records. Supplemental service measurement records are normalized to a standardized form, typically (though not necessarily) corresponding to service measurement records, and data elements are reduced to canonical form (e.g., timestamps are converted to a standardized time).

In an optional aspect of the primary embodiment and secondary embodiment, supplemental service measurement records may be further classified as consistent (i.e., reliable) or not consistent, either arbitrarily or by analysis, for example by calculating the elapsed time from the completion of issuance of a redirect segment URL (as contained in the applicable service measurement record) to the receipt of the corresponding service provider segment delivery URL at the infrastructure service provider (as contained in the applicable supplemental service measurement record) and comparing this time to the same measurement made using one or more benchmark segment redirect URLs, including benchmark segment redirect URLs with the same Session ID, or other comparable benchmark segment redirect URLs, or as another example, comparing supplemental service measurement records to corresponding derived service measurement records to detect and characterize anomalies. Classification of a supplemental service measurement record as consistent or not consistent may be specific to the context of its use, for example, a supplemental service measurement record may be classified as consistent for purposes of counting the number of sessions delivered by an infrastructure service provider or measuring the volume of data delivered by an infrastructure service provider, but not for the purpose of measuring the timing of segment file deliveries or the performance of the infrastructure service provider.

The performance administrator may aggregate service measurement records, derived service measurement records, and optionally may include in a given aggregation the supplemental service measurement records that are consistent for the specific purpose (and adjusts the derived service measurement records included in the given aggregation accordingly), in a number of ways:

Longitudinal session records, compiling all of the included service measurement records for a Session ID in video playback sequence, establishing the measured service performance of that individual video delivery, monitoring progress through a video playback session as it occurs, and aggregating and/or calculating: the video bandwidth selected by the video playback component of the requesting user device, or otherwise in use, at each measured point in time and sustained through time; duration of video playback and volume of video data delivered during playback; variation in the timing and intervals between video segment file URL requests and/or completed video segment file deliveries during playback; progress through video playback and the point at which video playback stopped (including whether video playback reached the last video segment file); changes in delivery performance in the interval before video playback stopped; and statistical measures of measured TCP packet-level metrics.

Digital service aggregated records, compiling all of the included service measurement records for a given period by digital service, sub-aggregated by infrastructure service provider and by combination of infrastructure service provider and user access network, and optionally further sub-aggregated by video mode (on-demand video or linear video) and by video or category of video, including and/or calculating: aggregate sustained bandwidth per user; variability in sustained bandwidth per user; average user progress through video playback and average video playback stopping point; variability in delivery performance; duration of video playback and volume of video data delivered during playback; and statistical measures of measured TCP packet-level metrics.

Infrastructure service provider aggregated records, compiling all of the included service measurement records for a given period by infrastructure service provider, by user access network, and by combination of infrastructure service provider and user access network, optionally sub-aggregated by video mode (on-demand video or linear video), by category or type of digital service, or by video attribute (such as total duration of a video, including all video segment files from beginning to end of playback), including and/or calculating: average sustained bandwidth per user, variability in sustained bandwidth per user, average user progress through video playback and average video playback stopping point, variability in delivery performance, and measured TCP packet-level metrics.

This information may be provided to the service provider manager, which may use this information as previously described (see "The Service Provider Manager" section). In an optional aspect of the primary embodiment and secondary embodiment, the performance administrator also may alert the service provider manager when the derived service measurement records and/or the consistent supplemental service measurement records for an infrastructure service provider indicate degrading or poor performance by the infrastructure service provider, globally or in a given region, universally or specifically for a given digital service.

In an optional aspect of the primary embodiment and secondary embodiment, as part of its monitoring progress through a video playback session as it occurs, the performance administrator notifies the cluster performance manager as the request for a video segment delivery URL approaches, and in turn the cluster performance manager can, if necessary or desirable in the circumstances, notify the segment file server identified in the hostname in the video segment delivery URL, or alternatively a library storage server supporting that segment file server, to request the source video segment file, if it does not already have it, before the video segment delivery URL request arrives.

This information also may be provided to the segment redirect processor, which uses this information as previously described (see "The Segment Redirect Processor" section). In an optional aspect of the primary embodiment and secondary embodiment, the performance administrator also alerts the segment redirect processor when the derived service measurement records and/or the consistent supplemental service measurement records for an infrastructure service provider indicate degrading or poor performance by the infrastructure service provider, globally or in a given region, universally or specifically for a given digital service.

The performance administrator may further aggregate service measurement records, derived service measurement records, and optionally may include in a given aggregation the supplemental service measurement records that are consistent for the specific purpose (and adjusts the derived service measurement records included in the given aggregation accordingly), in a number of additional ways:

Digital service business measurement records, compiling all of the included service measurement records for a given period by digital service, calculating aggregated volume of data transferred on behalf of the digital service by the network of infrastructure components over a given period of time and bandwidth used at each given point in time, in both cases inclusive of TCP packet-level metrics, including packet re-sends, and sub-aggregated by differentiated billing regions (if and as applicable). This information may be used for billing the digital service for its use of the network of infrastructure components.

Digital service analytical measurement records, compiling all of the included service measurement records for a given period by digital service, sub-aggregated by any of, or any combination of, region, user access network, requesting device type or class, requesting device user agent, video mode (on-demand video or linear video), and by video or category of video, including and/or calculating: number of videos started; number and percentage of videos completed; average duration of video playback; number and percentage of users to complete playback at each video segment file in video playback sequence; aggregate sustained bandwidth per user; and variability in sustained bandwidth per user. This information has analytical value to digital services.

Infrastructure component performance records, compiling all of the included service measurement records by segment file server or other infrastructure component and calculating its measured performance, including measured TCP packet-level metrics. This information may provide a different assessment, as opposed to the assessment of the cluster performance manager, of the operating effectiveness of a segment file server or other infrastructure component. For example, a segment file server may be measured by the cluster performance manager at only 25% processor utilization (apparently operating effectively) and yet may be experiencing an abnormally high rate of TCP packet loss (and therefore, packet re-sends); if the high rate of TCP packet loss is associated with video segment file deliveries to requesting devices connected to a particular network, the problem may be attributable to that network (a conclusion that would be reinforced by the same condition experienced on other segment file servers and associated with video segment file deliveries to requesting devices connected to the same network); conversely, if the high rate of TCP packet loss is associated with most or all video segment file deliveries, and is not correlated with video segment file deliveries to requesting devices connected to any particular network, then the problem is much more likely internal to the segment file server. This information is also provided to the cluster performance manager, which uses it to evaluate the operating condition of segment file servers and other infrastructure components. In an optional aspect of the primary embodiment and secondary embodiment, the performance administrator also alerts the cluster performance manager when the video segment serving records for a given segment file server indicate degrading or poor performance by the segment file server.

Other analytical measurement records, compiling all of the included service measurement records for a given period by other relevant organizing criterion, for example, end user access network, sub-aggregated by any of, or any combination of, region, requesting device type or class, requesting device user agent, video mode (on-demand video or linear video), and by video, category of video, or duration of video, including and/or calculating: number of videos started; number and percentage of videos completed; average duration of video playback; number and percentage of users to complete playback at each video segment file in video playback sequence; aggregate sustained bandwidth per user; and variability in sustained bandwidth per user; or, as another example, end user device type and user agent, sub-aggregated by any of, or any combination of, region, user access network, video mode (on-demand video or linear video), and by video, category of video, or duration of video, including and/or calculating: number of videos started; number and percentage of videos completed; average duration of video playback; number and percentage of users to complete playback at each video segment file in video playback sequence; aggregate sustained bandwidth per user; and variability in sustained bandwidth per user. This information has analytical value to the operator of the network of infrastructure components, digital services, infrastructure service providers, analysts, and other market and industry participants.

In an optional aspect of the primary embodiment and secondary embodiment, data aggregated by the performance administrator with respect to one or more digital services can be used in lieu of data collected with respect to, and aggregated by the performance administrator with respect to, another digital service. For example, a particular digital service may have limited or no aggregated data in a specific region, with respect to a particular access network, with respect to a subject protocol, or with respect to a certain video streaming workflow. In such circumstances, it may be desirable to use data aggregated by the performance administrator with respect to the particular digital service under other circumstances; or to use data aggregated by the performance administrator with respect to a separate digital service that is affiliated with the particular digital service; or to use data aggregated by the performance administrator with respect to one or more separate digital services. Uses of such aggregated data may include, for example, selecting infrastructure service providers for video streams of the particular digital service, or identifying anomalies within the data aggregated with respect to the particular digital service.

The performance administrator also may receive service provider request records from segment file servers, and if the network of infrastructure components includes optional library storage servers, service provider request records and library segment serving records from the library storage servers. The performance administrator aggregates these service provider request records, sub-aggregated by digital service, by infrastructure service provider, and by combination of digital service and infrastructure service provider. This information quantifies the total requests made by the network of infrastructure components to the digital service's infrastructure provider to obtain source video segment files.

In certain embodiments, additional attributes of the requests or measurements of the delivery of the video segment files can be recorded and used for different purposes. The recorded data can be aggregated for a given period by any of the following parameters: session, video, video mode, video category, geographical region, content provider, service provider, and user access network. Then, based on the aggregated data, performance statistics and reports can be generated for the given period and the given parameters. For example, statistics and reports can be generated for the average encoding bitrate used during playback, the number of requests for each video segment file, and the average progress through video playback or average stopping point of video playback.

The recorded data can also be used to manage content delivery among multiple infrastructure service providers for optimal network performance and user experience. Recorded attributes and measurements can be analyzed in real-time or periodically to determine network performance for a combination of parameters. For example, network performance can be determined for different combinations of service providers and user access networks. Then, when a request for a variant manifest file is received, the URLs in the issued variant manifest file can be configured based on the analysis to designate the service provider that has the best network performance for the access network that the request was received from.

Figure 7A:
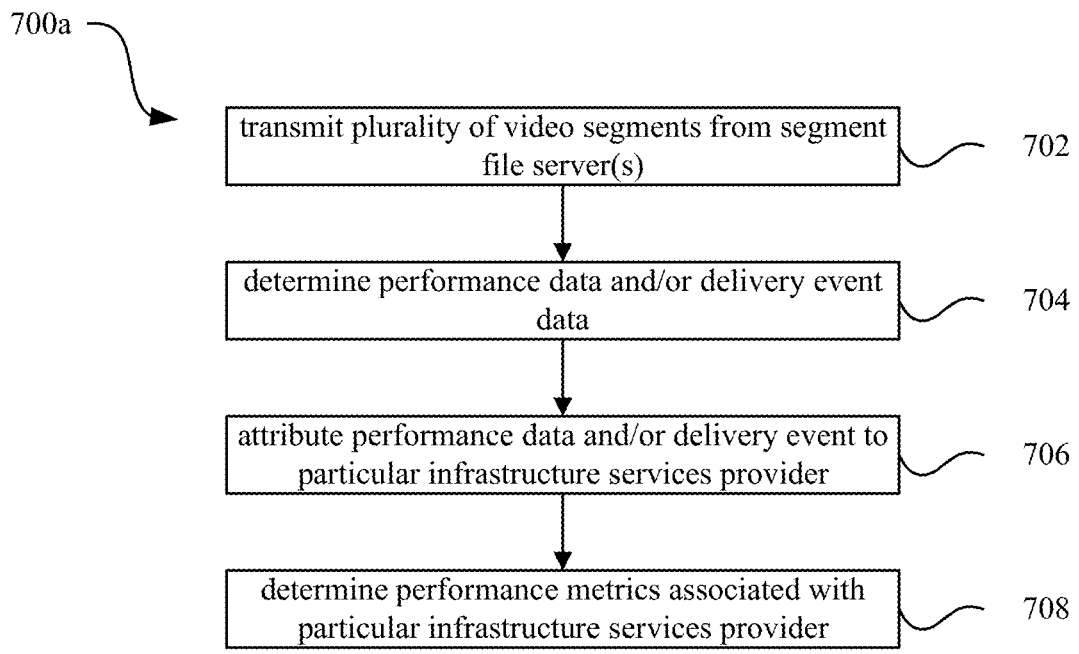
FIGS. 7A and 7B are flowcharts illustrating embodiments of processes for determining adaptive streaming video delivery performance metrics of infrastructure service providers, and configuring requested manifest files based on the determined performance metrics.
Figure 7B:
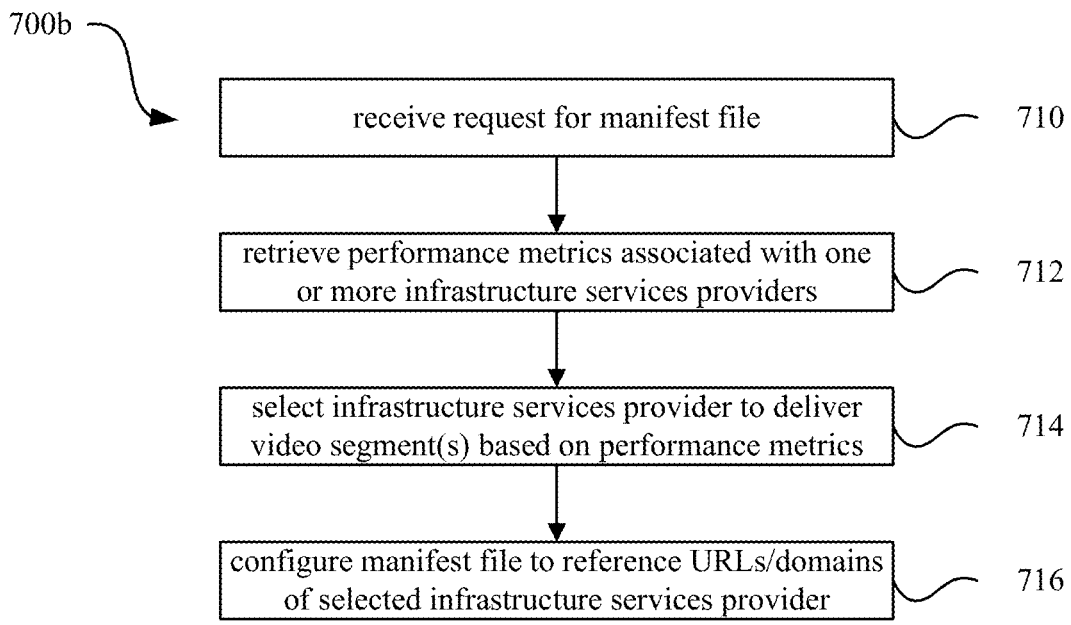

For example, referring now to FIGS. 7A and 7B, two examples flowcharts are shown illustrating processes for determining performance metrics for one or more infrastructure service providers (FIG. 7A), and then selecting one or more infrastructure service providers to deliver adaptive streaming video based on the determined performance metrics (FIG. 7B). In step 702, one or more segment file servers of a system 100 may transmit a plurality of video segments to recipients of an adaptive streaming video, using the techniques and processes described in the above embodiments. In step 704, performance data and/or video delivery events may be determined using the data detected during the delivery of the video segments by the segment file servers of the system 100. As discussed above, the performance data determined in step 704 may include, for example, a bitrate upshift or downshift, a buffering event, a server failure, and/or any other recorded variance data or any other video delivery performance data. In step 706, the segment file server(s) and/or performance administrator may attribute the performance data and/or delivery event data detected in step 704 to one or more infrastructure service providers 122 or 124. For example, in embodiments in which URLs of video segment files that reference the segment file server(s) of the system 100 are interspersed with other URLs of video segment files referencing an infrastructure service provider (e.g., FIG. 5), the performance administrator and/or segment file server(s) of the system 100 may attribute the performance data to the infrastructure service provider referenced by the other URLs. In step 708, the determined performance data and/or delivery event data attributed to one or more particular infrastructure service providers may be collected, aggregated, and/or analyzed in order to determine performance metrics for the infrastructure service providers. Thus, by monitoring and measuring data only from video segment file deliveries by the segment file servers 106 and/or 112, the system 100 may determine performance metrics for external infrastructure service providers 122 and/or 124 that are operated entirely separately from the system 100.

In some embodiments, steps 702-708 may be performed a number of different times to collect various performance metrics for a single infrastructure service provider and for multiple different infrastructure service providers. The performance data collected and aggregated for infrastructure service providers 122 and 124 may be based on any of the video delivery factors or variables described herein.

In step 710, after an infrastructure service provider performance metric data has been collected and stored, for example, by the performance administrator, a new request may be received for a manifest file for an adaptive streaming video. The request generally may be handled by a manifest file handler 106 or 112 of the system 100, using the same or similar techniques to those discussed above. Additionally, in step 712, the manifest file handler may retrieve the performance metrics determined in step 708 for one or more infrastructure service providers that may potentially provide the requested adaptive streaming video. In step 714, the manifest file handler may select one of the available infrastructure service providers based at least in part on the performance metrics determined in step 708 determined for the one or more infrastructure service providers. The selection of an infrastructure service provider in step 714 also may be based on a variety of other factors, including any of the above factors or techniques discussed in above embodiments. In step 716, the issued manifest file may be configured with URLs that reference the infrastructure service provider selected in step 714, using the techniques discussed above.

Figure 8A:
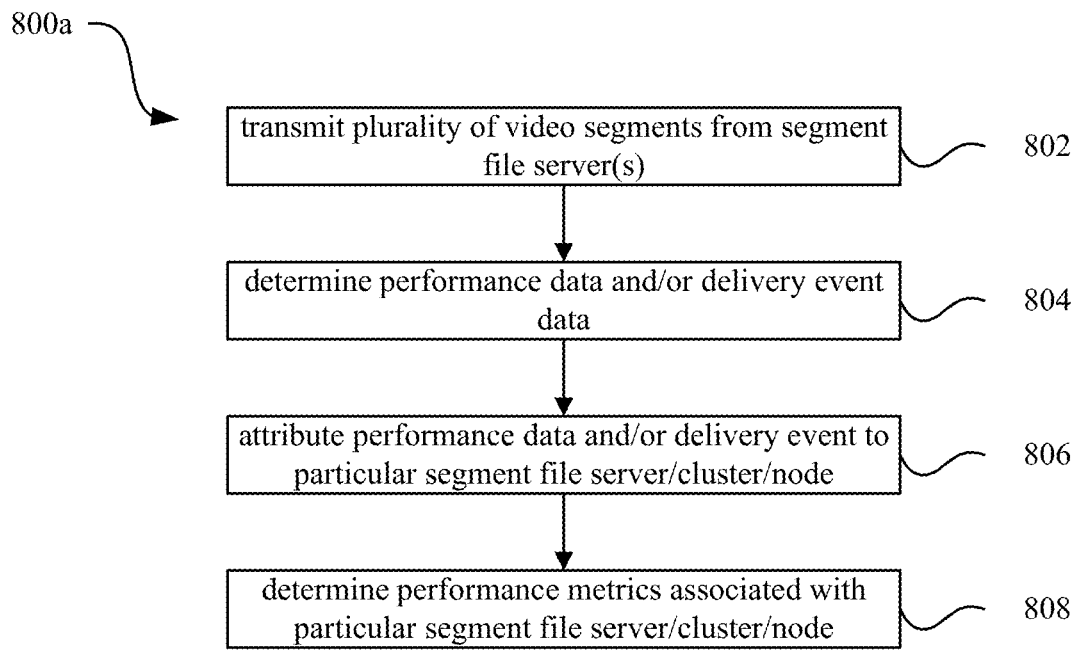
FIGS. 8A and 8B are flowcharts illustrating embodiments of processes for determining adaptive streaming video delivery performance metrics of servers, clusters, or nodes of segment file servers, and configuring requested manifest files based on the determined performance metrics.
Figure 8B:
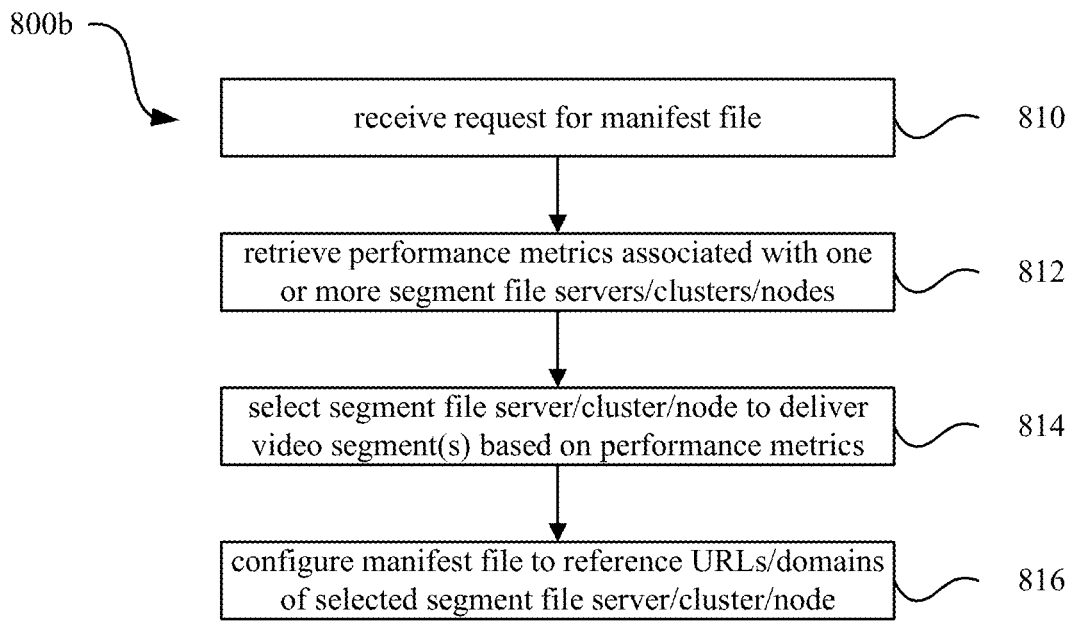

In addition to monitoring performance data during delivery of video segment files, and using performance metrics to select infrastructure service providers 122 and 124 for subsequent deliveries, certain embodiments described herein may include determining performance metrics for particular servers, clusters, and/or nodes of segment file servers 108 and 114 and using these performance metrics to select particular servers, clusters, and/or nodes of segment file servers 108 and 114 for subsequent deliveries of video segment files. For example, referring now to FIGS. 8A and 8B, two examples flowcharts are shown illustrating processes for determining performance metrics for one or more segment file servers, clusters, and/or nodes (FIG. 8A), and then selecting one or more segment file servers, clusters, and/or nodes to deliver adaptive streaming video based on the determined performance metrics (FIG. 8B). In step 802, one or more segment file servers of a system 100 may transmit a plurality of video segments to recipients of an adaptive streaming video, using the techniques and processes described in the above embodiments. In step 804, performance data and/or video delivery events may be determined using the data detected during the delivery of the video segments by the segment file servers of the system 100. As discussed above, the performance data determined in step 704 may include, for example, a bitrate upshift or downshift, a buffering event, a server failure, and/or any other recorded variance data or any other video delivery performance data. In step 806, the segment file server(s) and/or performance administrator may attribute the performance data and/or delivery event data detected in step 804 to one or more particular servers, clusters, and/or nodes of segment file servers 108 and 114. In step 808, the determined performance data and/or delivery event data attributed to one or more particular servers, clusters, and/or nodes of segment file servers may be collected, aggregated, and/or analyzed in order to determine performance metrics for the particular servers, clusters, and/or nodes of segment file servers.

In some embodiments, steps 802-808 may be performed a number of different times to collect various performance metrics for single servers, clusters, and/or nodes of the segment file servers 108 and 114, and for multiple different servers, clusters, and/or nodes of the segment file servers. The performance data collected and aggregated for particular servers, clusters, and/or nodes of segment file servers may be based on any of the video delivery factors or variables described herein.

In step 810, after performance metric data has been collected and stored for particular servers, clusters, and/or nodes of segment file servers, for example, by the performance administrator, a new request may be received for a manifest file for an adaptive streaming video. The request generally may be handled by a manifest file handler 106 or 112 of the system 100, using the same or similar techniques to those discussed above. Additionally, in step 812, the manifest file handler may retrieve the performance metrics determined in step 808 for one or more particular servers, clusters, and/or nodes of segment file servers that may potentially provide the requested adaptive streaming video. In step 814, the manifest file handler may select one of the available particular servers, clusters, and/or nodes of the segment file servers 108 or 114 based at least in part on the performance metrics determined in step 808 determined for the one or more particular servers, clusters, and/or nodes of segment file servers. The selection of a particular server, cluster, and/or node of the segment file servers in step 814 also may be based on a variety of other factors, including any of the above factors or techniques discussed in above embodiments. In step 816, the issued manifest file may be configured with URLs that reference the particular servers, clusters, and/or nodes of segment file servers selected in step 814, using the techniques discussed above.

Generated or Supplied Manifest File Data

In an optional aspect of the primary embodiment and secondary embodiment, it may be desirable to generate manifest file data from sources other than manifest files. For example, manifest files may contain incorrect metadata associated with some or all of the video segment files referenced in the manifest file; in such circumstances, it may be desirable to generate manifest file data from other sources in order to compare it to the data contained in manifest files and identify and/or correct such errors.

Further, in an alternative embodiment, it may be necessary or desirable for the network of infrastructure components to operate without interacting with, or with partial or no access to, manifest files, and therefore (in this alternative embodiment) with limited or no involvement of the Manifest File Handler 204; for example, an unrelated service may receive requests for manifest files from user devices and in response issue manifest files that contain video segment file URLs, wherein the video segment file URLs contain a hostname designating the network of infrastructure components. In this alternative embodiment, the network of infrastructure components can serve some video segment file requests and redirect other video segment file requests to one or more infrastructure service providers; however, in the absence of manifest file data, the performance administrator may have only a limited ability to accurately determine service measurement records, derived service measurement records, and/or other measurements and records. Accordingly, in this alternative embodiment, it may be desirable to supply manifest file data to, or generate manifest file data for, the performance administrator and/or another component of the network of infrastructure components in order to improve the functioning and accuracy of the performance administrator, improve the functioning and accuracy of one ore more other components of the network of infrastructure components, and/or improve the collection of, and/or accuracy of, service measurement data.

Accordingly, in this optional aspect of the primary embodiment and secondary embodiment, and/or in the aforementioned alternative embodiment, segment file servers 212, and/or other components in the network of infrastructure components, and/or other systems related or unrelated to the network of infrastructure components supply manifest file data to the performance administrator or other component of the network of infrastructure components; or, segment file servers 212, and/or other components in the network of infrastructure components, and/or other systems related or unrelated to the network of infrastructure components generate manifest file data from other available data.

Manifest file data can be generated in a number of ways:
Video segment files will normally be requested sequentially during a video play, not randomly or indeterminately, with allowance for occasional variation based on differences in user behavior (pause, rewind, skip, etc), and therefore the sequence and timing of video segment file requests, both within a given video play and in aggregate across multiple independent video plays, can be processed to derive manifest file data.
Video segment file URLs—the character strings themselves—may contain consistent information and/or information that varies consistently, and therefore that can be parsed to generate manifest file data. For example, when a video file is initially segmented and manifests are created, it is often the case (though not always) that the encoding bitrate of the video file is included in the URL path and/or that the individual segments from the file are named consistently and with an appended or inserted sequence number, and further that they are numbered sequentially and not randomly or otherwise out of order.

Video segment files may contain data that can be observed to generate manifest file data, for example the file size (e.g., in megabytes), or that can be either observed or derived to generate manifest file data, for example the encoded bit rate of the video segment file.

Video segment files may contain metadata that can be extracted to generate manifest file data. For example, in HLS, video segment files are configured as MPEG-2 transport streams, and therefore contain presentation timestamps within them; presentation timestamps comprise metadata with respect to the stream and the position and timing of the segment file within the stream; accordingly, manifest file data can be generated by inspecting the presentation timestamps of individual video segment files and by aggregating the presentation timestamps of multiple sequential video segment files.

The Secondary Embodiment: Linear Video

Returning to the primary embodiment and secondary embodiment, after the manifest file handler issues the Variant HLS manifest file, the primary and secondary embodiments may differ in some respects due to differences in how the HLS protocol itself works in on-demand video and linear video use cases:

In on-demand video (which is supported by the primary embodiment), the Variant HLS manifest file for the entire video program is returned to the requesting device; when the requesting device reaches the end-list tag in the Variant HLS manifest file, playback has reached the end of the video and stops.

In linear video (which is supported by the secondary embodiment), a Variant HLS manifest file for the currently transmitting portion of the linear video transmission is returned to the requesting device; before, or as, the requesting device requests the last video segment entry in the Variant HLS manifest file, the requesting device requests a refresh of the Variant HLS manifest file and obtains additional video segment entries; this process is repeated, with no preset ending point and continuous periodic refreshes of the Variant HLS manifest file, until the device stops requesting refreshes of the Variant HLS manifest file (for example, because the user stops playback of the linear video transmission) or until there are no more available refreshes of the Variant HLS manifest file (for example, because the linear video transmission has reached its end, such as at the end of a live sports or music event).

In the secondary embodiment, in response to a request for a refreshed Variant HLS manifest file, the manifest file handler may configure and return to the requesting device an issued refreshed Variant HLS manifest file in the same manner that it issues a Variant HLS manifest file. Note that the request for the refreshed Variant HLS manifest file uses the Variant HLS manifest file URL configured by the manifest file handler in the issued Master HLS manifest file, as previously described; the Variant HLS manifest file URL was configured by the manifest file handler with the Session ID included in the URL, as previously described; and accordingly, each request to refresh the Variant HLS manifest file is made using a Variant HLS manifest file URL that includes the Session ID, enabling the manifest file handler to configure Variant HLS manifest file refreshes throughout the video delivery, consistently when that is desirable (for example, repeatedly designating the same segment file server hostname, which minimizes hostname DNS resolutions and positively influences the video segment file cache efficiency of a segment file server), but also dynamically, when that is desirable. For example, in the secondary embodiment the performance administrator and service provider manager capitalize on the immediate delivery of service measurement records to the performance administrator by segment file servers and segment redirect processors, which then further enables the performance administrator to immediately derive derived service measurement records;

together, the service measurement records and the derived service measurement records enable the performance administrator to compile longitudinal session records in near real-time, monitoring progress through a video playback session as it occurs;

the performance administrator can identify video deliveries experiencing abnormal or sub-optimal performance and notify the service provider manager, which in turn, can provide adjusted video segment file URL configuration information to the manifest file handlers responding to requests for refreshed Variant HLS manifest files for the affected video deliveries;

thereby switching the affected video deliveries, as they are occurring, from the poorly performing infrastructure service provider to another infrastructure service provider, or from the poorly performing infrastructure service provider to the network of infrastructure components, resolving the abnormal or sub-optimal performance conditions of the affected video deliveries.

Similarly, in the secondary embodiment, cluster performance managers can allocate video segment delivery URLs among segment file servers, or groups or clusters of segment file servers, adjusting the allocations as the video deliveries occur by working in conjunction with manifest file handlers as Variant HLS manifest files refreshes are requested, balancing the allocations of video segment delivery URLs among segment file servers and rebalancing the allocations when and if necessary as aggregate conditions change.

In an optional aspect of the secondary embodiment, the network of Infrastructure Components can include one or more video encoders, transcoders, and/or packagers, or can work in conjunction with one or more separately operated encoders, transcoders, and/or packagers. In this optional aspect of the secondary embodiment, a video encoder can receive a video signal, typically originating externally from the network of infrastructure components, and encode the signal into one or more adaptive streaming video streams for handling by the network of infrastructure components; a video transcoder can transcode the encoded adaptive streaming video stream to one or more additional bitrates or formats, or can receive an encoded adaptive streaming video stream originating externally from the network of infrastructure components and transcode it to one or more additional bitrates or formats, in either case for handling by the network of infrastructure components; and a video packager can format an encoded or transcoded adaptive streaming video stream into a container for handling by the network of infrastructure components. In addition, in this optional aspect of the secondary embodiment the network of infrastructure components can optionally receive one or more previously encoded adaptive streaming video streams from one or more external sources or locations; encoders, transcoders, and/or packagers can optionally receive multiple video signals and/or encoded adaptive video streams from multiple internal and external sources or locations; and optionally, the multiple internal and external sources or locations can be associated with multiple, different digital services.

Additional Embodiment(s) that Utilize a Session Association Repository or Session Association Service In one or more additional embodiments, which may be referred individually or in combination as a first additional embodiment, once a Session ID has been assigned by the network of infrastructure components, the character string that identifies, or is associated with, the digital service associated with the requested video is optionally no longer included in any of, or any combination of, some or all HLS manifest file URLs, some or all video segment delivery URLs, or some or all other URLs. Instead, the Session ID, which is included in these URLs, is associated by the network of infrastructure components with the digital service that is associated with the requested video; this session association is then available to, and can be looked up by or requested by, any infrastructure component that requires it. For example, in the case of a segment file server that needs to configure a digital service URL or infrastructure service provider URL to request a video segment file that has been requested from it but that it does not have in storage, in these embodiments the segment file server, rather than looking up the hostname to be used in the digital service request in the hostname authorities file using the character string that identifies the digital service, would retrieve the digital service hostname by looking up the Session ID in the repository of session associations and retrieving the corresponding digital service hostname, or by requesting the digital service hostname, using the Session ID as the basis for the request, from another infrastructure component that maintains the associations between Session IDs and digital service hostnames, or an equivalent session association repository or session association service maintained by the network of infrastructure components.

Similarly, in this first additional embodiment, once a Session ID has been assigned by the network of infrastructure components, some or all character strings that identify, or are associated with, the requested video content, for example the path portion of a digital service URL, are optionally no longer included in any of, or any combination of, some or all HLS manifest file URLs, some or all video segment delivery URLs, or some or all other URLs. Instead, the Session ID, which is included in these URLs, is associated by the network of infrastructure components with the requested video content; this session association is then available to, and can be looked up by or requested by, any infrastructure component that requires it. For example, in the case of a segment file server that needs to configure a digital service URL or infrastructure service provider URL to request a video segment file that has been requested from it but that it does not have in storage, in these embodiments the segment file server, rather than retrieving the path portion of the digital service URL from the requested URL, would retrieve the path portion of the required digital service URL or infrastructure service provider URL or by looking up the Session ID in the repository of session associations and retrieving the corresponding path portion of the digital service URL, or by requesting the path portion of the digital service URL, using the Session ID as the basis for the request, from another infrastructure component that maintains the associations between Session IDs and the path portions of digital service URLs, or an equivalent session association repository or session association service maintained by the network of infrastructure components.

Combining these two optional aspects of this additional embodiment, the network of infrastructure components optionally relies on the Session ID, once assigned, and a set of associations of that Session ID to digital service hostnames, digital service URL paths, and similar related information. Therefore using both of these optional aspects of this additional embodiment, URLs included in HLS manifest files would contain a hostname associated with the network of infrastructure components, the Session ID (typically, though not necessarily, configured in the URL path); a control character string (comprising a single control character string or optionally two control character strings, as further described herein) that is unique within any group of URLs with a common hostname, Session ID, and file extension (because multiple URLs containing only the Session ID would be identical, whether in a single HLS manifest file or across multiple HLS manifest files, whereas a complete set of source HLS manifest files requires, in practical operating circumstances, that each URL contained within it, whether an HLS manifest file URL or a video segment file URL, be unique as compared to the other URLs contained within the complete set), plus the appropriate file extension, and optionally little or nothing more. For example:

when the manifest file handler receives an initial device request for an HLS manifest file, in addition to returning an HLS manifest file to the requesting user device, the manifest file handler updates the session association repository or session association service with the Session ID of the new session, the URL of the initial device request, the IP address of the requesting device, the user agent specified in the initial device request for the HLS manifest file, and any other information contained in the initial device request for the HLS manifest file that will be potentially be needed by any other infrastructure component, for example the contents of query strings included in the initial device request URL; thereafter, all of this information is associated with the Session ID and available to any infrastructure component with access to the session association repository or session association service;

a Master HLS index configured by the manifest file handler and returned to the requesting user device contains Variant HLS manifest file URLs, each comprising: a hostname associated with one or more manifest file handlers, one or more groups or clusters of manifest file handlers, or the network of manifest file handlers; a Session ID; a control character string specific to each URL and unique within the group of URLs with a common Session ID and file extension; and the ".m3u8" file extension;

the requesting device would then issue one or more requests for these Variant HLS manifest file URLs, which would be directed to the designated manifest file handler(s), group(s) or cluster(s) of manifest file handlers, or the network of manifest file handlers, as described in various embodiments in this disclosure;

when a manifest file handler receives a subsequent request for one of these Variant HLS manifest file URLs (which, as a reminder, is a request for a Variant HLS manifest file), it would then use the Session ID and the control character string present in the URL to look up in, or request from, the session association repository or session association service the configuration information for the Variant HLS manifest file corresponding to the Session ID and the control character string contained in the requested Variant HLS manifest file URL;

this configuration information comprises the type and contents of the issued video segment file URL to be configured corresponding to each source video segment file URL in the source Variant HLS manifest file;

the manifest file handler configures and returns to the requesting device an issued Variant HLS manifest file configured with video segment file URLs (and, as in the primary embodiment and secondary embodiment, the metadata as contained in the source Variant HLS manifest file;

in this embodiment, each video segment delivery URL comprises: a hostname associated with one or more segment file servers, one or more groups or clusters of segment file servers, or the network of segment file servers; the Session ID; a control character string specific to each URL and unique within the URLs with a common hostname, Session ID, and file extension (or, optionally, the control character string contained in the requested Variant HLS manifest file URL, and a second control character string unique within the URLs comprising a particular Variant HLS manifest file and containing a common hostname); and the ".ts" file extension;

the requesting device would then issue one or more requests for these video segment delivery URLs, which would be directed to the designated segment file server(s), group(s) or cluster(s) of segment file servers, or the network of segment file servers, as described in various embodiments in this disclosure;

when a segment file server receives a request for one of these video segment delivery URLs, it uses the Session ID and the control character string (or, in the optional implementation using two control character strings in video segment file URLs configured in the Variant HLS manifest file, the Session ID and the first and second control character strings) to look up in, or request from, the session association repository or session association service the video segment file to serve in response to the request;

in the case where the segment file server does not already have the video segment file, it also uses the Session ID and the control character string (or, in the optional implementation using two control character strings in video segment file URLs configured in the Variant HLS manifest file, the Session ID and the first and second control character strings) to look up in, or request from, the session association repository or session association service the information necessary to configure a digital service URL or infrastructure service provider URL to request the video segment file;

in this embodiment, as in the first embodiment and second embodiment, the issued Variant HLS index may also contain service provider segment delivery URLs; no control character string is required in the configuration of these URLs;

optionally, in this embodiment, as in the first embodiment and second embodiment, the issued Variant HLS manifest file may also contain segment redirect URLs; segment redirect URLs each comprise a hostname associated with one or more segment redirect processors, one or more clusters of segment redirect processors, or the network of segment redirect processors; the Session ID; a control character string specific to each URL and unique within the URLs with a common hostname, Session ID and file extension (or, optionally, the control character string contained in the requested Variant HLS manifest file URL, and a second control character string unique within the URLs comprising a particular Variant HLS manifest file and containing a common hostname); and the ".ts" file extension;

when a segment redirect processor receives a request for one of these segment redirect URLs, it uses the Session ID and the control character string (or, in the optional implementation using two control character strings in video segment file URLs configured in the Variant HLS manifest file, the Session ID and the first and second control character strings) to look up in, or request from, the session association repository or session association service the URL, typically a service provider segment delivery URL but optionally a video segment delivery URL, to include as the redirect URL in the HTTP 302 Redirect message served in response to the URL request;

note that, as used in this description of the first additional embodiment, the purpose of a unique character string is to avoid name space collisions resulting from multiple URLs consisting of identical character strings but intended to retrieve different manifest files, video segment files, redirect URLs, or other returned results; accordingly, as used in describing this first additional embodiment, "unique" can mean in terms of composition, placement within the URL, or other basis by which the URL becomes distinguishable from other URLs as a result of the control character string.

Note that other infrastructure components may have access to the session association repository or session association service as well, including, but not limited to:

A cluster performance manager may access the session association repository or session association service to retrieve session-specific information, such as the requesting device IP address, requesting device user agent, and requested video content associated with the Session ID, and can use this retrieved session-specific information to determine (and return to the manifest file handler) the manifest file handler(s), or cluster(s) or group(s) of manifest file handlers, or the network of manifest file handlers, to be designated, by use of hostnames, in Variant HLS manifest file URLs included in an issued Master HLS manifest file. Similarly, the cluster performance manager can use this session-specific information to determine (and return to a manifest file handler), the segment file server(s), or cluster(s) or group(s) of segment file servers, or the network of segment file servers, to be designated, by use of hostnames, in video segment delivery URLs included in an issued Variant HLS manifest file.

A service provider manager also may access the session association repository or session association service to retrieve session-specific information, and can use this retrieved session-specific information to determine (and return to the manifest file handler) one or more service providers, and optionally the hostname(s) associated with the service provider(s) and/or the digital service, to be designated, by use of hostnames, in service provider segment delivery URLs included in an issued HLS manifest file, in particular in an issued Variant HLS manifest file. A service provider manager can also use this retrieved session-specific information to determine (and return to the manifest file handler) session-specific service provider segment delivery URL configuration information, such as a requesting device location and/or media content identifier, or other parameters, to be included in the hostname or path of the service provider segment delivery URLs included in an issued HLS manifest file.

A segment redirect processor also may access the session association repository or session association service to retrieve session-specific information, and can use this retrieved session-specific information to determine (and return to the manifest file handler) one or more service providers, and optionally the hostname(s) associated with the service provider(s) and/or the digital service, to be designated, by use of hostnames, in service provider segment delivery URLs included in an issued HLS manifest file, in particular in an issued Variant HLS manifest file. A service provider manager can also use this retrieved session-specific information to determine (and return to the manifest file handler) session-specific service provider segment delivery URL configuration information, such as a requesting device location and/or media content identifier, or other parameters, to be included in the hostname or path of the service provider segment delivery URLs included in an issued HLS manifest file.

A performance administrator also may access the session association repository or session association service to retrieve session-specific information, and can use this retrieved session-specific information in aggregating, deriving, and otherwise processing performance information.

A DNS Authoritative Name Server or other authoritative name server also may access the session association repository or session association service to retrieve session-specific information, such as the requesting device IP address, requesting device user agent, and requested video content associated with the Session ID, and can use this retrieved session-specific information to resolve hostnames (associated with manifest file handlers, clusters or groups of manifest file handlers, segment file servers, clusters or groups of segment file servers, other infrastructure components, clusters or groups of other infrastructure components, or the network of infrastructure components) to the IP addresses of infrastructure components (including, but not limited to, individual units of, groups of, or clusters of manifest file handlers, segment file servers, other infrastructure components, switches associated with clusters of manifest file handlers, switches associated with clusters of segment file servers, or switches associated with other clusters of infrastructure components) based, entirely or in part, on such session-specific information, or based on criteria that depend at least in part on such session-specific information, such as the network distance between the requesting user device and a cluster of manifest file handlers and segment file servers or the past use of a segment file server to respond to requests for video segment files associated with the requested content.

This first additional embodiment may result in manifest file handlers configuring shorter, more compact Variant HLS manifest file URLs and video segment delivery URLs; can also provide greater flexibility in certain operating aspects of the network of infrastructure components; can facilitate operation of a network of infrastructure components that spans multiple organizations; and can facilitate interoperation of a network of infrastructure components with digital services, other infrastructure services, and infrastructure service providers of various types. This first additional embodiment can also facilitate other embodiments wherein requesting user devices (including software applications executing on requesting user devices) request a Session ID from a Session ID Service, for example as described as an additional embodiment in this disclosure.

This first additional embodiment depends, however, on at least adequate synchronization of session-specific information across distributed instances, if any, of the session association repository and/or potentially introduces at least some incremental latency into the operation of manifest file handlers, segment file servers, and other infrastructure components as a result of accessing a session association service (if used). In addition, the use of published URLs (as received by the manifest file handler) and the URLs contained in a complete current set of source HLS manifest files (as received from the digital service, the digital service's infrastructure service provider(s), or another manifest file provider) as the basis for URLs that will be configured in issued HLS manifest files and therefore requested by the requesting user device, thereby conveying to the next infrastructure component certain session-specific information obtained from (or associated with) the initial device request URL, is less complicated in many (but not all) circumstances to implement, maintain, manage, and operate than is the use of a session association repository and/or a session association service to convey such session-specific information to the next infrastructure component.

In other embodiments related to this first additional embodiment, a session association repository and/or session association service is used in part, and a URL configuration (as in the first embodiment and secondary embodiment) is used in part. For example, in one such embodiment, a hostname authorities file comprising hostname authority records is used in conjunction with published URLs and digital service URLs, while a session association repository and/or session association service is used for other URLs, such as for the Variant HLS manifest file URLs contained in an issued Master HLS manifest file.

Additional Embodiment that Utilizes a Session ID Included in a Hostname Resolved by DNS Authoritative Name Servers In one or more additional embodiments, the Session ID may be configured into hostnames that are then resolved by DNS Authoritative Name Servers or other authoritative name servers. For example,
  where XYZ789 is the Session ID and digserv is the character string designating the digital service;
  a URL for a Master HLS manifest file is
    http://indexhandler.net/digserv/firstindexfile.m3u8
  and that Master HLS manifest file contains issued Variant HLS manifest file URLs wherein the Session ID is configured into the hostname, as follows:
    http://XYZ789.b.indexhandler.net/indexfiles.digserv.com/firstindexfile/variant-HLS-index-file-200.m3u8
    http://XYZ789.b.indexhandler.net/indexfiles.digserv.com/firstindexfile/variant-HLS-index-file-400.m3u8
    http://XYZ789.b.indexhandler.net/indexfiles.digserv.com/firstindexfile/variant-HLS-index-file-600.m3u8
  or, alternatively:
  a URL for the Master HLS manifest file is
    http://XYZ789.indexhandler.net/digserv/firstindexfile.m3u8
  and that Master HLS manifest file contains issued Variant HLS manifest file URLs wherein the Session ID is configured into the hostname, as follows:

http://XYZ789.indexhandler.net/indexfiles.digserv.com/firstindexfile/variant-HLS-index-file-200.m3u8
http://XYZ789.indexhandler.net/indexfiles.digserv.com/firstindexfile/variant-HLS-index-file-400.m3u8
http://XYZ789.indexhandler.net/indexfiles.digserv.com/firstindexfile/variant-HLS-index-file-600.m3u8

In these additional embodiments, the Session ID can be configured into the a hostname by a device other than a manifest file handler. For example, when the NIF Message Handler receives an HTTP 302 Redirect Message containing a Master HLS manifest file URL, it can configure the issued version of that URL (which it sends to the original requesting device) to include the Session ID in the hostname. As in the first embodiment and second embodiment, once the Session ID has been configured into a hostname that is received by a manifest file handler, the manifest file handler continues configuring that Session ID into the URLs it configures related to that manifest file request.

In these additional embodiments, the DNS Authoritative Name Servers or other authoritative name servers make use of aspects of the requesting device, optionally including the requesting device's IP address, the user agent identified in the URL request sent by the requesting device, and/or the content requested identified in the URL request sent by the requesting device, any or all of which are typically available to the device that configures the Session ID into the hostname. This information can be provided to the DNS Authoritative Name Servers or other authoritative name servers via a Session ID Service that enables other devices to post this information, along with Session IDs, to the network of DNS Authoritative Name Servers or other authoritative name servers, or to post this information to, and obtain an associated session ID from, the network of DNS Authoritative Name Servers or other authoritative name servers.

DNS Authoritative Name Servers or other authoritative name servers can then resolve the hostname, which is unique to the session, using any of, or any combination of:
- the network location of, or a network location associated with the network location of, the requesting device;
- the relative distance, in network terms, of a segment file server or cluster of segment file servers to the network location of the requesting device or to other network locations associated with the network location of the requesting device, as compared to the distance, in network terms, of one or more other segment file servers or clusters of segment file servers to the network location of the requesting user device;
- the relative performance, in network terms, of a segment file server or cluster of segment file servers when communicating to the network location of the requesting device or to other network locations associated with the network location of the requesting device, as compared to the performance, in network terms, of one or more other segment file servers or clusters of segment file servers when communicating to the network location of the requesting device or to other network locations associated with the network location of the requesting device;
- segment file server availability and utilization, both current and anticipated, including (but not limited to) the availability of sufficient capacity to process the video segment delivery URL request;
- a segment file server having previously processed requests for the requested video segment delivery URL, requests for video segment delivery URLs associated with the same video object, requests for video segment delivery URLs associated with the same digital service, or requests for similar video segment delivery URLs;
- segment file server association with the requested HLS manifest file;
- segment file server association with a portion of the HLS manifest file request URL or contents of the HLS manifest file request message, such as the user agent identified in the HLS manifest file request message;
- segment file server association with, or optimization for, video segment delivery URLs associated with on-demand video, video segment delivery URLs associated with linear video, or video segment delivery URLs associated with a combination of on-demand video and linear video;
- the request rate of a Master HLS manifest file or of a Variant HLS manifest file;
- duration of the video;
- release date, publication date, or availability date of video;
- number and size of video segment files comprising the source Variant HLS manifest file;
- the requesting device or user agent, or category or type of user agent, or an attribute or characteristic associated with the user agent;
- the access network used by the requesting user device;
- round-robin rotation of video segment delivery URL requests among segment file servers;
- deterministic distribution of video segment delivery URL requests among segment file servers, for example using a protocol such as Cache Array Routing Protocol (CARP);
- random distribution of video segment delivery URLs requests among segment file servers;
- the relative distance, in network terms, of a server or cluster of servers operated by an infrastructure service provider to the network location of the requesting device or to other network locations associated with the network location of the requesting device, as compared to the distance, in network terms, of one or more other servers or clusters of servers operated by the infrastructure service provider to the network location of the requesting user device, or as compared to the distance, in network terms, of one or more servers or clusters of servers operated by another infrastructure service provider to the network location of the requesting user device In an optional aspect of these additional embodiments, requesting devices can themselves configure the Session ID into the hostname of a URL requested from the network of infrastructure components. In this optional aspect of these additional embodiments, requesting devices access a Session ID Service to request a Session ID, which the requesting device then configures, for the duration of that session, into each hostname included in a URL that will be serviced by the network of infrastructure components.

Optionally, the Session ID request can include additional information about the content and/or services that the requesting device will or may request from the network of infrastructure components during the session.

Optionally, the Session ID Service is an HTTP GET request (a basic HTTP service); the requesting device sends an HTTP GET request to the IP address of the network of infrastructure component's Session ID Service; the HTTP GET request contains a properly configured URL, wherein the query string of the URL (or, optionally, the path portion of the URL) encodes the additional information about the content and/or services that the requesting device will or may request.

As described previously, the Session ID Service is now aware of the IP address of the requesting device, and of the user agent of the requesting device; in addition, the Session ID Service receives any additional information encoded in the URL in the HTTP GET request. The Session ID Service returns one or more Session IDs to the requesting device; optionally, the Session ID Service returns more than one Session ID, each of which is designated for use with one or more specific subsets of the content and/or services that the requesting device will or may request from the network of infrastructure components during the session. The Session ID Service forwards the Session ID(s), if applicable the subset(s) of the content and/or services that the requesting device will or may request from the network of infrastructure components during the session associated with each Session ID, and the IP address and user agent of the requesting device, to the network of DNS Authoritative Name Servers or other authoritative name servers, which can then use this information to resolve the any hostname resolution requests that include Session IDs as part of the hostname.

One characteristic of these additional embodiments is that it can result in a "race condition," wherein: on the one hand, a Session ID is configured into a hostname included in a URL by another device, and that device (or another device that receives the configured URL) will soon request a resolution of that hostname; and, on the other hand, some or all of the described resolving information may be propagated from the API access point throughout the network of DNS Authoritative Name Servers or other authoritative name servers, or at least to any DNS Authoritative Name Servers or other authoritative name servers that may receive the hostname resolution request; thus, in effect there is a race between the requesting device hostname resolution activity and the resolving information propagation activity. When the resolving information propagation activity is the winner of the race, the resolving information is on hand at the DNS Authoritative Name Server or other authoritative name server that receives the hostname resolution request and the hostname can be resolved immediately and with maximum accuracy. However, when the requesting device hostname resolution activity is the winner of the race, the resolving information is not on hand at the DNS Authoritative Name Server or other authoritative name server that receives the hostname resolution request; in this situation, the hostname resolution may either wait pending the arrival of the resolving information at the DNS Authoritative Name Server or other authoritative name server, or the hostname resolution may be resolved with less than maximum accuracy. The risk that the requesting device hostname resolution activity is the winner of the race, and the resolving information propagation activity is the loser of the race, is particularly high when the requesting device is the device configuring the Session ID into the hostname in the requested URL.

Depending on the circumstances, neither of these alternatives may be desirable, although either or both may be tolerable.

To avoid such a race condition, in an optional aspect of these additional embodiment the network of DNS Authoritative Name Servers or other authoritative name servers or, optionally, another infrastructure component, generates Session IDs in advance and, using these advance-generated Session IDs and some or all of the other described resolving information, generates hostname resolutions in advance; these advance-generated hostname resolutions and the associated Session IDs are then distributed to the network of DNS Authoritative Name Servers or other authoritative name servers. When a device accesses the API, providing session-specific information and requesting a Session ID, the network of DNS Authoritative Name Servers or other authoritative name servers (or, optionally, another infrastructure component that responds to requests to the API) identifies an advance-generated hostname resolution appropriate for the resolving information provided and returns the Session ID associated with that hostname resolution. Thus, even when the device accessing the API is the requesting user device (which, it should be noted, guarantees that the API receives the IP address, and therefore the network location of the requesting user device, as part of the available resolving information for that session), at the moment the Session ID is provided, the related hostname resolutions have already been propagated throughout the network of DNS Authoritative Name Servers or other authoritative name servers. The race has been won in advance by the resolving information propagation activity.

These additional embodiments may have applications for the delivery of video using adaptive streaming video protocols, but may be especially suited for the delivery of video using protocols other than adaptive streaming video protocols, for the delivery of data, image, text, audio, and other content that is not video, and for providing other infrastructure resources such as computing resources. Embodiments involving the delivery of video using adaptive streaming video protocols, as demonstrated by the primary embodiment and secondary embodiment, can exploit the requesting user device's initial device request for an HLS manifest file to establish and maintain a Session ID consistently throughout the delivery of the video, and in most cases with very little effort, and very few technical changes, made by the digital service. Many of these other embodiments, however, are not as readily susceptible to establishing and maintaining the Session ID without more significant involvement by the digital service. In these circumstances, this additional embodiment can significantly simplify the effort, and reduce the scope and complexity of the technical changes, made by the digital service in order to use the network of infrastructure components.

Additional Embodiment that Utilizes a Session ID, URL String, Request Header, or Other Data Provided by a Network Device In additional embodiments, a Session ID and/or other data optionally may be provided by a network device included within the network of infrastructure components, and/or by a network device operated separately from the network of infrastructure components.

The initial device request for the adaptive streaming video, as well as requests for manifests, requests for video segments, and other requests, typically may be handled by many network devices, including network devices operated by the network to which the user device is connected, network devices operated by intermediate networks, and network devices operated within, or by the operator of, the network of infrastructure components. Such network devices may include, but are not limited to: switches; routers; subscriber access devices, such as digital subscriber line access multiplexers (DSLAMs), cable modem termination systems (CMTSs); mobile network radio transmitters (such as UMTS LTE radios) and other radio access network (RAN) devices; application delivery switches, such as load balancers and Layer 4-7 switches; deep packet inspection switches and devices; devices that manage, shape, and/or apply policy to traffic, usage, security, subscribers, network priorities, and network resources; and other network devices.

When transmissions between the user device and the network of infrastructure components are not encrypted, or are insufficiently encrypted (meaning, for example, that the encryption is not strong enough to prevent decryption by a network device), network devices that handle a transmission can read and can modify the content of the transmission. This enables the operator of such network devices to determine which transmissions to modify and to add data to those transmissions.

When transmissions between the user device and the network of infrastructure components are encrypted, such as with the Secure Sockets Layer (SSL) protocol, the transmission may be decrypted and read and/or modified by network devices that have the required decryption information, typically decryption keys. For example, the network of infrastructure components may provide decryption keys to authorized networks to enable those operators to decrypt transmissions, read transmissions, determine which transmissions to modify, and modify the contents of transmissions, and then re-encrypt the transmissions (either with the original encryption or with different or additional encryption, in either case optionally using encryption keys also provided by the network of infrastructure components). In an optional aspect of this additional embodiment, the network of infrastructure components or another service can coordinate and provide decryption and/or encryption information for multiple different video providers to multiple different network device operators, thereby providing a central repository and service authorizing access to encrypted transmissions to multiple network device operators.

In this additional embodiment, a network device can optionally provide a Session ID or other data by any of, or any combination of:
- inserting a Session ID or other data into the URL requested in the initial device request, for example by inserting the Session ID or other data into the hostname, into the path of the URL, as a query string added to the URL, or otherwise into the URL
- inserting a Session ID or other data into a header contained in the initial device request, or as a new header included in the initial device request, for example as an additional HTTP header
- inserting a Session ID or other data into the transmission protocol in the initial device request
- inserting a Session ID or other data into the URL requested in one or more subsequent requests associated with the adaptive streaming video, for example into the subsequent requests for variant manifests, or into subsequent requests for video segment files
- inserting a Session ID or other data into a header contained in one or more subsequent requests associated with the adaptive streaming video, for example into the subsequent requests for variant manifests, or into subsequent requests for video segment files
- inserting a Session ID or other data into the transmission protocol in one or more subsequent requests associated with the adaptive streaming video, for example into the subsequent requests for variant manifests, or into subsequent requests for video segment files
- inserting a Session ID or other data into another aspect of the initial device request or into one or more subsequent requests associated with the adaptive streaming video
- providing a Session ID or other data to the network of infrastructure components via a separate communication session distinct from the initial device request for the adaptive streaming video and the communication sessions associated with, or resulting from, the initial device request for the adaptive streaming video In these additional embodiments, a Session ID optionally added by the network device may be generated by the network device or by another device operated by the operator of the network device, for example a GUID; or may be requested and received from the network of infrastructure components; or can be requested and received from another digital service.

In these additional embodiments, data other than a Session ID optionally provided by a network device can be any of, or any combination of:
- user or user device information, such as unique user identifier, household or other group identifier, subscriber classification or economic value, demographic code, location code, affiliation code, or interest identifier
- advertising or advertising infrastructure information, such as an identifier usable across more than one digital service, an advertising server identifier, or an advertising or advertising category code or indicator
- available bandwidth, throughput, or other performance measurement, or other connectivity indicator, such as connectivity type (e.g., 3G or 4G), anticipated congestion, anticipated bandwidth variability, or other quality indicator
- network information, such as an identifier for the network downstream from the network device, or a network segment associated with the connection
- device information
- other information related to the user, user device, content, connection, network, or other aspects of the adaptive streaming video request or the adaptive streaming video requested.

In these additional embodiments, the Session ID provided by a network device may be used instead of, or in addition to, another Session ID associated with the initial device request for the adaptive streaming video, for example in addition to, or instead of, the Session ID typically provided by the network if Infrastructure Components.

In these additional embodiments, data other than a Session ID that is provided by a network device can be used to do any of, or any combination of, the following:
- configure the Master HLS manifest file, such as by selecting Variant HLS manifest files to be included in the Master HLS manifest file; for example, a network device in an access network to which the user device is connected can provide data indicating available bandwidth or connection performance associated with the user's connection to the access network, and the manifest file handler or other component in the network of infrastructure components may identify and/or sequence an appropriate set of Variant HLS manifest files, representing an appropriate subset of available bitrates for the requested adaptive streaming video, to provide the best available video playback experience, or other appropriate video playback experience, to the user, including to start video playback at a particular bitrate and to provide a subset of bitrates that are likely to be support by the connection
- configure control information in Master HLS manifest files and Variant HLS manifest files select a segment file server, or cluster of segment file servers, or node to be used in conjunction with this request pre-request video segment files at one or more segment file servers select an infrastructure service provider to be used in conjunction with this request select an external source or location of an adaptive streaming video to be used in conjunction with this request Additional Embodiment in which the Network of Infrastructure Components Provides Session and Other Information to One or More Infrastructure Service Providers In one or more additional embodiments, the network of infrastructure components may provide session, connection, user, content, and/or other information to one or more infrastructure service providers, such as any of, or any combination of:

the network address or network location of the user or user device, such as all or part of the user device's IP address, an Autonomous System Number associated with the user device's IP address, the access network the user device is connected to, a network upstream or downstream from the access network the user device is connected to, or other network-related information associated with the user device an identifier associated with the user, user device, or class of user or user device, such as an identifier associated with the relative importance or value of a subscriber associated with the user device, or an identifier associated with the class of service associated with the subscriber associated with the user device an identifier associated with the requested adaptive streaming video, including: an identifier separately associated consistently with the requested adaptive streaming video (e.g., the Tribune Media Services identifier for an episode of a television show); an identifier not separately associated with, but consistently correlated with, the requested adaptive streaming video (for example, this identifier would enable the infrastructure service provider to handle all services related to a specific adaptive streaming video consistently); an identifier consistently correlated with the a group of adaptive streaming videos that includes, or is associated with, the requested adaptive streaming video (for example, an identifier associated with a category such as "sports"); an identifier associated with an attribute or characteristic of the requested adaptive streaming video (for example, an identifier associated with a fidelity level, such as "high definition" or "standard definition"); or another identifier associated with the requested adaptive streaming video an identifier associated with a portion of the requested adaptive streaming video, such as a video segment file notification of an upcoming request, or a possible upcoming request, for an adaptive streaming video or a portion of an adaptive streaming video the Session ID associated with the user device request for the adaptive streaming video, and a session identifier correlated with the Session ID associated with the user device request for the adaptive streaming video In an optional aspect of these embodiments, the information provided to the infrastructure service provider may be encoded into a URL configured into a Variant HLS manifest file (or, in other embodiments, a URL configured into a Master HLS manifest file), so that the information will be passed to the infrastructure service provider by the user device when it requests the URL from the infrastructure service provider. For example, the user device IP address and an identifier consistently correlated with the requested adaptive streaming video may be encoded into the hostname in the URL, the path of the URL, and/or a query string in the URL of a video segment file. This information can enable the infrastructure service provider to better assign and manage its infrastructure resources. For example, encoding the IP address of the user device and the adaptive streaming video identifier into the host name included in the URL of a video segment file can enable an infrastructure service provider that assigns resources at DNS resolution to make better, more assignments using full information (in particular, about the network location of the user device and the requested adaptive streaming video, which normally are not available to the infrastructure service provider until it receives the request, which happens after DNS resolution).

In another optional aspect of these embodiments, the information may be provided to the infrastructure service provider via a communication session, such as a request to the infrastructure service provider or a system-to-system message. For example, in order to notify an infrastructure service provider of an upcoming request, or a possible upcoming request, for an adaptive streaming video or a portion of an adaptive streaming video, the network of infrastructure components can itself make a full or partial request for the adaptive streaming video or portion of an adaptive streaming video, optionally identifying itself as a particular user agent type and/or using an X-Forwarded-For header; more specifically, to notify an infrastructure service provider of an upcoming request for a specific video segment file, the network of infrastructure components may make a request for the video segment file, or may make a header request associated with the video segment file, to the infrastructure service provider. Alternatively, the network of infrastructure components may issue a message to the infrastructure service provider, for example via one or more Application Programming Interfaces (APIs). As an optional aspect of this embodiment, such notifications can be timed to occur before the user device makes the request that is the subject of the notification, but after it becomes possible (or relatively likely) that the user device will make such a request, which the network of infrastructure components can determine by observing the user device's progress through the set of URLs in the Variant HLS manifest files comprising the adaptive streaming video.

Additional Optional Aspects of Certain Embodiments

In an optional aspect of the embodiments described herein, an infrastructure service provider may be assigned to some or all of the URLs comprising an adaptive streaming video request based on the access network, one or more intermediate networks, one or more downstream networks or upstream networks from the access network or the infrastructure service provider, or other network connection aspects of the adaptive streaming video request and the infrastructure service provider's preferences and/or priorities related to such network connection aspects of adaptive streaming video requests. For example, a particular infrastructure service provider may have a preference for handling adaptive streaming videos requested by user devices connected to certain access networks because of the business relationships between the infrastructure service provider and those access networks, or because of the interconnection arrangement or interconnection capacity between the infrastructure service provider and those access networks. Such preferences of infrastructure service providers can be static, relatively static, or can be updated dynamically through a system-to-system message between infrastructure service providers and the network of infrastructure components, for example via an API.

In another optional aspect of the embodiments, an infrastructure service provider may be assigned to some or all of the URLs comprising an adaptive streaming video request based on any of, or any combination of: the content of the adaptive streaming video; content characteristics of the adaptive streaming video or portions of the adaptive streaming video (for example, the bit rate of the video segments comprising a particular Variant HLS manifest file); the category of the adaptive streaming video; the mode (e.g., on-demand or linear) of the adaptive streaming video; the current, historical, or anticipated request rate of the adaptive streaming video; or the rate of change, and/or direction of change, of the request rate of the adaptive streaming video. For example, one infrastructure service provider may have a preference for handling adaptive streaming videos for on-demand content, whereas another infrastructure service provider may have a preference for handling adaptive streaming videos for linear or live content; or, as another example, one infrastructure service provider may have a preference for handling adaptive streaming videos that have a low and stable request rate, whereas another infrastructure service provider may have a preference for handling adaptive streaming videos that have a high and increasing request rate. Such preferences of infrastructure service providers can be static, relatively static, or can be updated dynamically through a system-to-system message between infrastructure service providers and the network of infrastructure components, for example via an API.

In another optional aspect of the embodiments, host names in URLs of video segment files to be served by segment file servers in the network of infrastructure components are resolved to IP addresses associated with the network of infrastructure components, and that the network of infrastructure components has associated with an intermediate network, for example by announcing certain of its own IP addresses only to that intermediate network, or as another example by terminating IP addresses from the intermediate network's address space at the network of infrastructure components. In this optional aspect of the embodiments, use of a host name resolved in this manner as the host name in a video segment URL can control the intermediate network by which the request will be routed to the network of infrastructure components.

In another optional aspect of the embodiments, the initial network path from the network of infrastructure components to a requesting user device, for example from a segment file server to a user device requesting a video segment file, may be controlled by the server responding to the request through the use of the differentiated services code point (DSCP) field in IP headers. In one implementation of this optional aspect of the embodiments, the server may be configured with a file or table of DSCP codes and corresponding networks, may select a network to use, and may configure the DSCP field (a 6-bit field that can typically be configured with up to 63 different values in hexadecimal form) accordingly in the IP headers of the packets transmitted to the requesting user device. Similarly, a switch or other network device is configured to read the DSCP field and assign the packets to one or more particular outbound ports, connected to the corresponding networks, on the switch. Thus, the server is able to signal the switch via the DSCP field value which outbound port, and therefore outbound intermediate network, to place the transmitted packets on. In another implementation of this optional aspect of the embodiments, no file or table of DSCP codes and corresponding networks is used. Instead, a switch or other network device configures the DSCP field on inbound IP packets to contain a value corresponding to the network attached to the port on which the packets are received. Segment file servers and/or other elements of the network of infrastructure components initially use the same value in the DSCP field on outbound packets returned in response to the messages contained in the inbound packets. Segment file servers and/or other elements of the network of infrastructure components measure the performance of the intermediate network (e.g., transfer rate of the data transmitted, rate of packet loss and retry, overall throughput, etc), correlating the measured performance with the destination IP address and DSCP field value(s). Using the correlated measured performance, and optionally the IP address of a requesting device, one or more cluster performance managers or other elements of the network of infrastructure components determine which DSCP value to use in a given session, which may be a newly initiated session (such as an initial device request for an adaptive streaming video) or an ongoing session (such as the next video segment file request in an adaptive streaming video previously requested). A segment file server or other element of the network of infrastructure components may configure the DSCP field accordingly in the IP headers of the packets transmitted to the requesting user device. A switch or other network device may read the DSCP field and assigns the packets to the indicated outbound ports.

Other Additional Embodiments

In further additional embodiments, the manifest file handler may begin the processing of an initial device request for an HLS manifest file or other manifest file by (a) determining whether it has available, as may be required, suitable previously configured Master HLS manifest files or other manifest files, previously configured Variant HLS manifest files or other manifest files, or both, that are properly configured for use with the initial device request for an HLS manifest file HLS manifest file or other manifest file, respectively, and that optionally contain a pre-configured Session ID; (b) if the manifest file handler does have available suitable pre-configured HLS manifest files or other manifest files, it selects a pre-configured HLS manifest file or other manifest file, respectively; (c) if the selected pre-configured HLS manifest file or other manifest file does not contain a pre-configured Session ID, the manifest file handler assigns a Session ID and configures the HLS manifest file or other manifest file, respectively, to include the Session ID, as previously described herein; (d)) if the manifest file handler does not have available a suitable pre-configured HLS manifest file or other manifest file, it processes the initial device request for an HLS manifest file or other manifest file as described in the first embodiment and second embodiment. In these additional embodiments, the manifest file handler selects a previously configured HLS manifest file or other manifest file based on the criteria described in the primary embodiment and secondary embodiment for configuring HLS manifest files to be returned to the requesting device, except that in these additional embodiments the criteria are used to select a pre-configured HLS manifest file or other manifest file from among a group of pre-configured HLS manifest files or other manifest files, respectively. These additional embodiments include embodiments where the pre-configured Master HLS manifest files or other manifest files contain pre-configured Session IDs but the pre-configured Variant HLS manifest files or other manifest files do not, as well as embodiments where neither the pre-configured Master HLS manifest files or other manifest files or the pre-configured Variant HLS manifest files or other manifest files contain pre-configured Session IDs.

In some embodiments, the functions of the manifest file handler described in the primary and secondary embodiments, or described in other embodiments, may be included in the system(s) that encode(s) and/or segment(s) the video files, or otherwise create(s) the manifest file, or that store or cache the manifest file, or that publish or otherwise serve the manifest file in response to requests for it. In these embodiments, the manifest file is created, stored, cached, published, or served in conjunction with the characteristics described in the primary and secondary embodiments, or of other embodiments described herein.

In some embodiments, user devices may make requests for manifest files, video segment files, or other URLs in advance of the user's request for the video, such that user devices are optionally able to cache some or all of the manifest files, video segment files, or non-index-file URLs in advance of the user's request. In these embodiments, the network of infrastructure components optionally receives, from the user's device or another device collecting information from the user's device, information indicating the user device's actual use of the manifest files, video segment files, or non-index-file URLs, such information optionally including the Session ID associated with the manifest file, the video segment file, or non-index-file URL.

In some embodiments, manifest files may be configured as described herein but might not be returned to requesting devices; in these embodiments, manifest files may be requested by, may be returned to, or both, other devices that receive manifest file requests, or that return manifest files in response to requests, or both, or that neither receive manifest file requests nor return manifest files in response to requests; in addition, in these embodiments, manifest files may be configured without a request, for example any of, or any combination of, in quantity, on a schedule, in response to availability of a segmented video object, or in response to a signal or notification other than a request for a video or request for a manifest file. In these embodiments, after the manifest files are configured and provided to the other devices, these other devices then provide the manifest files to requesting devices or to devices other than the requesting devices, either providing the manifest files as configured or further configuring the manifest files, or otherwise processing the manifest files. These other devices can be in-line between the requesting device and these embodiments, for example a proxy server operated by an ISP; can be devices to which requesting devices direct requests, and that then in turn make a request sent to these embodiments; or can be other devices that make requests to these embodiments.

For example, in one of these other embodiments, a digital service can make requests for manifest files that its users may require, which it can determine based on the services and content it provides to it users, and can then provide those manifest files to the user's device in advance of the user's selection of a particular content item. To further illustrate such an embodiment, as well as these other embodiments generally, consider a social media service, with a smartphone app used by users, wherein user's app receives a personalized stream of posts or updates from other users of the social media service; the social media service could request manifest files for the media items contained in its users' feed, with a unique session ID associated with each such manifest file; provide the manifest files in advance to its smartphone app executing on users' devices; provide via API the network location, device type, and other information for each device to which it delivers a manifest file, along with the Session IDs of the manifest files delivered to that device, or to a group of devices with common information; thereby enabling the network of infrastructure components to have advance knowledge of such information, before the user requests any Variant HLS manifest files or any video segment files or any part of a requested content object; and thereby the network of infrastructure components would be able to assign specific infrastructure components to the user's delivery request, such that the request, if made, would be efficiently fulfilled, with a high level (or at least, an acceptable level) of user experience, and measured as described herein.

In some embodiments, the network of infrastructure components might not include segment file servers and/or might not include segment redirect processors. In these embodiments, manifest file handlers issue Variant HLS manifest files, other manifest files, and their equivalents, that contain only service provider URLs or their equivalents. These embodiments enable the network of infrastructure components to manage the selection of an infrastructure service provider for each video delivery and to allocate video delivery volume among infrastructure service providers. In an optional aspect of these embodiments, optionally there is no Session ID configured in URLs for Master HLS manifest files or Variant HLS manifest files.

In some embodiments, the network of infrastructure components might not include segment file servers but may include segment redirect processors. In such embodiments, manifest file handlers issue Variant HLS manifest files, other manifest files, and their equivalents, that contain only service provider URLs or their equivalents and segment redirect URLs or their equivalents. These embodiments enable the network of infrastructure components to manage the selection of an infrastructure service provider for each video delivery, to allocate video delivery volume among infrastructure service providers, to measure the performance of infrastructure service providers, and to change the infrastructure service provider in use for a given linear video delivery as updates to the Variant HLS manifest file are requested, and to configure failover URLs in a manifest file (when supported by the protocol in use) that are video segment delivery URLs or service provider URLs.

In some embodiments, the network of infrastructure components may include segment file servers and cluster performance managers, but might not include a service provider manager. In these embodiments, manifest file handlers issue Variant HLS manifest files, other manifest files, and their equivalents, that contain video segment delivery URLs and the network of segment file servers delivers all video segment files, except for, optionally, video segment files delivered as a result of the video playback component in the requesting device requesting a failover URL configured in the HLS manifest file or equivalent by the manifest file handler, where the failover URL is a service provider URL. These embodiments enable the network of infrastructure components to manage the selection of segment file servers for each video delivery, to measure the performance of infrastructure components and the overall performance of the network of infrastructure components for each video delivery and for video deliveries in aggregate, to change the segment file servers in use in a linear video delivery as updates to the Variant HLS manifest file are requested, and to configure failover URLs in a manifest file (when supported by the protocol in use) that are video segment delivery URLs or service provider URLs.

In some embodiments, some or all of the functions of any of, or any combination of, the manifest file handlers, segment file servers, cluster performance managers, service provider managers, redirect segment processors, performance administrators, non-index-file message handlers, and/or library storage servers may be implemented by any of, or any combination of: combination in any way into one or more components; functional distribution in any way to, or among, multiple components; or combination with, inclusion within, or functional distribution to other infrastructure components such as switches, servers, processors, storage servers, content delivery network servers or switches, DNS name servers, local name servers, or other components of a digital service, infrastructure resource service provider, access network service provider, other network service provider, or other infrastructure service provider.

In some embodiments, the overall network of infrastructure components may comprise two or more independent, autonomous networks of infrastructure components, or the overall network of a type of infrastructure component comprises two or more independent, autonomous networks of the type of infrastructure component. In some embodiments of this type, one independent, autonomous network of a type of infrastructure component references another independent, autonomous network of that type of infrastructure component as a back-up or failover option, either operating concurrently or available on standby. For example, two independent, autonomous networks of manifest file handlers could be referenced in a single hostname, which is resolved to two IP addresses, the first IP address associated with a manifest file handler of the first independent, autonomous network of manifest file handlers and the second IP address associated with a manifest file handler of the second independent, autonomous network of manifest file handlers. As another example, master manifest files (which contain the URLs of variant manifest files) configured by a manifest file handler in a first independent, autonomous network of manifest file handlers contain variant manifest file URLs configured with hostnames of one or more manifest file handlers that are part of the first independent, autonomous network of manifest file handlers, along with failover URLs configured with hostnames of one or more manifest file handlers that are part of a second independent, autonomous network of manifest file handlers; optionally, both independent, autonomous networks of manifest file handlers could work in conjunction with a single network of segment file servers.

Figure 9:
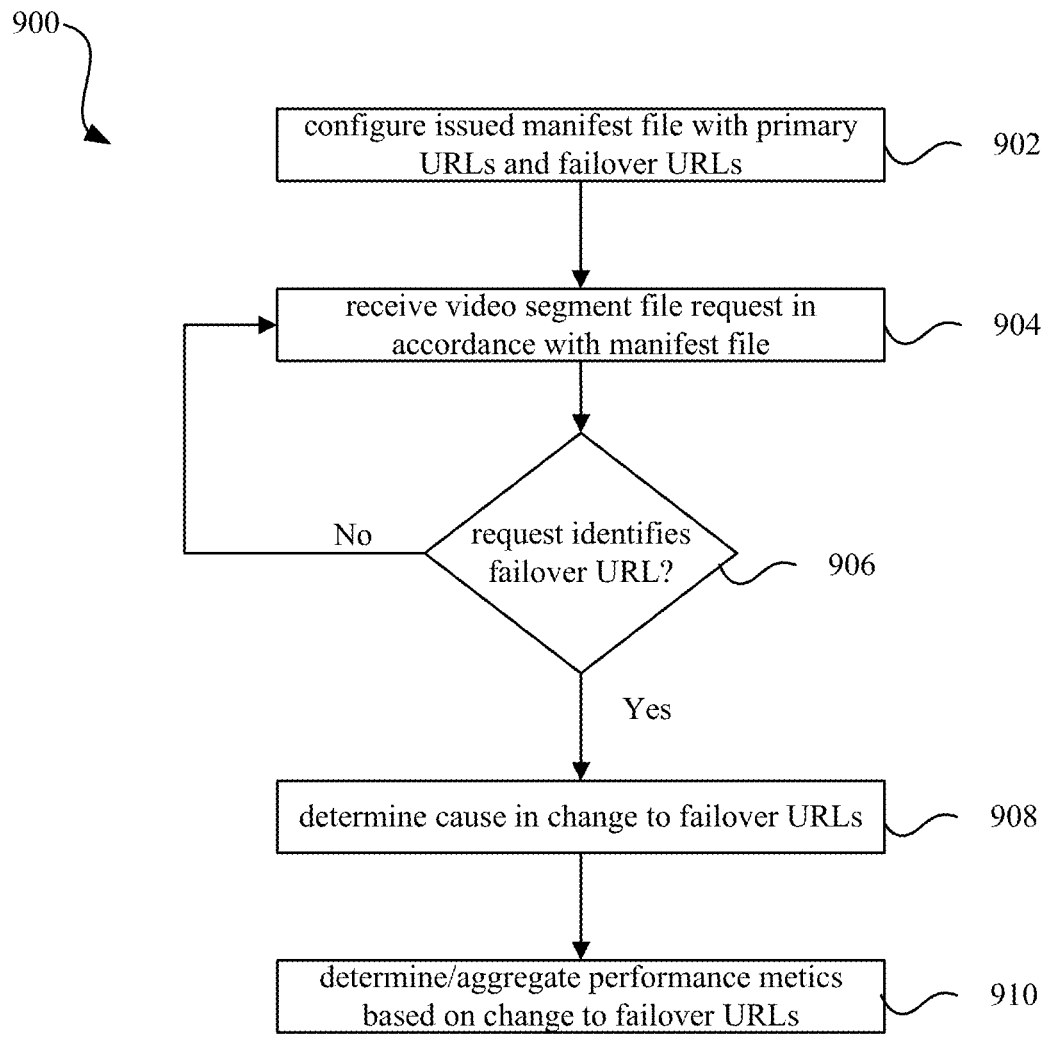
FIG. 9 is a flowchart of one embodiment of a process for detecting and analyzing a change to failover URLs when requesting and playing an adaptive streaming video corresponding a manifest file.

Referring now to FIG. 9, an example flowchart is shown illustrating a process for detecting and analyzing a change to the failover URLs of an issued manifest file. In step 902, a system 100 may configure an issued manifest file including a set of primary URLs and corresponding set of failover URLs for an adaptive streaming video. The issued manifest file may be configured by a manifest file handler using similar techniques to any of those discussed in the above embodiments. In step 904, after providing the issued manifest file, one or more segment file servers of the system 100 may receive video segment file requests in accordance with the issued manifest file. Specifically, the URLs to which the requests are directed may match the URLs in the issued manifest file. In step 906, the segment file server(s) receiving the video segment file request may determine whether or not the request is a request for one of the primary URLs in the issued manifest file, or one of the failover URLs in the issued manifest file. If the requested video segment file corresponds to one of the failover URLs (906:Yes), then the segment file server(s) may determine in step 908 that a server failure has occurred at some point during the process of the user device requesting/receiving video segment files for the adaptive streaming video. In step 908, the system 100 may determine the cause of the server failure, and specifically may attribute the server failure either to one or more of the infrastructure service providers that are providing some of the video segment files to the user device, or to one or more of the segment file servers providing other video segment files to the user device. In step 910, the server failure may be identified and analyzed, and may be included in the determination and aggregation of performance metrics for infrastructure service provider 122 or 124, and/or for a server, cluster, and/or node of segment file servers 108 or 114.

In some embodiments, a non-index-file message handler may receive, modify, forward, and/or return messages that are not HTTP messages but that otherwise communicate from a requesting user device to a non-index-file service.

Various embodiments described herein may utilize adaptive streaming protocols that utilize manifest files containing file byte ranges; video delivery protocols other than adaptive streaming protocols, including progressive HTTP download video delivery; streaming via RTSP, RTP, or RTCP protocols over UDP; Digital Video Broadcasting (DVB) protocols; Multimedia Broadcast/Multicast Service (MBMS) within LTE; the MediaFLO protocol from Qualcomm; the proposed Scalable Video Multicasting (SVM) protocol; and other digital video protocols.

Some embodiments may support the delivery of video-without-audio content, meaning video without an associated audio track, where video without an associated audio track is technically supported by the video protocol. Note that although video without an associated audio track is not currently supported in Apple's HLS video protocol, which is one of the most popular adaptive streaming protocols currently in use, some other video protocols may support, either fully or in a limited fashion, video without an associated audio track.

Some embodiments may support the delivery of non-video content, including data, image, text, audio, and other content, to a user's device in support of a digital service, and/or support the assignment of resources, such as compute or storage resources, in support of a digital service.

Additional Notes

As described in this disclosure, the secondary embodiment focuses on the delivery of linear video content, which means video content that is played out linearly to multiple users concurrently and that is, in general, watched by users concurrently. As noted in the description of linear video, "concurrently" in this context does not mean precisely simultaneously, e.g. to sub-second tolerance; two users watching the same linear video content via the Internet, using two different devices connected to two different Internet access networks, may experience disparities in the timing of the playback, typically measured in seconds and typically (though not always) less than a minute, between the playback of the content on their two devices, or (if applicable) between the playback of the linear video content on their devices and the playback of the same linear video programming broadcast concurrently on standard television transmission facilities. The size of such discrepancies depends in part on the video protocol used to deliver the linear video content to users; for example, as of early 2014 Apple estimated the typical latency associated with HLS live streaming, using recommended settings, at approximately 30 seconds (see https://developer.apple.com/library/ios/documentation/networkinginternet/conceptual/streaming mediaguide/FrequentlyAskedQuestions/FrequentlyAsked-Questions.html, updated by Apple 2-11-2014, retrieved on Oct. 21, 2014). Other video delivery protocols may be characterized by larger or small timing disparities in user experience; in addition, video production, encoding, segmenting, packaging, and related processes can also affect the size of such timing disparities. Note that it is not the size of such timing disparities in user experience that distinguishes linear video content from on-demand video content; rather, regardless of the size of such disparities, linear video content is distinguished from on-demand video content by the concurrent nature of the user video experience in general.

A Global Unique Identifier (GUID) is a unique, or approximately unique, reference number used as an identifier in computer systems, generally (though not always) generated from random (or pseudo-random) numbers. As used herein, approximately unique means that the probability that two instances are the same is negligible, or at least less than the required tolerance, though not necessarily zero. GUIDs are usually stored as 128-bit values, and are commonly (but not always) displayed as 32 hexadecimal digits with groups separated by hyphens, such as 65AFC127-9BEB-5196-BIAB-09126E4512D4. GUIDs generated from random numbers normally contain 6 fixed bits (indicating that the GUID is random) and 122 random bits; the total number of unique such GUIDs is $2^{122}$ (approximately 5.3× $10^{36}$); thus, the probability of the same number being generated randomly twice is negligible. GUIDs may or may not be generated from random (or pseudo-random) numbers; GUIDs generated in other ways, or other versions of GUIDs, have different uniqueness properties and probabilities, ranging from guaranteed uniqueness to likely duplicates. GUIDs used in the primary embodiments and secondary embodiment are generated from random numbers and thus the probability of the same GUID being generated twice is negligible. In other embodiments, other methods of generating GUIDs are used.

An API, or Application Programming Interface, is a software component, with specified inputs and outputs, used to communicate and/or share data between distinct applications.

In this disclosure, references to video refer generally to video including its associated audio track. References to video without an associated audio track (which is rare in practice, and further is not supported in some discussed protocols, for example HLS) are stated as such.

In this disclosure, examples of HLS manifest files comprise only the HLS manifest file URLs or video segment file URLs contained in the example HLS manifest files; as described in this disclosure, HLS manifest files contain other information in addition to URLs, including metadata; such metadata, except where noted, will generally be the same in both an issued HLS manifest file and the corresponding source HLS manifest file. Consequently, to make the examples easier to read and understand, and because the HLS manifest file examples are primarily illustrating the composition and/or structure of URLs or groups of URLs, this additional information has not been included in the examples of HLS manifest files presented in this disclosure. This style of example presentation, however, is not meant to suggest or imply that such additional information is not present in HLS manifest files, and the examples are not intended to imply anything about such additional information, including metadata, in HLS manifest files in the embodiments presented herein. Similarly, the manifest files used in some adaptive streaming protocols may be in at least some respects unordered, which is to say that the sequence in which variant manifest files or video segment files (in each instance, along with its related descriptive and control information) are listed is not significant, can be over-ridden by another sequencing scheme or indicator (such as a sequence number), or is not significant or can be over-ridden in at least some respects, in how the video playback component processes and utilizes the contents of the manifest file. The examples included herein, however, are in many cases listed in what may appear to the reader to be a sequential or numerical order, and in general, examples that illustrate related cases will be shown in the same apparent sequence or numerical order from one example to the next related example. Unless otherwise stated explicitly, the examples included herein are presented in this fashion to make them more readable and should not necessarily be construed as implying that such sequencing is in some way significant to the operation of all embodiments or any aspect of all embodiments presented herein.

In this disclosure, references to a URL (Uniform Resource Locator) refer to any of, all of, or any combination of, a URL, a URI (Uniform Resource Indicator), and/or a URN (Uniform Resource Number), and should be read accordingly.

Figure 10:
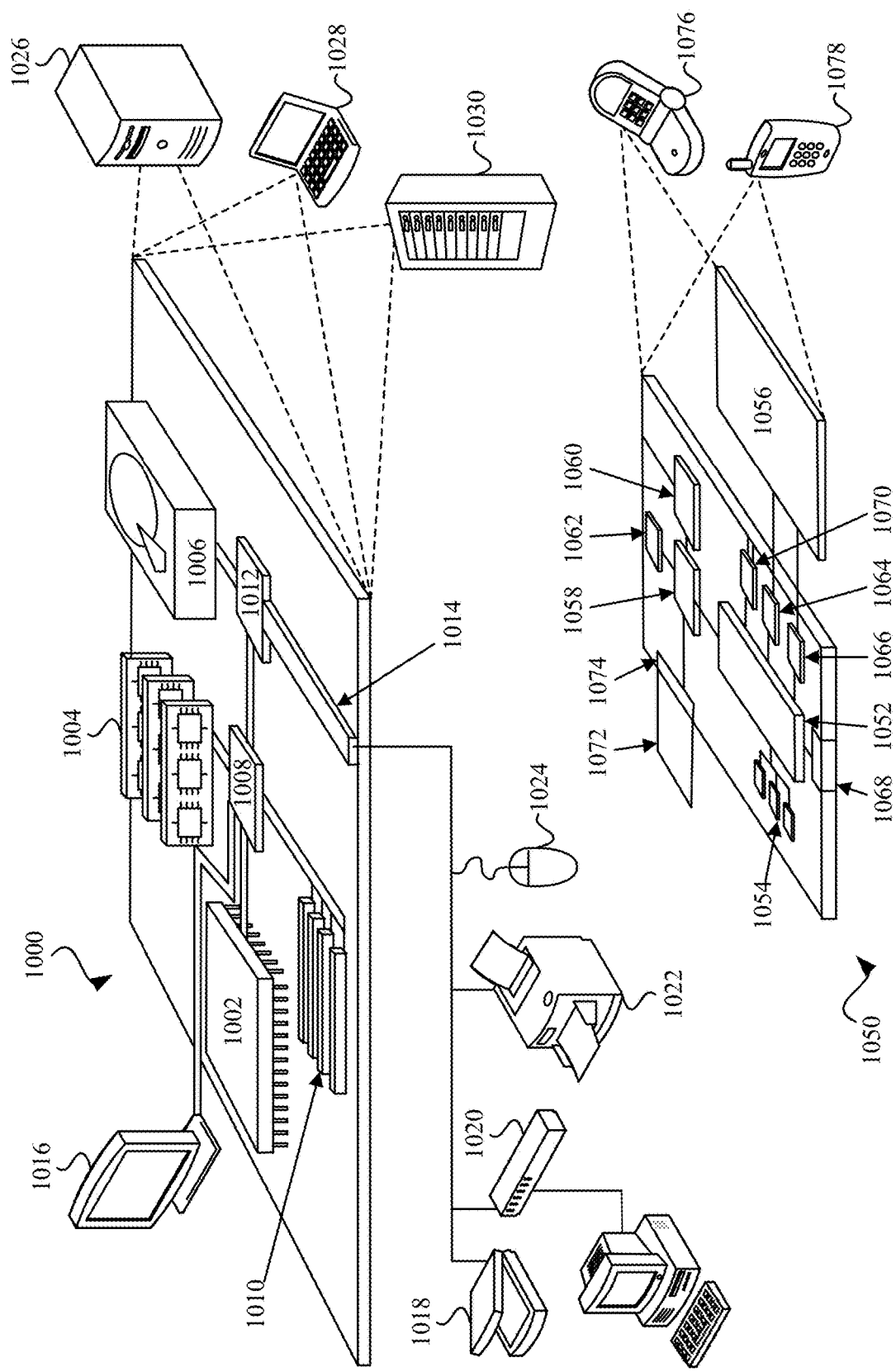
FIG. 10 is an illustration of embodiments of a special-purpose computer system and a computing device that can be used to implement a system for measuring and managing the performance of adaptive streaming video deliveries.

FIG. 10 is is an illustration of embodiments of a special-purpose computer system 1000 and a computing device 1050 that can be used to implement a system for measuring and managing the performance of adaptive streaming video deliveries. Special-purpose computer system 1000 represents various forms of digital computers, such as laptops, desktops, workstations, personal digital assistants, servers, blade servers, mainframes, and other appropriate computers. Computing device 1050 represents various forms of mobile devices, such as personal digital assistants, cellular telephones, smart phones, tablets, laptops and other similar computing devices.

Computer system 1000 includes a processor 1002, random access memory (RAM) 1004, a storage device 1006, a high speed controller 1008 connecting to RAM 1004 and high speed expansion ports 1010, and a low speed controller 1012 connecting to storage device 1006 and low speed expansion port 1014. The components 1002, 1004, 1006, 1008, 1010, 1012, and 1014 are interconnected using various busses, and may be mounted on a common motherboard or in other manners as appropriate. Computer system 1000 can further include a number of peripheral devices, such as display 1016 coupled to high speed controller 1008. Additional peripheral devices can be coupled to low speed expansion port 1014 and can include an optical scanner 1018, a network interface 1020 for networking with other computers, a printer 1022, and input device 1024 which can be, for example, a mouse, keyboard, track ball, or touch screen.

Processor 1002 processes instructions for execution, including instructions stored in RAM 1004 or on storage device 1006. In other implementations, multiple processors and/or multiple busses may be used, as appropriate, along with multiple memories and types of memory. RAM 704 and storage device 1006 are examples of non-transitory computer-readable media configured to store data such as a computer program product containing instructions that, when executed, cause processor 1002 to perform methods and processes according to the embodiments described herein. RAM 704 and storage device 1006 can be implemented as a floppy disk device, a hard disk device, an optical disk device, a tape device, a flash memory or other similar solid-state memory device, or an array of devices, including devices in a storage area network or other configurations.

High speed controller 1008 manages bandwidth-intensive operations for computer system 1000, while low speed controller 1012 manages lower bandwidth-intensive operations. Such allocation of duties is exemplary only. In one embodiment, high speed controller 1008 is coupled to memory 1004, display 1016 (e.g., through a graphics processor or accelerator), and to high speed expansion ports 1010, which can accept various expansion cards (not shown). In the embodiment, low speed controller 1012 is coupled to storage device 1006 and low speed expansion port 1014. Low speed expansion port 1014 can include various communication ports or network interfaces, such as universal serial bus (USB), Bluetooth, Ethernet, and wireless Ethernet.

Computer system 1000 can be implemented in a number of different forms. For example, it can be implemented as a standard server 1026, or multiple servers in a cluster. It can also be implemented as a personal computer 1028 or as part of a rack server system 1030. Alternatively, components from computer system 1000 can be combined with other components in a mobile device (not shown), such as device 1050. Each of such devices can contain one or more of computer system 1000 or computing device 1050, and an entire system can be made up of multiple computer systems 1000 and computing devices 1050 communicating with each other.

Computing device 1050 includes a processor 1052, memory 1054, an input/output device such as a display 1056, a communication interface 1058, and a transceiver 1060, among other components. The components 1052, 1054, 1056, 1058, and 1060 are interconnected using various busses, and several of the components may be mounted on a common motherboard or in other manners as appropriate. Computing device 1050 can also include one or more sensors, such as GPS or A-GPS receiver module 1062, gyroscopes (not shown), and cameras (not shown), configured to detect or sense motion or position of computing device 1050.

Processor 1052 can communicate with a user through control interface 1064 and display interface 1066 coupled to display 1056. Display 1056 can be, for example, a thin-film transistor (TFT) liquid-crystal display (LCD), an organic light-emitting diode (OLED) display, or other appropriate display technology. Display interface 1066 can comprise appropriate circuitry for driving display 1056 to present graphical and other information to the user. Control interface 1064 can receive commands from the user and convert the commands for submission to processor 1052. In addition, an external interface 1068 can be in communication with processor 1052 to provide near area communication with other devices. External interface 1068 can be, for example, a wired communication interface, such as a dock or USB, or a wireless communication interface, such as Bluetooth or near field communication (NFC).

Device 1050 can also communicate audibly with the user through audio codec 1070, which can receive spoken information and convert it to digital data that can be processed by processor 1052. Audio codec 1070 can likewise generate audible sound for the user, such as through a speaker. Such sound can include sound from voice telephone calls, recorded sound (e.g., voice messages, music files, etc.), and sound generated by applications operating on device 750.

Expansion memory 1072 can be connected to device 1050 through expansion interface 1074. Expansion memory 1072 can provide extra storage space for device 1050, which can be used to store applications or other information for device 1050. Specifically, expansion memory 1072 can include instructions to carry out or supplement the processes described herein. Expansion memory 1072 can also be used to store secure information.

Computing device 1050 can be implemented in a number of different forms. For example, it can be implemented as a cellular telephone 1076, smart phone 1078, personal digital assistant, tablet, laptop, or other similar mobile device.

The followings sections describe several additional embodiments and examples that further illustrate the concepts described above.

Figure 11:
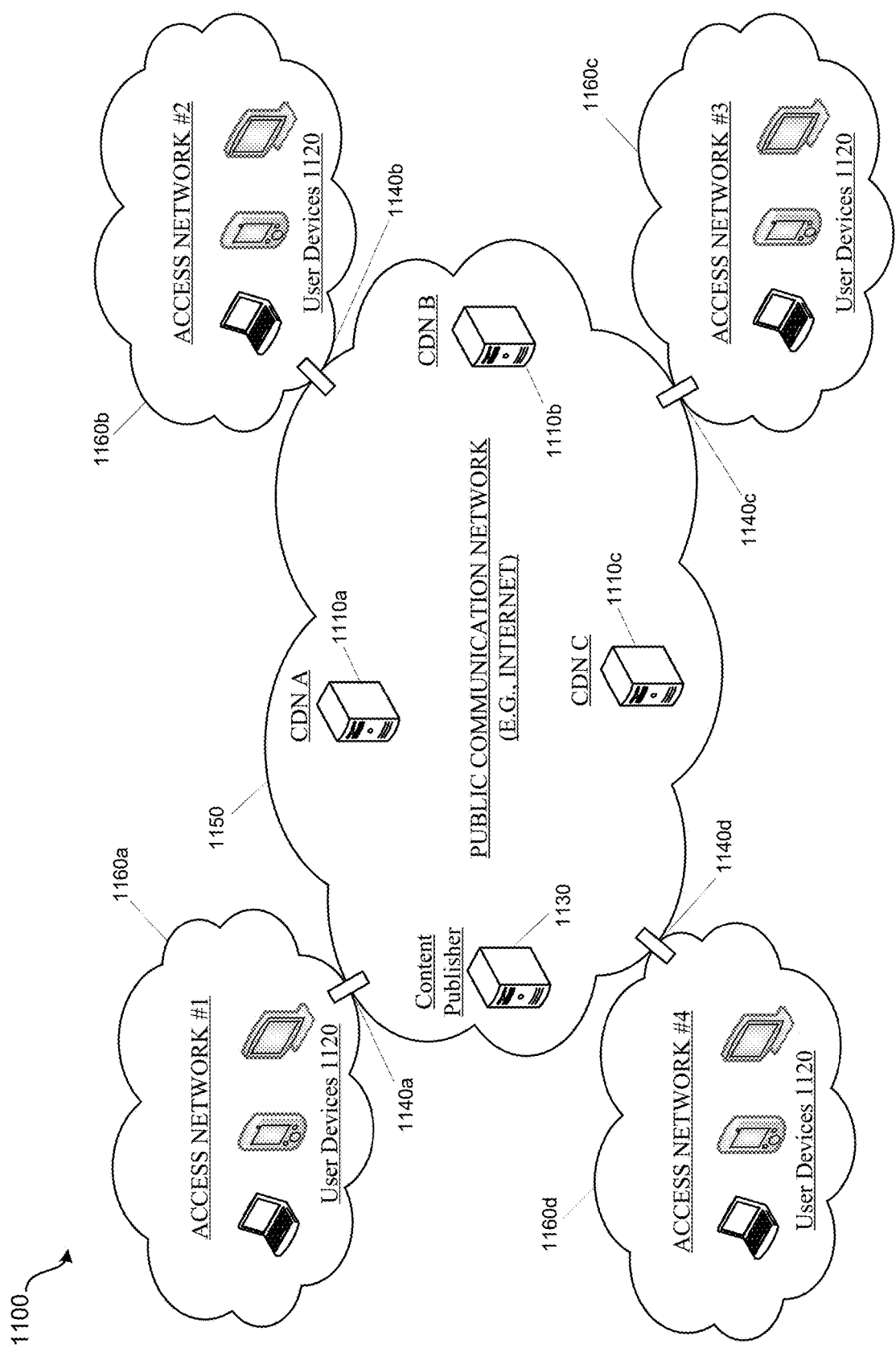
FIG. 11 is a diagram illustrating an example networking and computing environment including user devices and content delivery networks (CDNs) configured to provide adaptive streaming video, in accordance with one or more embodiments of the disclosure.

Referring now to FIG. 11, an example diagram is shown illustrating a networking and computing environment 1100 in which user devices may request and receive content resources such as adaptive streaming video, from one or more content delivery networks (CDNs) via wide-area public networks and/or local access networks. Specifically, in this example, computing environment 1100 includes a public communication network (e.g., Internet) 1150, on which a content publisher 1130 and a number of content delivery networks (CDNs) 1110a-1110c operate. As discussed above, the content publisher 1130 may be the initial generator and/or provider of content resources, such as prerecorded video resources (e.g., video-on-demand (VOD)) and live video feeds. When a content publisher 1130 lacks the computational and/or network infrastructure resources for high-performance and large-scale distribution of these video content resources, the content publisher 1130 may provide the video resources to one or more CDNs 1110 for on-demand distribution to user devices 1120. Each CDN 1110 may be implemented as a single server, or as a more complex systems including various combinations of manifest file generators/servers, segment files servers, encoders, DNS name servers, specialized network devices, etc.

As discussed previously, CDNs 1110 may be configured to store and serve content resources from various publishers 1130 to user devices 1120. The content resources served by CDNs 1110 to user devices 1120 may include adaptive streaming video resources, such as video-on-demand (VOD), dynamic VOD, and/or video streams of live events. Thus, CDNs 1110 may be configured to partition, encode, and store video resources as a set of smaller video segments, potentially in real-time or near real-time for live events. In some cases, a CDN 1110 may create and store multiple copies of each particular video segment, corresponding to different bitrates and/or to differences in other video characteristics. In such embodiments, adaptive streaming video may be supported by allowing the video players on user devices 1120 to switch to higher or lower bitrates (and/or change to other video display characteristics) mid-stream, that is, while the particular video is being streamed to the user device 1120.

User devices 1120 may include, by way of example, personal computers, laptop computers, workstation computers, gaming consoles, mobile devices (e.g., smartphones, tablet computers, smartwatches, wearable computers, vehicle-based computing systems, etc.), and/or any other computing device capable of receiving and playing video. In order to receive and play adaptive streaming video, user devices 1120 may include various specialized hardware and software components, such video decoders, decryption modules, renderers, digital rights managers, display screens, and various other user interface components.

As shown in this example, certain user devices 1120 may operate on one or more access networks 1160a-1160d. Access networks 1160 may include, for example, IP networks, cable networks, wireless networks, satellite networks, etc., which may be physically and/or logically separate from the public network 1150 (e.g., Internet). For instance, an access network 1160*a* may be wireless mobile network (e.g., a 3G or 4G LTE network) connected to the Internet 1150 via a packet data network gateway 1140*a*. Another example of an access network 1160*b* may be a corporate Ethernet network connected to the Internet 1150 via one or more network routing devices 1140, such as gateways, firewalls, NAT routers, etc. Although the physical network components have not been shown in this figure so as not to obscure the other elements depicted in the figure, it should be understood that any combination of network hardware components and network architecture designs may be implemented in various embodiments to support communication between user devices 1120 and CDNs 1110.

It should be understood that the techniques described herein may be applicable to user devices 1120 accessing CDNs 1110 from any access network 1160 via the corresponding gateway devices/systems 1140. In some cases, a single user device 1120 may connect to a CDN 1110 via different access networks 1160 at different times, such as a smartphone 1120 that is configured to stream video while at home by via a home WIFI network supported by a residential Internet Service Provider (ISP) 1160*a*, and also is configured to stream video while away from home via a wireless mobile network 1160*b* (e.g., a Long Term Evolution (LTE) network), etc. In fact, a single user device 1120 may connect to several different access networks 1160 (e.g., public WLANs, private business/governmental secure Ethernet, home ISP(s), mobile wireless networks, etc.) at different times or simultaneously. In some examples, a user device 1120 may select a particular access network 1160 for connecting to a CDN 1110 based on current location, access permissions, bandwidth limitations, data restrictions and overage charges, etc. In still other examples, a user device 1120 need not be connected to the Internet 1150 via a separate access network 1160, but may connect directly to a computer on the Internet 1150.

As discussed previously, the techniques described herein include, among other things, generating and issuing master and variant manifests for providing adaptive streaming video to user devices 1120. In many cases, data metrics measuring the quality and performance of the delivery of adaptive streaming video from CDNs 1110 to user devices 1120 may be of interest to content publishers 1130, the CDNs 1110 themselves, and various other entities/systems. Thus, performance data for delivery of streaming video, such as streaming bitrates, bitrate upshifts and downshifts, buffering events, CDN server failures, and any other recorded variance data/video delivery performance data, may be collected using the various techniques discussed herein. For example, in certain embodiments described previously, manifest files may be generated having video segment URLs referencing one CDN that are interspersed (or interleaved) among video segment URLs referencing another CDN. Such techniques may allow a first CDN 1110*a* to determine streaming video performance metrics of a second CDN 1110*b* without any communication or other cooperation between the CDNs, by instead analyzing the video segment requests and video segments provided by the first CDN 1110*a* to derive certain performance metrics (e.g., buffering events, bitrate shifts, server failures) which are attributable to the second CDN 1110*b*. When analyzing the performance of the delivery of adaptive streaming video from CDNs 1110 to user devices 1120, it should further be understood that certain performance issues and/or bottlenecks identified during the analyses may be attributable to a particular CDN 1110*a* in some cases, but alternatively (or additionally), such performance issues may be attributable to other entities/systems, such as an access network 1160, access network gateway 1140 or other network devices, or the user device 1120 itself. Thus, the techniques described herein include not only techniques for evaluating and analyzing delivery performance of adaptive streaming video, but also identifying performance issues and attributing issues to particular systems/networks, and using the performance analyses to optimize subsequent adaptive streaming video delivery.

Figure 12:
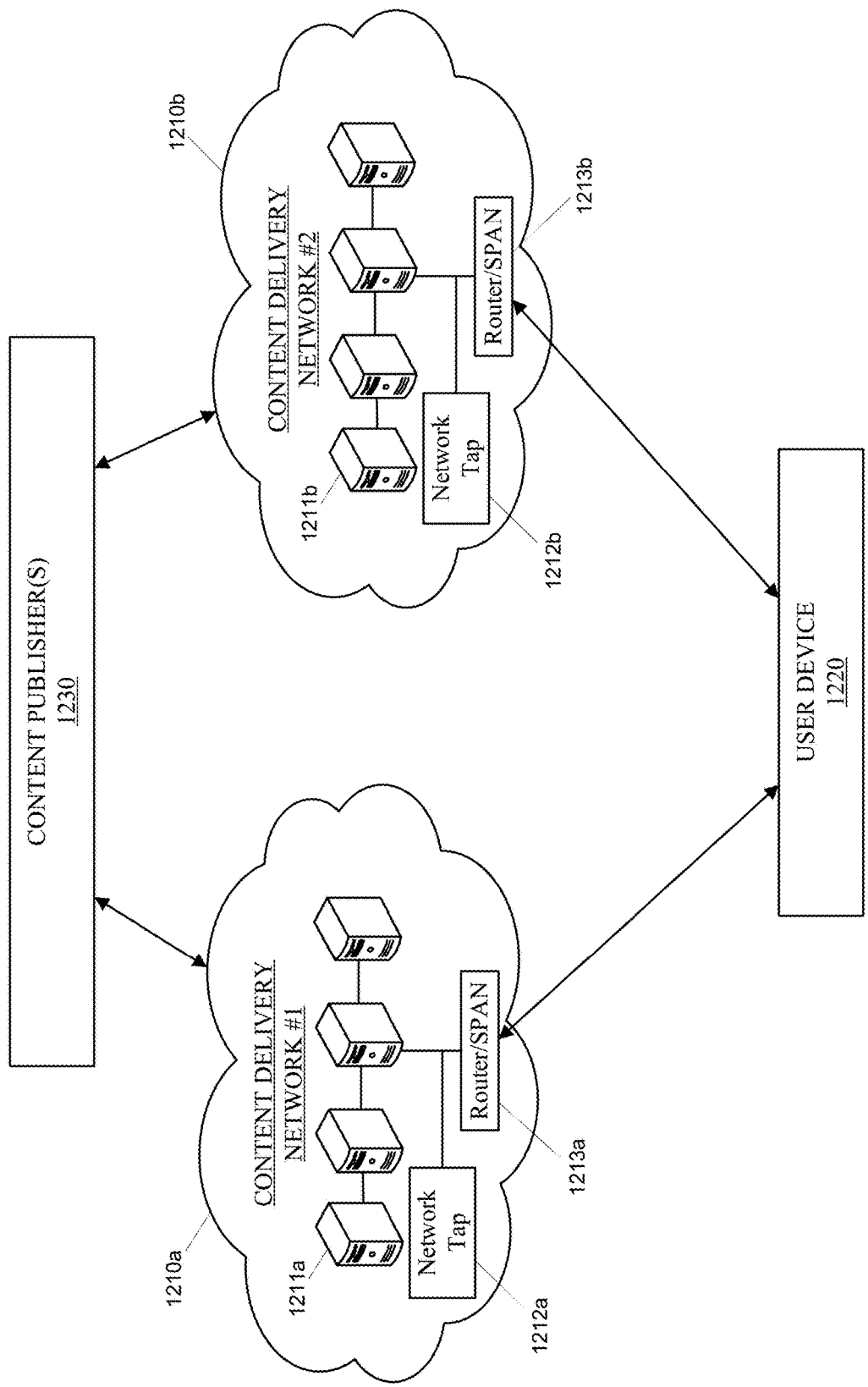
FIG. 12 is a diagram illustrating a single user device in communication with two content delivery networks (CDNs)

Referring now to FIG. 12, a diagram is shown illustrating a user device 1220 receiving an adaptive streaming video from two CDNs 1210*a* and 1220*b*. In this example, a content publisher 1230 may provide a single video content resource to multiple CDNs 1210*a* and 1220*b*. As discussed previously, the manifest file generated and provided to the user device 1220 for the adaptive streaming video may include URLs referencing CDN #1 1210*a*, with URLs referencing CDN #2 1210*b*. Thus, when receiving and playing the adaptive streaming video, the user device 1220 may request and receive certain video segments from CDN #1 1210*a*, and may request and receive other video segments from CDN #2 1210*b*.

In such cases, the user device 1220, a segment file server 1211*a* at CDN #1 1210*a* serving a subset of the video segments to the user device 1220, and a segment file server 1211*b* at CDN #2 1210*b* serving the remaining video segments to the user device 1220, may form what is essentially a closed system for delivering adaptive streaming video to the user device 1220. Therefore, by monitoring and analyzing only the video segment file requests that it receives from the user device 1220, both segment file server 1211*a* and segment file server 1211*b* may infer the other's performance in delivering the adaptive streaming video the user device 1220. For instance, segment file server 1211*a*, by analyzing the timing of the video segment requests it receives, the requested bitrates within those video segment requests, whether those video segment requests identify the primary or secondary hostname, etc., may logically determine or infer that certain delivery performance issues are attributable to the segment file server 1211*b* serving the other portions of the adaptive streaming video.

Thus, such techniques allow a particular segment file server 1211*a* within one CDN 1210*a* to analyze the performance of other CDN 1210*b*, even without any communication or collaboration between the CDNs 1210, but instead by analyzing only the video segment file requests that the server 1211*a* receives and serves itself. In some cases, both CDN #1 1210*a* and CDN #2 1210*b* may be capable of serving all of the video segments in the adaptive streaming video. However, in other cases, one or both of the CDNs 1210 may be configured to store and serve only particular subset of the video segment files, and need not store the entire adaptive streaming video. For instance, CDN #1 1210*a* may be implemented not as a traditional CDN, but as a performance analyzer server configured to evaluate the adaptive streaming video delivery performance of other CDNs. In such implementations, the video segment file server 1211*a* (and/or performance analyzer server 1211*a*) might store only a small subset of the video segments for each adaptive streaming video (e.g., every other segment, every $3^{rd}$ segment, every $4^{th}$ segment, every $5^{th}$ segment, . . . , every $20^{th}$ segment, etc.). Further, the system may include a manifest file generator configured to build variant manifests having CDN #1 URLs interspersed with CDN #2 URLs, so that the CDN #1 only receives requests for and serves the subset of video segments stored in CDN #1. The manifest file generator in this example may be included within CDN #1, for instance, manifest files may be built and provided by the video segment file server/performance analyzer server 1211*a*, or by another server within CDN #1 1210*a*. In other cases, such interspersed (or striped) manifest files may be generated outside of CDN #1, for example, by the content publisher 1230 or other third-party manifest provider.

As discussed in the above example, a particular video segment file server (e.g., 1211*a*) in one CDN 1210*a* may analyze and evaluate the performance of another CDN 1210*b* delivering different video segments of the same adaptive streaming video. However, in other embodiments, one or more separate servers/devices, other than the video segment file server 1211*a* itself, may be configured to monitor the video segment file requests received/served by the video segment file server 1211*a* and may perform similar performance analyses on the other CDN 1210*b*. For example, the physical network infrastructure of CDN #1 1210*a* may include various other servers and network devices such as network tap 1212*a* router/switched port analyzer (SPAN) 1213*a*, or other device that listens for, receives a copy of, or monitors the flow of network traffic, including deep packet inspection (DPI) devices, wire data collection devices, sFlow collectors, or other such devices. Any of these other servers or network devices within the same CDN #1 1210*a* may be configured to listen for and monitor some or all network packets received within CDN #1 1210*a*. For example, the network tap 1212*a* and/or SPAN 1213*a* may be configured to operate within shared packet networks (e.g., Ethernet), and may be used for such tasks as monitoring network traffic, reassembling sessions based on session IDs, performing network management tasks and diagnosing network issues. In this example, the network tap 1212*a* and/or SPAN 1213*a* may be configured to listen for, receive, and analyze all video segment file requests from the user device 1220 to the video segment file server 1211*a*. Based on the video segment file requests sent to, and/or the video segment files served by video segment file server 1211*a*, the network tap 1212*a* and/or SPAN 1213*a* may analyze and evaluate performance of CDN #2 1210*b* in delivery of the adaptive streaming video to the user device 1220, or may identify, collect and/or send data about the video segment file requests and/or video segment files served to another server or other device that can analyze and evaluate performance of CDN #2 1210*b* in delivery of the adaptive streaming video to the user device 1220.

Thus, the above embodiments describe that any number of different computers or devices within CDN #1 1210*a* may be used to analyze and evaluate the performance of CDN #2 for delivering the adaptive streaming video, and that such analyses need not require any communication or cooperation between the two CDNs. In still other embodiments, the analyses and evaluation of CDN #2 1210*b* with respect to delivery of adaptive streaming video may be performed in a similar manner by the user device 1220 itself, by another computing device within the user device's local Ethernet and/or access network 1160, or by a gateway device 1140 or other intermediary system between the user device 1220 and the CDNs 1210.

Referring now to FIGS. 13A-13C, three different tables are shown providing examples of variant manifest files that may be created in accordance with the techniques discussed above for analyzing and evaluating CDN performance. In these example, tables 1300*a*, 1300*b*, and 1300*c* represent three different ways in which a first CDN (CDN #1) may determine performance data of a second CDN (CDN #2), when both CDNs are used in the delivery of an adaptive streaming video to a user device.

As shown in FIG. 13A, table 1300*a* illustrates an interspersed variant manifest file for an adaptive streaming video resource. In this example, the interspersed manifest dictates that the user device 1220 will request and receive most of the video segments from CDN #2, but every fifth video segment will be requested and received from CDN #1. In this example, using the techniques discussed above, CDN #1 may analyze the video segment requests that it receives and serves (e.g., timing of requests, requested hostnames, requested bitrates, and other request parameters), and use that data to determine the performance of CDN #2's delivery of the other video segments. For instance, if the requested bitrate of video segment requests has changed between the request for "segment6.ts" and the request for "segment11.ts," then CDN #1 may determine that a bitrate shift or other performance issue has occurred in the delivery of the adaptive streaming resource to the user device 1220. Further, CDN #1 may logically attribute the performance issue to CDN #2, since CDN #2 is the only other CDN providing video segments of the adaptive streaming resource to the user device 1220. As another example, if the URL server hostname in the request for "segment11.ts" is the primary video segment file server of CDN #1, and the hostname in the request for "segment16.ts" references a different segment file server CDN #1 (e.g., a secondary backup or failover server), then CDN #1 may determine that a server failure has occurred at CDN #2 that causes the video player to switch to a secondary manifest with URLs referencing a secondary backup or failover server. As yet another example, in some embodiments CDN #1 may make predictions regarding the timestamps of the next incoming video segment file request it receives. Such timestamp predictions may be based on the timestamps of previously received requests, the video segment length, the interspersing pattern of the manifest, and other factors. For instance, if CDN #1 serves every fifth video segment, as shown in table 1300*a*, and if the video segments are 6 seconds long, CDN #1 may calculate that the request for "segment11.ts" may arrive 30 seconds after the request for "segment6.ts." In this case, if the request for "segment11.ts" arrives 33 seconds after the request for "segment6.ts," then CDN #1 may determine that a buffering event has occurred at the video player on the user device 1220, and (in some cases) may conclude that the buffering event is attributable to a performance issue of CDN #2 in serving the intervening video segments to the user device 1220.

As shown in FIG. 13B, table 1300*b* illustrates another interspersed variant manifest file for an adaptive streaming video resource. In this example, redirects are used so that every video segment file request is initially sent from the user device 1220 to CDN #1. For the majority of the video segment file requests in table 1300*b* (80% in this example), CDN #1 will respond with a redirect (e.g., HTTP 302) that provides the user device 1220 with the actual location of the requested video segment on CDN #2. The examples in FIGS. 13A and 13B are similar, in that the same subset of video segments will be served by CDN #1, while the remaining video segments will be served by CDN #2. Thus, CDN #1 may analyze the video segment file request data and may detect performance issues on CDN #2 in a similar or identical manner as described above. For instance, CDN #1 in this example may similarly detect buffering events, bitrate shifts, video segment file server failures, and the like, and may then logically attribute some or all of those performance issues to CDN #2. Further, in the example shown in FIG. 13B, because CDN #1 receives every video segment file request (not just 20% of them as in FIG. 13A), CDN #1 may use this additional data to further improve its performance analysis and evaluations of CDN #2, such as determining with greater accuracy the times and causes of specific performance issues. However, in some embodiments, the example of FIG. 13A may be preferable to the example of FIG. 13B, due to the additional network traffic and segment service delays caused by the redirects in table 1300*b*.

As shown in FIG. 13C, table 1300*c* illustrates another yet another technique by which CDN #1 may analyze request data and evaluate the performance of CDN #2 with respect to serving the adaptive streaming video to user device 1220. As shown in this example, every URL in the variant manifest file is directed to CDN #1, but will be redirected to CDN #2. Thus, the technique of interspersing URLs that reference different CDNs is not used in this case, and every video segment file will be served by CDN #2. Nonetheless, because CDN #1 initially receives every video segment file request, it may similarly detect buffering events, bitrate shifts, video segment file server failures, and the like, and may then logically attribute some or all of those performance issues to CDN #2, using similar or identical techniques to those described above. However, in this case, because CDN #1 does not serve any of the video file segments, it need not encode or store any video segments, and need not be a content delivery network (CDN) at all. Thus, in the example of FIG. 13C, CDN #1 might be referred to more accurately as a CDN performance analyzer server rather than as a CDN itself. Thus, the potential advantages of the example of FIG. 13C include CDN #1 not be required to store or serve any of the video segment files, allowing CDN #1 to be more cost efficient and performant.

Referring now to FIG. 14, an example table 1400 is shown illustrating performance data for a number of different CDNs. Although no actual performance data is shown in this example, different types and combinations of CDN performance data may be stored in various different embodiments. For instance, the performance metric data for a particular CDN may include averages or total aggregated data for number of adaptive streaming video resources served, number of segments served, delivery speeds, numbers of delivery failures, numbers of buffering events, severity of buffering events, numbers and types of bitrate shifts, number of server failures, etc. In some embodiments, one or more of the above metrics may be combined into a single overall performance metric that can be easily compared to the corresponding performance metrics of other CDNs. The "Performance Metrics" data populating table 1400 and other such performance tables may be determined using any of the CDN performance analysis/evaluation techniques discussed herein. For example, a particular CDN (and/or performance analyzer server that is not a traditional CDN) may use the techniques discussed above to determine the performance of other CDNs, such as CDN #1, CDN #2, and CDN #3 in table 1400.

Additionally, in many computing/networking environments, particular CDNs may perform better or worse at serving adaptive streaming video to different geographic regions, and/or to different access network. Thus, in this example CDN performance table 1400, each CDN has a separate set of performance metrics listed for different permutations of geographic region/city and access network. This simplified example includes only two cities and two access networks, but it should be understood that CDN performance data may be collected and classified separately across many different geographic regions (e.g., cities, states, zip codes, etc.) and many different access networks in other implementations. Further, in some embodiments it may be observed that performance of particular CDN(s) may vary based on other factors, such as the type of user device 1220, the type of video player hardware/software used on the device 1220, the time window during which the adaptive streaming video is served (e.g., morning, afternoon, prime time, late night, etc.), the streaming protocol used, the user's access network (or IP address ranges within it), or other characteristics of video streams and video stream deliveries. Thus, in other examples, separate sets of CDN performance data metrics may be calculated for the different permutations of these factors as well.

As discussed previously, after collecting and analyzing a statistically sufficient amount of performance data from multiple CDNs, the performance data then may be used to select particular CDNs to serve subsequent adaptive streaming video requests from user devices 1220. As indicated in table 1400, the selection of a CDN (or multiple CDNs) to serve an adaptive streaming video may depend on factors such as the geographic location and the access network of the requesting user device 1220. In other embodiments, additional factors such as request time, device type, video player type, requested video quality (bitrate), among others, may be taken into account when determining which CDN (or CDNs) should be selected to serve the adaptive streaming video responsive to the request.

Referring now to FIGS. 15A and 15B, two diagrams are shown illustrating systems for delivering adaptive streaming video from one or more content delivery networks (CDNs) to user devices. In both examples, discussed separately below, a user device 1520 requests video content from content publisher 1530, and is directed to one or more CDNs 1510 from which the user device 1520 may request and receive the corresponding adaptive streaming video content. As discussed above, the adaptive streaming video content may correspond to video-on-demand (VOD), dynamic VOD, and/or live streaming content. Thus, content publisher 1530 may be, for example, an Internet-based video streaming web site, other video streaming service, or a live streaming television provider, etc.

In FIG. 15A, in addition to the various system components, several numbered circles are shown (1-5) to illustrate certain device-to-device communications that may occur during the processes of requesting/delivering adaptive streaming video to the user device 1520. In step 1, the user device 1520 requests a particular streaming video from the content publisher 1530. In step 2, the content publisher 1530 responds to the request by directing the user device 1520 to CDN #1 1510*a*, which in this case also serves as the performance analyzer server. The communication in step 2 may be performed by the content publisher 1530 returning a redirect (e.g., an HTTP 302 message), by providing the user device 1520 with a master manifest file that directs the user device 1520 to CDN #1 1510*a*, by providing the user device 1520 with a variant manifest file that directs the user device 1520 to CDN #1 1510*a*, by including a hostname in a URL contained in a manifest file that resolves to CDN #1 1510*a*, or by another technique. In step 3, the user device 1520 may contact CDN #1 1510*a*, for example, to request a manifest file or an updated manifest file for the adaptive streaming video. As noted above, CDN #1 1510*a* may include a performance analyzer configured to select which CDN (or CDNs) 1510 are preferable for serving the particular adaptive streaming video to the user device 1520. As discussed above, the determination by the CDN #1/performance analyzer 1510*a* of which CDN(s) 1510 should serve the adaptive streaming video may be based on previously determined performance metrics for the CDNs, as well as additional factors such as the time of the request (e.g., day of the week, time of day, etc.), the geographic location of the user device 1520, the access network of the user device 1520, the device type of the user device 1520, and the video player and other hardware/software components of the user device 1520. After determining which CDN(s) 1510 should be used to serve the adaptive streaming video to the user device 1520, CDN #1 1510*a* may generate a corresponding manifest file (e.g., by modifying/updating a source manifest file received from the content publisher 1530) and return the manifest file back to the user device 1520 in step 4. Then, in step 5, the user device 1520 may use the manifest file received in step 4, to request/receive video segments from one or more of the CDNs 1510.

In FIG. 15B, a similar system and process is illustrated to that described above in FIG. 15A. However, in the example shown in FIG. 15B, none of the CDNs 1510 includes a performance analyzer component, but rather a CDN performance analyzer 1550 is implemented as a separate system unrelated to any of the CDNs 1510. In this example, in step 1, the user device 1520 may request a particular streaming video from the content publisher 1530. In step 2, the content publisher 1530 may transmit a request to the CDN performance analyzer 1550. As shown in this example, the CDN performance analyzer 1550 may be a separate device/server from any of the CDNs 1510.

In some embodiments, the request in step 2 may be a manifest file request from the content publisher 1530 to the CDN performance analyzer 1550. For example, CDN performance analyzer 1550 may include a manifest generator component (or may access a separate manifest builder device/server) that is configured to receive requests from content publishers 1530 or other client devices, and to generate and return variant manifest files in response. In such embodiments, the manifest generator server of 1550 may generate updated manifest files based on source manifest files received from the content publisher, by using the previously collected CDN performance data to determine which of the available CDN(s) 1510 should be used to serve the adaptive streaming video, and then building the appropriate video segment URLs within the manifest file to reference the selected CDNs 1510. Thus, the data returned to the content publisher in step 3 may include a manifest file generated by the manifest generator of 1550 for the user device 1520 to stream the requested video. As discussed above, the process that a manifest generator (e.g., within, or associated with, the CDN performance analyzer 1550) may use to determine which CDNs 1510 should be used to serve the adaptive streaming video may be based not only on the performance metrics of the various CDNs 1510, but also on the characteristics of the user device 1520 (e.g., device type, location/region, access network, etc.), the characteristics of the streaming video request, and other factors discussed below.

In other embodiments, the request in step 2 of FIG. 15B might not be a request for a manifest file, and the response in step 3 might not include a manifest file. Instead, the request in step 2 might be only a request for performance data and/or other manifest file-related data, to allow the requesting device itself to build the manifest file. For instance, as discussed below in reference to FIG. 16, a manifest builder application programming interface (API) or other software components may be provided (e.g., within or associated with the CDN performance analyzer 1550), which do not directly generate manifest files, but instead return information to allow a requesting device (e.g., content publisher 1530, user device 1520, etc.) to build a manifest file for the adaptive streaming video. Thus, the data returned to the content publisher in step 3 of FIG. 15B (and the data returned to the user device in step 4 of FIG. 15A), may include a manifest file for the requested adaptive streaming video, or may instead include information (e.g., CDN performance data, a selection of the CDNs to serve the video, data defining an interspersing pattern to be used) that will allow the requesting device to construct a manifest file for the adaptive streaming video.

In step 4 of FIG. 15B, the content publisher 1530 may return the manifest file to the user device 1520. As noted above, in various different embodiments, the manifest files to be used by the user device 1520 may be generated by the CDN performance analyzer 1550, the content publisher 1530, the user device 1520 itself, or by other third-party manifest builder component. Thus, in some cases, the information returned in step 4 might not include a manifest file, but may include information that allows the user device 1520 to generate its own manifest file and/or request a manifest file from a third-party manifest builder. Finally, in step 5, the user device 1520 may use the manifest file received in step 4 (or generated thereafter) to request/receive video segments from one or more of the CDNs 1510.

Referring now to FIG. 16, an example process is illustrated for providing manifest-related information to a requesting device, thereby allowing the requesting device to generate a manifest file. As noted above, in some embodiments, components having access to CDN performance analysis data (e.g., CDN 1510*a* of FIG. 15A, performance analyzer server 1550 of FIG. 15B) may directly generate and return manifest files. However, in other cases, such components might not generate manifest file, but instead may provide manifest-related data to a requesting device, to allow the manifest issuer to be the content publisher 1530, user device 1520, or other third-party manifest generator. Thus, the steps in FIG. 16 may be performed, for example, by a manifest builder application programming interface (API) or other software components implemented within a CDN 1510 (e.g., 1510*a* of FIG. 15A) and/or CDN performance analyzer (e.g., CDN performance analyzer server 1550).

In step 1601, the manifest builder API may receive a request from a manifest issuer (e.g., user device 1520, content publisher 1530, etc.) to provide manifest file data. The request in step 1601 may correspond to initial source manifest file received from the content publisher, and/or may include related information identifying the adaptive streaming video to be provided and the user device 1520 requesting the video. In step 1602, the manifest builder API may retrieve the CDN performance data previously collected/analyzed for the available CDNs 1510, and may determine which CDN (or CDNs) should be used to serve the adaptive streaming video to the user device 1520. As discussed above, the process that the manifest builder API may use to determine which CDNs 1510 should be used to serve the adaptive streaming video to the user device 1520 may be based not only on the performance metrics of the various CDNs 1510, but also on the characteristics of the user device 1520 (e.g., device type, location/region, access network, etc.), the characteristics of the streaming video request, and other factors. Additionally, in step 1602, the manifest builder API may determine a pattern of interspersing URLs to be used in the manifest file to be generated. As discussed below, in some embodiments, requests for adaptive steaming video may continue to be served by a combination of CDNs 1510, using a manifest file with interspersed URLs, even after CDN performance data has been collected and analyzed, and the performance of all available CDNs 1510 has been analyzed. In such embodiments, the manifest builder API may determine an interspersing pattern for the URLs referencing different CDNs 1510 in step 1602, in order to confirm, update, and improve the previous CDN performance analyses. Finally, in step 1603, the manifest builder API (e.g., within a CDN 1510 and/or within CDN performance analyzer server 1550), may transmit back to the requesting device (e.g., content publisher 1530 or user device 1520) the CDNs 1510 and interspersing pattern determined in step 1602, thereby allowing the requesting device to be the manifest builder/issuer.

As discussed in detail previously, embodiments described herein may allow servers/devices associated with one CDN (or servers/devices of a separate performance analyzer server that is not associated with a CDN) to be used to analyze and evaluate the performance of other CDNs with respect to delivering the adaptive streaming video to user devices. Further, previous CDN performance analyses and evaluations may be used to select which CDNs should be used to serve subsequent adaptive streaming video requests from user devices 1520. As discussed above, the determination of which CDN (or CDNs) will serve a newly received request for adaptive streaming video may be performed by a particular CDN 1510 or other server (e.g., a separate non-CDN performance analyzer 1550) which may include a manifest generator, manifest builder API, or the like, and may have access to the previous CDN performance analyses and evaluations (e.g., performance table 1400).

In some cases, the determination of which CDN(s) 1510 should be used to serve a new adaptive streaming video request from a user device 1520, may include simply accessing the previous performance data and selecting the optimal (e.g., best performing) CDN 1510 available to serve the entire adaptive streaming video to the user device 1520. In such cases, an interspersed manifest and/or redirects might not be used, as every URL in the manifest file might reference the same CDN 1510 selected to service the request. However, in other cases, the techniques above including interspersed manifests, redirects, etc., may be continued even after the selected CDNs have been determined, in order to continue evaluating/updating the performance of the available CDNs 1510 over time as conditions may change. For example, the manifest generator (or manifest builder API software, etc.) may continue to use any of the techniques described above (e.g., FIGS. 13A-13C), in which a CDN is selected (e.g., as CDN #2) to serve the majority of the video segment file requests, but another CDN remains involved (e.g., as CDN #1) to continue to monitor, analyze, and evaluate the performance of the selected CDN #2. In some embodiments, the manifest generator may handle most of the requests in this manner, but for a relatively small number of requests (e.g., 2%), a different CDN previously evaluated to not be the selected CDN may nevertheless be selected (e.g., as CDN #2), so that the performance of the CDNs not initially selected may continue to be monitored, analyzed, and evaluated over time. Thus, a change in the performance or other metrics of a CDN that has been previously evaluated as not the selected CDN can be detected, and thus that CDN may be selected as the CDN for future requests. Note that the selected CDN may be selected for reasons other than being determined to be best performing, for example because its performance is good enough even though not best, or because a minimum volume of data or minimum share of data or sessions has been specified for this CDN.

Referring now to FIG. 17, an example process is illustrated by which a first CDN serving a subset of the video segment files of an adaptive streaming video may analyze the performance of a second CDN serving the remaining video segment files of the adaptive streaming video. Thus, the steps in this process may be performed, for example, by a first CDN (1210a, 1510a, etc.) configured to detect adaptive streaming video delivery performance data, and attribute particular performance data or performance issues to other CDNs (e.g., 1210b, 1510b, etc.), using the various techniques previously described.

In step 1701, a first CDN (e.g., 1510a) may receive a request for a video segment file from a user device (e.g., 1520) as part of an adaptive streaming video delivery to the user. In step 1702, the first CDN 1510a may transmit the requested video segment file to the user device 1520. In step 1703, which also may be performed before or concurrently with step 1702, the first CDN 1510a may store certain data related to the first video segment file request. As discussed above, such request data may include the source of the request, the particular segment file requested, the particular server within first CDN to which the request was directed, the timestamp of the request, the bitrate requested for the first video segment file, and/or any other request parameters. In step 1704, the first CDN 1510a may request for another video segment file from the user device 1520, and in step 1705 the first CDN 1510a may transmit requested video segment file to the user device 1520. Thus, steps 1704 and 1705 may be similar or identical to steps 1701 and 1702.

In steps 1706, the first CDN 1510a may evaluate the video segment file requests received from the user in steps 1701 and 1704, and in particular may compare the requested video segments to determine whether or not it (the first CDN 1510a itself) is serving video segments in accordance with an interspersed manifest file. For example, referring to the example manifests shown in FIGS. 13A and 13B, if the first CDN 1510a determines that it has received requests for non-consecutive video segment files, then it may determine in step 1706 that the user device 1520 is using an interspersed manifest file to retrieve the video segments of the adaptive streaming video. Specifically, if the first CDN 1510a determines that it is receiving only 20% of the video segment file requests (e.g., every fifth request), then it may determine that it is serving the role of CDN #1 in the example shown in FIG. 13A, or if it determines that it is receiving 80% of the video segment file requests (e.g., four out of every five requests), then it may determine that it is serving the role of CDN #2 in the example shown in FIG. 13A. Of course, it should be understood that the 80/20 example in FIG. 13A is illustrative only, and that other percentages and/or patterns may be used when using multiple CDNs to serve a single adaptive streaming video. Thus, in other cases, the first CDN 1510a in step 1706 may detect the particular patterns of video segments that is has/has not received requests for, along with the timestamps of the segment requests and other request data, to determine whether the user device 1520 is using an interspersed manifest file.

If the first CDN 1510a determines that it is serving video segments in accordance with an interspersed manifest file (1706:Yes), then in step 1707 the first CDN 1510a may store data related to the second video segment file request, and in step 1708 may initiate any of the various CDN performance data collection processes, CDN performance analyses, and CDN performance evaluations described above. Thus, as this example illustrates a particular CDN 1510*a* may determine that the user device is using an interspersed manifest file, and may initiate CDN performance analyses in response, without the particular CDN 1510*a* ever having access to the manifest file.

Referring now to FIG. 18, an example system 1800 is shown for requesting and delivering adaptive streaming video to user devices. In this example, system 1800 includes an IP network 1850, including one or more CDN servers 1810 and one or more network gateway devices 1851. Additionally, system 1800 shows a wireless access network 1860, including a number of user devices 1820, various wireless network infrastructure (e.g., cellular towers 1862), and a packet data network gateway 1861. In some cases, system 1800 may correspond to a specific implementation of the networking and computing environment 1100 discussed above in FIG. 11. For instance, IP network 1810 may correspond to the Internet or other public communication network 1150, and wireless network 1860 may correspond to one or more of the access networks 1160 previously discussed. Additionally, CDN server 1810 may correspond to any of the CDNs previously discussed in the above examples and embodiments. As discussed in more detail below, CDN server 1810 may be implemented as a traditional (or non-traditional) CDN which may be configured to provide adaptive streaming videos (or portions of such videos) to user devices 1820. Additionally or alternatively, CDN server 1810 might not itself actually provide adaptive streaming video to user devices 1820, but may be implemented as separate manifest generator system having specialized hardware and/or software components for determining which CDNs will serve particular adaptive streaming videos, and generating/providing corresponding manifest files. Further, the CDN server 1810 might be implemented as a CDN performance analyzer (e.g., 1550) which may be configured to analyze and evaluate the performance of other CDNs with respect to delivering the adaptive streaming video to user devices, in addition to or instead of being configured to operate as a CDN itself.

Wireless access network 1860 may be, for example, an LTE network (or a 2G, 3G, or 5G, etc. wireless network) provided by a particular wireless network service provider (which also may be referred to as a carrier or operator). The wireless network 1860 may include various infrastructure components 1862, such as cellular towers and/or base stations, having transceivers, digital signal processors, GPS receivers, etc. Additionally, various other physical network components of the wireless network 1860 have not been shown in this figure so as not to obscure the other elements depicted in the figure, but it should be understood that any combination of network hardware components and network architecture designs may be implemented in various embodiments to support communication between wireless user devices 1220 and CDN servers 1210.

Additionally, wireless network 1860 in this example includes a packet data network gateway 1861. The packet data network gateway 1861 (or p-gateway) may be implemented as the physical point at which the wireless network 1860 interfaces with the IP network 1850. For example, the packet data network gateway 1861 receive and process all network traffic from the wireless network 1860 to the IP network 1850, including translating the wireless network traffic transmitted as radio waves via the radio access network into IP packets for transmission via the IP network 1850. In various embodiments of different network and computing environments, a single packet data network gateway 1861 or multiple packet data network gateways 1861 might be implemented within/between the networks, and all traffic between user devices 1820 and CDN servers 1810 may be transmitted through the packet data network gateway 1861. As indicated by the dotted box around the packet data network gateway 1861 and the IP network gateway 1851, in some embodiments these devices may be combined into a single device such as a packet data network gateway 1861 that is part of both the IP network 1850 and the wireless network 1860.

Due to the nature and function of the packet data network gateway 1861, the gateway 1861 has additional information about user devices 1820, and the communication sessions of the user devices 1820 with the IP network 1850, that might not be known or available to servers within the IP network that communicate with the user devices 1820. For example, during a communication session between a user device 1820 and the CDN server 1810, the transmission data or other data received by the packet data network gateway 1861 may indicate, for instance: the particular cell towers, base stations, and/or other wireless network infrastructure that the user device 1820 is using; what type of wireless connection the user device 1820 is using (e.g., a 2G, 3G, 4G, 5G, or other wireless connection type); whether or not the user device 1820 is roaming; the specific location of the user device 1820, the amount of bandwidth available for communicating with the user device 1820, whether the user device 1820 is using a pre-paid or post-paid Internet data plan, etc.

In some embodiments, system 1820 and other similar implementations may be used to provide encrypted delivery of adaptive streaming video between CDNs (e.g., 1810) and user devices 1820. For example, cryptographic technologies and protocols such as Secure Sockets Layer (SSL) and/or Transport Layer Security (TLS) may be used for encrypted communication sessions between the mobile devices 1820 and CDN servers 1810. In these examples, a shared secret (or shared session key) may be established for each new communication session between a user device 1820 and CDN server 1810, which may be discarded following the session. For instance, the user device 1820 may generate the session key, encrypt the session key using the public key of the CDN, and then transmit that encrypted session key to the CDN server 1810. The CDN server 1810 may use its own private key to decrypt and obtain the session key, and then may use the session key for all future transmissions to user device 1810 during the session. In some examples, session keys may use symmetric encryption, such that the same session key may be used for encrypting and for decrypting data during the session.

Additionally, SSL and TLS, and other encryption techniques, may provide endpoint to endpoint encryption, meaning that the data received by and transmitting from the packet data network gateway 1861 (and all other intermediary network devices) is encrypted. For instance, the header data may be unencrypted to allow the packet data network gateway 1861 and other network devices to properly forward the data, but the contents of the transmission may be encrypted. As discussed below, techniques discussed herein relate to using the packet data network gateway 1861, or other device located between transmission endpoints, to decrypt and open the encrypted data transmissions between the user device 1820 and CDN server 1810, allowing the packet data network gateway 1861 to provide additional information regarding the wireless device 1820 and/or wireless communication session back to the CDN server 1810. Although the examples discussed below describe the decryption and insertion of mid-stream data by the packet data network gateway 1861 it should be understood that in other embodiments similar techniques may be performed by an IP network gateway 1851 (e.g., configured to perform carrier grade network address translation (NAT), subscriber management, deep packet inspection, and/or filtering, etc.), or by another device located between the transmission endpoints.

Referring now to FIGS. 19A and 19B, two flowcharts are shown illustrating processes by which a server (e.g., CDN server 1810) may generate and provide a manifest file to a requesting user device (e.g., 1800), shown in FIG. 19A, and by which a server may provide video segment files to a requesting user device, shown in FIG. 19B. As discussed below, the processes illustrated in these examples may be similar to the processes and techniques discussed previously. However, in these examples, the CDN server 1810 may receive and use data provided by the packet data network gateway 1861 or other device relating to the wireless session of the user device 1820 within the wireless network 1860.

Referring to FIG. 19A, in step 1901, the CDN server 1810 may receive a request from a particular user device 1820 on a wireless network 1860 to establish a secure communication session. As discussed below, the steps in FIG. 19A relate to receiving and responding to a request from the user device 1820 for a manifest file. The manifest file request (step 1903) may be sent using an HTTP GET. However, prior to the transmission of the manifest file request in step 1903, the TCP session may be setup in step 1901. The setup of the TCP session between the user device 1820 and the CDN server 1810 may begin with a first SYN packet transmitted from the user device 1820 to the CDN server 1810. In response, the CDN server 1810 may generate a session identifier (or session ID) and transmit an SYN-ACK response back to the user device 1820 including the session identifier. In some embodiments, the initial SYN from the user device 1820 also may include a request for the CDN server's 1810 public key, and the SYN-ACK from the CDN server 1810 back to the user device 1820 may include the public key of the CDN server 1810. Such embodiments may allow the user device 1820 to obtain the CDN server's 1810 public key, which may be used subsequently to encrypt the session key. In other embodiments, the user device 1820 may use other techniques (e.g., accessing a public web server associated with the CDN) to obtain the CDN server's 1810 public key.

If the communication session need not be encrypted, then after receiving the SYN-ACK from the CDN server 1810, then the user device 1820 may transmit an ACK message back to the CDN server 1810 to complete the TCP handshake process. However, for encrypted communication sessions, after the user device 1820 receives the SYN-ACK message from the CDN server 1810, it may generate a session key, encrypt the session key using the public key of the CDN server 1810, and transmit the encrypted session key back to the CDN server 1810 using one or more additional messages. In these additional messages, along with the encrypted session key and the corresponding session ID, the user device 1820 may transmit the SSL/TLS version and/or cipher information to the CDN server 1810. In response to these additional messages, the CDN server 1810 may transmit back corresponding responses to the user device 1820 to complete the SSL/TLS handshaking process.

In step 1902, the CDN server 1810 may decrypt and transmit the session key to the packet data network gateway 1861 (or other intermediary network device in other examples). As noted above, the session key may be a session-specific shared secret between the particular user device 1820 and the CDN server 1810, which both endpoints may use to encrypt and decrypt session data transmitted between the devices. The CDN server 1810 may receive the encrypted session key from the user device 1820 during the establishing of the secure communication session (step 1901), and then may decrypt the session key using its own private key. After decryption of the session key, the CDN server 1810 may store and use the session key for the duration of the communication session, to encrypt data to and/or decrypt data transmitted to and/or from the user device 1820.

It may be noted from the above discussion that by the time the CDN server 1810 transmits its final message back to the user device 1820 during the SSL/TLS handshaking process, it may already have the session key. Thus, in step 1902, the CDN server 1810 may decrypt and transmit the session key to the packet data network gateway 1861 before the SSL/TLS handshaking process of step 1901 is concluded, and also before the user device 1820 transmits the HTTPS GET request for the manifest file (step 1903). Additionally, in this example, the session key may be provided to the packet data network gateway 1861 without any involvement by and/or knowledge of the user device 1820, in a way that need not cause delays or any duplicate/redundant transmissions between the user device 1820 and the CDN server 1810 in the requesting of the manifest file.

As noted above, the user device 1820 may encrypt the session key with the CDN server's 1810 public key before transmitting it to the CDN server 1810 in step 1901. Similarly, in step 1902, the CDN server 1810 may use similar techniques to encrypt the session key with a public key associated with the packet data network gateway 1861 (and/or with the carrier generally), and the packet data network gateway 1861 may decrypt the session key using its private key before using it.

In step 1903, after the completion of the SSL/TLS handshaking process, and after the session key has been provided to the packet data network gateway 1861, the user device 1820 then may send the HTTPS GET to the CDN server 1810 for the requested manifest file. From the perspective of the user device, step 1903 may be similar or identical to various manifest file requests previously discussed above. However, as noted above, the user device 1820 and CDN server 1810 may be configured to use encrypted communication sessions in some embodiments, and therefore the user device 1820 may encrypt the manifest file request with the session key, and transmit the manifest file using TLS/SSL, and/or other encryption protocols. Likewise, the CDN server 1810 may decrypt the manifest file using the session key. It should be noted the CDN server 1810 in this example may be implemented to function as a traditional (or non-traditional) CDN that directly serves streaming video to user devices 1820, or may be implemented as only a manifest generator and/or CDN performance analyzer server that does not itself serve any streaming video segment files.

In some embodiments, the encrypted manifest file request in step 1903 may be transmitted normally by the user device 1820, but may be intercepted and modified by the packet data network gateway 1861 on route to the CDN server 1810. For example, the packet data network gateway 1861 may modify the manifest file request to include any of the wireless user device data and/or wireless session data that is available to the packet data network gateway 1861. For example, as discussed above, the packet data network gateway 1861 may have information such as the particular cell towers, base stations, and/or other wireless network infrastructure that the user device 1820 is using; what type of connection the user device 1820 is using (e.g., a 2G, 3G, 4G, 5G, or other wireless connection type); whether or not the user device 1820 is off-network (or roaming); the specific location of the user device 1820, the amount of bandwidth available for communicating with the user device 1820, whether the user device 1820 is using a pre-paid or post-paid Internet data plan, etc. Thus, the packet data network gateway 1861 may insert any (or all) of this additional data into the manifest file request transmitted in step 1903. In order to insert the data into the manifest file request, the packet data network gateway 1861 may use the session key received in step 1902 to decrypt the manifest file request, insert the wireless session data for the user device 1820 (e.g., into the headers of the HTTP request), and then use the session key to re-encrypt the manifest file request. Finally, the packet data network gateway 1861 may forward the modified manifest file request onto the CDN server 1810, which may receive and decrypt the modified manifest file request in the same manner as it would the original manifest file request.

In step 1904, the CDN server 1810 may retrieve the wireless session data for user device 1820, from the packet data network gateway 1861. Continuing with the above example, the wireless session data for user device 1820 may be inserted by the packet data network gateway 1861 directed into the manifest file request. Thus, the CDN server 1810 may receive the manifest file request from the user device 1820 and may extract the user device's 1820 wireless session data directly from the request headers and/or elsewhere in the request. As discussed above, the wireless session data for the user device 1820 may include, for example, the particular cell towers, base stations, and/or other wireless network infrastructure that the user device 1820 is using at the time of the manifest request, what type of connection the user device 1820 is using (e.g., a 2G, 3G, 4G, 5G, or other wireless connection type); whether or not the user device 1820 is roaming; the specific location of the user device 1820, the amount of bandwidth available for communicating with the user device 1820, whether the user device 1820 is using a pre-paid or post-paid Internet data plan, etc. Thus, any or all of this data relating to the user device's current wireless session may be extracted by the CDN server 1810 from the manifest file request. In other examples, the user device's current wireless session data need not be inserted into the manifest file request, but may be transmitted in any separate communication (e.g., out of band transmission) directly or indirectly from the packet data network gateway 1861 to the CDN server 1810.

In step 1905, the CDN server 1810 may generate the requested manifest file for the user device 1820, taking into account the various wireless session data received for the user device 1820 in step 1904. For example, if the packet data network gateway 1861 transmits data to the CDN server 1810 indicated that the user device 1820 is using a relatively slow wireless connection, then the CDN server 1810 may select lower bitrates for the video segment files in the manifest file. On the other hand, if the data transmitted to the CDN server 1810 from the packet data network gateway 1861 indicates that the user device 1820 is using a relatively fast wireless connection, then the CDN server 1810 may select higher bitrates for the video segment files in the manifest file. In other examples, if the data received from the packet data network gateway 1861 indicates that the user device 1820 is currently roaming, or is approaching (or above) its monthly data quota for its data plan, and/or is using a pre-paid Internet data plan, then the CDN server 1810 may use lower bitrates for the manifest file. Similarly, if the data received from the packet data network gateway 1861 indicates that the user device 1820 indicates that the user is currently moving between different cell towers and may be heading toward a weak signal coverage area, and/or if the cell towers 1862 and/or other network components of the wireless network 1860 are currently handling a large amount of other network traffic, then the CDN server 1810 (and thus lower bandwidth is available for the connection to the user device 1820), then the CDN server 1810 also may use lower bitrates for the manifest file. To the contrary, when the data received from the packet data network gateway 1861 indicates that the user device 1820 is not roaming, has sufficiently high bandwidth available, has a sufficiently high data plan, etc., then the CDN server 1810 may select higher bitrates when generating manifest file.

Although the above examples relate to selecting the bitrates to use within the manifest file based on the wireless connection data for the user device 1820, additionally or alternatively, other features of the manifest file may be determined based on the user device's 1820 wireless connection data as well. For example, based on any of the various wireless connection data for the user device 1820 discussed above that may be received from the packet data network gateway 1861, the CDN server 1810 may select a different CDN (or combination of CDNs) to deliver the adaptive streaming video, and/or may select a different pattern for the manifest file (e.g., whether to not to generate an interspersed manifest, whether or to generate a manifest using redirects to other CDNs, etc.). For instance, the CDN server 1810 may implement policies by which certain CDNs are used for lower bitrate adaptive streaming videos (e.g., for user devices 1820 with slower connections, roaming user devices 1820, or user devices 1820 with lower bandwidth availability, etc.), while other CDNs may be used for higher bitrate adaptive streaming videos.

Additionally, in some embodiments, CDN server 1810 may determine that CDN performance analyses for delivery of the adaptive streaming video should only be performed when the user device 1820 has certain wireless session characteristics and not others. For instance, the CDN server 1810 might want to evaluate CDN performance only when it is determined that the user device 1820 has a fast connection on the wireless access network 1860, or when the user device is not roaming, and/or has sufficiently high bandwidth available on the wireless network 1860 (or vice versa for any of the above), and thus the CDN server 1810 may generate an interspersed manifest and/or a manifest using redirects to measure CDN performance in those cases, but not others.

Finally, in step 1906, the CDN server 1810 may transmit the manifest file generated in step 1905 back to the user device 1820. As noted above, the delivery of wireless session data from the packet data network gateway 1861 to the CDN server 1810 may be entirely transparent to the user device 1820, and need not cause delays or any duplicate/redundant transmissions between the user device 1820 and the CDN server 1810. Thus, the transmission of the manifest file by the CDN server 1810 and receipt and use of the manifest file by the user device 1820 may be performed identically to other embodiments discussed previously.

Referring now to FIG. 19B, a related example process is illustrated in which the CDN server 1810 may receive and respond to requests for video segment files from the user device 1820 for adaptive streaming video. As in this example, the process shown in FIG. 19B may be continuation of the process shown in FIG. 19A, and may be performed immediately after and/or within the same secure network session. For instance, a user device 1820 may first request a manifest file for an adaptive streaming video from the CDN server 1810 (FIG. 19A), and then may immediately thereafter begin requesting all or a portion of the individual video segment files from the CDN server 1810. However, in other embodiments, the processes shown in FIGS. 19A and 19B may be performed separately without involving the other. For instance, the CDN server 1810 might only provide manifest files that direct the user device to other CDNs, while in other examples a CDN server 1810 might only receive and serve requests for video segment files (FIG. 19B) without having issued or even having been aware of the issuance of the manifest file.

In step 1907, the CDN server 1810 may receive a request from a user device 1820 for a video segment file within an adaptive streaming video. The video segment file request may be similar or identical to the video segment file requests previously discussed. As noted above, in some embodiments the request in step 1907 may be received within a secure (e.g., encrypted) communication session between the CDN server 1810 and the user device 1820. In such embodiments, the secure connection may have already been established, for example, in step 1901 before the manifest file request. In other embodiments, if a secure connection has not been established (or was ended), then steps 1901 and 1902 may be performed (again) before step 1907.

In step 1908, the CDN server 1810 may retrieve various wireless session data for the user device 1820 from the packet data network gateway 1861. In some cases, the video segment file request received in step 1907 may include the user device's 1820 wireless session data, which may be inserted into the request by the packet data network gateway 1861 using similar or identical techniques to steps 1904 and 1905, discussed above.

Additionally, step 1908 may be optional in some embodiments. For instance, if the CDN server 1810 has already received the user device's 1820 wireless session data (e.g., in step 1904 within a manifest request), then additional wireless session data might not be retrieved in step 1908. However, in other embodiments, even if the CDN server 1810 has previously received wireless session data from the packet data network gateway 1861, updated wireless session data may be received in step 1908. For example, the packet data network gateway 1861 may be configured to insert new wireless session data into every video segment file request from the user device 1820 to the CDN server 1810. In other examples, the packet data network gateway 1861 may the user device's 1820 wireless session data into periodical video segment file requests (e.g., every $10^{th}$ video segment, every $20^{th}$ video segment, etc., or every 2 minutes, every 5 minutes, etc.), so that the CDN server 1810 may periodically record the updated wireless session data for the user device 1820, in order to match the wireless session characteristics of the user device 1820 to the performance of the CDNs in delivering the adaptive streaming video.

In step 1909, the CDN server 1810 may provide the requested video segment files to the user device 1820, in response to the request received in step 1907. Then, in step 1910, the CDN server 1810 may determine the performance of any other CDN servers in delivering streaming video to the user device 1820. The delivery of video segment files in step 1909, and the CDN performance measurements and evaluations in step 1910 may be performed using similar or identical techniques to those previously discussed. For example, the CDN server 1810 may deliver only a portion of the video segments in accordance with an interspersed manifest, and/or may use redirects, so that performance data may be collected for one or more other CDNs that deliver at least a portion of the adaptive streaming video to the user device 1820. Additionally, in some embodiments, the delivery of video segment files in step 1909 may be based on the initial wireless session data received in step 1908 and/or any updated session data received periodically during the wireless session. For example, if while providing an adaptive streaming video to the user device 1820 during a wireless session, the CDN server 1810 receives updated session data inserted by the packet data network gateway 1861 indicating that the wireless connection has slowed, that the wireless user is now roaming, has exceeded its data plan, etc., then the CDN server 1810 may proactively stop or slow the transmission of the adaptive streaming video, or change how (or from where) the video segment files are provided to the user device 1820. For instance, the CDN server 1810 may intentionally delay the transmission of one or more video segment files to cause a bitrate downshift, or begin responding with redirects to a different CDN rather than providing the video segment files directly, to accomplish the same purposes discussed above when generating the manifest file in step 1905 taking into account the various wireless session data received for the user device 1820. Similarly, if the CDN server 1810 receives updated session data inserted by the packet data network gateway 1861 indicating that the wireless connection has sped up, or that the user is no longer roaming, etc., then the CDN server 1810 may proactively initiate a bitrate upshift or otherwise change how (or from where) the video segment files are provided to the user device 1820 to account for the updated wireless session data received for the user device 1820.

In step 1911, the CDN server 1810 may provide both the CDN performance data determined in step 1910, and the user device's 1820 wireless session data retrieved in step 1908, back to the content publisher and/or to various other external systems. Thus, the techniques described herein may allow for CDN performance data for delivery of adaptive streaming video to be measured and analyzed, while taking into account particular wireless session characteristics. For example, the performance data provided to the content publisher in step 1911 may include both the detected performance of the CDN (e.g., bitrate upshifts or downshifts, buffering events, server failures) as well as the detected wireless session characteristics (e.g., slower/faster connection, low/high bandwidth availability, etc.). The performance data in step 1911 thus may provide a more comprehensive analysis of both the CDN performance and the wireless access network performance in the delivery of adaptive streaming video, including the performance affects that the wireless access network may have on the CDN, and vice versa. For example, if one or more CDN performance issues (e.g., bitrate downshifts, buffering events, server failures, etc.) are detected, and the wireless session data indicates that the user device 1820 has a high-speed and high-quality wireless connection, then the CDN server 1810 and/or content publisher may attribute the CDN performance issues to the particular CDN that was serving the video the user device 1820. On the other hand, if certain CDN performance issues are detected, but the wireless session data indicates that the user device 1820 has a lower-speed and/or lower-quality wireless connection, then the CDN server 1810 and/or content publisher may attribute some or all of the CDN performance issues to the wireless network rather than to the CDN(s) that were serving the video the user device 1820.

Referring now to FIG. 20, an example process is illustrated by which a CDN server (e.g., 1810) may respond to an adaptive streaming video request from a user device (e.g., 1820), transmitted via a secure connection. The process shown in this example may be performed in connection with the processes discussed above in FIGS. 19A and 19B, and/or any other adaptive streaming video requests between a user device 1820 in a wireless access network 1860 and a CDN server 1810. As discussed in those examples above, a CDN server 1810 may provide a private session key to a packet data network gateway 1861 (or other intermediary network device), thereby allowing the packet data network gateway 1861 to open encrypted data packets between the user device 1820 to the CDN server 1810, insert specific wireless session data into the packets headers, and then re-encrypt and forward the data packets onto the CDN server 1810. However, in some cases, certain wireless networks 1860 (or carriers) might not be trusted by certain CDN's and/or content publishers, and vice versa. Thus, the example process in FIG. 20 may be performed by the CDN server 1810 to enforce policies regarding which wireless networks 1860 are permitted to receive secure sessions keys in which situations.

In step 2001, the CDN server 1810 may receive an encrypted request from a user device 1820 associated with a request for adaptive streaming video resources. For example, the request received in step 2001 may be a communication used to establish a secure connection during a TCP or SSL/TLS handshaking process, and thus the request may include a session key as discussed above in steps 1901-1902. In some cases, the request may include, or may be a precursor to, a request for a manifest file (e.g., step 1903) or a request for one or more video segment files of an adaptive streaming video (e.g., step 1907). Further, in some embodiments, the user device 1820 may be communicating with the CDN server 1810 via a wireless network 1860, so that all communications pass through a packet data network gateway 1861 (or other intermediary network device(s)).

In step 2002, the CDN server 1810 may decrypt the request using its own public key, to obtain the session key for the secure session with the user device 1820. Thus, step 2002 may be similar or identical to step 1902, discussed above. In step 2003, the CDN server 1810 may further analyze the request, and/or may receive additional requests from the user device 1820, to determine which adaptive streaming video the user device 1820 is requesting. For example, the determination in step 2003 may include receiving a manifest file request (step 1903) after establishing a secure connection and/or receiving a video segment file request (step 1907) after establishing a secure connection. Thus, the CDN server 1810 may analyze the manifest file request and/or video segment file requests to determine which adaptive streaming video is being requested by the user device 1820. The adaptive streaming videos may be video on demand or live steaming video, and may include content such as movies, television episodes, live programming events, etc.

In step 2004, the CDN server 1810 determines whether or not the session key is to be provided to the wireless carrier. In the examples shown in FIGS. 19A and 19B, the session key was provided packet data network gateway 1861 without such a determination. However, as noted above, in this example it may be desirable for the CDN server 1810 to enforce policies regarding which wireless networks 1860 may be permitted to receive the secure session keys. Such policies may be based on the identity of the wireless carrier, the particular content publisher, or combination of the two and/or additional factors. For instance, the CDN server 1810 may maintain lists of trusted and/or untrusted wireless carriers, and the CDN server 1810 analyzes the request from the user device 1820 and determines that the user device 1820 is connecting via a secure session from an untrusted wireless carrier 1860, the CDN server 1810 may determine not provide the session key to the packet data network gateway 1861 of the untrusted wireless carrier 1860. As another example, the CDN server 1810 may determine whether or not to provide the session key to the wireless carrier based on the particular content publisher of the requested adaptive streaming video resource. For instance, certain content publishers 2030 might not want the wireless carrier 1860 reading the contents of any secure sessions with user devices 1820, and thus the CDN server 1810 may enforce the policy of the content publishers 2030 by not providing the session key to the packet data network gateway 1861 in step 2004. In still other examples, a particular content publisher 2030 may have different arrangements and/or policies with different carriers. For instance, a content publisher 2030 might agree that a first wireless carrier might decrypt and read the secure sessions when providing adaptive streaming video, while a second wireless carrier might not be permitted to do so. In this case, the CDN server 1810 may enforce the policies of the particular content publisher 2030 by retrieving policy information (e.g., from a data store of content publisher-to-wireless carrier policies) and using the identity of the content publisher and the particular wireless carrier 1860 to determine whether or not the session key is to be provided to the packet data network gateway 1861 in step 2004. In such examples, a content publisher 2030 may make independent agreements with various wireless carriers, and may alter/update those agreements at any time by instructing the CDN server 1810 to update its records regarding the content publisher's 2030 policies.

If the CDN server 1810 determines that the session key may be provided to the wireless carrier (2004:Yes), then in step 2005 the CDN server 1810 may transmit the session key to the packet data network gateway 1861 as described above. Along with the session, the CDN server 1810 may optionally transmit one or more policy-based parameters (and/or access permissions) to the packet data network gateway 1861, for example, specifying which session data that the packet data network gateway 1861 is/is not permitted to read and extract, and/or which data the packet data network gateway 1861 is/is not permitted to write into the session, etc. In step 2006, after transmitting the session key to the packet data network gateway 1861, the CDN server 1810 may continue to use the session key to encrypt and decrypt communications to and from the user device 1820, and may extract from these encrypted communications the wireless session data inserted mid-stream by the packet data network gateway 1861. On the other hand, if the CDN server 1810 determines that the session key should not be provided to the wireless carrier (2004:No), then in step 2007 the CDN server 1810 may continue to use the session key to encrypt and decrypt communications to and from the user device 1820 throughout the secure session, but would not receive any wireless session data inserted mid-stream by the packet data network gateway 1861.

Determining Manifest File Data Used in Adaptive Streaming Video Delivery

As discussed above, the manifest files that may be used to control the delivery of an adaptive streaming video to a recipient device, may be generated and configured to have a sequence of URLs corresponding to different video segment files. However, in addition to the video segment file URLs, manifest files may include additional data defining or relating to the transmission characteristics of the video segments and/or other data related to the delivery of the adaptive streaming video to the recipient device. This data may be referred to as manifest file data (or manifest file metadata). For example, manifest file data may include data defining the correct or normal sequence of video segment files, the encoding bitrates of the video segment files, the size of the video segment files, the duration of the video segment files, the presentation time of the video segment files within the adaptive streaming video, etc. In some cases, this manifest file data (or metadata) may be written into the text of the actual manifest file in human-readable and machine-readable format. In other cases, this manifest file data (or metadata) may be stored as properties of the manifest file, or may be stored in a separate data store/repository. For some manifest files, an initial block of manifest file data may apply to all of the video segment files, while in other manifest files multiple different blocks of manifest file data may apply to different video segment files in the sequence. For instance, each URL or set of URLs within a particular manifest file may have its own designated manifest file data, which may be written into the manifest file just above the URL or set of URLs. Thus, different manifest file data such as video segment duration, video segment encoding bitrate, etc., may change while the recipient device is traversing the URL listing within the manifest.

In some cases, it may be desirable to determine the manifest file data using techniques other than simply reading the data from the manifest file itself. For example, some content delivery networks (CDNs) or other infrastructure service providers may serve video segment files to a recipient device, while only having partial access or without having any access to the manifest file that the recipient is using to request the segments. Two examples of such computing environments are shown in FIGS. 21A-21B, which illustrate additional systems for delivering adaptive streaming video from one or more content delivery networks (CDNs) or other infrastructure service providers to recipient devices. In both of these examples, a recipient device 2120 may request video content from content publisher 2130, and may receive in response a manifest file that directs the recipient device 2120 to request individual video segment files from CDNs 2110. As discussed above, the adaptive streaming video content in these examples may correspond to video-on-demand (VOD), dynamic VOD, and/or live streaming content. Thus, content publisher 2130 may be, for example, an Internet-based video streaming web site, other video streaming service, or a live streaming television provider, etc.

In FIGS. 21A-21B, in addition to the various system components, several numbered circles are shown to illustrate certain device-to-device communications that may occur during the processes of delivering the adaptive streaming video to the recipient device 2120 and determining the manifest file data. The flow of both example systems FIGS. 21A-21B may be similar or identical to the flow of the system in FIG. 15A, discussed above. Referring to FIG. 21A, in step 1 the recipient device 2120 requests a particular streaming video from the content publisher 2130. In step 2, the content publisher 2130 responds to the request with a manifest file that directs the recipient device 2120 to request video segment files from CDNs 2110. In some embodiments, an interspersed manifest file may be used, or any other manifest that directs the recipient device 2120 to multiple different CDNs 2110s and 2110b to retrieve different video segments. Thus, in step 3 the recipient device 2120 may request and receive video segment files from a first CDN 2110a, and in step 4 the recipient device 2120 may request and receive different video segment files within the same adaptive streaming video from a second CDN 2110a. In the case of interspersed manifest files with URLs alternating between the first CDN 2110a and second CDN 2110b (and/or other CDNs), steps 3 and 4 each may be performed multiple times in an alternating and/or periodic sequence as the interspersed manifest file is traversed. Thus, in this example the content publisher 2130 may generate its own manifest file, and CDNs 2110 might not ever receive or have access to the manifest file itself, but may only receive video segment file requests based on the manifest file. Finally, in step 5, using techniques discussed below in more detail, one or more of the CDNs 2110 (e.g., CDN 2110a) may determine certain manifest file data based on data sources and techniques other than the manifest file itself and/or may generate performance data for the other CDNs 2110 providing the adaptive streaming video. The determined manifest file data and/or the generated performance data may then be used by the performance analyzer and/or transmitted to the content publisher 2130 or other related system.

Referring briefly to FIG. 21B, a similar example is shown in which the manifest file is generated for the content publisher 2130 by one or more separate systems including a manifest generator service 2150 and/or an ad insertion server 2155. In step 1, the recipient device 2120 requests a particular streaming video from the content publisher 2130, and steps 2 and 3 the content publisher 2130 requests and receives the manifest file from the manifest generator service 2150 and/or a server-side ad insertion service 2155. In step 4, the content publisher 2130 may respond to the request with the manifest file that directs the recipient device 2120 to request video segment files from CDNs 2110. In some embodiments, the content publisher 2130 might only request certain data from the external systems 2150-2155, such as interspersing pattern data, CDN selections, ad insertion data, etc., but may generate the manifest file itself. Additionally, in certain embodiments, the content publisher 2130 might only direct the recipient device 2120 to contact the separate external systems 2150 and/or 2155 to retrieve the manifest file. As noted above, the manifest file returned in step 4 may be an interspersed manifest file or other manifest file that directs the recipient device 2120 to multiple different CDNs 2110s and 2110b to retrieve different video segments. Thus, in step 5, the recipient device 2120 may request and receive video segment files from the first CDN 2110a, and in step 6 the recipient device 2120 may request and receive different video segment files within the same adaptive streaming video from the second CDN 2110b. As in the previous example, steps 5 and 6 each may be performed multiple times in an alternating or periodic sequence for interspersed manifest files. Thus, in this example as well as the previous example, the CDNs 2110 might only receive and serve requests for video segment files, but might not ever receive or have access to the manifest file itself. In step 7, as discussed below, one or more of the CDNs 2110 (e.g., CDN 2110a) may determine manifest file data and/or may generate performance data for the other CDNs 2110 providing the adaptive streaming video, and then use the data to determine performance and/or may transmit the data and/or performance data back to the content publisher 2130 and/or manifest generator system(s) 2150 or 2155, etc.

In some embodiments, rather than the recipient device 2120 using an interspersed manifest, all of the video segment file requests may be directed to one network of infrastructure components (e.g., CDN 2110a), which may serve some video segment file requests and redirect other video segment file requests to different infrastructure service provider(s) (e.g., CDN 2110b). In this case or any of the above examples, in the absence of manifest file data, a performance administrator may have only a limited ability to accurately determine service measurement records, derived service measurement records, and/or other measurements and records. Accordingly, in such embodiments, it may be desirable to supply manifest file data to, or generate manifest file data for, the performance administrator and/or another component of the network of infrastructure components in order to improve the functioning and accuracy of the performance administrator, improve the functioning and accuracy of one or more other components of the network of infrastructure components, and/or improve the collection of, and/or accuracy of, service measurement data.

Thus, both of the computing environments shown in FIGS. 21A-21B are examples of systems in which a CDN 2110 or other infrastructure service provider may serve video segment files for an adaptive streaming video, without having access to the manifest file controlling the delivery of the adaptive streaming video. In such systems, one or more of the CDNs 2110 may analyze the video segment file requests it receives and/or the segments it serves, in order determine manifest file data for a number of reasons. For example, for a first CDN 2110a serving a subset of the video segment files of an adaptive streaming video to analyze a second CDN 2110b serving the remaining video segment files of the adaptive streaming video, it may be necessary for the first CDN 2110a to have certain manifest file data such as the normal sequence of video segment files, the encoding bitrate, the segment length/duration, etc. Such manifest file data may be necessary for a CDN 2110 first to determine that it is serving only a subset of the video segment files for an adaptive streaming video, and also to detect events associated with CDN (or other infrastructure service provider) performance such as buffering events, bitrate shifts up or down, server failure, failure of a primary infrastructure service, etc.

In addition to a first CDN 2110a determining and using the manifest file data in order to analyze the performance of other CDNs 2110, the same techniques may be used to validate and confirm the data within a manifest file when the actual manifest file itself is available. For example, even systems having access to the actual manifest file may nonetheless determine the manifest file data using the other data sources and techniques described herein, in order to empirically confirm the accuracy of the data listed within the manifest file. Thus, if a manifest file lists an incorrect bitrate encoding, segment lengths/sizes/durations, or other incorrect data, the empirical analysis may be used to detect the incorrect data within the manifest file.

Referring now to FIG. 22, an example process is illustrated by which a system may determine manifest file data and/or analyze the performance of the CDNs/segment file servers delivering an adaptive streaming video, using data sources and techniques other than the manifest file itself. Thus, the steps in this process may be performed, for example, by a first CDN (e.g., 2110a) configured to receive and serve requests for video segment files of an adaptive streaming video. Additionally or alternatively, the steps in this process may be performed by a performance analyzer server (e.g., 1210a, 1510a, or 2110a) configured to detect adaptive streaming video delivery performance data, and attribute particular performance data or performance issues to other CDNs (e.g., 1210b, 1510b, etc.), using the various techniques previously described.

In steps 2201 and 2202, the CDN 2110a may receive and serve requests for video segment files as part of the delivery of an adaptive streaming video to a recipient device 2120. As shown in this example, these steps may be iterative and may be performed multiple times as the recipient device 2120 continuously requests and plays new video segments. As discussed above, the CDN 2110a may serve only a subset of the video segment files, for example, when an interspersed manifest file is used having URLs that direct the recipient 2120 to retrieve different video segments from different CDNs 2110 in an interspersing pattern.

In step 2203, the CDN 2110a may analyze the video segment file request received from the recipient device 2120, and/or the video segment file provided in response in step 2202, in order to determine certain manifest file data. As discussed above, the manifest file data may include data relating to the transmission characteristics of video segments and/or other data related to the delivery of the adaptive streaming video to the recipient device 2120, such as the normal video segment sequence, the encoding bitrate(s) of the video segment files, the timestamps, sizes, and/or durations the video segment files, etc. The analysis in step 2203 may include any of the techniques discussed below for determining the data of the manifest file being used by the recipient device 2120. In some cases, this analysis may be performed iteratively, for example, after serving each request (as shown in FIG. 22), or semi-iteratively, after serving a group of requests, or may be performed only a single time after all of the requested segments have been served, or in a combination of iterative, semi-iterative, and post-completion processes.

Certain techniques for determining the data of the manifest file, by a CDN 2110a serving video segment files, may include tracking the sequence in which video segments are requested during a single playback of the streaming video by the recipient device 2120, or over multiple playbacks of the streaming video by one or more recipients 2120. It may be assumed for this technique that video segment files are normally requested sequentially during a video play, not randomly or indeterminately. Thus, CDN 2110a may record and track the order of video segment file requests it receives, along with the timing of those requests, to derive manifest file data such as the sequence of video segment file URLs, the presentation time and duration of each video segment, etc. During some plays of the adaptive streaming video, certain user behavior during playback (e.g., pausing, rewinding, skipping ahead, etc.) may cause the video segment files to be requested from CDN 2110a in a different sequence. However, to account for this occasional variation, the CDN 2110a may track the sequence and timing of video segment file requests, both within a single given video play, and in aggregate across multiple independent video plays of the adaptive streaming video, in order to determine the most likely sequence of video segment file URLs in the manifest file and the related data for the segments (e.g., duration, presentation time within the video, etc.).

Additional techniques for determining the data of the manifest file, by a CDN 2110a serving video segment files, may involve analyzing the specific URLs received from the recipient device 2120 during the video segment file requests. These segment file URLs—the character strings themselves—may have a consistent format used for multiple different URLs, and thus may contain consistent information and/or information that varies consistently, which may be parsed to determine manifest file data. For example, when a video file is initially segmented and manifests are created, it is often the case that the encoding bitrate of the video file is included in the URL path and/or that the individual segments from the file are named consistently and with an appended or inserted sequence number, and further that they are numbered sequentially and not randomly or otherwise out of order. Thus, the CDN 2110*a* may read the URL character strings from multiple requests, analyze the strings to determine the common format, and then extract the relevant manifest file data from the string. For instance, a CDN 2110 may receive requests for the following URL during a single video play:

video/com/property/600/program727.segment1.ts
    video/com/property/600/program727.segment5.ts
    video/com/property/600/program727.segment9.ts
    video/com/property/800/program727.segment13.ts In this example, because 600 kilobit streams and 800 kilobit streams are possible encoding bitrates, the CDN 2110 may infer that the "600" and "800" within the URLs refer to the encoding bitrate of the requested segment. Further inferences on the URL text string may be made in some cases to determine the video segment sequences (e.g., based on file numbering) or other data properties. Also, although the data in this example is parsed from the URL text string, any query parameters that may be attached to the URL also may be analyzed to detect a parameter/attribute name or other pattern that may allow the CDN 2110 to determine certain manifest file data. Finally, one or more sample video segment files may be directly inspected to determine the encoded bitrate and confirm that the URL text string in fact does correspond to the encoded bitrate, thus allowing the URL text string to be used in instances other than the sample instances without directly inspecting the related video segment files.

Still other techniques for determining the data of the manifest file, by a CDN 2110*a* serving video segment files, may involve retrieving and then opening and/or playing the requested video segment files themselves in order to determine certain manifest file data relating to the video segments. For example, the file size (e.g., in megabytes), may be either observed or derived to determine manifest file data such as the encoded bit rate of the video segment file. Additionally, video segment files may contain data that can be extracted to generate manifest file data. For example, in HLS, video segment files may be configured as MPEG-2 transport streams, and therefore may contain presentation timestamps. These presentation timestamps may comprise data identifying the position and timing of the particular video segment file within the stream. Accordingly, manifest file data may be determined by inspecting the presentation timestamps of individual video segment files and/or by aggregating the presentation timestamps of multiple sequential video segment files, in order to determine the presentation size and duration of video segment files, and/or the correct/normal sequence of video segment files within the adaptive streaming video.

The analysis in step 2203 may include some or all of the techniques discussed above, to determine certain manifest file data within (or associated with) the manifest file used by the recipient device 2120 to request the video segment files. Thus, the CDN 2110*a* may determine in step 2203 data such as the encoding bitrates, video segment sizes, durations, presentation times within the video, and/or the video segment sequence within the manifest file, using any combination of the above techniques.

In step 2204, if the system performing step 2203 has access to the actual manifest file (2204:Yes), then in step 2205 the system may compare the manifest file data determined in step 2203 to the corresponding data read from the actual manifest file. As discussed above, this step may be performed by content publishers 2130, manifest file generators 2150, performance analyzers, etc., in order to verify and confirm the accuracy of the data within the manifest file. In some cases, step 2205 may include transmitting an alert and/or updated manifest file data to the recipient device 2120, content publishers 2130, and/or manifest generator 2150, for any data in the actual manifest file determined to be incorrect. In other cases, the system(s) performing steps 2201-2203 might not have access to the actual manifest file (2204:No), in which case it might not be possible for such systems (e.g., a CDN 2110) to verify the actual manifest file data. As an alternative, discussed below, the CDN 2110 may transmit the determined manifest file data to one of the systems that does have access to the actual manifest file (e.g., recipient device 2120, content publishers 2130, and/or manifest generator 2150). As another alternative, the system(s) performing steps 2201-2203 may use the determined manifest file data in lieu of manifest file data read from actual manifests, or may transmit determined manifest file data to other systems, such as a performance analyzer system, to use in lieu of manifest file data read from actual manifests.

In step 2206, the CDN 2110*a* (and/or other components within the streaming video delivery system) may perform various performance analyses using the manifest file data determined in step 2203. As noted above, the manifest file data determined in step 2203 may provide the underlying data used by the CDN 2110 to first determine that it is serving a subset of the video segment files for an adaptive streaming video (e.g., in accordance with an interspersed manifest), and/or to detect events associated with CDN (or other infrastructure service provider) performance such as buffering events, bitrate shifts up or down, server failure of a primary server, etc. For instance, knowing the sequence of video segments, segment lengths, and/or presentation times of the video segments may allow the CDN 2110*a* to determine when particular video segment file requests are anticipated, and thus to determine when a buffering event or a user behavior changing or stopping the stream has occurred. Additionally, knowing the encoding bitrate may allow the CDN 2110*a* to identify bitrate shifts up or down, etc. In some embodiments, the performance analysis in step 2206 may be similar or identical to step 1708, including any of the same CDN performance data collection processes, CDN performance analyses, and/or CDN performance evaluations described above.

Finally, in step 2207, the CDN 2110*a* (or other components performing the techniques within the streaming video delivery system) may transmit the performance analyses data from step 2206 and/or the manifest file data determined in step 2203 to one or more additional components within the system. For example, as discussed above in more detail, if a performance analysis is performed by a first CDN (e.g., 2110*a*) on a second CDN (e.g., 2110*b*), then results of the performance analysis may be provided to the content publisher 2130, manifest generator 2150, etc. Such performance analyses data of the second CDN 2010*b* may be used, for example, to determine if and when the second CDN 2110*b* may be selected to serve future deliveries of the adaptive streaming video.

In this disclosure, in any embodiment where a connection request is first received at a switch, which will then select the infrastructure component which will receive it, the term switch means any switching device, server, or other device that can accept requests and assign them to, or route them to, one or more receiving devices; this includes the capability to initially receive a connection request, select a device to handle the connection, and forward the connection request to the selected device, or otherwise establish an effective connection on behalf of the selected device. Note also that the return path from the selected device to the requesting device need not necessarily be through the switch (though sometimes, for some types of switches, it may be); for example, at least in the case where the receiving device is a server and the connection is a TCP connection, the server that receives the connection may normally reply directly to the requesting device by using the IP address of the switch when replying.

Where this disclosure describes one or more conditional alternatives based on one or more criteria or circumstances, whether expressly stated or not it is intended that the one or more conditional alternatives and the one or more criteria or circumstances all include the null case, and this disclosure should be read and interpreted accordingly.

Where this disclosure describes one or more consequences, results, or outputs, whether expressly stated or not such a description is not intended to be exhaustive or to preclude other consequences, results, or outputs, or to preclude the null case, and this disclosure should be read and interpreted accordingly.

Where this disclosure provides examples, such examples are intended only to illustrate, and enhance understanding of, the concept referenced and are not intended to be limiting; therefore, the words "for example," "as an example," "as another example," and similar phrases are to be read in all cases to include "but not by way of limitation," and this disclosure should be read accordingly.

In the embodiments described herein, manifest files, as previously indicated, are typically text files. This means that (among other things) manifest files are typically character-based files that do not contain mark-up language instructions. However, the embodiments described herein are not limited to manifest files that are text files; rather, manifest files may be any kind of file, including files formatted in a mark-up language such as HTML or XML, or other types of files.

Section headings contained in this disclosure, for example the heading "Introduction" in the Detailed Description, are provided to assist the reader and are not intended to limit the scope of the text that follows; headings in this disclosure should not be construed as limiting. Some series contained in this disclosure have been structured as lists, typically in alphabetized form, to assist the reader in determining the scope and contents of each item in the series; the alphabetized listing (itself) of such series is not intended to be limiting to the contents of the series or to imply that the series is sequential, or to convey a sequence of priority, importance, execution, or interpretation. The alphabetized listing (itself) of such a series in this disclosure should not be construed as limiting.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A method of determining performance metrics for infrastructure service providers (SPs) providing adaptive streaming video, the method comprising:
receiving, by a network monitoring device, data metrics corresponding to a transmission of one or more video segment files from a first infrastructure service provider (SP) to one or more recipient devices, the video segment files corresponding to a portion of a first adaptive streaming video, wherein the first adaptive streaming video is provided by the first SP;
determining, by the first SP, one or more performance metrics associated with the first SP based on the received data metrics corresponding to the transmission of the video segment files from the first SP to the one or more recipient devices;
receiving, by the first SP, a request for data relating to a manifest file for a second adaptive streaming video;
selecting, by the first SP, one or more additional SPs operated independently from the first SP to provide at least a portion of the second adaptive streaming video, based on the determined performance metrics associated with-the first SP; and transmitting, by the first SP, in response to the request, data identifying the one or more additional SPs selected to provide at least a portion of the second adaptive streaming video.

2. The method of determining performance metrics for infrastructure service providers (SPs) providing adaptive streaming video of claim 1, wherein the network monitor device is a network appliance configured to operate within the first SP.

3. The method of determining performance metrics for infrastructure service providers (SPs) providing adaptive streaming video of claim 2, wherein the network monitoring device corresponds to at least one of a network tap device, a network router, or a switched port analyzer device within the first SP.

4. The method of determining performance metrics for infrastructure service providers (SPs) providing adaptive streaming video of claim 1, wherein the network monitor device is not within the first SP, but is a network appliance configured to operate on an access network through which the one or more recipient devices communicate with the first SP.

5. The method of determining performance metrics for infrastructure service providers (SPs) providing adaptive streaming video of claim 1, wherein each of the video segment files transmitted from the first SP to the one or more recipient devices is interspersed within one or more additional video segment files transmitted from the one or more additional SPs operated separately and independently from the first SP to the one or more recipient devices.

6. The method of determining performance metrics for infrastructure service providers (SPs) providing adaptive streaming video of claim 1, wherein determining the performance metrics associated with the first SP comprises:
determining that a shift from one bandwidth version of the first adaptive streaming video to another bandwidth version of the first adaptive streaming video has been initiated by a recipient device of the first adaptive streaming video; and
attributing the shift to a second SP operated separately and independently from the first SP.

7. The method of determining performance metrics for infrastructure service providers (SPs) providing adaptive streaming video of claim 1, wherein determining the performance metrics associated with the first SP comprises:
detecting, based on video segment file requests transmitted from a first recipient device of the first adaptive streaming video to the first SP, that a buffering event occurred at the first recipient device; and
attributing the buffering event to a second SP operated separately and independently from the first SP.

8. The method of determining performance metrics for infrastructure service providers (SPs) providing adaptive streaming video of claim 1, wherein determining the performance metrics associated with the first SP comprises detecting a failure of a second SP operated separately and independently from the first SP by:
receiving, by the first SP, data corresponding to a first request for a first video segment file transmitted from a first recipient device to the first SP;
determining, by the first SP, that the first request includes a first URL corresponding to a primary URL within a first manifest file for the first adaptive streaming video;
receiving, by the first SP, data corresponding to a second request for a second video segment file transmitted from the first recipient device to the first SP;
determining, by the first SP, that the second request includes a second URL corresponding to a failover URL within the first manifest file for the first adaptive streaming video; and
determining, by the network monitoring device, that the second SP failed to provide at least a portion of the first adaptive streaming video in between the first video segment file and the second video segment file.

9. A system for determining performance metrics for infrastructure service providers (SPs) providing adaptive streaming video, the system comprising a first infrastructure service provider (SP) and a network monitor device configured to monitor network traffic within one or more computer networks:
the network monitor device comprising:
one or more computer network interfaces;
a processing unit including one or more processors; and
memory coupled with and readable by the processing unit and storing therein a set of instructions which, when executed by the processing unit, causes the network monitor device to:
receive data metrics corresponding to a transmission of one or more video segment files from the first infrastructure service provider (SP) to one or more recipient devices, the video segment files corresponding to a portion of a first adaptive streaming video, wherein the first adaptive streaming video is provided by the first SP; and
the first SP comprising one or more computer servers, each said computer server comprising:
a processing unit including one or more processors; and
memory coupled with and readable by the processing unit and storing therein a set of instructions which, when executed by the processing unit, causes the computer server to:
determine one or more performance metrics associated with the first SP, based on the received data metrics corresponding to the transmission of the video segment files from the first SP to the one or more recipient devices;
receive a request for data relating to a manifest file for a second adaptive streaming video;
select one or more additional SPs operated independently from the first SP to provide at least a portion of the second adaptive streaming video, based on the determined performance metrics associated with the first SP; and
transmit, in response to the request, data identifying the one or more additional SPs selected to provide at least a portion of the second adaptive streaming video.

10. The system of claim 9, wherein the network monitor device is a network appliance configured to operate within the first SP.

11. The system of claim 10, wherein the network monitoring device corresponds to at least one of a network tap device, a network router, or a switched port analyzer device within the first SP.

12. The system of claim 9, wherein the network monitor device is not within the first SP, but is a network appliance configured to operate on an access network through which the one or more recipient devices communicate with the first SP.

13. The system of claim 9, wherein each of the video segment files transmitted from the first SP to the one or more recipient devices is interspersed within one or more additional video segment files transmitted from the one or more additional SPs operated separately and independently from the first SP to the one or more recipient devices.

14. The system of claim 9, wherein determining the performance metrics associated with the one or more additional SPs operated separately and independently from the first SP comprises:
  determining that a shift from one bandwidth version of the first adaptive streaming video to another bandwidth version of the first adaptive streaming video has been initiated by a recipient device of the first adaptive streaming video; and
  attributing the shift to a second SP operated separately and independently from the first SP.

15. The system of claim 9, wherein determining the performance metrics associated with the one or more additional SPs operated separately and independently from the first SP comprises:
  detecting, based on video segment file requests transmitted from a first recipient device of the first adaptive streaming video to the first SP, that a buffering event occurred at the first recipient device; and
  attributing the buffering event to a second SP operated separately and independently from the first SP.

16. The system of claim 9, wherein determining the performance metrics associated with the one or more additional SPs comprises detecting a failure of a second SP operated separately and independently from the first SP by:
  receiving, by the first SP, data corresponding to a first request for a first video segment file transmitted from a first recipient device to the first SP;
  determining, by the first SP, that the first request includes a first URL corresponding to a primary URL within a first manifest file for the first adaptive streaming video;
  receiving, by the first SP, data corresponding to a second request for a second video segment file transmitted from the first recipient device to the first SP;
  determining, by the first SP, that the second request includes a second URL corresponding to a failover URL within the first manifest file for the first adaptive streaming video; and
  determining, by the network monitoring device, that the second SP failed to provide at least a portion of the first adaptive streaming video in between the first video segment file and the second video segment file.

17. One or more non-transitory computer-readable media, comprising computer-executable instructions, which when executed by a computer system comprising a first infrastructure service provider (SP) and a network monitoring device, cause the computer system to:
  receive, by the network monitoring device, data metrics corresponding to a transmission of one or more video segment files from the first infrastructure service provider (SP) to one or more recipient devices, the video segment files corresponding to a portion of a first adaptive streaming video, wherein the first adaptive streaming video is provided by the first SP;
  determine, by the first SP, one or more performance metrics associated with the first SP, based on the received data metrics corresponding to the transmission of the video segment files from the first SP to the one or more recipient devices;
  receive, by the first SP, a request for data relating to a manifest file for a second adaptive streaming video;
  select, by the first SP, one or more additional SPs operated independently from the first SP to provide at least a portion of the second adaptive streaming video, based on the determined performance metrics associated with the first SP; and
  transmit, by the first SP, in response to the request, data identifying the one or more additional SPs selected to provide at least a portion of the second adaptive streaming video.

18. The non-transitory computer-readable media of claim 17, wherein determining the performance metrics associated with the one or more additional SPs operated separately and independently from the first SP comprises:
  determining that a shift from one bandwidth version of the first adaptive streaming video to another bandwidth version of the first adaptive streaming video has been initiated by a recipient device of the first adaptive streaming video; and
  attributing the shift to a second SP operated separately and independently from the first SP.

19. The non-transitory computer-readable media of claim 17, wherein determining the performance metrics associated with the one or more additional SPs operated separately and independently from the first SP comprises:
  detecting, based on video segment file requests transmitted from a first recipient device of the first adaptive streaming video to the first SP, that a buffering event occurred at the first recipient device; and
  attributing the buffering event to a second SP operated separately and independently from the first SP.

20. The non-transitory computer-readable media of claim 17, wherein determining the performance metrics associated with the one or more additional SPs comprises detecting a failure of a second SP operated separately and independently from the first SP by:
  receiving, by the first SP, data corresponding to a first request for a first video segment file transmitted from a first recipient device to the first SP;
  determining, by the first SP, that the first request includes a first URL corresponding to a primary URL within a first manifest file for the first adaptive streaming video;
  receiving, by the first SP, data corresponding to a second request for a second video segment file transmitted from the first recipient device to the first SP;
  determining, by the first SP, that the second request includes a second URL corresponding to a failover URL within the first manifest file for the first adaptive streaming video; and
  determining, by the network monitoring device, that the second SP failed to provide at least a portion of the first adaptive streaming video in between the first video segment file and the second video segment file.

* * * * *